United States Patent
Ackerson et al.

(10) Patent No.: US 12,217,389 B2
(45) Date of Patent: Feb. 4, 2025

(54) CODEC FOR PROCESSING SCENES OF ALMOST UNLIMITED DETAIL

(71) Applicant: QUIDIENT, LLC, Easton, MD (US)

(72) Inventors: David Scott Ackerson, Easton, MD (US); Donald J. Meagher, Candia, NH (US); John K. Leffingwell, Madison, AL (US)

(73) Assignee: QUIDIENT, LLC, Easton, MD (US)

(*) Notice: Subject to any disclaimer, the term of this patent is extended or adjusted under 35 U.S.C. 154(b) by 0 days.

(21) Appl. No.: 18/514,340

(22) Filed: Nov. 20, 2023

(65) Prior Publication Data

US 2024/0087088 A1     Mar. 14, 2024

Related U.S. Application Data

(63) Continuation of application No. 17/051,951, filed as application No. PCT/US2019/030483 on May 2, 2019, now Pat. No. 11,875,476.

(Continued)

(51) Int. Cl.
*G06T 3/4092*  (2024.01)
*G06T 3/067*  (2024.01)

(Continued)

(52) U.S. Cl.
CPC ............ *G06T 3/4092* (2013.01); *G06T 3/067* (2024.01); *G06T 3/4076* (2013.01); *G06T 9/40* (2013.01); *G06T 19/006* (2013.01)

(58) Field of Classification Search
None
See application file for complete search history.

(56) References Cited

U.S. PATENT DOCUMENTS 10,521,952 B2 * 12/2019 Ackerson .............. G06T 7/0002
2013/0128068 A1   5/2013 Georgiev et al.
(Continued)

FOREIGN PATENT DOCUMENTS

EP    3 144 887    3/2017
GB    2535475     8/2016

OTHER PUBLICATIONS

John K. Leffingwell et al., "Generalized Scene Reconstruction", Quidient, LLC, Mar. 22, 2018, pp. 1-14 (Year: 2018).*

(Continued)

*Primary Examiner* — Dov Popovici
(74) *Attorney, Agent, or Firm* — Nixon & Vanderhye, PC

(57) ABSTRACT

Methods and apparatus for systems using a scene codec are described, where systems are either providers or consumers of multi-way, just-in-time, only-as-needed scene data including subscenes and subscene increments. An example system using a scene codec includes a plenoptic scene database containing one or more digital models of scenes, where representations and organization of representations are distributable across multiple systems such that collectively the multiplicity of systems can represent scenes of almost unlimited detail. The system may further include highly efficient means for the processing of these representation and organizations of representation providing the just-in-time, only-as-needed subscenes and scene increments necessary for ensuring a maximally continuous user experience enabled by a minimal amount of newly provided scene information, where the highly efficient means include a spatial processing unit.

20 Claims, 83 Drawing Sheets

Related U.S. Application Data

(60) Provisional application No. 62/665,806, filed on May 2, 2018.

(51) Int. Cl.
*G06T 3/4076* (2024.01)
*G06T 9/40* (2006.01)
*G06T 19/00* (2011.01)

(56) References Cited

U.S. PATENT DOCUMENTS

2015/0146032 A1    5/2015  Rime et al.
2019/0130630 A1*  5/2019  Ackerson ............. G06V 20/647

OTHER PUBLICATIONS

International Search Report for PCT/US2019/030483 dated Sep. 3, 2019, 4 pages.
Written Opinion of the ISA for PCT/US2019/030483 dated Sep. 3, 2019, 5 pages.
European Search Report for Application No. 19796775.5 dated Dec. 6, 2021, 8 pages.
Generalized Scene Reconstruction by John K. Leffingwell, et al., 14 pages.

* cited by examiner

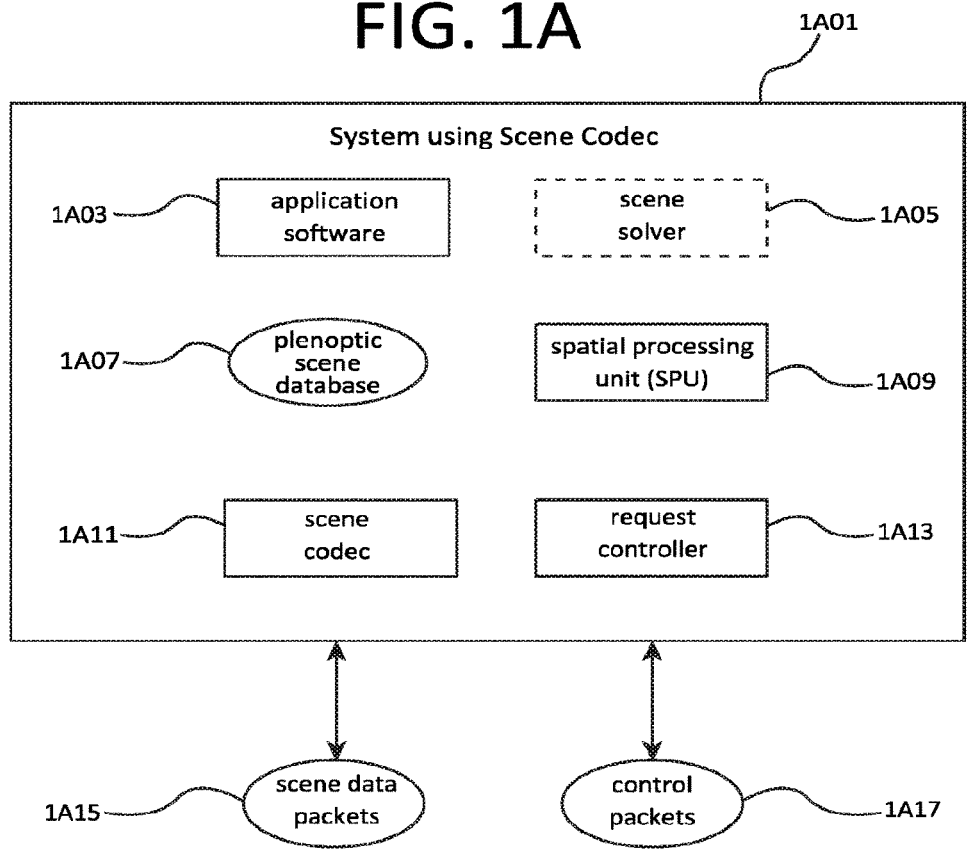
FIG. 1A
FIG. 1B  FIG. 1C  FIG. 1D
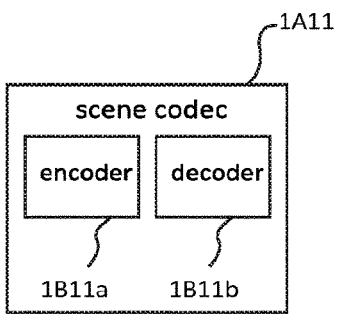 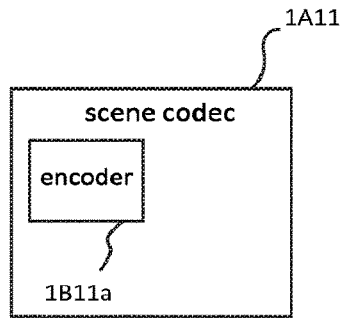 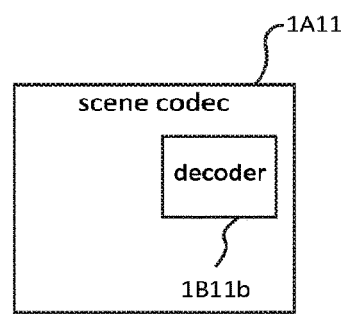

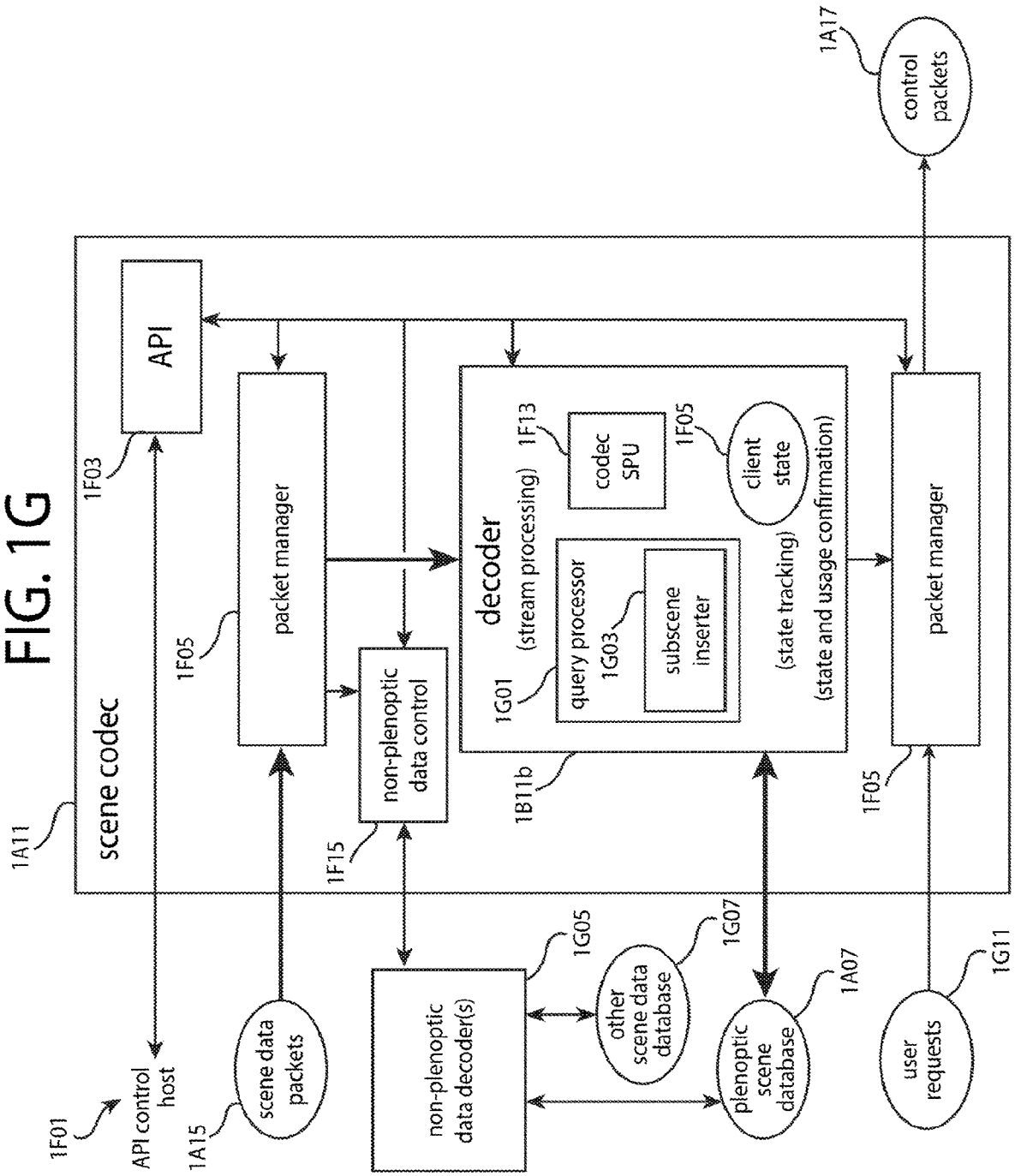

data model view of real scene

FIG. 53

SPU Minimalist Projection Geometry

Looking at face 5 (p = 1) from +z axis, +x to the right and +y up. The sae's are tracked in face 1 where the intersection w
Here the quadrants are numbered when looking from the +z axis (z when looking at the projection in x=7 plane and +x w
When looking at the face, we are only projecting into the upper/left quadrant. When subdividing it, the sub-quadrants

| | SLT PUSH | VLO PUSH | Sael PUSH | SLT To Lev | VLO To Lev | Sael To Lev | SLT Edge | SLT step x | SLT step y | SLTx | SLTy | VLO Edge | VLO step x | VLO step y | VLO x |
|---|---|---|---|---|---|---|---|---|---|---|---|---|---|---|---|
| | | | | Start x: 0 | 0 | Start y: 0 | | | | | | | | | |
| Iteration | | | | | | | | | | | | | | | |
| (start) | | | | 0 | 0 | 1 | 1 | | | 0 | 0 | 1 | 0 | 0 | 0 |
| 1 | 3 | | | 1 | 0 | 1 | 0.5 | 0.5 | 0.5 | 0.5 | 0.5 | 1 | 0 | 0 | 0 |
| 2 | 2 | | | 2 | 0 | 1 | 0.25 | -0.25 | 0.25 | 0.25 | 0.75 | 1 | 0 | 0 | 0 |
| 3 | | 3 | | 2 | 1 | 1 | 0.25 | 0 | 0 | 0.25 | 0.75 | 0.5 | 0.5 | 0.5 | 0.5 |
| 4 | | 1 | | 2 | 2 | 1 | 0.25 | 0 | 0 | 0.25 | 0.75 | 0.25 | 0.25 | -0.25 | 0.75 |
| 5 | | | 1 | 2 | 2 | 2 | 0.25 | 0 | 0 | 0.25 | 0.75 | 0.25 | 0 | 0 | 0.75 |
| 6 | | | 2 | 2 | 2 | 3 | 0.25 | 0 | 0 | 0.25 | 0.75 | 0.25 | 0 | 0 | 0.75 |
| 7 | | 0 | | 2 | 3 | 3 | 0.125 | -0.125 | 0.125 | 0.125 | 0.75 | 0.125 | -0.125 | -0.125 | 0.625 |
| 8 | | 1 | | 2 | 4 | 3 | 0.125 | 0 | 0 | 0.125 | 0.75 | 0.0625 | 0.0625 | -0.0625 | 0.6875 |
| 9 | 2 | | | 3 | 5 | 3 | 0.125 | 0 | 0 | 0.125 | 0.875 | 0.0625 | 0 | 0 | 0.6875 |
| 10 | | 3 | | 3 | 5 | 3 | 0.125 | 0 | 0 | 0.125 | 0.875 | 0.03125 | 0.03125 | 0.0313 | 0.7188 |
| 11 | | | | 3 | 5 | 3 | 0.125 | 0 | 0 | 0.125 | 0.875 | 0.03125 | 0 | 0 | 0.7188 |
| 12 | | | | 3 | 5 | 3 | 0.125 | 0 | 0 | 0.125 | 0.875 | 0.03125 | 0 | 0 | 0.7188 |
| 13 | | | | 3 | 5 | 3 | 0.125 | 0 | 0 | 0.125 | 0.875 | 0.03125 | 0 | 0 | 0.7188 |
| 14 | | | | 3 | 5 | 3 | 0.125 | 0 | 0 | 0.125 | 0.875 | 0.03125 | 0 | 0 | 0.7188 |
| 15 | | | | | | | | | | | | | | | |
| 16 | | | | | | | | | | | | | | | |

FIG. 54

On face 1 I have y > 0.
When looking at the face (upper half).
Are numbered 0 to 4 with 0 & 1 being the lower subdivision and 2 & 3 the upper subdivision.

| VLO y | TOP Slope | BOT Slope | t_y | b_y | comp t_y | comp b_y | NOTES |
|---|---|---|---|---|---|---|---|
| 0 | 1 | 0 | 0 | 0 | 0 | 0 | initialization |
| 0 | 1 | 0 | 0.5 | 0.5 | 0 | 0.5 | move SLT |
| 0 | 1 | 0 | 0.5 | 0.75 | 0.75 | 0.75 | move SLT |
| 0.5 | 1 | 0 | 0.5 | 0.25 | 0.5 | 0.25 | move VLO (projection plane attached to center) |
| 0.25 | 1 | 0 | 1 | 0.5 | 1 | 0.5 | move VLO (projection plane attached to center) |
| 0.25 | 0.5 | 0.25 | 0.75 | 0.625 | 0.75 | 0.625 | subdivide sael |
| 0.25 | 0.5 | 0.25 | 0.8125 | 0.71875 | 0.8125 | 0.71875 | subdivide sael |
| 0.125 | 0.5 | 0.25 | 0.90625 | 0.796875 | 0.90625 | 0.796875 | move VLO (projection plane attached to center) |
| 0.0625 | 0.5 | 0.25 | 1.09375 | 0.953125 | 1.08375 | 0.953125 | |
| 0.0625 | 0.5 | 0.25 | 1.078125 | 0.9296875 | 1.078125 | 0.9296875 | |
| 0.0938 | 0.5 | 0.25 | 1.078125 | 0.9296875 | 1.078125 | 0.9296875 | |
| 0.0938 | 0.5 | 0.25 | 1.078125 | 0.9296875 | 1.078125 | 0.9296875 | |
| 0.0938 | 0.5 | 0.25 | 1.078125 | 0.9296875 | 1.078125 | 0.9296875 | |
| 0.0938 | 0.5 | 0.25 | 1.078125 | 0.9296875 | 1.078125 | 0.9296875 | |
| 0.0938 | 0.5 | 0.25 | 1.078125 | 0.9296875 | 1.078125 | 0.9296875 | |

FIG. 55

| Rows | col A | 7 | 8 | row 9 | row 10 |
|---|---|---|---|---|---|
| | | | Iteration | 1 | |
| B | | SLT | PUSH | (start) | |
| C | | V/O | PUSH | | |
| D | | Small | PUSH | | |
| E | | SLT | To Lev | 0 | =IF(B10="", E9, E9+1) |
| F | | V/O | To Lev | 0 | =IF(C10="", F9, F9+1) |
| G | | Small | To Lev | 1 | =IF(D10="", G9, G9+1) |
| H | | SLT | Edge | 1 | =IF(B10="", H9, H9/2) |
| I | | SLT | step_x | =F5 | =IF(OR(SB10=1,SB10=3),SM10, -SM10) |
| J | | SLT | SLTy | =H5 | =IF(OR(SB10=2,SB10=3),SM10, -SM10) |
| K | | TB | Edge | 1 | =K9+I10 |
| L | | TB | | | =L9+J10 |
| M | | V/O | step_x | 1 | =IF(C10="", M9, M9/2) |
| N | | V/O | | 0 | =IF(OR(SC10=1,SC10=3),SM10, -SM10) |
| O | | V/O | V/O_x | 0 | =IF(OR(SC10=2,SC10=3),SM10, -SM10) |
| P | | | V/O_y | 0 | =P9+I10 |
| Q | | | | 0 | =Q9+O10 |
| R | | TOP | Shape | 1 | =IF(C10="", M9, M9/2) |
| S | | BOT | | 0 | =IF(SD10="", S9, (IF(OR(SD10=0,SD10=1),(SR9 + SS9)/2,R9)) |
| T | | | L_y | =F5+H5 | =IF(SD10="",T9+I10-I10*R10-O10+N10*R10, (IF(OR(SD10=0,SD10=1),(SR9 + SS9)/2, ST9)) |
| U | | | b_y | =H5 | =IF(SD10="",U9+J10-J10*S10-O10+M10*S10, (IF(OR(SD10=0,SD10=1),SP10*S10 - SQ10)) |
| V | | | comp_t_y | =SL9 + (SP9-SK9)*R9 - SO9 | =SL10 + (SP10-SK10)*R10 - SQ10 |
| W | | | comp_b_y | =SL9 + (SP9-SK9)*S9 - SQ9 | =SL10 + (SP10-SK10)*S10 - SQ10 |
| X | | | NOTES | initialization | move SLT |

FIG. 64

| SPU Minimalist Projection Geometry | | | | | | | | | | | | | | | | |
|---|---|---|---|---|---|---|---|---|---|---|---|---|---|---|---|---|
| | | | | | | | | Looking at face 5 (z = 1) from +z axis, +x to the right and +y up. The axis are tracked in face 1 where the intersection with... | | | | | | | | |
| | | | | | | | | Here the quadrants are numbered when looking from the +z axis (z when looking at the projection in x=? plane and +x wh... | | | | | | | | |
| | | | | | | | | When looking at the face, we are only projecting into the upper/left quadrant. When subdividing it, the sub-quadrants ... | | | | | | | | |
| | | | | | SLT | | Start x: 0.125 | Start y: 0.06625 | | | | | | | | |
| | SLT | VLO | Sml | SLT | VLO | Sml | SLT | SLT | SLT | SLT | SLT | VLO | VLO | VLO | | |
| | PUSH | PUSH | PUSH | InLev | InLev | InLev | Edge | step x | step y | SLTx | SLTy | Edge | step x | step y | | |
| Iteration | | | | | | | | | | | | | | | | |
| [start] | | | | 0 | 0 | 1 | 1 | | | 0.125 | 0.0625 | 1 | 0 | 0 | | |
| 1 | 3 | | | 1 | 0 | 1 | 0.5 | 0.5 | 0.5 | 0.625 | 0.5625 | 1 | 0 | 0 | | |
| 2 | 2 | | | 2 | 0 | 1 | 0.25 | -0.25 | 0.25 | 0.375 | 0.8125 | 1 | 0 | 0 | | |
| 3 | | 3 | | 2 | 1 | 1 | 0.25 | 0 | 0 | 0.375 | 0.8125 | 0.5 | 0.5 | 0.5 | | |
| 4 | | 1 | | 2 | 2 | 1 | 0.25 | 0 | 0.25 | 0.375 | 0.8125 | 0.25 | 0.25 | -0.25 | | |
| 5 | | | 1 | 2 | 2 | 2 | 0.25 | 0 | 0 | 0.375 | 0.8125 | 0.25 | 0 | 0 | | |
| 6 | | | 2 | 2 | 2 | 3 | 0.25 | 0 | 0 | 0.375 | 0.8125 | 0.25 | 0 | 0 | | |
| 7 | | 0 | | 2 | 3 | 3 | 0.25 | 0 | 0.125 | 0.375 | 0.8125 | 0.125 | -0.125 | -0.125 | | |
| 8 | | 1 | | 2 | 4 | 3 | 0.125 | -0.125 | 0 | 0.25 | 0.9375 | 0.0625 | 0.0625 | -0.0625 | | |
| 9 | 2 | | | 3 | 4 | 3 | 0.125 | 0 | 0 | 0.25 | 0.9375 | 0.0625 | 0 | 0 | | |
| 10 | | 3 | | 3 | 5 | 3 | 0.125 | 0 | 0 | 0.25 | 0.9375 | 0.03125 | 0.03125 | 0.03125 | | |
| 11 | | | | 3 | 5 | 3 | 0.125 | 0 | 0 | 0.25 | 0.9375 | 0.03125 | 0 | 0 | | |
| 12 | | | | 3 | 5 | 3 | 0.125 | 0 | 0 | 0.25 | 0.9375 | 0.03125 | 0 | 0 | | |
| 13 | | | | 3 | 5 | 3 | 0.125 | 0 | 0 | 0.25 | 0.9375 | 0.03125 | 0 | 0 | | |
| 14 | | | | 3 | 5 | 3 | 0.125 | 0 | 0 | 0.25 | 0.9375 | 0.03125 | 0 | 0 | | |

FIG. 65 face 1 have y > 0.
en looking at the face (upper half).
re numbered 0 to 4 with 0 & 1 being the lower subdivision and 2 & 3 the upper subdivision.

| V.O. x | V.O. y | TOP Slope | BOT Slope | t_x | b_x | cam. t_y | cam. b_y | NOTES |
|---|---|---|---|---|---|---|---|---|
| 0 | 0 | 1 | 0 | -0.0625 | 0.0625 | -0.0625 | 0.0625 | initialization |
| 0 | 0 | 1 | 0 | -0.0625 | 0.5625 | -0.0625 | 0.5625 | move $t$,$t$ |
| 0 | 0 | 1 | 0 | 0.4375 | 0.8125 | 0.4375 | 0.8125 | move $t$,$t$ |
| 0.5 | 0.5 | 1 | 0 | 0.4375 | 0.3125 | 0.4375 | 0.3125 | move VLO (projection plane attached to center) |
| 0.75 | 0.25 | 0.5 | 0 | 0.9375 | 0.5625 | 0.9375 | 0.5625 | move VLO (projection plane attached to center) |
| 0.75 | 0.25 | 0.5 | 0 | 0.75 | 0.5625 | 0.75 | 0.5625 | subdivide sw1 |
| 0.75 | 0.25 | 0.5 | 0.25 | 0.75 | 0.65625 | 0.75 | 0.65625 | subdivide sw1 |
| 0.625 | 0.125 | 0.5 | 0.25 | 0.8125 | 0.75 | 0.8125 | 0.75 | move VLO (projection plane attached to center) |
| 0.6875 | 0.0625 | 0.5 | 0.25 | 0.96625 | 0.828125 | 0.90625 | 0.828125 | |
| 0.6875 | 0.0625 | 0.5 | 0.25 | 1.09375 | 0.904375 | 1.09375 | 0.904375 | |
| 0.71875 | 0.09375 | 0.5 | 0.25 | 1.078125 | 0.960938 | 1.078125 | 0.960938 | |
| 0.71875 | 0.09375 | 0.5 | 0.25 | 1.078125 | 0.960938 | 1.078125 | 0.960938 | |
| 0.71875 | 0.09375 | 0.5 | 0.25 | 1.078125 | 0.960938 | 1.078125 | 0.960938 | |
| 0.71875 | 0.09375 | 0.5 | 0.25 | 1.078125 | 0.960938 | 1.078125 | 0.960938 | |

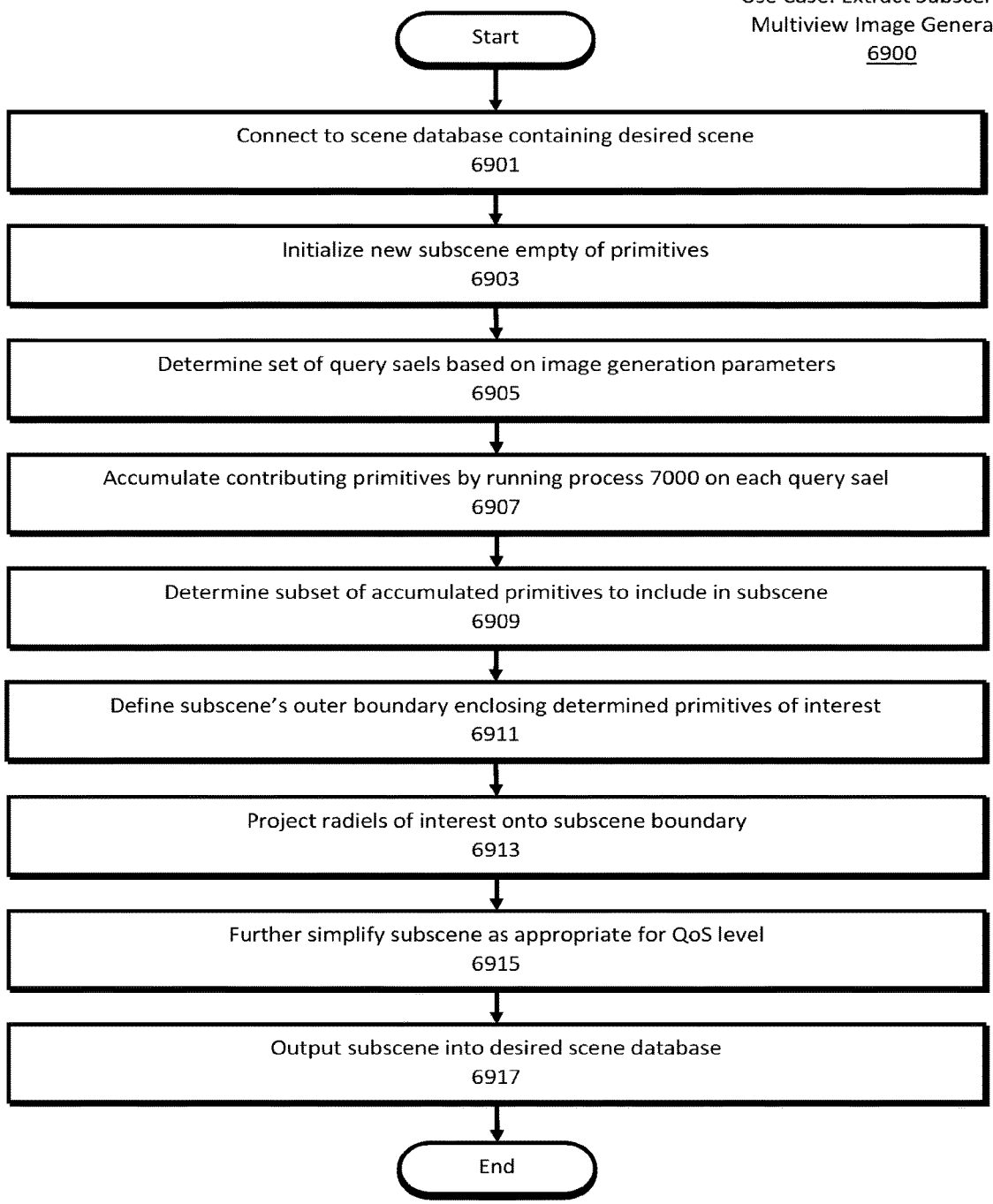

Project Query Sael to Accumulate Contributing Primitives
7000

FIG. 75
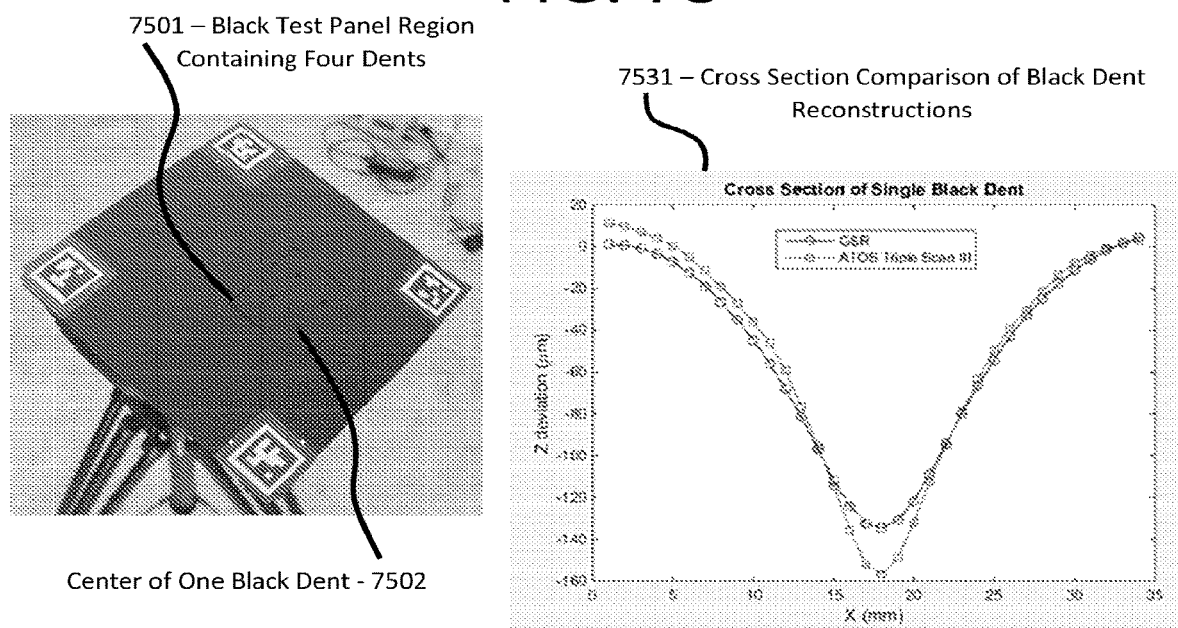
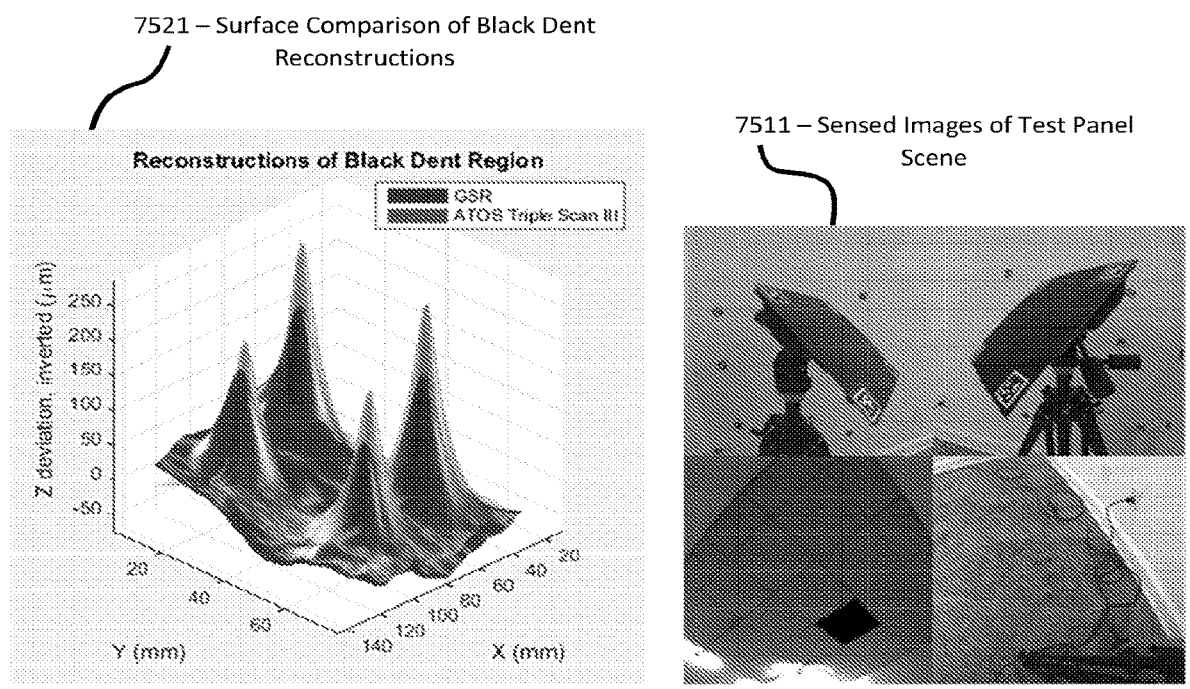

FIG. 76
7601 – White Test Panel Region Containing Four Dents
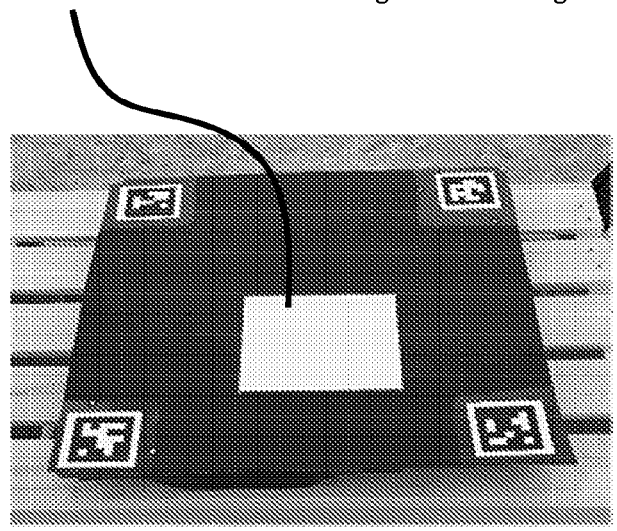
7611 – Surface Comparison of White Dent Reconstructions
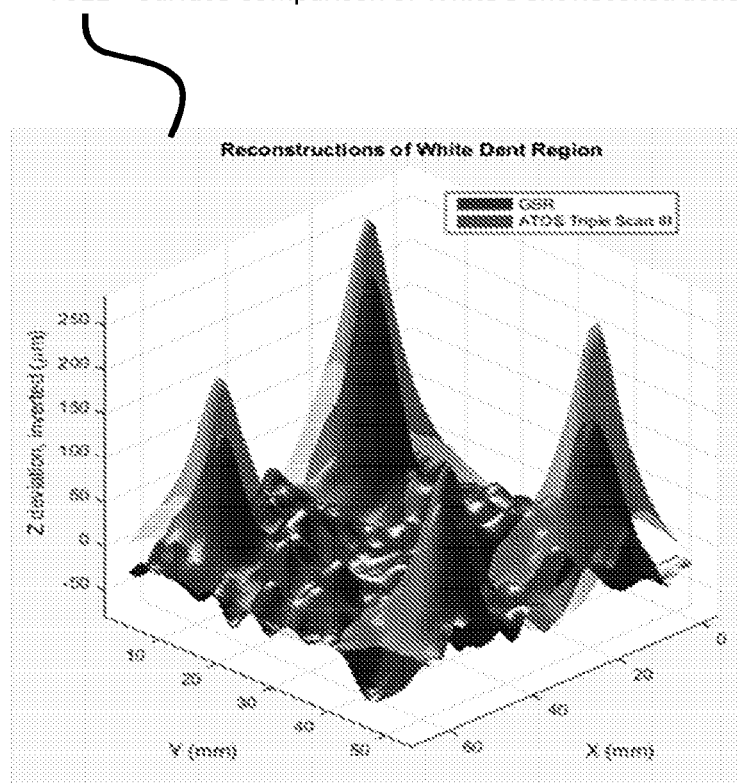

FIG. 77
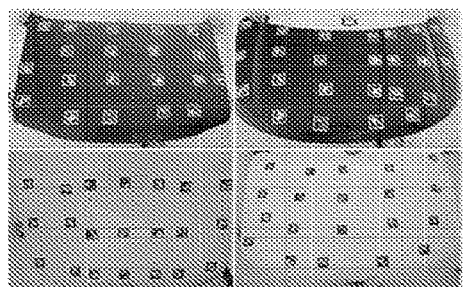
7701 – Hail-Damaged Vehicle Panels
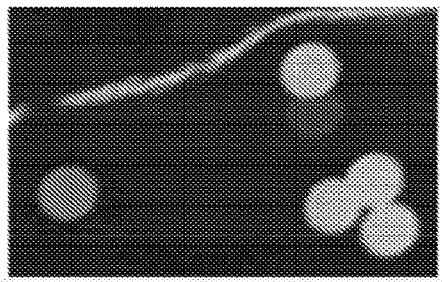
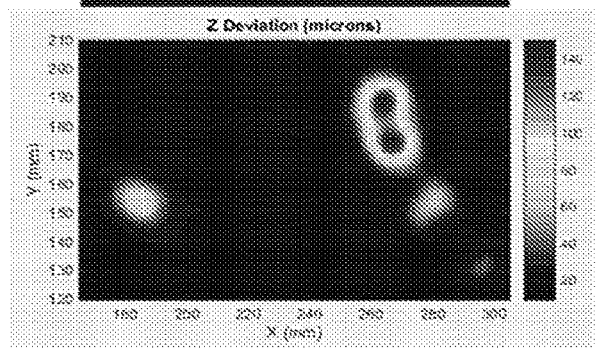
7731 – Photograph and Reconstructed Indentation Map of Panel Region
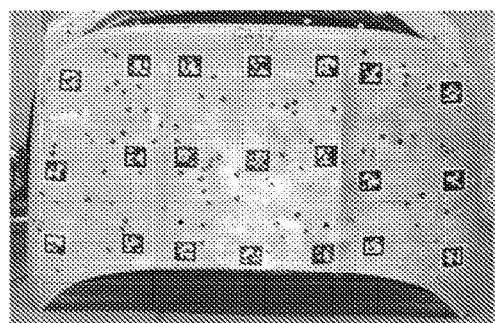
7721 – Vehicle Panel Annotated by Trained Human Inspectors
7741 – Annotated Indentation Maps of Dented Panel Regions
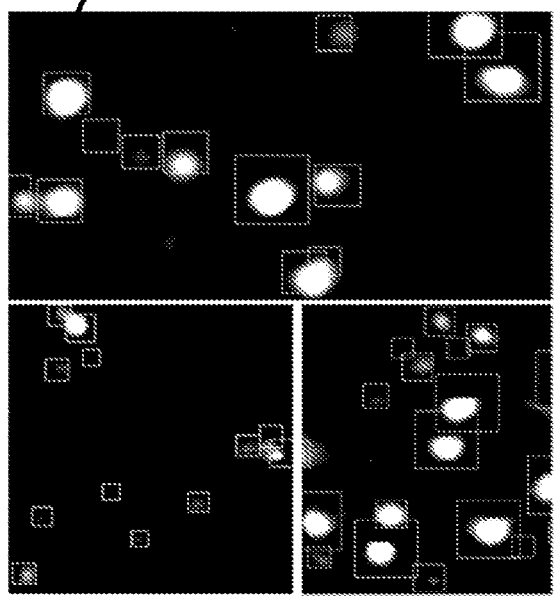
7711 – Vehicle Panel in Bright Light Field
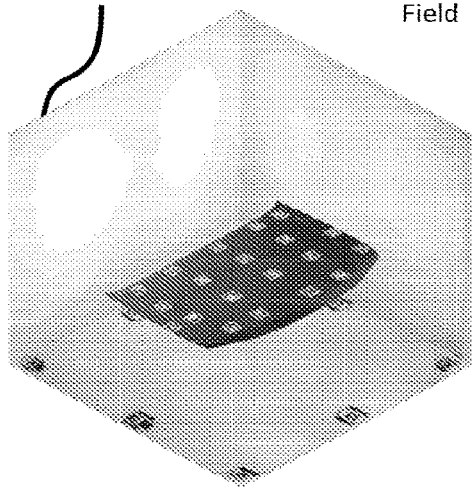

CODEC FOR PROCESSING SCENES OF ALMOST UNLIMITED DETAIL

CROSS REFERENCE TO RELATED APPLICATIONS

This application is a continuation application of U.S. application Ser. No. 17/051,951 filed Oct. 30, 2020. U.S. application Ser. No. 17/051,951 is the U.S. national phase of International Application No. PCT/US2019/030483 filed May 2, 2019 which designated the U.S. and claims priority to U.S. Provisional Patent Application No. 62/665,806 filed May 2, 2018, the entire contents of each of which are hereby incorporated by reference. This application is related to PCT Application No. PCT/US2017/026994, filed Apr. 11, 2017, the entire content of which is hereby incorporated.

FIELD

This disclosure relates to scene representation, processing and acceleration in distributed digital networks.

BACKGROUND

Various codecs are well known in the art and in general are a device or program that compresses data to enable faster transmission and decompresses received data. Typical types of codecs include video (e.g. MPEG, H.264), audio (e.g. MP3, ACC), image (e.g. JPEG, PNG) and data (e.g. PKZIP), where the type of codec encapsulates and is strongly coupled to the type of data. While these types of codecs are satisfactory for applications limited to the type of data, inherent with the strong coupling is a limited end user experience.

Codecs are essentially "file based", where the file is a data representation of some real or synthetic pre-captured sensory experience, and where the file (such as a movie, song or book) necessarily limits a user's experience to experience-paths chosen by the file creator. Hence, we watch movies, listen to songs and read books in a substantially ordered experience confined by the creator.

Technological advancements in the marketplace are providing for increased means for both expanding types of data and experiencing types of data. Increases in the types of data include what is often referred to as real-world scene reconstruction in which sensors such as cameras and range finding devices create scene models of the real-world scene. The present inventors have proposed significant advancements in scene reconstruction in the patent application PCT/2017/026994 "Quotidian Scene Reconstruction Engine", filed Apr. 11, 2017, the entire content of which is hereby incorporated by reference. Improvements in the means for experiencing types of data include higher resolution and better performing 2D and 3D displays, autostereoscopic displays, holographic display and extended reality devices such as virtual reality (VR) headsets and augmented reality (AR) headsets and methods. Other significant technological advancements include the proliferation of automatons, where humans are no longer the sole consumers of real-world sensory information and the proliferation of networks, where the flow of and access to information is enabling new experience paradigms.

Some work has been accomplished for the development of new scene-based codecs, where then the type of data is the reconstruction of a real-world scene and/or the computer generation of a synthetic scene. For an assessment of scene codecs the reader is directed to the *Technical report of the joint ad hoc group for digital representations of light/sound fields for immersive media applications* as published by the "Joint ad hoc group for digital representations of light/sound fields for immersive media applications", the entire content of which is hereby incorporated by reference.

Scene reconstruction and distribution is problematic, where reconstruction is challenged in terms of the representations and the organization of representations that sufficiently describe the complexities of real-world matter and light fields in an efficiently controllable and highly extensible manner, and where distribution is challenged in terms of managing active, even live, scene models across a multiplicity of interactive clients, including humans and automatons, each potentially requesting any of a virtually unlimited number of scene perspectives, detail and data types.

Accordingly, there is a need to overcome the drawbacks and deficiencies in the art by providing an efficient and flexible system addressing the many needs and opportunities of the marketplace.

SUMMARY OF EXAMPLE EMBODIMENTS

The following simplified summary may provide a basic initial understanding of some aspects of the systems and/or methods discussed herein. This summary is not an extensive overview of the systems and/or methods discussed herein. It is not intended to identify all key/critical elements or to delineate the entire scope of such systems and/or methods. Its sole purpose is to present some concepts in a simplified form as a prelude to the more detailed description that is presented later.

Methods and apparatus are provided herein supporting systems using a scene codec, where systems are either providers or consumers of multi-way, just-in-time, only-as-needed scene data including subscenes and subscene increments. According to some embodiments, a system using a scene codec comprises a plenoptic scene database containing one or more digital models of scenes, where representations and organization of representations are distributable across multiple systems such that collectively the multiplicity of systems can represent scenes of almost unlimited detail. The system may further include highly efficient means for the processing of these representation and organizations of representation providing the just-in-time, only-as-needed subscenes and scene increments necessary for ensuring a maximally continuous user experience enabled by a minimal amount of newly provided scene information, where the highly efficient means include a spatial processing unit.

The system according to some embodiments may further includes application software performing both executive system functions as well as user interface functions. User interface functions include any combination of providing a user interface or communicating with an external user interface. User interfaces determine explicit and implicit user indications used at least in part to determine user requests for scene data (and associated other scene data) and provide to the user any of scene data and other scene data responding to the user's requests.

The system according to some embodiments may further include a scene codec, where the codec comprises either or both an encoder and a decoder, thus allowing for systems that are either or both scene data providers or consumers. The system may optionally interface or optionally comprise any of available sensors for sensing real-world, real-scene data, where any of such sensed data is available for reconstruction by the system into entirely new scenes or increments to existing scenes, where any one system sensing the data can reconstruct the data into scene information or offload the data to other systems for scene reconstruction, and where other system preforming scene reconstruction return reconstructed subscenes and scene increments to the originally sensing system.

The codec according to some embodiments supports scene models and other types of non-scene data either integrated with the scene model or held in association with the scene model. The codec according to some embodiments may support networking of a multiplicity of systems, exchanging control packets comprising user requests, client state and scene usage data as well as scene data packets comprising requested scene data and non-scene data and optional request identification for use by the client in fulfilment verification. Support may be provided for one-to-one, one-to-many and many-to-many system networking, where again any system may be capable of sensing new scene data, reconstructing new scene data, providing scene data and consuming scene data.

The system according to some embodiments provides for the use of machine learning during both the reconstruction and the distribution of scene data, where key data logging of new types of information provide basis for the machine learning or deterministic algorithms that optimize both the individual system performance and the networked systems performance. For example, the state of all client systems consuming scene data is tracked to ensure that any possible serving systems have valuable pre-knowledge of a client's existing scene data and non-scene data User requests including types of scenes and scene instances are classified and uniquely identified. Individual systems are both identified and classified according to their abilities for scene sensing, reconstruction, providing and consuming. The extent of scene usage including types of usage as well as scene consumption paths and duration are tracked. The multiplicity of the classified and tracked information provides valuable new data for machine learning, where the user's requests for scene data are intelligently extended by look-ahead prediction based on cumulative learning further ensuring a maximally continuous user experience enabled by a minimal amount of newly provided scene information.

BRIEF DESCRIPTION OF THE DRAWINGS

These and other features and advantages will be better and more completely understood by referring to the following detailed description of example non-limiting illustrative embodiments in conjunction with the following drawings.

FIG. 1A depicts a block diagram of a system using scene codec, according to some embodiments.

FIG. 1B depicts a block diagram of a scene codec including both an encoder and decoder, according to some embodiments.

FIG. 1C depicts a block diagram of a scene codec including an encoder but no decoder, according to some embodiments.

FIG. 1D depicts a block diagram of a scene codec including a decoder but no encoder, according to some embodiments.

FIG. 1G depicts a block diagram of a scene codec comprising a decoder, according to some embodiments.

FIG. 53 is a table showing part of a spreadsheet tabulating the results of a series of saeltree origin, VLO and sael PUSHes, according to some embodiments.

FIG. 54 is a table that is a continuation of FIG. 53.

FIG. 55 is a table showing the formulas for the spreadsheet in FIGS. 53 and 54.

FIG. 64 is a table showing part of a spreadsheet tabulating the results of a series of saeltree origin, VLO and sael PUSHes where the saeltree origin is not at the center of an octree node, according to some embodiments.

FIG. 65 is a table that is a continuation of FIG. 64.

FIG. 69 is a flow diagram of a process to extract a subscene model from a scene database for purposes of image generation from multiple viewpoints, according to some embodiments.

FIG. 75 shows pictorial diagrams related to evidence of efficacy of an embodiment.

FIG. 76 shows pictorial diagrams related to evidence of efficacy of an embodiment.

FIG. 77 shows pictorial diagrams related to evidence of efficacy of an embodiment.

Figure 1E:
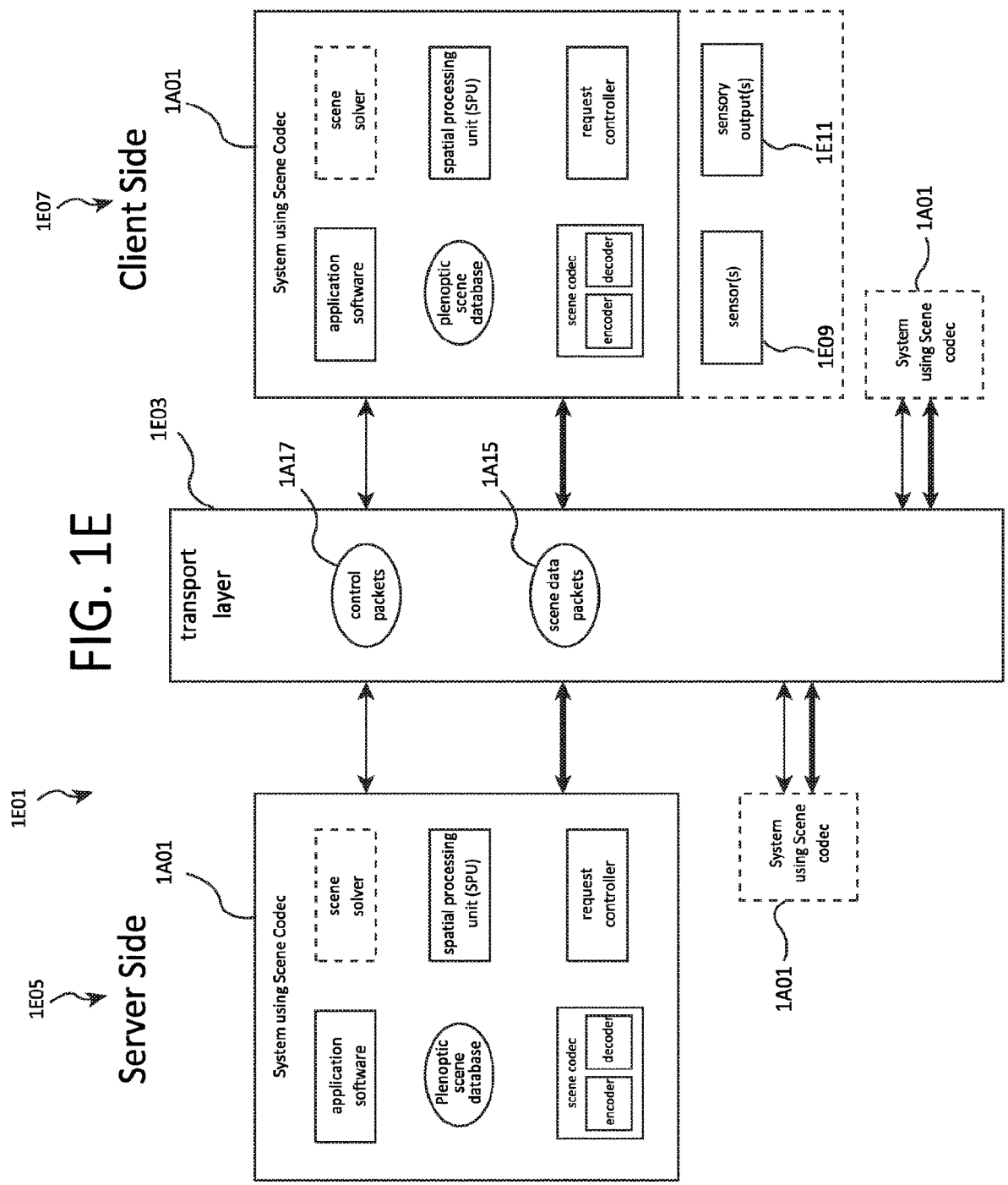
FIG. 1E depicts a block diagram of a network connecting two or more systems using scene codecs, according to some embodiments.

In the following description, numerous specific details are set forth, such as examples of specific components, types of usage scenarios, etc. to provide a thorough understanding of the present disclosure. It will be apparent, however, to one skilled in the art that the present disclosure may be practiced without these specific details and with alternative implementations, some of which are also described herein. In other instances, well-known components or methods have not been described in detail to avoid unnecessarily obscuring the present disclosure. Thus, the specific details set forth are merely exemplary. The specific details may be varied from and still be contemplated to be within the spirit and scope of the present disclosure.

DETAILED DESCRIPTION

A comprehensive solution for providing variably extensive scene representations such as subscenes and increments to subscenes that both fit complex user requests using minimal scene data while yet "looking-ahead" to anticipate sufficient buffers (extensions to requested scene data) that ensure a continuous quality-of-service. A codec according to example embodiments addresses on-going scene reconstruction commensurate with on-going scene consumption, where a multiplicity of entities is at any moment providing scene data or consuming scene data, where providing scene data includes both reconstructed scene data and newly determined real-scene unreconstructed data.

In certain example embodiments, scene distribution is less "file-based" (that is, less focused on a one-to-one one-way pipeline of entire-scene information), and more "file-segment-based" (that is, more focused on a many-to-many two-way pipeline of just-in-time, only-as-needed subscene and subscene increment information). This multi-way configuration in certain example embodiments is self-learning, tracking the provision and consumption of scene data in order to determine optimal load balancing and sharing across a potentially larger number of scene servers and scene clients. Scene processing in example embodiments account for an amalgamation of all types of data, where a scene model is an indexable, augmentable, translatable object with connections to virtually all other types of data, where the scene then provides context for the various types of data and itself becomes searchable based upon all types of data.

A scene in example embodiments may be considered as a region in space and time occupied by matter field and light field. Example systems according to some embodiments support scene visualization in free-view, free-matter and free-light, where free-view allows the user to self-navigate the scene, free-matter allows the user to objectify, qualify, quantify, augment and otherwise translate the scene, and free-light allows the user to recast the scene even accounting for the unique spectral output of various light sources as well as light intensity and polarization considerations all of which add to scene model realism. The combination of free-matter and free-light enable the user to recontextualize the scene into various settings, for example experiencing a Prague city tour on a winter morning or a summer evening.

While human visualization of scene data is always of importance, the codec according to some embodiments provides an array of scene data types and functions including metrology, object recognition, scene and situational awareness. Scene data may comprise the entire range of data and meta-data determinable within the real-world limited only by the extent of matter-field and light-field detail comprised within the scene model, where this range of data must then be formatted according to the range of consumers, from humans to AI systems to automatons, such as a search-and-rescue automaton that crawls or flies over a disaster scene being modeled in real time, searching for specific objects and people using advanced object recognition. As such, the codec according to example embodiments is free-view, free-matter, free-lighting and free-data.

The codec according to some embodiments implements new apparatus and methods for highly efficient subscene, and scene increment, extraction and insertion, where the technical improvements of such efficiency provide substantial reductions in computer processing requirements such as computing times with associated power requirements. Given the expected rise in marketplace requirements for multi-way, just-in-time, only-as-needed scene reconstruction and distribution, new types of scene processing units including customized computer chips are needed that embed new classes of instruction sets optimized for the new representations and organization of representations of real-world, complex and highly detailed scenes.

Referring to FIG. 1A, there is shown a block diagram depicting key components of a system using scene codec 1A01, according to some example embodiments. The system 1A01 provides significant technical improvements for the reconstruction, distribution and processing of scene models, where a real scene is generally understood to be a three-dimensional space but may also include the fourth dimension of time such that the spatial aspects of the real scene can change over time. Scene models may be any of, or any combination of, real scene reconstructions or computer-generated scenes or scene augmentations. System 1A01 addresses the substantial challenges of global scene models, where a global scene model is generally understood to be representative of a larger real-world space, the experiencing and exploration of which an end user accomplishes in spatial increments, herein referred to as a subscene. In one example, a global real scene is a major tourist city such as Prague, where in the real-world exploring Prague would require many days of spatial movement throughout subscenes comprising a significant amount of spatially detailed information. Especially for larger real scenes, the combination of scene entry points, transversal paths, and viewpoints along the transversal paths create a virtually limitless amount of information, thus requiring intelligent scene modeling and processing including compression.

For purposes of efficient description henceforth, when this disclosure refers to a scene or subscene, this should be understood to be a scene model or subscene model, therefore as opposed to the real scene or real subscene that is understood to exist and from which the model was at least in part derived. However, from time to time this disclosure may describe a scene as real, or real-world, to discuss the real-world without confusion with the modeled world. It should also be understood that the term viewer and user are used interchangeably without distinction.

The system 1A01 is configured for intelligently providing users access to virtually limitless scenes in a highly efficient real-time or near-real-time manner. Global scenes can be considered as a combination of local scenes, where local scenes are not as extensive but also must be explored in a spatially incremental manner. Local scenes and therefore also global scenes can have entry points wherein a user is first presented with scene information. A scene entry point is inherently a subscene, where for example a scene entry point in a "Prague" global scene model is the "narthex of the St. Clement Cathedral", where again it is understood that the data provided by the system 1A01 for representing the "Cathedral" subscene is typically substantially less than the entire data of the "Prague" global scene. In some example embodiments, the provided subscene, such as "St. Clement Cathedral" is determined by the system to be the minimal scene representation sufficient for satisfying an end-use requirement. This determination of the sufficiency by the system in some example embodiments provides many advantages. In general, the determination of sufficiency at least includes providing subscene model information with a varying level of matter field and/or light field resolution based upon requested or expected scene viewing orientations. For example, higher resolution information can be provided for nearby objects as opposed to visually distant objects. The term "light field" refers to light flow in all directions at all regions in a scene, and the term "matter field" refers to matter occupying regions in a scene. The term "light", in this disclosure, refers to electromagnetic waves at frequencies including visible, infrared and ultraviolet bands.

Furthermore, according to some example embodiments, the system 1A01 intelligently provides subscenes with a spatial buffer for purposes such as, for example, providing "look-ahead" scene resolution. In the "St. Clement narthex" subscene example, a minimal resolution might expect a viewer standing stationary at the entrance to the St. Clement Cathedral, but then rotating 360 degrees to look in any direction, e.g. toward or away from the Cathedral. While this minimal resolution is sufficient assuming that the viewer remains standing in the narthex, should the viewer wish to approach and enter the Cathedral this would eventually cause the resolution in the direction of the Cathedral to drop below a quality-of-service (QoS) threshold. The system expects viewer requested movement and in response includes additional non-minimal resolution such that should the viewer move their free-viewpoint, the viewer will not perceive any substantial loss in scene resolution. In the present example, this additional non-minimal resolution could include resolution sufficient for viewing all of Prague at the QoS threshold, except that this in turn would create significant excess, and most likely unused, data processing and transmission, likely causing an adverse impact on an uninterrupted, real-time viewer experience. Thus, the concept of a scene buffer is to intelligently determine and provide some amount of additional non-minimal resolution based upon all known information including the viewer's likely transversal path, transversal path viewpoints and transversal movement rate.

The system 1A01 exhibits a high degree of contextual awareness regarding both the scene and the user experiencing and requesting access to the scene, where, in some example embodiments, this contextual awareness is enhanced based upon the application of one or both machine learning and an accumulation of scene experience logging performed by the system 1A01. For a global scene such as Prague that is experienced by multiple users over time, the logging of at least the traversal metrics of the individual users, including chosen entry points, transversal path, transversal path viewpoints and transversal movement rate provides significant information for system 1A01's machine learning component to help adjust the size of the spatial buffer thus ensuring a maximally (or substantially maximally) continuous user experience of a scene provided by a minimal (or substantially minimal) amount of provided scene information, where this max-min relationship is a focus of the system 1A01's scene compression technology in some example embodiments. Another critical aspect of scene compression addressed by system 1A01 is scene processing time that is highly dependent upon the novel arrangements of the scene model data representative of a real-world scene, where herein this data is generally referred to as a plenoptic scene model and is stored in the plenoptic scene database 1A07.

Those familiar with the term "plenoptic" will recognize it as the 5-dimensional (5D) representation of a specific point in a scene from which 47c steradian movement can be experienced, therefore any point (x, y, z) in a scene can be considered as the center of a sphere from which user movement can then be experienced in any direction (0, 0) outward from the center point. Those familiar with light field processing will also understand that the plenoptic function is useful for describing at least what is referred to in the art as a light field. As will be detailed herein, some example embodiments of the present invention provide for novel representation of the both the light field and the matter field of a real scene such that the effectively 5D transversal by a user of a scene model can be efficiently processed in a just-in-time manner for allowing maximally (or substantially maximally) continuous user experience provided by a minimal (or substantially minimal) amount of newly provided scene information.

The system 1A01 further includes a spatial processing unit (SPU) 1A09 for substantially processing a plenoptic scene database 1A07 for the purposes of both scene reconstruction and scene distribution. As will be discussed herein, reconstruction is generally the process of adding to, or building up, a scene database to increase any of a scene's various data representations such as, but not limited to: 1) spatio-temporal expanse that is the three-dimensional volume of the real scene, for example ranging from a car hood being inspected for damage to Prague being traversed for tourism; 2) spatial detail that includes at least the visual representation of the scene with respect to the limits of spatial acuity perceptible to a user experiencing the scene, where visual spatial acuity is generally understood to be a function of the human vision system and defines a maximum resolution of detail per solid angle of roughly 0.5 to 1.0 arc minutes that is differentiable by a human user, such that any further detail is substantially non-perceivable to the user unless the user alters their spatial location to effectively increase the scene area within the solid angle by moving closer to the scene area; 3) light field dynamic range that includes both the intensity and color gamut of light representative of the perceived scene, where for example the dynamic range can be intelligently altered to provide greater color range for portions of the scene deemed to be foreground verses background, and 4) matter field dynamic range that includes both spatial characteristics (e.g. surface shapes) along with light interaction characteristics describing the effect of matter within a scene on the transmission, absorption and reflection of the scene's light field. Subscene extraction is then the intelligent and efficient determination by the system 1A01 using the SPU 1A09 of a minimal dataset of scene information with respect to the various dimensions of information representative of the scene in the plenoptic scene database 1A07, where again it is of utmost importance to the user's experience that this minimal dataset (subscene) provide a substantially continuous experience with sufficient scene resolution (e.g., continuity and/or resolution satisfying predetermined QoS thresholds).

System 1A01 may, at least in some embodiments, include a scene solver 1A05 for providing machine learning during one or more of the process of scene reconstruction, and the process of subscene distribution. In the scene solver 1A05, auxiliary scene information such as, for example, information indicative of scene entry points, transversal paths, viewpoints and effective scene increment pace may be considered in providing maximum scene compression with minimal or at least acceptable scene loss.

System 1A01 further comprises a request controller 1A13 for receiving requests indicated through a user interface implemented by the application software 1A03. The received requests are translated into control packets 1A17 for communication to another networked system using a scene codec 1A11. The system 1A01 therefore is also capable of receiving requests generated by other networked systems 1A01. Received requests are processed by system 1A01 either independently by the request controller 1A13, or in combination by both the request controller 1A13 and the application software 1A03. Control packets 1A17 may carry either or both explicit and implicit user requests, where explicit requests represent conscious decisions by a user such as choosing a specific available entry point for a scene (for example the Cathedral of St. Clement as a starting point for a tour of Prague), while implicit user requests may represent subconscious decisions by a user such as the detection of the user's head orientation with respect to a current scene (for example as detected by camera sensors attached to a holographic display or inertial sensors provided within a virtual reality (VR) headset). This distinction of explicit and implicit is meant to be illustrative but not limiting, as some user requests are semi-conscious, for example the scene increment pace that might be indicated by the movement of a motion controller in a VR system.

Scene codec 1A11 is configured to be responsive to user requests that may be contained within control packets 1A17, providing preferably just-in-time scene data packets when and if system 1A01 is functioning as a scene provider. Scene codec 1A11 may be further enabled to receive and respond to scene data packets 1A15 when and if system 1A01 is functioning as a scene consumer. For example, the system 1A01 might be a provider of scene information as extracted from the plenoptic scene database 1A07 to a multiplicity of other systems 1A01 that receive the provided scene information for potential consumption by an end user. Scene information comprised within plenoptic scene database 1A07 may not be limited to strictly visual information, therefore information that is ultimately received for example by a user viewing some form of an image output device may also be included in some example embodiments. It should be understood that scene information, in some example embodiments, can also comprise any number of meta information translated at least in part from the matter and light fields of a scene such as scene metrology (for example the size of a table) or scene recognition (for example the location of light sources) or related information such as auxiliary information that is not the matter or light field but is associable with any combination or portion of the matter and light field. Example auxiliary information includes, but is not limited to, scene entry points, scene object labels, scene augmentations and digital scene signage.

The system 1A01 may be configured for either or both outputting and receiving scene data packets 1A15. Furthermore, the exchanging of scene data packets 1A15 between systems such as system 1A01 may not be synchronous or homogenous but is rather minimally responsive for maximally satisfying a user's requests as primarily expressed in control packets 1A17 or otherwise through a user interface or application interface provided by the application software 1A03. Specifically with respect to the periodicity of the scene data packets 1A15, in contrast to a traditional codec, the scene codec 1A11 can operate asynchronously where for example subscene data representative of scene increments with a given scene buffer size are provided both just-in-time and only-as-needed, or even just-in-time and only-as-anticipated, where "needed" is more a function of explicit user requests and "anticipated" is more a function of implicit user requests. Specifically with respect to the content construction of scene data packets 1A15, in contrast to a traditional codec, the scene codec 1A11 can operate to provide heterogeneous scene data packets 1A15, where for example a just-in-time packet comprises any one of, or any combination of, matter field information, light field information, auxiliary information, or any translations thereof.

Figure 3:
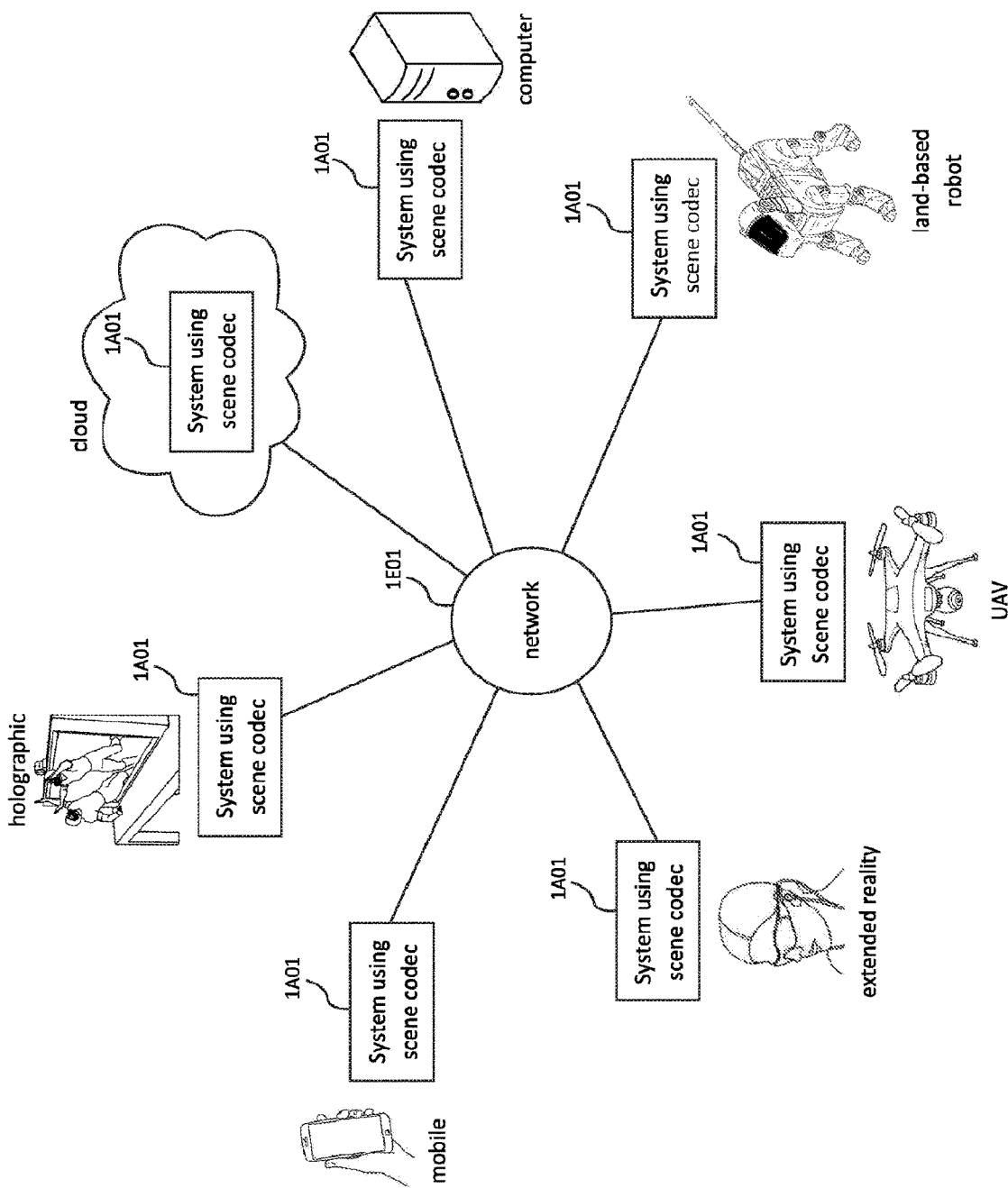
FIG. 3 is a pictorial diagram of an exemplary network connecting systems using scene codec, according to some embodiments.
Figure 4A:
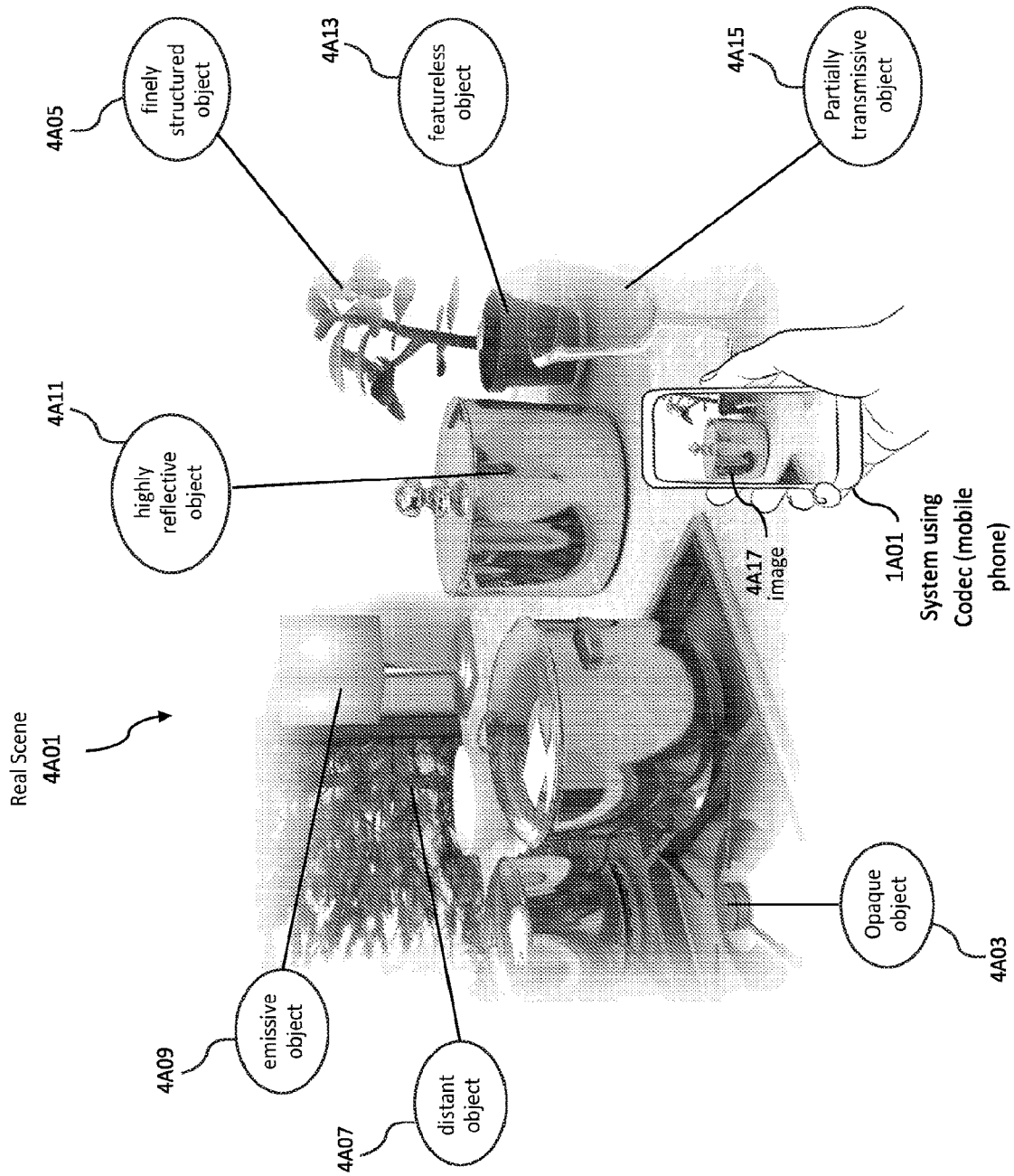
FIG. 4A is a pictorial diagram of an exemplary real-world scene of unlimited or almost unlimited detail such as an internal house scene with windows viewing an outdoor scene, according to some embodiments.
Figure 4B:
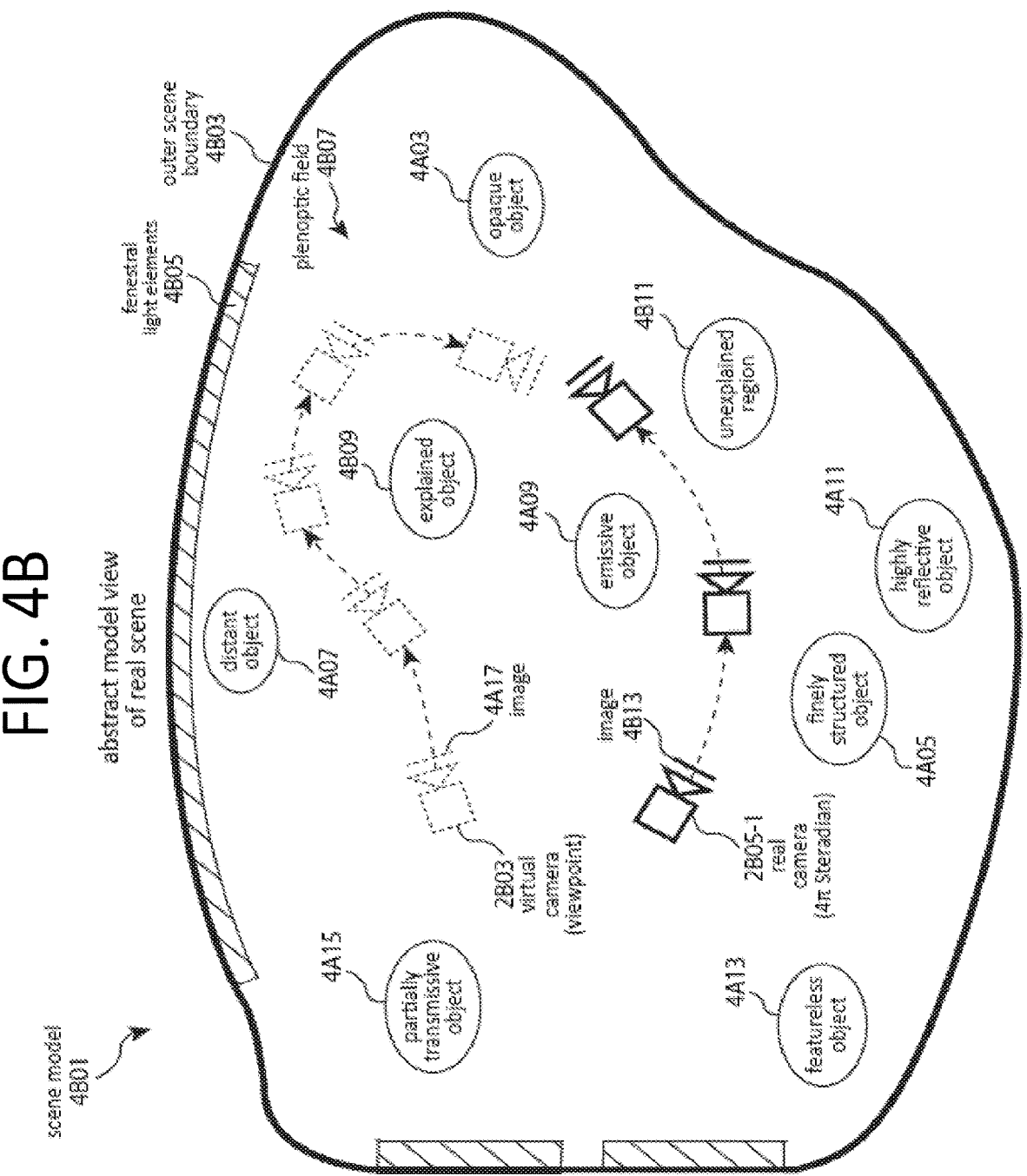
FIG. 4B is a pictorial diagram representative of a real-world scene such as depicted in FIG. 4A, where the representation can be considered as an abstract model view of data comprised within a plenoptic scene database as well as other objects such as explained objects and unexplained objects, according to some example embodiments.
Figure 4C:
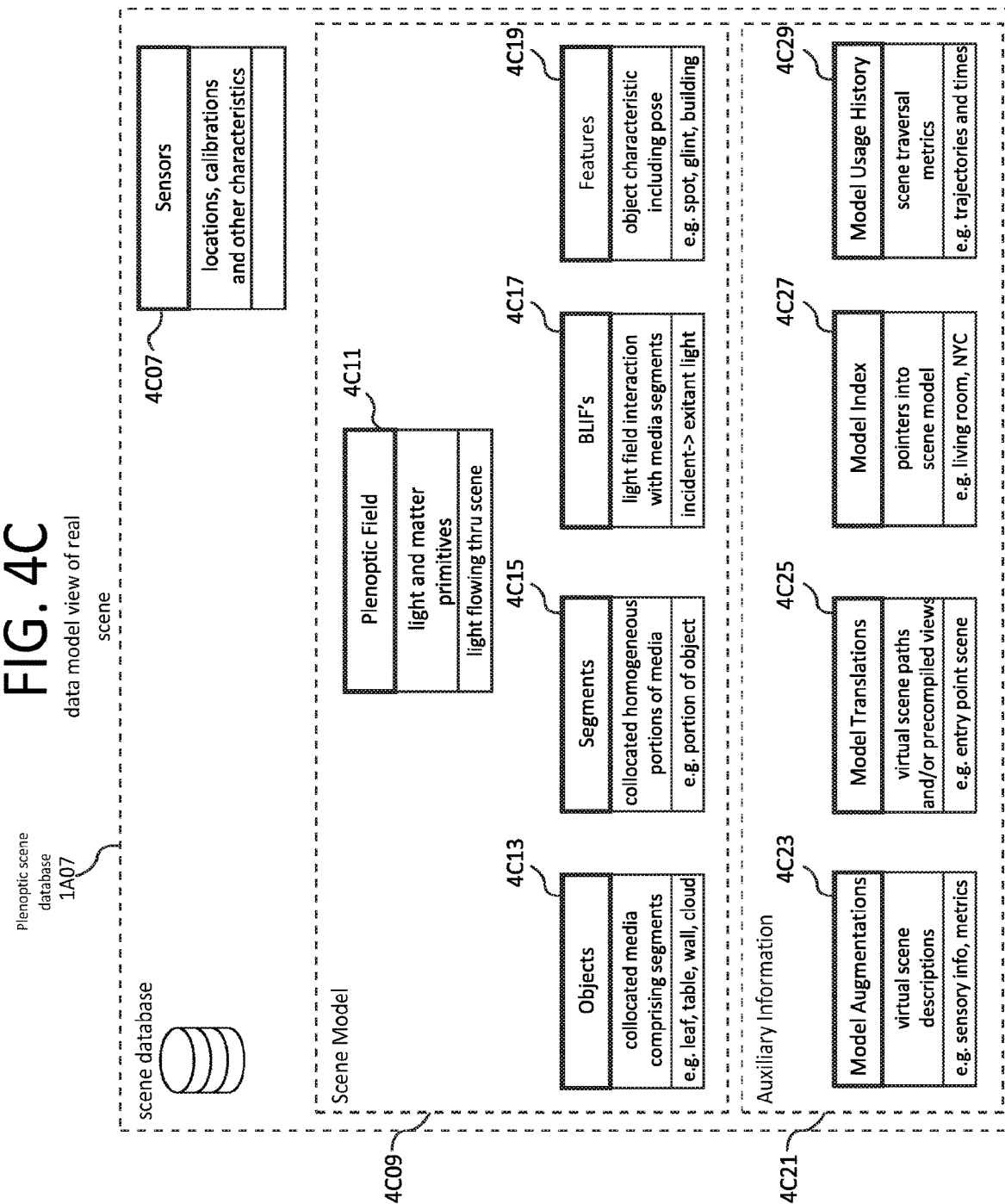
FIG. 4C is a block diagram of the some datasets in a plenoptic scene database, according to some embodiments.

It is also understood that a "user" is not limited to a person, and can include any requestor such as another autonomous system 1A01 (e.g., see land-based robot, UAV, computer or cloud system as depicted in upcoming FIG. 3). As will be well understood by those familiar with autonomous systems, such autonomous systems may have a significant use for scene representations that essentially contain visual representation information, for example, where known pictures of the scene are usable by the autonomous system 1A01 in a search-and-find operation for comparison with visual information being captured by the autonomous system 1A01 in a real-world scene either corresponding to or similar to the scene comprised within the plenoptic scene database 1A07. Furthermore, such autonomous systems 1A01 may have a preferred use for non-visual information or quasi-visual information, where non-visual information may include scene and scene object metrology and quasi-visual information may include scene lighting attributes. Either autonomous or human operated systems 1A01 may also be configured in some example embodiments to collect and provide non-visual representations of a scene for possible spatial or even object collocation within a plenoptic scene database 1A07, or at least for further describing a scene as auxiliary information (e.g., see upcoming FIG. 4C illustrating a scene database view). For example, non-visual representations include other sensory information such as somatosensation (touch), olfaction (smell), audition (hearing) or even gustation (taste). For the purposes of this disclosure, where there is a focus on scene representations as visual information, this focus should not be construed as a limitation but rather as a characteristic, where then it is at least understood that a plenoptic scene database can include any sensory information or translation of sensory information, especially including audio/visual data often requested by a human user.

Referring next to FIG. 1B, there is shown a block diagram of scene codec 1A11 that is comprised within any of a system 1A01, where the scene codec 1A11 comprises both an encoder 1B11a and a decoder 1B11b, according to some example embodiments. As described in relation to FIG. 1A, the encoder's primary function is to determine and provide scene data packets 1A15, presumably over a network to be received by at least one other system, such as for example another system 1A01, that is enabled (by comprising decoder, such as for example a decoder 1B11b) to receive and process the scene data packets. Encoder 1B11a can receive and respond to control packets 1A17. Use cases for systems 1A01 comprising scene codecs 1A11 comprising both an encoder 1B11a and a decoder 1B11b are described in relation to upcoming FIG. 7 below.

Referring next to FIG. 1C, there is shown a block diagram of scene codec 1A11 comprising only an encoder 1B11a (and therefore not including a decoder 1B11b as depicted in FIG. 1B), according to some example embodiments. Use cases for systems 1A01 comprising scene codecs 1A11 comprising only an encoder 1B11a are described in relation to upcoming FIGS. 5 and 6 below.

Referring next to FIG. 1D, there is shown a block diagram of scene codec 1A11 comprising only a decoder 1B11b (and therefore not including an encoder 1B11a as depicted in FIG. 1B), according to some example embodiments. Use cases for systems 1A01 comprising scene codecs 1A11 comprising only a decoder 1B11b are described in relation to upcoming FIGS. 5 and 6 below.

Referring next to FIG. 1E, there is shown a block diagram of a network 1E01 comprising a transport layer for connecting two or more systems 1A01. The network 1E01 may represent any means or communications infrastructure for the transmission of information between any two or more computing systems, where in the example embodiments the computing systems of primary focus are systems 1A01 but, at least in some embodiments, are not limited thereto. As will be well understood by those familiar with computer networks, there are currently many variations of networks such as personal area networks (PAN), local area networks (LAN), wireless local area networks (WLAN), campus area network (CAN), metropolitan area network (MAN), wide area network (WAN), storage area network (SAN), passive optical local area network (POLAN), enterprise private network (EPN) and virtual private network (VPN), any and all of which may be implementations of the presently described network 1E01. As will also be well understood by those familiar with computer networks, a transport layer is generally understood to be a logical division of techniques in a layered architecture of protocols in a network stack, for example referred to as Layer 4 with respect to the open systems interconnection (OSI) communications model. For the purposes of this disclosure, a transport layer includes the functions of communicating information such as the control packets 1A17 and scene data packets 1A15 exchanged across a network 1E01 by any two or more systems 1A01.

Still referring to FIG. 1E, computing systems such as system 1A01 communicating across a network 1E01 are often referred to as residing on either the server side such as 1E05, or the client side such as 1E07. The typical server-client distinction is most often used with respect to web services (server side) being supplied to web browsers (client side). It should be understood that there is no restriction within the example embodiments that, for example, the application software 1A03 within a system 1A01 be implemented using a web browser as opposed to another technology such as a desktop application or even an embedded application, and as such the terms server side and client side are used herein in the most general of senses such that a server is any system 1A01 determining and providing scene data packets 1A15 while a client is any system 1A01 receiving and processing scene data packets 1A15. Likewise, a server is any system 1A01 receiving and processing control packets 1A17, while a client is any system 1A01 determining and providing control packets 1A17. A system 1A01 may function either as a server or a client, or a single system 1A01 may function as both a server and a client. Therefore, the block diagram and descriptions provided herein with respect to networks, transport layers, server side and client side should be considered as useful for conveying information rather than as limitations of the example embodiments. FIG. 1E also illustrates that a network 1E01 of systems 1A01 may comprise one or more systems 1A01 functioning as servers at any given time as well as one or more systems 1A01 functioning as clients at any given time, where again it is also understood that a given system 1A01 may be alternately or substantially simultaneously functioning as both a server of scene data and a client of scene data.

In FIG. 1E there is also depicted optional sensor(s) 1E09 and optional sensor output(s) 1E11, that may be included in some example embodiments. It will be understood that a system 1A01 requires neither sensor(s) 1E09 nor sensor output(s) 1E11 to perform a useful function, such as receiving scene data packets 1A15 from other systems 1A01 for example for use in scene reconstruction, or such as providing scene data packets 1A15 to other system 1A01 for further scene processing. Alternatively, system 1A01 can comprise any one or more sensor(s) 1E09 such as but not limited to: 1) imaging sensors for detecting any of a multi-spectral range of data such as ultraviolet light, visible light or infrared light filtered for any of light characteristics such as intensity and polarization; 2) distance sensors or communication sensors that can be used at least in part to determine distances such as lidar, time-of-flight sensors, ultrasound, ultra-wide-band, microwave and otherwise radio frequency based systems, as well as 3) any of non-visual sensors for example capable of detecting other sensory information such as somatosensation (touch), olfaction (smell), audition (hearing) or even gustation (taste). It is important to understand that a real-world scene to be represented within a plenoptic scene database 1A07 typically comprises what would be generally understood to be visual data, where this data is not necessarily limited to what is known as the visible spectrum, but that also a real-world scene comprises a plethora of additional information that can be sensed using any of today's available sensors as well as additional known or unknown data that will be detectable by future sensors. In the spirit of the example embodiments, all such sensors may provide information that is useful for reconstructing, distributing and processing scenes as described herein and therefore are sensor(s) 1E07. Likewise, there are many currently known sensory output(s) 1E09 such as but not limited to 2D, 3D, 4D visual presentation devices, where the visual presentation devices often include companion 1D, 2D or 3D auditory output devices. Sensory output(s) 1E09 also comprise any currently known, future devices for providing any form of sensory information including visual, auditory, touch, smell, or even taste. Any given system 1A01 may comprise zero or more sensor(s) 1E07 and zero or more sensory output(s) 1E09.

Figure 1F:
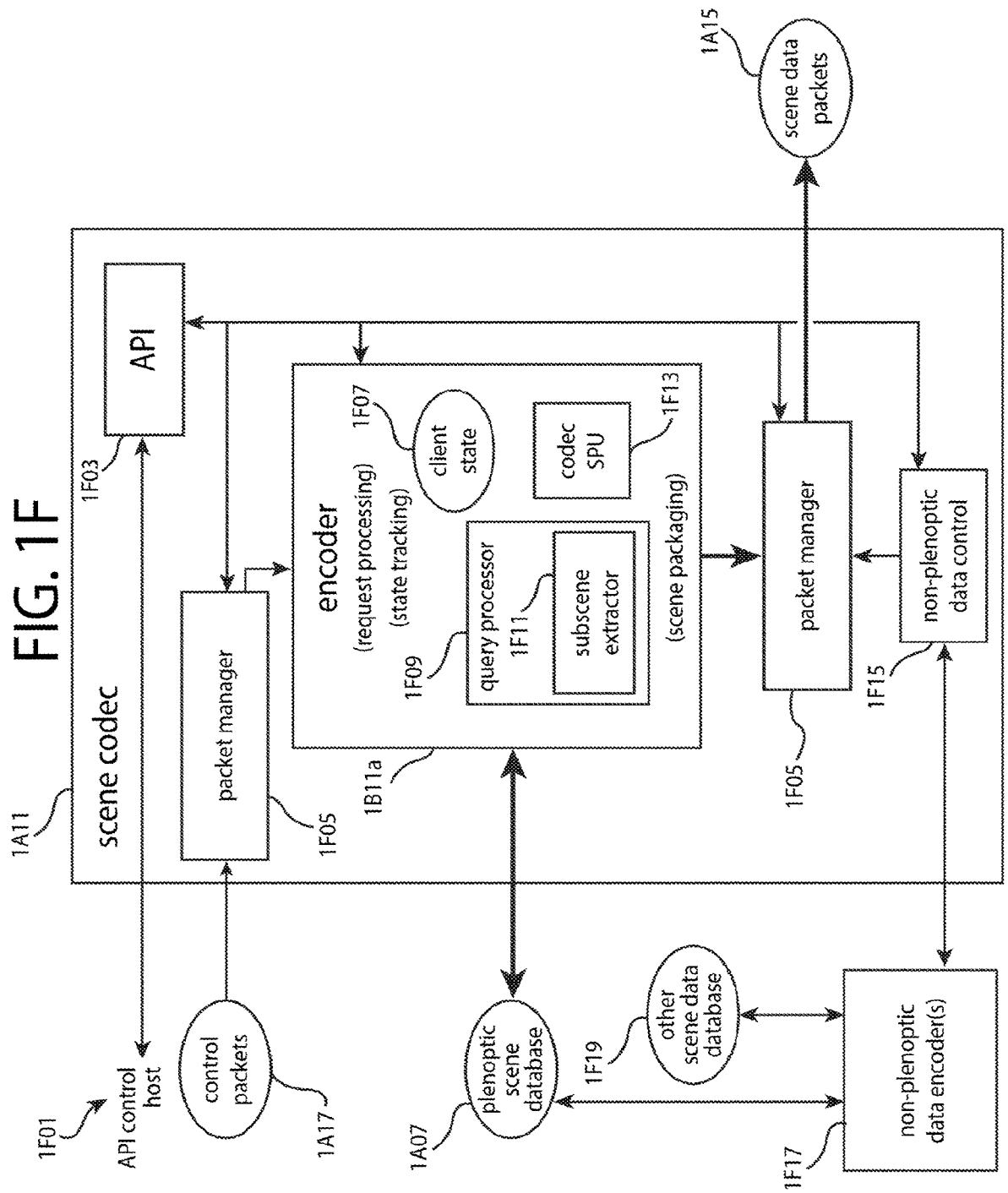
FIG. 1F depicts a block diagram of a scene codec comprising an encoder, according to some embodiments.

Referring next to FIG. 1F, there is shown a block diagram of encoder 1B11a in scene codec 1A11 comprising at least an encoder 1B11a, according to some example embodiments. The API interface 1F03 of scene codec 1A11 receives and responds to application interface (API) calls 1F01 from an API control host, where the host is for example application software 1A03. API 1F03 is in communications with various codec components including the packet manager 1F05, encoder 1B11a and non-plenoptic data control 1F15. API 1F03 provides for receiving control signals such as commands from a host such as the application software 1A03, providing control signals such as commands to the various codec components including 1F05, 1B11a and 1F15 based at least in part upon any of host control signals, receiving control signals such as component status indications from the various codec components including 1F05, 1B11a and 1F15, and providing control signals such as codec status indications to a host such as the application software 1A03 based at least in part upon any of component status indications. A primary purpose of the API 1F03 is to provide an external host a single point of interaction for controlling the scene codec 1A11, where API 1F03 is for example a set of software functions executed on a processing element, where in one embodiment the processing element for executing API 1F03 is exclusive to scene codec 1A11. Furthermore, API 1F03 can execute functions for controlling on-going processes as commanded by the host 1F01, such that a single host command generates multiple signals and communications between the API 1F03 and the various codec components including 1F05, 1B11a and 1F15. At any time during the execution of any of scene codec 1A11's internal processes, API 1F03 determines if responses such as status updates are necessary for providing to host 1F01 based at least in part upon the interface contract implemented with respect to API 1F03, all as will be understood by those familiar with software programming and especially object-oriented programming.

Still referring to FIG. 1F, each of the various components 1F05, 1B11a and 1F15 are in communication with each other as necessary for exchanging control signals and data commensurate with any of the internal processes implemented by the scene codec 1A11. During normal operation of the scene codec 1A11, packet manager 1F05 receives one or more control packets 1A17 for internal processing by the codec 1A11 and provides one or more scene data packets 1A15 based upon internal processing by the codec 1A11. As will be understood by those familiar with networked systems, in one embodiment, scene codec 1A11 implements a data transfer protocol on what is referred to as a packet-switched network for transmitting data that is divided into units called packets, where each packet comprises a header for describing the packet and a payload that is the data being transmitted within the packet. As discussed in relation to FIG. 1E, example embodiments can be implemented on a multiplicity of network 1E01 types, where for example multiple systems using scene codec 1A01 are communicating over the Internet which is a packet-switched network 1E01. A packet-switched network 1E01 such as the Internet uses a transport layer 1E03 protocol such as TCP (transmission control protocol) or UDP (user datagram protocol).

TCP is well known in the art and provides many advantages such as message acknowledgement, retransmission and timeout, and proper ordering of transmitted data sequence, but is typically limited to what is referred to in the art as unicasting, where a single server system 1A01 provides data to a single client system 1A01 per each single TCP stream. Using TCP, it is still possible that a single server system 1A01 sets up multiple TCP streams with multiple client systems 1A01, and vice versa, with the understanding that transmitted control packets 1A17 and data packets 1A15 are being exchanged exclusively between two systems forming a single TCP connection. Other data transmission protocols such as UDP (user datagram protocol) are known for supporting what is referred to in the art as multicasting, or for supporting what is known as broadcasting, where unlike unicasting, these protocols allow for example multiple client systems 1A01 to receive the same stream of scene data packets 1A15. UDP has limitations in that the transmitted data is not confirmed upon receipt by the client and the sending order of packets is not maintained. The packet manager 1F05 may be adapted to implement any one of the available data transfer protocols based upon at least either of a TCP or UDP transport layer protocol for communicating packets 1A17 and 1A15, where it is possible that new protocols will become available in the future, or that existing protocols will be further adapted, such that embodiments should not be unnecessarily limited to any single choice of a data transfer protocol or a transport layer protocol but rather the protocol's selected for implementing a particular configuration of systems using scene codec 1A01 should be selected based upon the desired implementation of the many features of the particular embodiments.

Referring still to FIG. 1F, packet manager 1F05 parses each received control packet 1A17, for example by processing any of the packet's header and payload, in order to determine various types of packet 1A17 contents including but not limited to: 1) user requests for plenoptic scene data; 2) user requests for non-plenoptic scene data; 3) scene data usage information, and 4) client state information. Packet manager 1F05 provides any of information related to a user request for plenoptic scene data to encoder 1B11a, where encoder 1B11a processes the user's request at least in part using query processor 1F09 to access a plenoptic scene database 1A07. Query processor 1F09 at least in part comprises subscene extractor 1F11 for efficiently extracting the requested plenoptic scene data including a subscene or an increment to a subscene. The extracted requested plenoptic scene data is then provided to packet manager 1F05 for inserting as a payload into a scene packet 1A15 for transmission to the requesting (client) system 1A05. In one embodiment, packet manager 1F05 further inserts preferably into the scene data packet 1A15 comprising the requested plenoptic scene data, information sufficient for identifying the original user request such that the receiving client system 1A05 receives both an indication of the original user request and the plenoptic scene data provided to fulfil the original request. During operation, any of the encoder 1B11a, the query processor 1F09 packet manager 1F05, and especially the subscene extractor 1F11, may invoke codec SPU 1F13 for efficiently processing plenoptic scene database 1A07, where codec SPU 1F13 is may be configured to implement various of the technical advantages described herein for efficiently processing the representations and organization of representation with regard to the plenoptic scene database 1A07.

The representations in example embodiments for use in representing a real-world scene as a plenoptic scene model and novel organizations of these representations for use in a plenoptic scene database 1A07. The apparatus and methods for processing a plenoptic scene database 1A07, and that in example embodiments, in combination with the representations and organizations used in the embodiments provide significant technical advantages such as the ability to efficiently query a plenoptic scene database potentially representing a very large, complex and detailed real-world scene to then quickly and efficiently extract a requested subscene or increment to a subscene. As those familiar with computer systems will understand, scene codec 1A11 can be implemented in many combinations of software and hardware, for example including a higher level programming language such as C++ running on a generalized CPU, or an embedded programming language running on an FPGA (field programmable gate array), or a substantially hardcoded instruction set comprised within an ASIC (application-specific integrated circuit). Furthermore, any of scene codec 1A11 components and subcomponents may be implemented in different combinations of software and hardware, where in one embodiment codec SPU 1F13 is implemented as a substantially hardcoded instruction set such as comprised within an ASIC. Alternatively, in some embodiments the implementation of the codec SPU 1F13 is a separate hardware chip that is in communications with at least the scene codec 1A11, such that in effect codec SPU 1F13 is external to scene codec 1A11.

As those familiar with computer systems will understand, scene codec 1A11 may further comprise memory or otherwise data storage elements for holding at least some or all of the plenoptic scene database 1A07, or copied portions of database 1A07 most relevant to the plenoptic scene model, where the copied portions might for example be implemented in what is known in the art as a cache. What is important to see is that while the plenoptic scene database 1A07 is presently depicted as being outside of the scene codec 1A11, in an alternate embodiment of the present scene codec at least some portion of the plenoptic scene database 1A07 is maintained within the scene codec 1A11, or even within encoder 1B11a. Therefore it is important to understand that the presently depicted block diagram for a scene codec with at least an encoder is exemplary and therefore should not be considered as a limitation of example embodiments, as many variations and configurations of the various components and subcomponents of the scene code 1A11 are possible without departing from the spirit of the described embodiments.

Figure 5:
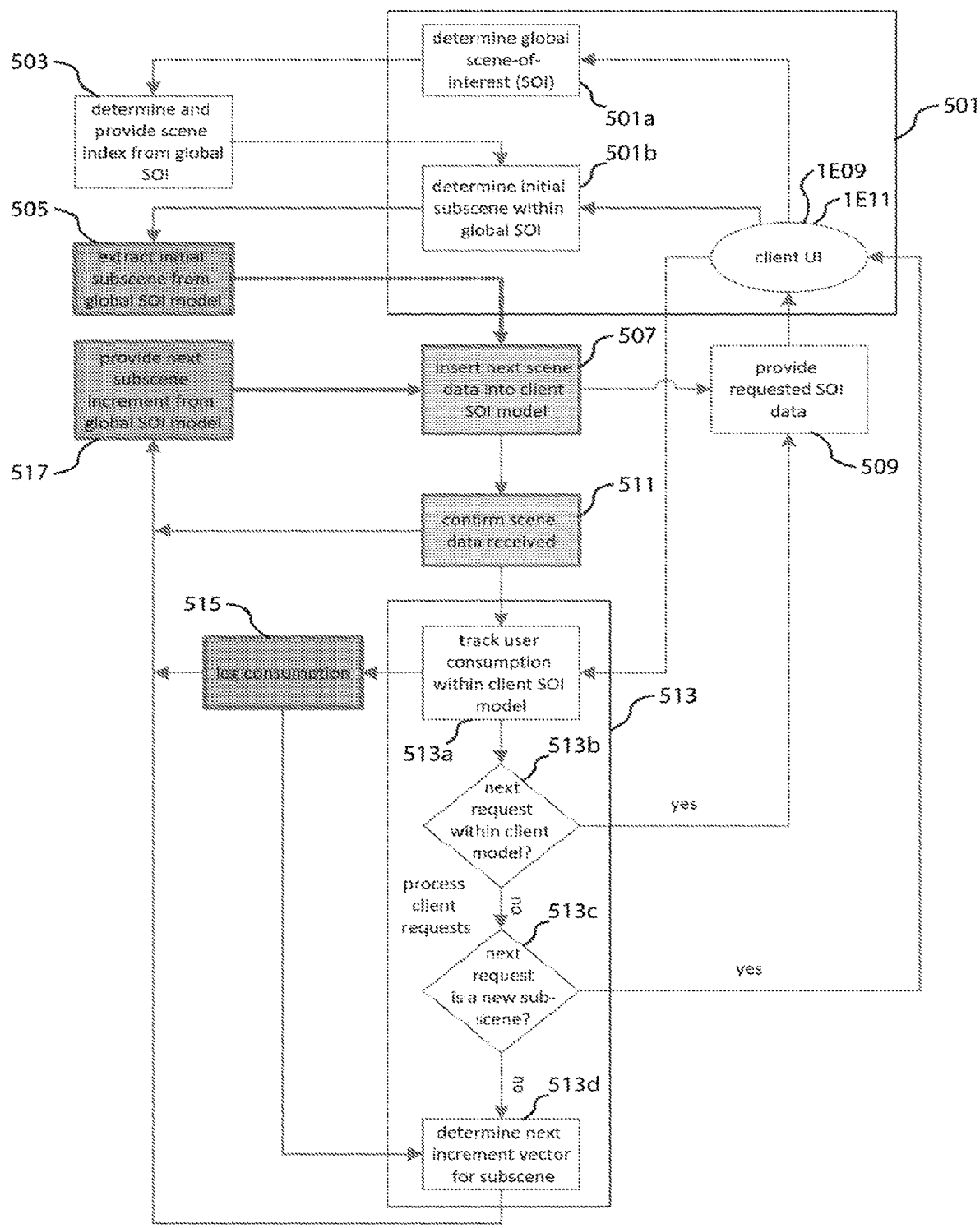
FIG. 5 is a flow diagram of a use case including the sharing of a larger global scene model with a remote client that is consuming any of the various types of scene model information, according to some embodiments.
Figure 6:
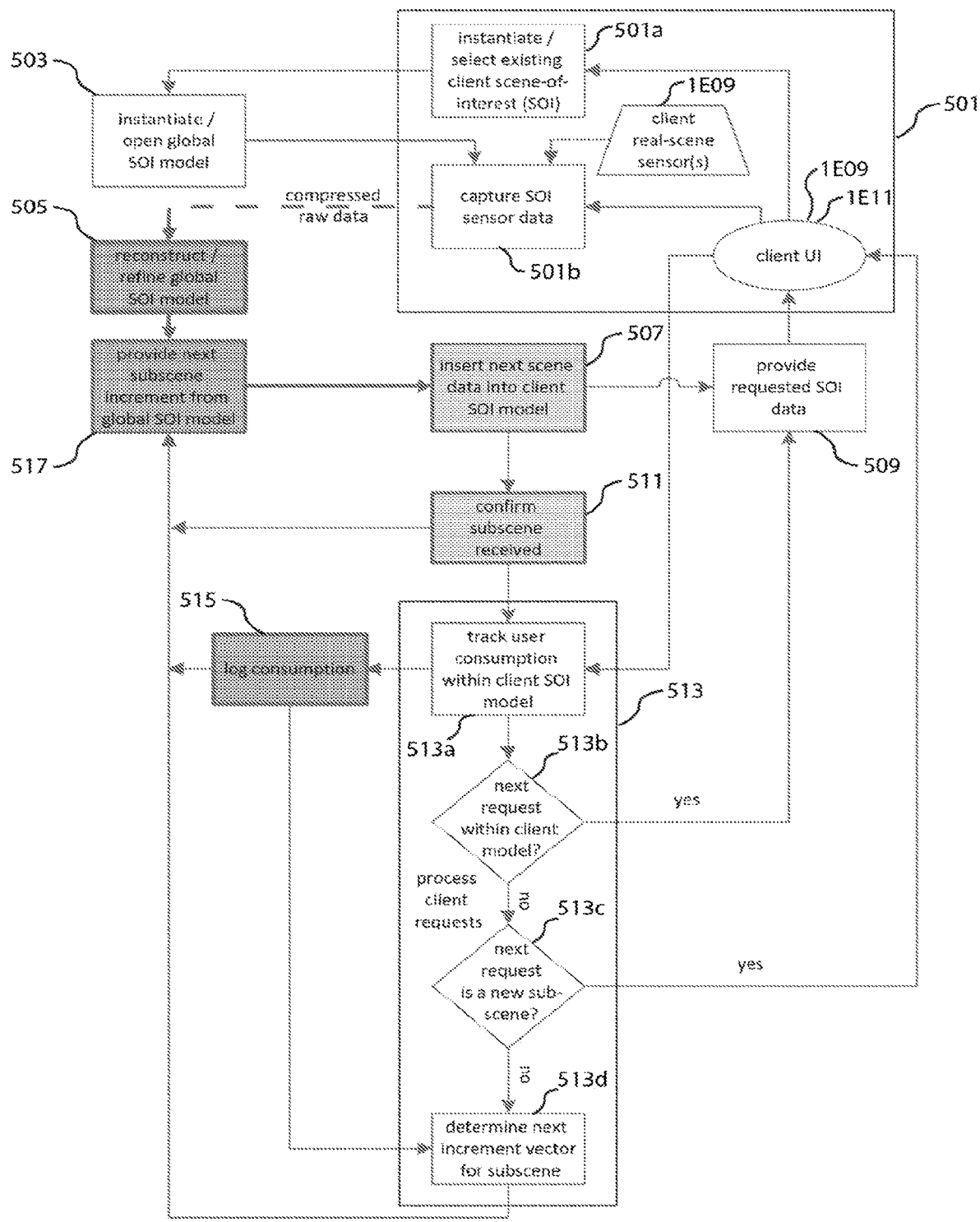
FIG. 6 is a flow diagram of a use case similar to FIG. 5, but now addressing a variant case where the client is first creating a scene model or updating an existing scene model, according to some embodiments.
Figure 7:
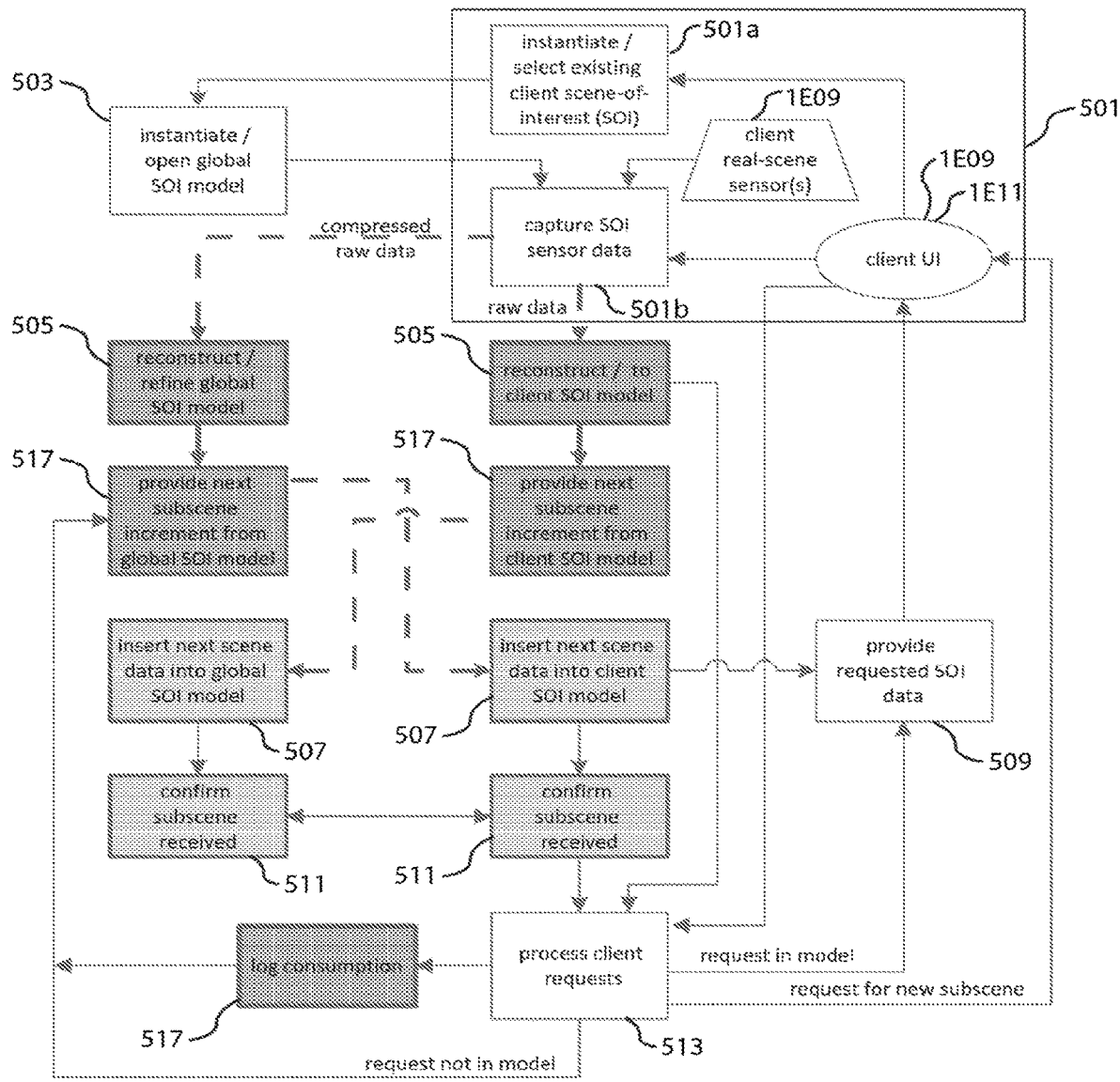
FIG. 7 is a flow diagram of a use case similar to FIG. 5 and FIG. 6, but now addressing a variant case where the client system is first creating a scene model or updating an existing scene model and then capturing local scene data of the real-scene where both the client-side system and the server-side system are each capable of reconstructing and distributing the real-scene thus determining and providing subscenes and increments to subscenes, according to some embodiments.

Still referring to FIG. 1F, packet manager 1F05 provides any of scene data usage information to encoder 1B11a, where encoder 1B11a inserts the usage information, or other calculated information based at least in part upon the usage information, into the plenoptic scene database 1A07 (see especially upcoming plenoptic database data model view FIG. 4C and upcoming use case FIGS. 5, 6 and 7 for more detail regarding usage information). As will be discussed further, usage information is highly valuable for optimizing the functions of example embodiments at least including the determination of the informational extent of subscene or scene increments for ideally servicing a user's request. Packet manager 1F05 also provides any of client state information to encoder 1B11a, where encoder 1B11a maintains client state 1F07 based at least in part upon any of client state information received from the client system 1A01. It is important to understand that a scene codec 1A11 can support a multiplicity of client systems 1A01 and that for each supported client system 1A01 a distinct client state 1F07 is maintained. As will be discussed further especially in relation to upcoming use case FIGS. 5, 6 and 7, a client state 1F07 is at least sufficient for allowing encoder 1B11a to determine the extent of plenoptic scene database 1A07 information already successfully received and available to a client system 1F07.

Unlike a traditional codec for providing some types of other scene data 1F19 (such as a movie), a scene codec 1A11 with encoder 1B11a provides any of plenoptic scene data 1A07 or other scene data 1F19 to a requesting client system 1A01. Also, unlike a traditional codec, at least plenoptic scene data 1A07 provided by a scene codec 1A11 is of a nature that it is not necessarily fully consumed as it is received and processed by the client system 1A01. For example, with a traditional codec streaming a movie comprising a series of image frames typically encoded in some format such as MPEG, as the encoded stream of images is decoded by the traditional client system, each next decoded image is essentially presented in real-time to a user after which the decoded image essentially has no further value, or at least no further immediate value as the user is then presented with the next decoded image and so on until the entire stream of images is received, decoded and presented.

In contrast, the present scene codec 1A11 provides at least plenoptic scene data 1A07 such as a subscene or scene increment that is both immediately usable to a user of a client system 1A01 while also retaining additional substantial future value. As will be discussed further at least with respect to upcoming use case FIGS. 5, 6 and 7, codec 1A11 with encoder 1B11a for example transmits within scene data packets 1A15 a subscene or subscene increment representative of some requested portion of the server's plenoptic scene database 1A07, where the scene data packets 1A15 are then received and decoded by the requesting client system 1A01 for two substantially concurrent purposes including immediate data provision to the user as well as insertion into a client plenoptic scene database 1A07. What should then be further understood is that by inserting the received plenoptic subscene or subscene increment into a client database 1A07, the inserted scene data is then made available for later use in responding to potential future user requests directly from the client plenoptic scene database 1A07 without requiring any additional scene data from the server plenoptic scene database 1A07. After insertion of the subscene or subscene increment into the client plenoptic scene database 1A07, the client system 1A01 then provides as feedback to the providing scene codec 1A11 client state information, where the client state information is provided within the control packets 1A17, and where the parsed client state information is then used by the encoder 1B11a to update and maintain the corresponding client state 1F07.

By receiving and maintaining a client state 1F07 associated with a stream of scene data packets 1A15 being provided to a client system 1A01, codec 1A11 with encoder 1B11a is then capable of determining at least the minimal extent of new server plenoptic scene database 1A07 information necessary for satisfying a user's next request as received from the corresponding client system 1A01. It is also important to understand, that in some use cases a client system 1A01 is receiving plenoptic scene data from two or more server systems 1A01 comprising scene codecs 1A11 with encoders 1B11a. In these use cases, the client system 1A01 preferably notifies each server system 1A01 regarding changes to the client's state information based upon scene data packets 1A15 received from all the server systems 1A01. In such an arrangement, it is possible that multiple serving systems 1A01 can be used in a load balancing situation to expediently fulfill user requests made from a single client system 1A01 using any of plenoptic scene databases 1A07 on any of the serving systems 1A01, as if all of the serving systems 1A07 collectively were providing a single virtual plenoptic scene database 1A07.

Still referring to FIG. 1F, packet manager 1F05 provides any of user requests for non-plenoptic scene data to non-plenoptic data control 1F15, where non-plenoptic data control 1F15 is in communications with one or more non-plenoptic data encoder(s) 1F17. Non-plenoptic data encoder(s) 1F17 include any software or hardware components or systems that provide other scene data from other scene data database 1F19 to data control 1F15. It is important to understand that in some embodiments, codec 1A11 with encoder 1B11a does not require access to other scene data such as comprised within other scene data database 1F19 and therefore does not require access to non-plenoptic data encoder(s) 1F17, or even require implementation of the non-plenoptic data control 1F15 within codec 1A11. For embodiments of scene codec 1A11 with encoder 1B11a that may require or anticipate requiring the encoding of some combination of both plenoptic scene data as comprised within server plenoptic scene database 1A07 and other scene data as comprised within other scene data database 1F19, scene codec 1A11 at least in part uses other scene data as provided by a non-plenoptic data encoder 1F15 for determining at least some of the payload of any one or more scene data packets 1A15. Exemplary other scene data 1F19 includes any information that is not plenoptic scene database 1A07 information (see especially upcoming FIG. 4C for a discussion of plenoptic scene database 1A07 information), including video, audio, graphics, text, or otherwise digital information, where this other data is determined to be required for responding to client system 1A01 requests as comprised within control packets 1A17. For example, a scene in a plenoptic scene database 1A07 may be a home for sale where other scene data stored in the database 1F19 comprises any of related video, audio, graphics, text, or otherwise digital information, such as product videos related to objects in the house such as appliances.

It is important to note that a plenoptic scene database 1A07 has provision for storing any of traditional video, audio, graphics, text, or otherwise digital information for association with any of plenoptic scene data (see especially upcoming FIG. 4C for further detail), and therefore the scene codec 1A11 comprising encoder 1B11a is capable of providing other data such as video, audio, graphics, text, or otherwise digital information as retrieved from either the server plenoptic scene database 1A07 or the other scene data database 1F19. As will also be understood by those familiar with computer systems, it is beneficial to store different forms of data in different forms of databases, where the different forms of databases may then also reside in different means of data storage and retrieval, where for example some means are more economical from a data storage cost perspective and other means are more economical from a retrieval time perspective, and therefore it will be apparent to those skilled in the art that at least in some embodiments it is preferable to substantially separate the plenoptic scene data from any other scene data.

Non-plenoptic data encoder(s) 1F17 include any processing element capable of accessing at least the other scene data database 1F19 and retrieving at least some other scene data for providing to data control 1F15. In some embodiments of the present invention, information associating scene data with other non-scene data is maintained within a plenoptic scene database 1A07, such that non-plenoptic data encoder(s) 1F17 preferably have access to the server plenoptic scene database 1A07 for determining what of any of other scene data 1F17 should be retrieved from the other scene data database 1F19 to satisfy the user's request. In one embodiment, the non-plenoptic data encoder 1F17 includes any of processing elements capable of retrieving some other scene data in a first format, translating the first format into a second format, and then providing the translated scene data in the second format to the data control 1F15. In at least one embodiment, the first format is for example uncompressed video, audio, graphics, text or otherwise digital information and the second format is any of compressed formats for representing video, audio, graphics, text or otherwise digital information. In another embodiment, the first format is for example any of a first compressed format for representing video, audio, graphics, text or otherwise digital information and the second format is any of a second compressed format for representing video, audio, graphics, text or otherwise digital information. It is also expected that, at least in some embodiments, non-plenoptic data encoder(s) 1F17 simply extract other scene data from database 1F19 for provision to data control 1F15 without conversion of format, where the extracted other scene data is either already in a compressed format or is in an uncompressed format.

Still referring to FIG. 1F, it is possible that a user request is for plenoptic scene data and other scene data for example based upon a rendered view of the plenoptic scene data. In this use case, the initial user request is provided by the packet manager 1F05 to the encoder 1B11a that extracts the requested plenoptic scene data and then provides the extracted plenoptic scene data to the non-plenoptic data control 1F15. The data control 1F15 then provides the non-plenoptic data to a non-plenoptic data encoder 1F17 that can translate the plenoptic scene data into for example the requested rendered view of the scene, where then this rendered view that is other scene data is provided to the data control 1F15 for including in the payload of one or more scene data packets 1A15. As will be made apparent especially in relation to upcoming FIG. 1G, alternatively the extracted plenoptic scene data could simply be transmitted to the client system 1A01 in one or more scene data packets 1A15, where the codec 1A11 including a decoder 1B11b on the client system 1A01 then uses the extracted plenoptic scene data received in the scene data packet(s) 1A15 to render the requested scene view. As a careful consideration will show, this flexibility provides for a network of communicating systems using scene codec 1A11 with multiple options for most efficiently satisfying any given user request.

Still referring to FIG. 1F, there is no limitation as to the number of concurrent streams of scene data a scene codec 1A11 comprising encoder 1B11a can process, where it should be understood that the codec 1A11 with encoder differs in this respect from a traditional codec with encoder that is typically providing a single stream of data either to a single decoder (often referred to as a unicast) or to multiple decoders (often referred to as a multicast or broadcast). Especially as was depicted in relation to prior FIG. 1E, FIG. 1E, some example embodiments of the present invention provides for a one-to-many relationship between a single serving system 1A01 (including a scene codec 1A11 at least comprising encoder 1B11a) and multiple client systems 1A01 (including a scene codec 1A11 at least comprising decoder 1B11b). Some embodiments of the present invention also provide for a many-to-one relationship between a single client system 1A01 and multiple sewing systems 1A01 as well as a many-to-many relationship between a multiplicity of server systems 1A01 and a multiplicity of client systems 1A01.

Referring next to FIG. 1G, there is shown a block diagram of scene codec 1A11 comprising at least a decoder 1B11b. Many of the elements described in FIG. 1G are the same or like those in FIG. 1F and therefore will be discussed in less detail. As prior discussed, API control host 1F01 is for example application software 1A03 being executed on or in communication with a system using scene codec 1A01, where for example the software 1A03 is any of implementing in full or in part a user interface (UI) or communicating with a UI. Ultimately, a user such as a human or automaton provides one or more explicit or implicit indications using the UI, where these indications are used at least in part to determine one or more user requests 1G11 for scene data. In a general sense, any system using scene codec 1A01 that determines user requests 1611 is referred to herein as a client system 1A01. As has been discussed and will be further discussed especially in relation to upcoming use case FIGS. 5, 6 and 7, it is possible and even desirable that the client system 1A01 have sufficient scene data to satisfy a given user request 1G11. However, it should also be understood that the totality of possible and useful scene data will likely far exceed the capacities of any given client system 1A01, for example where the computing platform for implementing the client system 1A01 is a mobile computing device or computing elements embedded within an automaton such as a drone or robot. Some example embodiments therefore provide that a given client system 1A01 determining one or more user requests 1G11 has access over a network 1E01 to any number of other systems using scene codec 1A01, where any one or more of these other systems 1A01 may have access to or include scene data sufficient for satisfying the given user request 1611. As will be discussed further in relation to the present figure, a user request 1G11 may then be communicated over a network to another system 1A01 comprising a scene codec 1A11 comprising at least an encoder 1B11a, where this another system 1A01 is referred to herein as a server system 1A01 and will ultimately provide to the client system 1A01 one or more scene data packets 1A15 for satisfying the user request 1G11.

There is no restriction that any given system using scene codec 1A01 be limited to the functions of being only a client system 1A01 or only a server system 1A01, and as will be discussed especially in relation to FIGS. 5, 6 and 7, a given system 1A01 can at any time operate as either or both a client and a server, where the client includes a codec comprising a decoder 1B11b and the server includes a codec comprising an encoder 1B11a, such that a system 1A01 comprising a codec 1A11 comprising both a decoder 1A11b and an encoder 1A11a is able to function as both a client system 1A01 and a server system 1A01.

Still referring to FIG. 1G, in a codec 1A11 comprising a decoder 1B11b, API host 1F03 is in communications with various codec components including the packet manager 1F05, decoder 1B11b and non-plenoptic data control 1F15. Packet manager 1F05 receives user requests 1G11 in any of many possible various forms sufficient for communicating with a server system 1A01 the user's desired scene data, where then scene data is broadly understood to including any of scene data comprised within a plenoptic scene database 1A07, and/or any of other scene data comprised within another scene data database 1G07. Other scene data includes any of video, audio, graphics, text, or otherwise digital information. Other scene data may also be stored within and retrieved from the plenoptic scene database 1A07, especially as auxiliary information (see element 4C21 with respect to upcoming FIG. 4C). Throughout the present specification, descriptions are provided to delineate the various data types herein generally referred to as comprising a plenoptic scene database 1A07, including a scene model and auxiliary information including scene model augmentations, translations, index and usage history. Scene models may generally comprise both a matter field and light field.

It should be noted that it is possible to classify the various types of scene data and other scene data described in the present application, where this classification for example can take the form of a GUID (global unique identifier) or even a UUID (universally unique identifier). Furthermore, the present structures described herein for reconstructing a real scene into a scene model for possible association with other scene data is applicable to a virtually limitless number of real-world scenes, where then it is also useful to provide classifications for the types of possible real-world (or computer generated) scenes available as scene models. Therefore, it is also possible to assign a GUID or UUID to represent the various possible types of scene models (for example city scape, building, car, home, etc.) It may also be possible to use another GUID or UUID to then uniquely identify a specific instance of a type of scene, such identifying a car type as a "2016 Mustang xyz". As will also be understood, it is possible to allow a given user requesting scene information to remain anonymous, or to likewise be assigned a GUID or UUID. It is also possible that each system using scene codec 1A01, whether acting as a server and/or a client, is also assigned a GUID or UUID. Furthermore, it is also possible to classify user requests 1G11 into types of user requests (such as "new subscene request", "subscene increment request", "scene index request", etc.) where both the types of the user request and the actual user request can be assigned a GUID or UUID.

In some embodiments, one or more identifiers such as GUIDs or UUIDs are included along with a specific user request 1G11 for provision to the packet manager, where then the packet manager may then include one or more additional identifiers, such that the control packet 1A17 issued by the scene codec 1A11 comprising a decoder 1B11*b* comprises significant user request classification data, and where any of this classification data is usable at least to: 1) store in a database such as either the plenoptic scene database 1A07 being maintained by the server system 1A01 servicing the user's request, or in an external user request database that is generally made available to any one or more systems 1A01 such as the server system 1A01 servicing the user's request, and 2) determine any of user request 1G11/ control packet 1A17 routing or scene data provision load balancing, where any one or more request traffic processing agents can communicate over the network 1E01 with any one or more of the client and server systems 1A01 to route or reroute control packets 1A17, especially for the purposes of balancing the load of user requests 1G11 with the availability of server system 1A01 and network bandwidth, all as will be understood by those familiar with networked systems and managing network traffic.

Referring still to FIG. 1G, in one embodiment, a client system 1A01 is in sole communications with a server system 1A01, where the client system 1A01 provides user requests 1G11 comprised within control packets 1A17 and the server system provides in return scene data packets 1A15 satisfying the user requests 1G11. In another embodiment, a client system 1A01 is being serviced by two or more server systems 1A01. As discussed in relation to FIG. 1F, a server system 1A01 preferably includes identifying information within a scene data packet 1A15 along with any requested scene data (or other scene data), such that the codec 1A11 on the client system 1A01 is able to track the state of the received scene data including answered requests stored within the client system's 1A01 plenoptic scene database 1A07, or within the client system's 1A01 other scene data database 1G07. In operation, a given scene data packet 1A15 is received and parsed by the packet manager 1F05, where then any non-plenoptic scene data is provided to the non-plenoptic data control, any plenoptic scene data is provided to the decoder 1B11*b*, and any user request identification data is provided to the decoder 1B11*b*.

Non-plenoptic data control 1F15 provides any non-plenoptic scene data to any one or more of non-plenoptic data decoder(s) 1G05 for any of decoding and/or storing in either the other scene data database 1G07 or the client system 1A01's plenoptic scene database 1A07 preferably as auxiliary information (see e.g., FIG. 4C). Again, non-plenoptic scene data comprises for example any of video, audio, graphics, text, or otherwise digital information, where decoders of such data are well known in the art and are under constant further development, therefore it should be understood that any of the available or to become available non-plenoptic scene data decoders is useable by some embodiments as a non-plenoptic data decoder 1G05.

Decoder 1B11*b* receives plenoptic scene data and at least in part uses query processor 1G01 with subscene inserter 1G03 to insert the plenoptic scene data into the client system 1A01's plenoptic scene database 1A07. As prior mentioned with respect to FIG. 1F, the client plenoptic scene database 1A07 may be implemented as any combination of internal or external data memory or storage, where for example the decoder 1B11*b* includes a high-speed internal memory for storing a substantial portion of the client plenoptic scene database 1A07 most anticipated to be required and requested by a user, and where otherwise additional portions of the client plenoptic scene database 1A07 are stored external to the decoder 1B11*b* (but not necessarily external to the system using scene codec 1A01 comprising the decoder 1B11*b*). Like encoder 1B11*a*, during operation, any of the decoder 1B11*b*, the query processor 1G01, and especially the subscene inserter 1G03, may invoke codec SPU 1F13 for efficiently processing plenoptic scene database 1A07, where codec SPU 1F13 is meant to implement various of the technical advantages described herein for efficiently processing the representations and organization of representations with regard to the plenoptic scene database 1A07.

Still referring to FIG. 1G, decoder 1B11*b* receives any of user request identification data for any of: 1) updating client state 1F05, and 2) notifying the API host 1F01 via APT 1F03 that a user request has been satisfied. Decoder 1B11*b* may also update client state 1F05 based upon any of the internal operations of decoder 1B11*b*, where it is important to see that the purpose of the client state 1F05 includes accurately representing at least the current states of available client system 1A01 plenoptic scene database 1A07 and other scene data database 1G07. As will be discussed in further detail with respect to use case FIGS. 5, 6 and 7, client state 1F05 information it at least useful to the client system 1A01 for use at least in part to efficiently determine if a given client user request can be satisfied locally on the client system 1A01 using any of the available client system 1A01 plenoptic scene database 1A07 and other scene data database 1G07, or requires additional scene data or other scene data that must be provided by another server system 1A01, in which case the client user request is packaged in a control packet 1A17 and transmitted to a specific server system 1A01 or a load balancing component for selecting an appropriate server system 1A01 for satisfying the user's request. Client state 1F05 information is also useful to any of the load balancing component or ultimately a specific server system 1A01 for efficiently determining at least a minimal amount of scene data or other scene data sufficient for satisfying the user's request.

After receiving an indication via the API 1F03 that a specific user request has been satisfied, API control host 1F01 such as application software 1A03 then causes client system 1A01 to provide the requested data to the user, where again users can be either human or autonomous. It should be understood that there are many possible formats for providing scene data and other scene data, such as a free-view format for use with a display for outputting video and audio or such as an encoded format for use with an automaton that has requested scene object identification information including localized directions to the object and confirmation of the visual appearance of the object. What is important to see is that the codec 1A11 comprising decoder 1B11b has operated to provide user requests 1G11 to one or more server systems 1A01 and then to receive and process scene data packets 1A15 such that ultimately the user receives the requested data in some format through some user interface means. It is also important to see that the codec 1A11 comprising decoder 1B11b has operated to track the current client state 1F05, such that a client system 1A01 uses any of client state 1F05 information to at least in part determine if a given user request can be satisfied locally on the client system 1A01, or requires scene or other data that must be provided by another server system 1A01. It is further important to see that the client system 1A01 using the codec 1A11 comprising decoder 1B11b optionally provides one or many of various possible unique identifiers, for example including classifiers, along with any user requests 1G11 especially as encoded in a control packet 1A17, where the tracking of the various possible unique identifiers by at least any of the client system 1A01 or serving systems 1A01 is useful for optimizing the overall performance (such as by using machine learning) of any one or more clients 1A01 and any one or more servers 1A01. It is also important to see that like the codec 1A11 comprising an encoder 1B11a, the codec 1A11 comprising a decoder 1B11b has access to a codec SPU 1F13 for significantly increasing at least the execution speed of various extraction and insertion operations, respectively, all as to be discussed in greater detail herein.

Still with respect to FIG. 1G, as codec 1A11 comprising decoder 1B11b processes scene data packets, any of processing metrics or information can be provided as usage data along with the changes to the client state 1F07, where usage data differs from user requests in at least that a given user request may be satisfied by providing a subscene (such as a scene model of a home that is for sale) whereas the client system 1A01 then tracks how the user interacts with this provided scene model, for example where the user is a human and the tracked usage refers to rooms in the home scene model that were accessed by the user, durations of the access, points of view taken in each room, etc. It should be understood that, just as there are virtually a limitless number of possible scene models representative of any combination of real-world and computer generated scenes, there are also at least a very large number of usage classifications and otherwise information that can be tracked and that would at least be valuable to the machine learning aspects of example embodiments, where at least one function of the machine learning described herein it to estimate the best informational extent of a subscene or a subscene increment when determining how to satisfy a user's request.

For example, if a user is requesting to tour a city such as Prague (see especially FIG. 5) starting in a certain city location such as the narthex of the St. Clement Cathedral, then the system must decide to what informational extent the initial narthex subscene is provided to the user, where providing a greater extent in general allows the user more initial freedom of scene consumption, but where providing a lesser extent in general allows for a faster response time with less scene data transmitted. As will be discussed, scene freedom at least includes free-view, free-matter and free-lighting, and where for example free-view includes spatial movement in a subscene such as moving from the narthex to then enter the St. Clement Cathedral, or moving from the narthex to walk across the street, turn and capture a virtual image of the Cathedral. As a careful consideration will show, each of the possible user choices for consuming the provided subscene might require a greater and greater amount of information extent including matter field and light field data In this regard, example embodiments provide that by tracking scene usage across a multiplicity of users and user incidents, the accumulated usage information can be used by a machine learning component described herein to estimate for example the information extent of the matter field or light field that would be necessary to allow for "X" amount of scene movement by a user, where then X can be associated with Y amount of time for typically experiencing the scene movement, such that the system then is able to look-ahead and predict when a user is likely to require new scene data based upon all known usage and currently tracked user scene movement, where such look-ahead may then be automatically used to trigger additional (implied) user requests 1G11 for more new scene data to be provided by a server system 1A01.

While not depicted in FIG. 1G, any non-plenoptic data or other scene data received in scene data packets 1A15 and processed by codec 1A11 comprising decoder 1B11b may also be provided directly to any of appropriate sensory output(s) 1E11 (see FIG. 1E) for providing requested data to a requesting user, where for example the sensory output 1E11 is a traditional display, a holographic display, or an extended reality devices such as a VR headset or AR glasses, where provided directly means to be provided from the codec 1A11 and not from a process that retrieves the equivalent scene data from either of the plenoptic scene database 1A07 or other scene data database 1G07 after first being stored in the respective database 1A07 or 1G07 by the codec 1A11. Furthermore, it is possible that any of this non-plenoptic data or other scene data provided to a sensory output 1E11 is either not stored as data or stored as data in either of client plenoptic database 1A07 or other database 1G17, where the storage operation is any of prior to the provision, substantially concurrent with the provision, or after the provision, and where the provision to a sensory output 1E11 can alternatively be accomplished by further processing any of the stored data in databases 1A07 or 1G07 in order to retrieve scene data equivalent to the scene data received in a scene data packet 1A15 for provision to the sensory output 1E11.

Figure 2A:
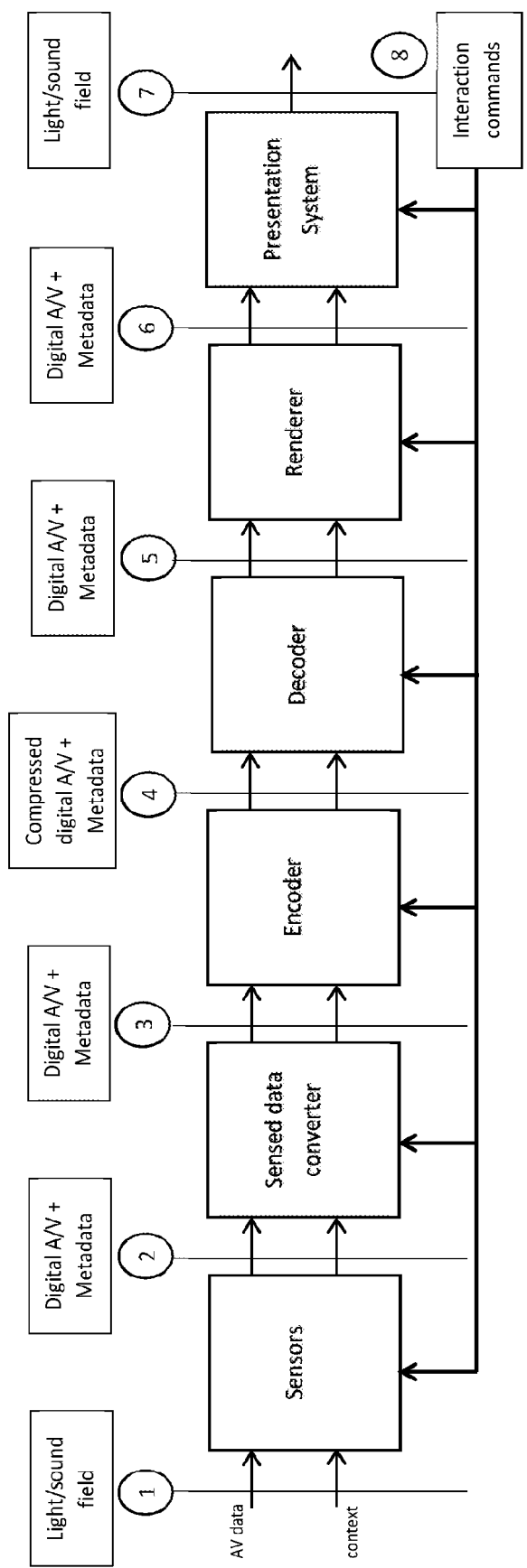
FIG. 2A depicts a block diagram of existing state-of-the-art "light/sound field conceptual workflow" as described by the *Joint ad hoc group for digital representations of light/sound fields for immersive media applications* in the technical publication ISO/IEC JTC1/SC29/WG1N72033, ISO/IEC JTC1/SC29/WG11N16352 dated June 2016, issued from Geneva, Switzerland.

Referring next to FIG. 2A, there is shown a block diagram as provided on page 13 of the publication entitled *Technical report of the joint ad hoc group for digital representations of light/sound fields for immersive media applications* as provided by the "Joint ad hoc group for digital representations of light/sound fields for immersive media applications", the entire content of which is incorporated by reference. The publication is directed to the processing of "the conceptual light/sound field", where the diagram depicts seven steps in the processing flow. The seven steps include: 1) sensors; 2) sensed data conversion; 3) encoder; 4) decoder; 5) renderer; 6) presentation, and 7) interaction commands. The processing flow is intended to provide real-world or computer synthesized scenes to a user.

Figure 2B:
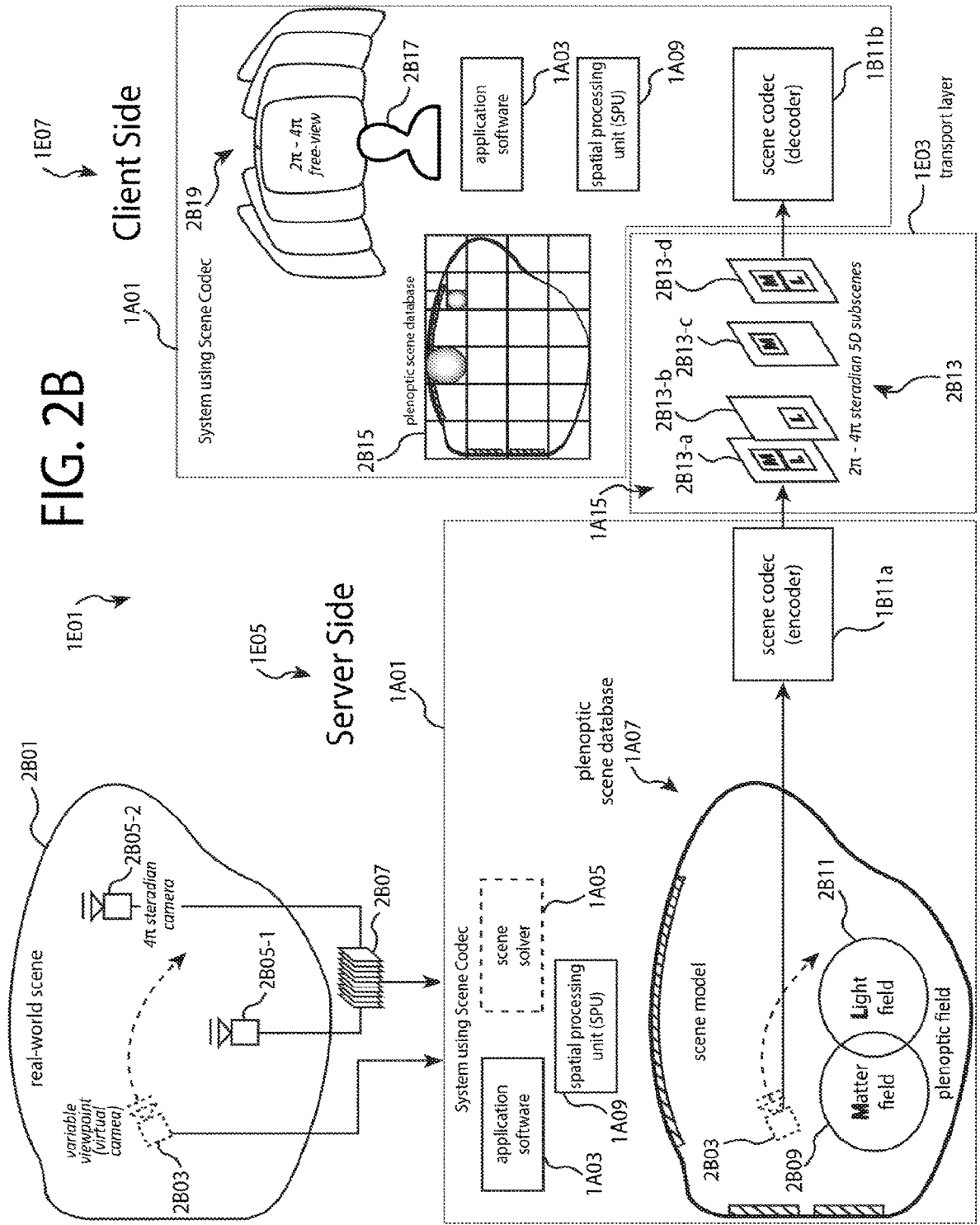
FIG. 2B is a combination block and pictorial diagram of a real-world scene being captured by representative real cameras and provided to a system such as the system shown in FIG. 1 in a network environment such as that shown in FIG. 1E, according to some embodiments.

In FIG. 2B, there is shown a combination block and pictorial diagram representative of an exemplary use case of some example embodiments for providing at least visual information regarding a real-world scene 2B01 to a user 2B17 through a sensory output device such as a $2\pi$-$4\pi$ free-view display 2B19. In the present depiction, a real-world scene 2B01 is sensed using one or more sensors such as real cameras 2B05-1 and 2B05-2, where real cameras 2B05-1 and 2B05-2 are for example capable of imaging a real scene 2B01 over some field-of-view including the entire spherical $4\pi$ steradians (therefore 360×180 degrees). Real cameras such as 2B05-1 and 2B05-2, as well as other real-world scene 2B01 sensors provide captured scene data 2B07 to a system 1A01, for example residing on the server side 1E05 of a network 1E01. While in the present depiction scene data 2B07 is visual in nature, as prior discussed in relation to FIG. 1E, sensors 1E09 of a system 1A01 include but are not limited to real cameras such as 2B05-1 and 2B05-2, where furthermore real cameras such as 2B05-1 and 2B05-2 are not limited to 4P steradian cameras (also often referred to as 360 degree cameras) but may for example be single sensor narrow field-of-view cameras. Also, as prior discussed, cameras such as 2B05-1 and 2B05-2 can sense across a wide range of frequencies for example including ultra-violet, visible and infrared. However, in the use case depicted in the present figure where an end user 2B17 is to view visual information, preferred sensors are real cameras or capable of sensing real scene depth and color across a multiplicity of scene points, all as will be well understood by those familiar with imaging systems.

Still referring to FIG. 2B, sensor data 2B07 including in the present example camera images, is provided to a server-side system 1A01. As prior mentioned in relation to FIG. 1A, and further described with respect to upcoming FIG. 4C below, additional extrinsic and intrinsic information may also be provided to server-side system 1A01 with respect to sensors such as real cameras 2B05-1 and 2B05-2, where such information includes for example sensor location and orientation and possibly also sensor resolution, optical and electronic filters, capture frequency, etc. Using any of provided information as well as captured information such as images comprising 2B07, server-side system 1A01, preferably under the direction of the application software 1A03 in combination with a scene solver 1A05 and an SPU 1A09, reconstructs real-world scene 2B01 forming a plenoptic scene model within a plenoptic scene database 1A07. Upcoming FIGS. 4A and 4B provide further information regarding both an exemplary real-world scene such as 2B01 (FIG. 4A) and an abstract model view (or plenoptic scene model) of the real-world scene (FIG. 4B). According to some embodiments, a plenoptic scene model describes both the matter field 2B09 and light field 2B11 of the corresponding real-world scene at least to some predetermined resolution across the various dimensions including 1) spatial expanse; 2) spatial detail; 3) light field dynamic range, and 4) matter field dynamic range.

Referring still to FIG. 2B, user 2B17 interacting with client-side system 1A01 requests to view at least a portion of the real-world scene 2B01 as represented within the plenoptic scene database 1A07 stored on or accessible to the server-side system 1A01. In the preferred embodiment, application software 1A03 executed on the client-side system 1A01 presents and controls a user interface for at least determining the user requests. Upcoming FIGS. 5, 6, and 7 provide examples of types of user requests. In an example embodiment, application software 1A03 on the client-side system 1A01 interfaces with a scene codec such as 1B11*b* comprising a decoder to communicate user requests within control packets 1A17 across a network 1E01 (shown in FIG. 1E) to a scene codec such as 1A11*b* with an encoder being executed for example on a server-side system 1A01. Server-side system 1A01 application software 1A03 is preferably in communication with server-side encoder 1B11*a*, at least for receiving explicit user requests, such as user requests to receive scene information spatially commencing at a given entry point within the plenoptic scene model (co-located with a spatial entry point in the real-world scene 2B01).

When processing requests, the server-side system 1A01 preferably determines and extracts a relevant subscene from the plenoptic scene database 1A07 as indicated by the requested scene entry point. The extracted subscene preferably further includes a subscene spatial buffer. Hence, in the present example a subscene minimally comprises visual data representative of a 2π-4π steradian viewpoint located at the entry point, but then maximally includes additional portions of the database 1A07 sufficient to accommodate any expected path traversal of the scene by the user with respect to both the entry point and a given minimal time. For example, if the real-world scene is Prague and the entry point is the narthex of the St. Clement Cathedral, then the minimal extracted scene would substantially allow the user to perceive the 4π/2 steradian (half dome) viewpoint located at the narthex of the Cathedral. However, based upon any of user requests, or auxiliary information available within or to the server-side system 1A01, such as typical walking speeds and directions for a user based at the given entry point, application software 1A03 executing on the server-side system 1A01 may determine a subscene buffer sufficient for providing additional scene resolution sufficient for supporting a 30 second walk from the narthex in any available direction.

Still referring to FIG. 2B, the determined and extracted subscene is provided in a communication of one or more scene data packets 1A15 (see FIG. 1A) in scene stream 2B13. Preferably, a minimal number of scene packets 1A15 are communicated such that the user 2B17 perceives an acceptable application responsiveness, where it is understood that in general transferring the entire plenoptic scene database 1A07 is prohibitive (e.g. due to bandwidth and/or time limitations), especially as any of the scene dimensions increases, such as would naturally be the case for at least a large global city scene such as Prague. The techniques used in example embodiments for both organizing the plenoptic scene database and processing the organized database provide for substantial technical improvement over other known techniques such that the user experiences real-time or near real-time scene entry.

However, it is possible and affordable that the user experience some delay when first entering a scene in favor of then perceiving a continuous experience of the entered scene, where the continuous experience is directly related to both the size of the entry subscene buffer and the provision of supplemental scene increments along the explicitly or implicitly expressed direction of scene traversal. Some example embodiments of the present invention provides means for balancing the initial entry point resolution and subscene buffer as well as the periodic or aperiodic event-based rate of subscene increments and resolution. This balancing provides a maximally continuous user experience encoded with a minimal amount of scene information, therefore providing novel scene compression that can satisfy a predetermined quality-of-service (QoS) level. Within the asynchronous scene stream 2B13 determined and provided by the exemplary server-side system 1A01, any given transmission of scene data packets 1A15 may comprise any combination of any form and type of plenoptic scene database 1A07 information, where for example one scene data packet such as 2B13-*a* or 2B13-*d* comprises at least a combination of matter field 2B09 and light field 2B11 information (e.g., shown in 2B13-*a* and 2B13-*d* as having both "M" and "L" respectively), whereas another scene data packet such as 2B13-*b* comprises at least no matter field 2B09 but some light field 2B11 (e.g., shown in 2B13-*b* as having only an "L"), while yet another scene data packet such as 2B13-*c* comprises at least some matter field 2B09 but no light field 2B11 (e.g., shown in 2B13-*c* as having only an "M").

Still referring to FIG. 2B, scene stream 2B13 is transmitted from server-side system 1A01 over the network 1E01 transport layer to be received and processed by client-side system 1A01. Preferably, scene data packets 1A15 are first received on the client-side system 1A01 by scene codec 1B11*b* comprising decoder where the decoded scene data is then processed under the direction of application software 1A03 accessing the functions of the SPU 1A09. Decoded and processed scene data is preferably used on the client-side system 1A01 to both reconstruct a local plenoptic scene database 2B15 as well as to provide scene information such as the scene entry point in $2\pi$-$4\pi$ free-view. The provided entry-point free-view allows the user 2B17 to explicitly or implicitly alter the presentation of the viewpoint with respect to at least the angles of viewpoint orientation (0, 0) as well as the spatial viewpoint location (x, y, z) representative of the user's current location within the scene. As the user 2B17 provides explicit or implicit requests to further explore and therefore move about within the scene, the client-side system 1A01 first determines if the local scene database 2B15 includes sufficient information for providing subscene increments or if additional increments should be requested from the server-side system 1A01 to be extracted from the server-side scene database 1A07. A well-functioning scene reconstruction, distribution and processing system such as described herein intelligently determines an optimal QoS for the user 2B17 that balances multiple considerations and provides for an efficient means for storing and retrieving plenoptic scene model information into and from a plenoptic scene database 1A07.

Referring next to FIG. 3, there is shown a combination block and pictorial diagram of network 1E01 connecting a multiplicity of systems using scene codec 1A01 in various forms representative of a variety of possible forms, including but not limited to: personal mobile devices such as cell phones, display devices such as holographic televisions, cloud computing devices such as servers, local computing devices such as computers, land-based robots, unmanned autonomous vehicles (UAVs) such as drones and extended reality devices such as AR glasses. As prior discussed, all of systems 1A01 include a scene codec 1A11, where the codec 1A11 comprised within any of systems 1A01 may further comprise both an encoder 1B11*a* and a decoder 1B11*b*, an encoder 1B11*a* and no decoder 1B11*b*, or a decoder 1B11*b* and no encoder 1B11*a*. Thus, any of systems 1A01 as represented by the depictions of the present figure may be both a plenoptic scene data provider and plenoptic scene data consumer, a provider only, or a consumer only. While it is possible that a single system 1A01, for example a computer that is not connected to a network 1E01, performs any of the functions described herein as defining a system using a scene codec 1A01, some embodiments may include two or more systems 1A01 interacting across a network 1E01 such that they are exchanging any of captured real-scene data 2B07 to be reconstructed into a plenoptic scene database 1A07, or exchanging any of plenoptic scene database 1A07 scene data (see especially upcoming use case FIGS. 5, 6 and 7).

Referring next to FIG. 4A, there is shown a pictorial diagram of an exemplary real-world scene 4A01 of a very high level of detail (e.g., in some instances referred to as unlimited or almost unlimited detail) such as an internal house scene with windows viewing an outdoor scene. Scene 4A01 for example includes but is not limited to any one of, or any combination of, opaque objects 4A03, finely structured objects 4A05, distant objects 4A07, emissive objects 4A09, highly reflective objects 4A11, featureless objects 4A13 or partially transmissive objects 4A15. Also depicted is a user operating a system 1A01 using scene codec such as a mobile phone that is operating either individually or in combination with other (not depicted) systems 1A01 to provide the user with for example subscene images 4A17 along with any number of attendant real-world scene 4A01 translations, for example object measurements, light field measurements, or scene boundary measurements such as the portion of a scene that includes a fenestrel boundary verses an opaque boundary (see especially upcoming FIG., e.g., FIG. 4B).

Still referring to FIG. 4A, in general any real-world scene such as 4A01 is translated into a plenoptic scene model 1A07 via a process referred to as "scene reconstruction". As prior mentioned, and as will be discussed in greater detail later in this disclosure, an SPU 1A09 implements a multiplicity of operations for most efficiently executing both scene reconstruction as well as other database 1A07 functions such as but not limited to scene augmentation and scene extraction, where scene augmentation introduces new real or synthetic scene information into a scene model that otherwise is not necessarily present or substantially present within the corresponding real-world scene 4A01, and where scene extraction provides for the determination and processing of some portion of a scene model that is representative of a subscene. Synthetic scene augmentation for example includes providing a higher resolution of a reconstructed real-world object, such as a tree or a marble floor, such that as a viewer views the real-world object from beyond a given QoS threshold, the viewer is provided with the real-scene reconstruction information as represented in the original plenoptic scene model corresponding to the captured real-scene. However, as the viewer spatially approaches the object within a provided subscene and ultimately crosses the QoS threshold, the system according to some example embodiments intelligently augments during presentation, or has intelligently included as augmentation within the provided subscene, synthetic information such as tree-bark or marble floor detail not originally captured (or even present) within the real-world scene. As also prior mentioned, a scene solver 1A05 is an optional processing element that in general further applies machine learning techniques for extending the accuracy and precision of any of the aspects of scene reconstruction, augmentation (such as QoS driven synthesis), extraction or other form of scene processing.

As will be well understood by those familiar with computer systems, combinations of any of the system components including the application software 1A03, scene solver 1A05, SPU 1A09, scene codec 1A11 and request controller 1A13 provide functions and technical improvements that can be implemented as various arrangements of components without departing from the scope and spirit of the example embodiments. For example, one or more of the various novel functions of the scene solver 1A05 could be alternatively comprised within either the application software 1A03 or the SPU 1A09, such that the presently described delineations of functionality describing the various system components should be considered as exemplary, rather than as a limitation of the example embodiments, as those skilled in the art of software and computer systems will recognize many possible variations of system components and component functionality without departing from the scope of the example embodiments.

Still referring to FIG. 4A, the reconstruction of a real-world scene such as 4A01 by a system 1A01 includes a determination of a data representation for both the matter field 2B09 and light field 2B11 of the real-world scene, where these representations, and organization of these representations, have a significant effect on scene reconstruction but even more importantly on the efficiency including processing speed of subscene extraction. The example embodiments provide scene representations and organizations of scene representations that essentially enable for example large global scene models to be made available for user experiencing in real time or near real-time. FIGS. 4A, 4B and 4C are collectively oriented to describing at some level of detail these scene representations and organizations of scene representations, all of which are then further detailed in portions of the disclosure.

The techniques according to example embodiments described herein may use hierarchical, multi-resolution and spatially-sorted volumetric data structures for describing both the matter field 2B09 and the light field 2B11. This allows for the identification of the parts of a scene that are needed for remote viewing based on location, resolution and visibility as determined by each user's location and viewing direction or statistically estimated for groups of users. By communicating only the necessary parts, channel bandwidth requirements are minimized. The use of volumetric models also facilitates advanced functionality in virtual worlds such as collision detection and physics-based simulations (mass properties are readily computed). Thus, based upon the novel scene reconstruction processing of real-world scenes such as 4A01 into novel plenoptic scene model representations and organizations of representations, as well as the novel processing of subscene extraction and user scene interaction monitoring and tracking, example embodiments provides many use-case advantages some of which will be discussed in upcoming FIGS. 5, 6 and 7 where one of the advantages includes providing for free-viewpoint viewer experiences. In a free-viewpoint viewer experience, one or more remote viewers can independently change their viewpoint of a transmitted subscene. What is required for the maximal free-viewpoint experience, especially of larger global scene models, is both just-in-time and only-as-needed, or just-in-time and only-as-anticipated subscene provision by a system 1A01 to a free-viewpoint viewer.

Still referring to FIG. 4A, images and otherwise captured sensor data representative of a real-world scene such as 4A01 contain one or more characteristics of light such as color, intensity, and polarization. By processing this and other real scene information, system 1A01 determines shape, surface characteristics, material properties and light interaction information regarding the matter field 2B09 for representation in the plenoptic scene database 1A07. The separate determination and characterization of the real scene's light field 2B11 is used in combination with the matter field 2B09 to among other goals remove ambiguity in surface characteristics and material properties caused by scene lighting (e.g., specular reflections, shadows). The presently described novel processing of a real-world scene into a scene model allows for the effective modeling of transparent material, highly-reflective surfaces and other difficult situations in everyday scenes. For example, this includes the "discovery" of matter and surface characteristics, independent of the actual lighting in the scene, where this discovery and attendant representation and organization of representation then allows for novel subscene extraction including the accurate separation and provision to a free-point viewer of the matter field 2B09 distinct from the light field 2B11.

Thus, the free-point viewing experience accomplishes another key goal of free-lighting where for example when accessing a scene model corresponding to a real scene such as 4A01, the viewer is able to request free-point viewing of the scene with perhaps "morning sunlight" verses "evening sunlight", or even "half-moon lighting with available room-lights" where the user interface provided preferably by the application software 1A03 allows for the insertion of new lighting sources from a group of template lighting sources, and where both the newly specified or available lighting sources may then be modified to alter for example light emission, reflection or transmission characteristics. Similarly, matter field 2B09 property and characteristics may also be dynamically altered by the viewer thus providing free-matter along with free-lighting and free-viewpoint, where it is especially important to see that example embodiments provide for a more accurate separation of the matter field 2B09 from the light field 2B11 of a real scene, where the lack of accuracy in separation conversely limits the end use experience for accurately altering the properties and characteristics of the matter field 2B09 and/or the light field 2B11. Another advantage of an accurate matter field 2B09 as described herein includes interference and collision detection within the objects of the matter field, where these and other life-simulation functions require matter properties such as mass, weight and center of mass (e.g., for physics-based simulations). As will also be well understood by those familiar with object recognition within a real-world scene, highly accurate matter and light fields provide a significant advantage.

Referring still to FIG. 4A, the matter field 2B09 of a real-scene 4A01 comprises mediels that are finite volumetric representations of a material in which light flows or is blocked, thus possessing varying degrees of light transmissivity, characterizable as degrees of absorption, reflection, transmission and scattering. Mediels are located and oriented in scene-space and have associated properties such as material type, temperature, and a bidirectional light interaction function (BLIF) that relates the incident light field to the exitant light field caused by the light's interaction with the mediel. Collocated mediels that are optically, spatially and temporally homogeneous form segments of objects including surfaces with a palpable boundary, where a palpable boundary is generally understood to be a boundary that a human can sense through touch. Using these and other matter field 2B09 characteristics, the various objects as depicted in FIG. 4A are distinguished not only spatially but also and importantly with respect to their interaction with the light field (2B11), where the various objects again include: opaque objects 4A03, finely structured objects 4A05, distant objects 4A07, emissive objects 4A09, highly reflective objects 4A11, featureless objects 4A13 or partially transmissive objects 4A15.

Referring next to FIG. 4B, there is shown is a pictorial diagram representative of a real-world scene 4A01 such as depicted in FIG. 4A, where the representation can be considered as an abstract scene model 4B01 view of data comprised within a plenoptic scene database 1A07. An abstract representation of scene model 4B01 of a real-world scene 4A01 includes an miter scene boundary 4B03 containing a plenoptic field 4B07 comprising the matter field 2B09 and light field 2B11 of the scene. Light field 2B11 interacts with any number of objects in the matter field 2B11 as described in relation to FIG. 4A as well as other objects such as, for example, explained objects 4B09, and unexplained regions 4B11. Real-world scene 4A01 is captured for example by any one or more of real sensors such as real camera 2B05-1 capturing real images 4B13, whereas the scene model 4B01 is translated into real-world data representations such as images using for example a virtual camera 2B03 providing a real-world representative image 4A17.

In addition to objects including opaque objects 4A03, finely structured objects 4A05, distant objects 4A07, emissive objects 4A09, highly reflective objects 4A11, featureless objects 4A13 or partially transmissive objects 4A15 as shown in FIG. 4A, the system according to some embodiments may further allows for both explained objects 4B09 and unexplained regions 4B11, where these generic objects and regions include variations of the characteristics and properties of the matter field 2B09 as discussed in FIG. 4A. An important to aspect is the that matter field 2B09 is identified by scene reconstruction sufficient for the differentiation between multiple types of objects, where then any individual type of object uniquely located in the model scene can be further processed, for example by using machine learning to perform object recognition and classification, altering various characteristics and properties to cause model presentation effects such as changes to visualization (generally translations), object augmentation and tagging (see especially model augmentations 4C23 and model index 4C27 with respect to FIG. 4C) and even object removal. Along with object removal, object translations (see model translations 4C25 in upcoming FIG. 4C) may be specified to perform any number of geometric translations (such as sizing and rotation) or even object movement based upon for example object collisions or assigned object paths, for example an opaque object 4A03 classified through machine learning that is then rolled along a floor (opaque outer scene boundary 4B03) to bounce off of a wall (opaque outer scene boundary 4B03).

Still referring to FIG. 4B, the characteristics and properties of any object may be changed through the additional processing of new real-scene sensor data such as but not limited to new camera images, perhaps taken in a non-visible frequency such as infrared thus providing at least new BLIF (bidirectional light field information). The object types such as depicted in FIGS. 4A and 4B should be considered as exemplary rather than as limitations of embodiments, as it will be clear to those familiar with software and databases that the data may be updated and that the tagging of associated data forming a matter field object can be adjusted, at least including the naming of an object such as "featureless" verses "finely structured", or including the changing of object classification thresholds that might for example be used to classify and object as "partially transmissive" versus "opaque". Other useful variations of object types will be apparent to those skilled in the art of scene processing based upon this disclosure, as will other variations in general of the matter field 2B09 and light field 2B11, such that what is most important is the representations and organizations of representation of a real-world a real world scene such as 4A01 as described herein, as well as the efficient processing thereof, the combination of which are useful for providing the unique functions as described herein, where again these unique functions provide for a free-viewpoint, free-matter and free-light experience of at least a viewer using a scene model for a visualization.

A scene model also includes an outer scene boundary 4B03 demarcating the outermost extent of the represented plenoptic field 4B07. As a careful consideration of a real-world scene such as the kitchen depicted in FIG. 4A or an outdoor scene (not depicted) will reveal, some regions of the plenoptic field near the outer scene boundary 4B03 may act substantially opaque (such as the wall or countertop in a kitchen, or a thick fog in an outdoor scene), while other regions near the (imaginary) outer scene boundary may act substantially fenestral, representing arbitrary light field boundaries (such as the sky in an outdoor scene). In the real scene, light may cross back and forth across the space associated with the scene model outer boundary. But, the scene model does not allow such transmission. Rather, the fenestral light field can represent light fields in the real scene (like a TV can display a picture of the moon at night). In a scene model, opaque regions near the outer scene boundary 4B03 do not represent substantial transmission of light (in the real scene) that is exterior to the plenoptic field, into the scene, while fenestral regions near the outer scene boundary 4B03 do represent substantial transmission of light (in the real scene) that is exterior to the plenoptic field, into the scene. In some embodiments, it is possible to represent the trees and other outdoor matter as being included in the plenoptic field 4B07, where then the outer scene boundary 4B03 is spatially extended to include at least this matter. However, as objects in the matter field become ever more distant, even reaching the distance referred to as the no-parallax limit where features on the object do not substantially change with an alteration of viewpoint, it is beneficial to end the plenoptic field 4B07 in an outer scene boundary 4B03. Using one or more fenestral light elements 4B05, it is possible to represent the light field incident to the real scene along portions of the outer scene boundary 4B03 as if the plenoptic field 4B07 at those portions of the outer scene boundary 4B03 were extending indefinitely.

For example, referring to FIG. 4A, rather than extending the scene boundary 4B03 and therefore also the plenoptic field 4B07 into the outdoors area beyond the window thus including the trees in the matter field of the scene, it is possible to have the scene boundary 4B03 substantially end at the representations of the media and matter comprising the countertop, wall and window, where then a multiplicity of fenestral light elements 4B05 included along the portion of the outer scene boundary 4B03 spatially representing the window surface can be added so as to effectively inject a fenestral light field into the plenoptic field 4B07. Various light field complexities are possible using fenestral light elements 4B05 including 2D, 3D and 4D light fields. Note that as used herein "media" refers to contents of a volumetric region that includes some or no matter. Media can be homogeneous or heterogeneous. Examples of homogeneous media include: empty space, air and water. Examples of heterogeneous media include contents of volumetric regions including the surface of a mirror (part air and part slivered glass), the surface of a pane of glass (part air and part transmissive glass) and the branch of a pine tree (part air and part organic material). Light flows in media by phenomena including absorption, reflection, transmission and scattering. Examples of media that is partially transmissive includes the branch of a pine tree and a pane of glass.

In one exemplary use and advantage of the present system, a scene model 1A07, in a manner as described in FIG. 4B and corresponding to a real scene such as depicted in FIG. 4A, can be used to estimate the amount of sunlight based upon the time of day that will be transmitted into the scene (e.g. the kitchen), where an estimated time-of-day room temperatures or seasonal energy savings opportunities based upon various types of window coverings can be calculated based at least in part upon the estimated amount of transmitted sunlight. Such exemplary calculations are based at least in part upon data representing the light field 2B11 comprising the plenoptic field 4B07, the light field representation and other more fundamental calculation methods of which will be addressed in more detail herein. Suffice it to say that the light field 4B07 is treated as a quasi-steady state light field such that all light propagation is modeled as instantaneous with respect to the scene, although using the principles of free light described herein the viewer may experience a dynamic-state light field through the presentation of visual scene representations preferably using the application software 1A03.

Still referring to FIG. 4B, there is shown both a real camera 2B05-1, for example being capable of capturing images up to and throughout a 4π steradian view, as well as a virtual camera 2B03 with an exemplary limited viewpoint 4A17 that is less than 4n steradian. Any scene such as real scene 4A01 with a corresponding scene model 4B01 described within a plenoptic scene database 1A07 may comprise any number of real or virtual cameras such as 2B05-1 and 2B03, respectively. Any of cameras such as 2B05-1 and 2B03 may be designated as fixed with respect to the scene model or movable with respect to the scene model, where a movable camera is for example associate with a traversal path. What is important to see is that the many possible viewpoints and therefore resulting images of any real or virtual camera, whether moving or fixed, whether adjustable in field-of-view verses fixed field-of-view, can be estimated by the processing of the scene model 4B01 as described in relation to FIG. 4B.

Referring next to FIG. 4C, there is shown a block diagram of the major datasets within one embodiment of a plenoptic scene database 1A07, where the database 1A07 for example stores data representative of a real-world scene 4A01 such as depicted in FIG. 4A. A data model view of plenoptic scene database 1A07 of a real-world scene 4A01 typically includes for example any of intrinsic or extrinsic data 4C07 describing sensors 1E07, such as a real camera 2B05-1 or 2B05-2, or a virtual camera such as 2B03, where intrinsic and extrinsic data are well-known in the art based upon the type of sensor, and where in general an intrinsic property relates to the data capturing and processing functions of the sensor and where an extrinsic property relates to the physical location and orientation of the sensor with respect to typically a local scene coordinate system, or at least any coordinate system allowing for understanding the spatial location of the sensor with respect to the scene including the matter field 2B09 and light field 2B11.

The data model view further comprises a scene model 4C09, typically comprising a plenoptic field 4C11, objects 4C13, segments 4C15, BLIFs 4C17 and features 4C19. The term "plenoptic field" has a range of meaning within the current art, and furthermore this disclosure provides a novel representation of a plenoptic field 4C11, where this novel representation and organization of representation is at least in part a basis for many of the technical improvements herein described, for example including just-in-time subscene extraction providing for a substantially continuous visual free-view experience with sufficient scene resolution (thus meeting a QoS threshold) enabled by a minimal dataset (subscene). Therefore, the term and dataset plenoptic field 4C11, as with other specifically described terms and datasets described herein, should be understood in light of the present specification and not merely in reference to the current state-of-the-art.

Still referring to FIG. 4C, a plenoptic field 4C11 comprises an organization of representation herein referred to as a plenoptic octree, where a plenoptic octree holds representations of both the matter field 2B09 and the light field 2B11. A more detailed discussion of the representations and organization of representations with respect to the scene model 4C09 in general, and the major datasets of the scene model such as the plenoptic field 4C11, objects 4C13, segments 4C15, BLIFs 4C17 and features 4C19 in particular, is forthcoming in the remainder of the specification, where in general a plenoptic octree representation as herein described includes two types of representations for the matter field 2B09, and one type of representation for the light field 2B11. The matter field 2B09 will be shown to comprise both (volumetric) "medium" type matter representations and "surface" type matter representations. A medium type representation describes a homogeneous or inhomogeneous material in which light substantially flows (or in which light is substantially blocked). This includes empty space. Light flows in media comprising the medium type by phenomena including absorption, reflection, transmission and scattering. The type and degree of the modification of light is contained in property values contained in a voxel of the plenoptic octree or referenced by it. A surface type representation describes a palpable (touchable), (approximately) planar boundary between matter and empty space (or another media), where the planar boundary includes media on both sides, and where the media on both sides may be the same or different media (where different media surfaces are referred to as a "split surface" or "split surfel").

Surface type matter comprising a collocated media that is both spatially and temporally homogenous forms segment representations 4C15, where then collocated segments form representations of objects 4C13. The effect of surface type matter on the light field 2B11 (reflection, refraction, etc.), is modeled by the Bidirectional Light Interaction Function (BLIF representations 4C17 associated with the surface type matter, where the granularity of the BLIF representations 4C17 extends to association with at least the segments 4C15 comprising the objects 4C13, but also with feature representations 4C19, where features are referred to as poses in an entity such as an object 4C13 located in the space described by the scene model 4C09. Examples of features in scenes or images include spots and glints in a microperspective, or even a building from a macro perspective. The BLIF representations 4C17 relate the transformation of the light field 2B11 incident to a material (matter) with the light field 2B11 exitant from the material, based upon the light field's interaction with the material.

Still referring to FIG. 4C, the major datasets of at least one embodiment of some example embodiments include auxiliary information 4C21 such as any of, or any combination of: model augmentations 4C23, model translations 4C25, model index 4C27 and model usage history 4C29. A model augmentation 4C23 comprises any additional meta data to be associated with some portion of the scene model 4C09 that is not otherwise comprised within the scene model 4C09 and does not otherwise specify a change to the scene model 4C09 (where for example a model transformation 4C25 describes some mathematical function or similar for attribution to the scene model, the attribution of which alters (changes) extracted subscenes or scene model interpretations such as metrology).

Model augmentation representations 4C09 include but are not limited to: 1) virtual scene descriptions including text, graphics, URLs, or other digital information that might for example are displayed as augmentations to a viewed subscene (similar in concept to augmented reality (AR)), examples including room features, object pricing or links to a nearest store for purchasing an object for example with respect to the real scene depicted in FIG. 4A; 2) sensory information such as a current temperature reading to be associated with a portion of either the matter field 2B09 or the light field 2B11, where sensory information is typically not based at least in part upon either the matter 2B09 or light field 2B11 and includes any type of data available from a currently known or as of yet unknown future sensor and especially relates to data associated with the senses of somatosensation (touch), olfaction (smell), audition (hearing) or even gustation (taste), and 3) metrics relating to computations describing any of the matter field 2B09 or light field 2B11, examples including measurements of a quantity (such as a dimension of size) or a quality (such as a dimension of temperature), where preferably the computations are based at least in part upon any of the matter field 2B09 or light field 2B11. Model augmentations 4C23 are associated directly with any of the scene model 4C09 or indirectly to the scene model 4C09 through any of the model translations 4C25 or model index 4C27. Model augmentations may be based at least in part upon any information comprised within the model usage history 4C29, where for example the augmentation is an up-to-date statistic regarding some logged aspect of scene model usage across a multiplicity of users.

Still referring to FIG. 4C, model translations 4C25 include but are not limited to: 1) geometric transformations applied to any of the matter field 2B09 or light field 2B11 comprising the scene model 4C09, where a geometric transformation maps the spatial position of any matter or light field element to a new position including spatial shifting, rotating, enlarging, reducing, etc.; 2) compound geometric transformations such as trajectory paths for describing the movement of an object in the scene model 4C09, or otherwise for any of the matter field 2B09 or light field 2B11; 3) virtual scene paths including path point timing for example describing the movement and viewpoint of a virtual camera (such as 2B03) within a scene model such that a viewer experiencing a visual representation of the scene model is guided through the scene without necessarily requiring free-view directives, or for example describing suggested scene model paths such as a set of city tour destination locations where the viewer might be translocated from one subscene to another subscene that are or are not spatially collocated within the scene model 4C09, and 4) pre-compilations of any of the data comprised within the scene model 4C09 and associated auxiliary information 4C21 for example including a jpeg image of the St. Clement Cathedral in Prague. Model translations 4C25 are associated directly with any of the scene model 4C09 or indirectly to the scene model 4C09 through any of the model augmentations 4C23 or model index 4C27. Model translations may be referenced by the model usage history 4C29, where for example the use of given translations is logged across a multiplicity of users.

The model index 4C27 comprises data useful for presenting to any of a human or autonomous user index elements for selecting a portion of any of the scene database 1A07 especially including any of the scene model 4C09 or the auxiliary information 4C21, where the data includes but is not limited to: 1) a list of index elements comprising any of text, image, video, audio or other digital information, where each index element in the list is associated with at least one portion such as a subscene of the scene database 1A07 to be extracted for the requesting user (human or autonomous), or 2) an encoded list of index elements comprising any of encrypted or non-encrypted information useful for selecting a portion of the scene database 1A07 by way of an executed computer algorithm, where for example a remote computer that is a system using a scene codec 1A01 accesses an encrypted model index of extractable scene information including types of scene information for algorithmic comparison to desired types of scene information, where the algorithm then selects scene information for extraction based at least in part upon the algorithmic comparison. A given model index 4C27 may include associated permission information for allowing or denying access to the index 4C27 (and therefore the scene model 4C09 through the index 4C27) by any given user (human or autonomous), where the permission information includes allowed types of given users, specific given users associated with access credentials such as usernames and passwords, and any of payment or sale transaction related information including links for interacting with remote sale transaction providers such as PayPal.

A model index 4C27 is associated directly with any of the scene model 4C09. Model indexes 4C27 may be associated with, or trigger the use of, model augmentations 4C23 (for example current sensor readings of a certain type taken throughout a real scene such as a natural disaster scene corresponding to the scene model) or model translations 4C25 (for example a scene relighting in a morning, daytime or evening setting, or the automatic entry into a scene at a specific subscene followed by automatic movement throughout the scene according to a prescribed path). A model index 4C27, or any of its index elements, may be associated with any of model usage history 4C29, where association is broadly interpreted to include any formulation of the model usage history 4C29 such as a statistical percentage of index element selection by a multiplicity of users (human or autonomous) with associated scene model elapsed time usage, where the statistical percentages are then use to resort a ranking or presentation of the index elements with a given model index 4C27.

Still referring to FIG. 4C, model usage history 4C29 comprises any of data know to a system using scene codec 1A01 representative of a user's requests or indications, where users are either human or autonomous. Requests and indications include, but are not limited to, any of: 1) model index and model index element selections; 2) scene model free-view, free-matter or free-light adjustments based at least in part any upon of explicit or implicit user indications; 3) any of a user's explicit or implicit user indications, including for a human user tracked body motions, facial expression or audible sounds; 4) generalize scene model propagation information including elapsed time spent within a subscene or at least the elapsed time starting with the provision of a subscene before the incrementation of a subscene (such as spatial increase to include more of the total scene) or before a request to switch to an alternative subscene, or 5) any information logging the use of a model augmentation 4C23 (for example the use of a URL to access information external to the scene database 1A07) or a model translation 4C25 (for example the use of a predesignated scene path such as that representing a specific tour of a scene that is a cityscape or a home for sale).

Moreover, with respect to FIG. 4C, as will be well understood by those familiar with computer databases, there are many types of database technologies available in the current marketplace or that will become available at a future time, where the presently described plenoptic scene database 1A07 may be implemented in any number of these database technologies, or even a combination of these technologies, each technology with tradeoff advantages and each technology enhanced by the technical improvements of at least scene model 4C09 representations and organization of representations as described herein. Those familiar with computer databases will also appreciate that while one embodiment of the database 1A07 has been described as comprising the various datasets 4C07, 4C09 comprising 4C11, 4C13, 4C15, 4C17 and 4C19, as well as 4C21 comprising 4C23, 4C25, 4C27 and 4C29, the data herein described as belonging to the datasets can be reorganized into a different arrangement of datasets, or some described datasets may be further divided into other datasets or combined into other datasets without departing from the true scope and spirit of the example embodiments. It should also be understood that other data is described herein that is not specifically reviewed in the presentation of at least FIG. 4C, where this other data is also comprised within the plenoptic scene database 1A07, but may form its own dataset not including those datasets depicted in the present figure. A careful reading of this disclosure will also make clear that not all of the datasets described in the present figure must exist in the database 1A07 in order for a system using scene codec 1A01 to perform useful and novel functions or otherwise to provide any one of the many technical improvements described herein. Therefore, the plenoptic scene database 1A07 as described in relation to the present FIG. 4C should be considered as exemplary rather than as a limitation on example embodiments, as many variations are possible without departing from the scope of the embodiments provided herein.

Referring next collectively to FIGS. 5, 6 and 7, there is depicted a series of three flow charts describing three variants of generic uses cases for a system using scene codec 1A01, according to some example embodiments. Each of the three flow diagrams depicts a series of connected process shapes that are either boxes, ovals or diamonds, where it should be understood that each of these process shapes represent a higher level function of a specialized computer process that includes a portion of the technical improvements provided in example embodiments, where then collectively all of the shapes and their interconnections further describe herein specified technical improvements. The diamond shapes represent a function that determines an important branching decision for the system with respect to the processing of a user's requests within the generic use cases. In general, each of the shapes may be understood to represent a set of executable instructions for processing on a computing device, where these computing devices may be any arrangement of many possible variations such as a single CPU with multiple cores, each of the cores executing one or more functions, or multiple CPUs with single or multiple cores, where these multiple CPUs may be distributed over any type of network as prior discussed. Also, as prior discussed, there are certain computer operations for certain novel techniques herein described that can be further optimized using some form of a hardware specialized processing unit, for example an FPGA or ASIC or other well-known hardware executing what is often referred to as embedded code. In particular, some example embodiments include a spatial processing unit (SPU) 1A09 (see FIG. 1A) that is preferably a set of operations executed on an embedded system, even including customized digital circuits optimized for the key plenoptic scene processing functions described this disclosure.

Still referring to FIGS. 5, 6 and 7 collectively, the example embodiments provide significant benefits for reconstruction, distribution and processing of scene models, where it should be understood that traditionally most codecs transmit visual information, such as a movie, that does not provide for many of the benefits described herein such as free-view and subscene-on-demand, nor for example the transmission of scene data that is not visual (such as scene metrology, matter field or light field), nor for example the servicing of scene data alternatively to human users and autonomous users, each accessing the same model seeking different forms and aspects of scene data. There are some systems for transmitting scene models, especially including virtual reality (VR) systems, but typically VR systems are based upon computer modeling that lacks significant realism such as a real-world scene depicted in FIG. 4A. There are other systems for transmitting real-world scenes that have been reconstructed into scene models, however, the present system provides a unique plenoptic octree representation of a real scene where the matter field 2B09 and light field 2B11 are separated to a higher degree that existing systems, and where the organization of the representation of among other aspects the matter field 2B09 and light field 2B11 provide for a significant technical improvement in the underlying functions enabling real-time or near real time access and consumption of large real-world reconstructed scenes. Thus, the present system provides for the representation and organization of representation of a real scene as a plenoptic octree database 1A07 enabling systems for processing large global scenes across distributed networks, where the scenes are even undergoing intermittent or continuous reconstruction, and where the fundamental transfer of information is a stream of just-in-time heterogeneous, asynchronous plenoptic data, rather than for example merely visual data such as a traditional codec, or even whole reconstructed models such as other state-of-the-art scene model codecs.

As the upcoming FIGS. 5, 6 and 7 will make apparent, there are a multiplicity of ways for processing scenes using two or more systems using scene coded 1A01, where for example a first system 1A01 resides on a server and provides on demand scene model information to either of human or autonomous consumers (clients), where the clients are then using a second system 1A01 to receive and process the scene model information (see e.g., FIG. 5). In other variations, a first system 1A01 is being used by a client that is desirous of capturing what might be considered a "local" vs. "global" scene such as their car that received damage in a recent hail storm, or perhaps their house that was damaged in a storm or simply is being readied for sale. In this type of use case, the client system 1A01 is further adapted to comprise scene sensor(s) 1E09 for capturing raw data of the local scene (see especially FIG. 6). It is then possible that this raw scene data is transmitted across a network to a second system 1A01 running on a server that assumes the primary responsibility for reconstructing the local client scene and retransmitting back to the client system 1A01 reconstructed subscenes and subscene increments. In still other variations both a first system 1A01 being used by a client at a shared scene (such as a disaster site or an industrial warehouse) and a second system 1A01 running across a network share the responsibilities for reconstructing scene data captured by the client into subscenes and scene increments where then these reconstructed subscenes and scene increments are shared between the first and second systems 1A01 via codec functions such that the shared scene that is locally captured by the first system 1A01 is compiled into a larger scene model (by the cooperation of the first and second systems 1A01) that is then also available for sharing with still yet a third system 1A01, where then this third system may be local to the shared scene and also capturing raw data, or remote from both the first and second systems 1A01, and therefore also remote from the shared scene.

With collective respect to FIGS. 5, 6 and 7, there are depicted some rectangular shapes to represent codec 1A11 encoder functions (505, 515, 517 in FIG. 5; 505, 515, 517 in FIGS. 6; 505 and 517 in FIG. 7), some to represent codec 1A11 decoder functions (507, 511 in FIGS. 5; 507 and 511 in FIGS. 6; 507 and 511 in FIG. 7), and some to represent application software 1A03 (501*a*, 501*b*, 503, 509, 513*a-d* in FIG. 5; 501*a*, 501*b*, 503, 509, 513*a-d* in FIG. 6; 501*a*, 501*b*, 503, 509, 513 in FIG. 7). As will be well understood by those familiar with computer systems and software architectures, the deployed implementation of the various operations and functions represented as shapes in the FIGS. 5, 6 and 7 has many variations, including the use of any one or more processing elements for executing any one or more functions, where for example a processing element is any of a CPUs, GPUs or the herein defined SPUs 1A09 executing as an embedded processor in communications with, and support of, any of the codec 1A11 or application software 1A03 functions. Therefore, the depictions and specifications with respect to upcoming FIGS. 5, 6 and 7 should be considered as exemplary rather than as limitations of example embodiments, as the described functions may be further combined or further divided, and where these functions in various combinations may implemented and deployed in many variations without departing from the scope and spirit of the example embodiments. It will also be evident to those skilled in the art of software systems, networks, traditional compression, scene modeling, etc., that some other functions where omitted for clarity but may be apparent based upon existing knowledge (such as transport layer 1E03 functions if a network is to be used and depending upon the type of network). FIGS. 5, 6 and 7 also show some connecting lines as thicker than others, where these thicker lines (505-507, 517-507 in FIG. 5; 501*b*-505, 505-517, 517-507 in FIG. 6; 501*b*-505, 505-517, 517-507 in FIG. 7) represent the transmission of any combinations of plenoptic scene database 1A07 information, such as the stream 2B13 described generally with respect to FIG. 2B, or the transmission of scene data 2B07 (see FIG. 2B) for the purposes of scene reconstruction or annotation such as captured by scene sensor(s) 1E09 such as real cameras 2B05-1 and 2B05-2.

Referring now exclusively to FIG. 5, there is shown a flow diagram of an embodiment for example including the sharing of a larger global scene model with a remote client that is either human or autonomous and is consuming any of the various types of scene model information as herein described including any of free-view, free-matter, free-lighting, metrology, traditional 2D, 3D or 4D visualizations, any of associated (five) sensory information, auxiliary information or otherwise related scene model information either comprised within the plenoptic scene database 1A07 or associated with the plenoptic database 1A07 (for example where the database 1A07 includes URL links embedded within the spatial scene that connect to other internet accessible content such as current weather conditions, supporting video, product information, etc.). In this exemplary embodiment, it may be assumed that the global scene model is not only remote from the consuming client but also prohibitively large thus precluding the simple transfer of the entire global scene model to the client. For the purposes of clarity and illustration, the flow of FIG. 5 will be described with respect to just one of the many possible specific use cases, namely a human user requesting a city tour as a remote client with respect to a global repository of scene model city tours made available on a server.

Referring still to FIG. 5, the human client operates a client UI (user interface) 501 preferably executed by application software 1A03 running on a client system 1A01 such as a mobile device. Also, either comprised within or in communication with client system 1A01, is zero or more sensor(s) 1E09 (see FIG. 1E) for at least sensing some data in relation to the human user that is usable at least in part to determine any of user requests. Exemplary sensors include a mouse, joystick, game controller, web-camera, motion detectors, etc., where exemplary data preferably includes data explicitly or implicitly indicative of a desired scene movement or view-change including a direction, path, trajectory or similar with respect to a tracked current location/viewpoint within the ongoing scene which is usable by system 1A01 at least in part to help determine a viewpoint change and/or a next scene increment to a current subscene, as will be explained shortly in more detail. Client system 1A01 further includes one or more sensory output(s) 1E11 (FIG. 1E) for providing data to the human user, for example a 2D display, a VR headset, or even a holographic display.

In a first step of the present example, the human user accesses the client UI 501 to determine a global scene-of-interest (SOI) 501*a*, where for example the choices are a multiplicity of world-wide tourist attractions including major cities of the world, where for example the user selects to take a city tour of Prague. Operation 501*a* is in communication with determine and provide scene index from global SOI operation 503, where for example after the user choses to take a virtual tour of the city Prague, operation 503 provides an index of a multiplicity of possible tours (and therefore scene entry points with connected paths, see especially FIG. 4C model translations 4C25) along with associated auxiliary information such as images, short videos, customer ratings, critic ratings, texts, URL links to websites, hotel and restaurant information and websites, etc., where this auxiliary information along with other scene index information may be transmitted using traditional techniques and codecs well known based upon the type of data, and therefore is not necessary comprised with a plenoptic stream 2B13 (see FIG. 2B). While operation 503 might be performed on a server-side 1E05 system 1A01 that stores or has access to the plenoptic scene database 1A07 (see FIG. 2B), operation 501*a* as well as the other processing of the client UI 501 is preferably performed on a client-side 1E07 system 1A01, including determine initial subscene within global SOI operation 501*b*. In operation 501*b* the user reviews and selects from the scene index provided by operation 503 a subscene for entering the scene model, where for example the user choses a city-cathedral tour that commences at the narthex of the St. Clement Cathedral.

Still referring to FIG. 5, operation 501*b* is in communications with extract initial subscene from global SOI model operation 505 and transmits to operation 505 an indication of the user's selected subscene, for example the narthex of St. Clement. Based at least in part on the user's selected subscene, and also in part on determined subscene buffer size information, operation 505 accesses the plenoptic scene database 1A07 to determine a set of at least initial matter field 2B09 and light field 2B11 data for providing as a first independent subscene to the client system 1A01. In one embodiment, operation 505 is primarily a function of scene codec 1A11, where operation 505 communicates with operation 501*b* either directly or through an intermediary system component such as application software 1A03. In another embodiment, application software 1A03 provides substantially more than a communication service between operations 501*b* and 505, where software 1A03 implements for example the portion of operation 505 that is primarily responsible for determining the buffer size and then also causes scene codec 1A11 to then extract and transmit the initial subscene by invoking various application interface (API) calls into the scene codec 1A11. In any of these or other possible embodiments that are possible and will be understood by those familiar with software systems, the processes executing as a part of scene codec 1A11 may then also invoke various API calls into the SPU 1A09.

It yet still another embodiment, scene solver 1A05 is invoked by for example either the application software 1A03 or the scene codec 1A11 when determining for example the preferred buffer size, where scene solver 1A05 executes either deterministic or non-deterministic (e.g. statistical or probabilistic) algorithms including machine learning algorithms to provide or predict the buffer size preferably based at least in part upon auxiliary information 4C21 (see FIG. 4C) comprised within database 1A07, where the auxiliary information 4C29 is especially useful as a basis for machine learning based at least in part from data indicative of prior buffer sizes and scene movement as logged for prior client sessions of other users, either accessing the same subscene or different subscenes. As will be appreciated by those skilled in the art of software systems and architectures, these same deterministic or non-deterministic (e.g. statistical or probabilistic) algorithms including machine learning algorithms could also be functions of the scene codec 1A11, the SPU 1A09, the application software 1A03, or even some other component not described specifically herein but as will be apparent based upon the descriptions herein, were for example system using scene codec 1A01 comprises another scene-usage learning component that is for example implemented using any of specialized machine learning hardware, either as currently available and known in the marketplace or as will become known.

At least one technology company known in the market as NVIDIA is currently providing technology referred to as "AI Chips" that are a part of what is referred to as "Infrastructure 3.0" and is implemented on specialized GPUs further comprising what are referred to by NVIDIA as "tensor cores". The disclosure herein provide for novel representations and organizations of representations of scene models, and more specifically plenoptic scene models including auxiliary information 4C21 that is not traditionally considered to be scene data, but rather is data such as model usage history 4C29 that is directed towards how scene models are used in any and all ways by any of humans or automatons. As will be appreciated by those familiar with machine learning, while example embodiments provide some novel approaches for the implementation of scene learning, other approaches and implementations may be apparent especially with regard to the determination of a buffer size, where these implementations may be software executing on general computing hardware and/or software executing on specialized machine learning hardware, all solutions of which are considered to be within the scope and spirit of this disclosure.

Still referring to FIG. 5, description is provided with respect to at least efficient (just-in-time) subscene extraction based upon some determined or provided scene entry point and some determined or provided scene buffer size or otherwise information predictably limiting the subscene to be extracted from the entire SOI (e.g. global) scene model such that the extracted subscene with respect to the spatial buffer substantially ensures a maximally continuous user experience provided by a minimal amount of provided scene information. After having determined plenoptic scene data from database 1A07 representative of the user's chosen subscene, the plenoptic scene data is transmitted as asynchronous just-in-time stream 2B13 of any combination of the matter field 2B09 and light field 2B11 data comprised within database 1A07, where stream 2B13 is received by for example a client-side 1E07 system using scene codec 1A01 for processing into sensory output such as for example images and corresponding audio provided to a user 2B17 through a sensory output device 2B19 capable of providing $2\pi$-$4\pi$ free-view manipulation to a human user, where output device 2B19 is a specific example of any sensory output device 1E11 available through client UI 501.

As a first step of receiving the stream 2B13 by the decoder comprised in codec 1A01, a function for inserting the next scene data into client SOI model 507 is executed resulting in the reconstruction or updating of a client SOI (i.e. plenoptic scene database 1A07) mirroring but not equivalent to the global scene model (i.e. plenoptic scene database 1A07) from which the subscene was extracted and provided. It is important to see that it is possible, and considered within the scope of example embodiments, that the provided stream 2B13 comprising substantially plenoptic scene model data is translated into requested user data without first storing in a client ("local") database 1A07, or even without ever storing in a client database 1A07, where scene translation is for example via the steps of rendering and presentation into a free-view or other scene data fulfilling the user request. However, what is preferred and herein shown to provide significant benefit is that by first or additionally reconstructing a client database 1A07, and by not just translating the stream 2B13 into the requested scene data such as a user free-view visualization, it is possible to allow for ongoing client-side based scene data provision substantially independent of the global scene model or at least quasi-independent, where from time-to-time it is necessary to update or further "grow" the local client scene database 1A07 based upon the user's requests, where such growing is referred to as providing subscene increments to be discussed shortly.

Still referring to FIG. 5, those familiar with software systems and architectures will understand that while operation 507 is preferably implemented as a part of a decoder within a scene codec 1A11, it is possible that at least some portion of the operation 507 is executed by application software 1A03 implementing the client UI 501. For example, the application software 1A03 might include providing indications and changes to the client UI 501 prior to the actual provision of the requested scene data in operation 509. In traditional scene processing, operation 509 includes what is generally referred to as rendering if the requested data is for example a free-view visualization. With respect to current rendering techniques, due to the plenoptic scene database 1A07, example embodiments provide for increased free-matter and free-lighting options that provide for even more realistic free-views. As will be understood by those familiar with software architecture and based upon a careful reading of this disclosure, both the insert operation 507 and the provide requested data operation 509 may invoke various application interface (API) calls into the scene processing unit (SPU) 1A09. Unlike traditional codecs, the example embodiments provide confirming that scene data is received 511 to the server of the scene data, a feature that is especially important when considering that future provided scene increments rely upon an originally provided independent subscene as well as any subsequently provided scene increments.

Referring still to FIG. 5, it is important to see that the client SOI database 1A07 may be sufficient for providing any and all of the SOI data required in operation 509. The extent to which a first independent subscene is sufficient for satisfying all future data requests is proportional to the size of the initial subscene and inversely proportional to the extent of scene data to be requested. As the extent of requested or expected scene data increases, the burden and cost of transmitting an anticipatory initial subscene with a sufficient scene buffer eventually becomes prohibitive. For example, if the initial subscene is the narthex of the St. Clement Cathedral from which the user is only expected to enter the Cathedral and stand in the great hall, then the subscene can be of limited size. However, if the user is expected to enter the Cathedral or walk across the street into another building, then the subscene must necessarily increase in size. Example embodiments therefore provide that the initial subscene comprises an intelligently determined scene buffer balancing the expected user requests up to a certain amount of scene data with a need to minimize transmitted scene data and thereby decrease any perceived scene or UI lagging, where after the system provides for transmitting further increments of the subscene from the global model for fulfilling further requests or expected further requests based upon any of explicit or implicit user indications. Again, preferably this balance is based upon machine learning and other deterministic methods based at least in part on a history of similar user requests such that a maximally continuous user experience is provided by a minimal amount of initially provided and there after incrementally provided scene information.

As will be clear to those familiar with the various types of prediction systems, as the "look-ahead" (into the future) time increases, the number of possible scene movement variations increases geometrically or even exponentially, as opposed to linearly. For example, if the user is given an initial subscene of the narthex of the St. Clement Cathedral, a look-ahead time of 1 min versus 1 hour would yield at least a geometric rise in the size of the scene buffer such that if the calculated buffer size is X for 1 min, the buffer size of Y for 1 hour would likely be substantially greater than 60*X. In this regard, another key technical advantage of the certain embodiments is that the both the representation of the plenoptic scene model and the organization of these representations will be shown to significantly reduce the processing time necessary to extract any initial subscene or scene increment, given any chosen buffer size, with respect to currently known scene processing technologies. Thus, as will be clear from a careful consideration of the balancing tradeoffs, a significant reduction in subscene or scene increment extraction and processing time both supports larger initial subscene buffers for the same system response time and supports smaller subscene increment buffers in favor of more frequent scene increments, where the smaller more frequent approach actually decreases the total transmitted scene data as user request look-ahead times are reduced.

Still referring to FIG. 5, the remaining process client requests operation 513 and log consumption operation 515 provide for tracking the scene usage of the user and the intelligent incrementing of the client SOI model in the case where the initial subscene is determined or expected to lack sufficient scene data for satisfying current or possible future user requests. As a user interacts with UI 501, for example to receive updated scene data, these interactions provide indications of scene data value and consumption. Furthermore, client UI 501 preferably allows the user to express indications interpretable as requests for more scene data, such as by moving a mouse, joy stick, game controller or VR headset, where the indications are detected using sensors 1E09. Any one or more of these usage or expected usage indications allow the system to track user consumption within the client SOI model as operation 513a, where the tracked usage is saved in either of both the server and client plenoptic scene databases 1A07 as model usage history 4C29 (see FIG. 4C).

As user indications are processed by client UI 501, the process client requests operation 513 includes the operation 513b for determining if any of the user indications are interpretable as a next request for scene data, and then subsequently if the next request can be satisfied based solely upon scene data already contained within the existing local client SOI model. If a next request can be satisfied based solely upon the existing client SOI model, then the requested scene data is provided by operation 509 to the user. If a next request cannot be satisfied based solely upon the existing client SOI model, then operation 513c determines if the next request is incremental to the existing subscene (or subscenes) within the client SOI model, of if the next request is for an entirely new (and therefore independent) subscene. If the request is for a new subscene, operation 513c transfers control or otherwise invokes the client UI 501 to effectively determine what is the new subscene being requested (for example a switch to the Cathedral of Saint Lawrence), or even if the user might be requesting an entirely new global scene (for example a switch to a tour of Venice). If the request is not for a new subscene, but rather to continue exploring the existing subscene in a manner that requires an incremental addition to the current subscene, then operation 513d determines a next increment vector for the subscene. A next increment vector represents any of the dimensions of the scene model, such as the spatio-temporal expanse, spatial detail, light field dynamic range or matter field dynamic range, where the vector is any information indicating the extent of new scene data minimally required to satisfy the user's request. When determining the vector, operation 513d preferably has access to the user history tracked by the log consumption operation 515, where the determined vector for minimally satisfying the user's request along with the usage history (of the current and all other tracked users) can be combined for use at least in part by the system when estimating a next scene increment and increment buffer size, where again the buffer size expands the scene increment beyond a minimally satisfying vector scene increment to include expected "look-ahead" subscene usage.

Still referring to FIG. 5, as will be understood by those familiar with software systems, other arrangements of operations are possible while still performing the preferred steps of tracking and logging at least some of a user's indications and consumption of a scene model. Furthermore, other arrangements of operations are possible while still determining if a user is explicitly or implicitly requesting additional scene data, and if so whether this additional scene data is already present within the client scene model database 1A07. Still other arrangements of operations are possible for determining a next scene increment and buffer size if the additional scene data is not already present but is an extension to a subscene already existing within the client SOI database 1A07. As such, the functions provided for processing client requests 513 and logging consumption 515 in the present figure should be considered as exemplary, rather than as limitations on embodiments. Furthermore, any of operations 513, 513a, 513b, 513c, 513d and 515 could be implemented to execute concurrently on their own processing element or be implemented to execute sequentially on a single processing element. For example, tracking and logging user consumption operations 513a and 515 could be executed in parallel with the sequential processing of request tracking operations 513b and 513c. In another consideration, log consumption operation 515 could be running both on the client system 1A01 for updating the client SOI database 1A07 usage history 4C29, and on the server system 1A01 for updating the global SOT database 1A07 usage history 4C29. It is also possible that some or all of determine next increment vector for subscene 513d (including the determination of a buffer size) is executed on either the client system 1A01 or the server system 1A01.

It is important to note that a user's usage of a scene model is tracked and aggregated and that a client system first attempts to satisfy requests for new scene data based solely upon the client SOI model currently residing on, or accessible to, the client system 1A01, and that if an additional subscene increment is required from the global SOI model, calculations are made for determining a minimal amount of subscene increment necessary for providing a maximally continuous user experience with respect to both an expected amount of look-ahead usage and a determined quality-of-service (QoS) level, where the determination of the expected amount of look-ahead usage is based at least in part upon a history of tracked usage.

Referring next to FIG. 6, there is shown a flow diagram of some example embodiments built upon the description of FIG. 5, but now addressing a variant case where the client is first creating a scene model, or updating an existing scene model, rather than accessing an existing model. With respect FIG. 5, operations 507, 509, 511, 513 (comprising 513a, 513b, 513c and 513d), 515 and 517 remain substantially as described in FIG. 5 and therefore will be given minimal additional discussion with respect to the present FIG. 6. The exemplary use case of FIG. 6 is a user working with a mobile device such as a cell phone that is a system using scene codec 1A01 for creating (or updating) a scene model of their car hood that has been damaged, for example in a hail storm. Many other use cases are applicable to each of the flow diagrams in FIGS. 5, 6 and 7 than the exemplary uses cases, such as modeling car damage with respect to FIG. 6. For example, the present FIG. 6 use case is equally applicable for a user capturing scene models of any of their assets or property, including for example their home, or perhaps where the user is an agent such as an insurance or real estate agent needing to capture models of assets or property. Industrial and engineering firms could also use this same use case to capture scene models of critical assets or properties for sharing with others, where these assets or properties can be of any size and almost unlimited visual detail.

Still referring to FIG. 6, client UI 501 includes both sensors 1E09 and sensory outputs 1E11 as with FIG. 5, where one difference in use cases is that the for those exemplified in FIG. 6, sensors 1E09 include one or more sensors for sensing the asset, property or otherwise real scene to be reconstructed into a plenoptic scene model and database 1A07. Typical sensors 1E09 would be one or more real cameras such as 2B05-1 and 2B05-2 depicted in FIG. 2B, but otherwise may be any of a multiplicity of sensors and type of sensors. Client UI 501 allows the user to either instantiate a new, or select an existing, client SOI, for example their car or even car hood. The example embodiments may provide that for example there may preexist a plenoptic scene model either of the user's asset, property or otherwise scene, or that the user is going to create (instantiate) a new scene model. For example, if the user is a rental car agent and a renter has just returned the rental car to a scanning station, the client UI 501 might allow the agent to scan a bar code from the renter's agreement and then use this information at least in part to recall an existing plenoptic scene model of the same vehicle prior to the commencement of the rental. Hence, the car can be rescanned, perhaps by devices that are autonomous but still considered as sensors 1E09, where the new scanned images or otherwise sensed data is usable to update the existing scene model of the vehicle.

Using this approach, as prior mentioned, a plenoptic scene exists in all four dimensions including the three spatial dimensions as well as the time dimension. Hence, any refinement of the existing plenoptic scene model can either permanently alter the plenoptic scene such that the original baseline matter and light field data is overwritten or otherwise lost, or the refinement is organized as additional representations associated for example with any of a specific time like Apr. 25, 2019 at 10:44 AM EST, or an event name, like Rental Agreement 970445A. Given that the matter and light field is then organized in a time dimension of the plenoptic scene database 1A07, it is then at least possible to: 1) create any of scene data based upon a before or after time/event for any real-scene reconstructions and refinements; 2) measure or otherwise describe differences between any two points in time within the plenoptic scene database 1A07, and 3) catalogue a history of plenoptic scene database 1A07 changes filtered by any of the database 1A07 features, such as some or all of any portion of the scene model including the matter field and the light field.

In the example of a user scanning their own car hood to for example document and measure hail damage, it is also expected that the user may access a remote database of plenoptic scene models of cars, such that rather than instantiating a new model without any baseline plenoptic scene, the user would first select the appropriate baseline make and model for their own car and then use this as a basis for then scanning in their unique data for reconstruction and refinement of the baseline model. It is further expected that in this case, the client UI 501 would also provide intelligent functions for the user that would allow the user to adjust for example the matter field associated with the baseline model, for example to change the color of the car to a custom paint color added by the user, or any similar type of difference between the baseline and the unique real scene. It is further expected that any portion of the matter field can be named or tagged, for example "car exterior" where this tag is auxiliary information 4C21 such as that considered to be a model augmentation 4C23 (see FIG. 4c). As a careful consideration will show, by providing tagged baseline plenoptic scene models, the system provides significant leverage for creating and refining new custom scene models.

Some example embodiments further provide a multiplicity of tagged plenoptic matter and light field types and instances along with baseline plenoptic scene models, where for example the car manufacturer creates various plenoptic matter field types representative of the various materials used in the construction of any of their car models, where again the car models are represented as baseline plenoptic scenes. In this arrangement, a car salesperson is able to quickly alter a baseline car to select for different material (matter field) types substituting into the baseline, such that these model translations 4C25 (see FIG. 4C) can then be accessed as a plenoptic scene model for exploration (like the generic use case of FIG. 5). As a careful reader will understand, there are virtually an unlimited number of uses for each of the generic use cases presented in FIGS. 5, 6 and 7, let alone other use case variations that are discussed, implied or otherwise apparent from the descriptions provided herein, such that use cases described especially in relation to FIGS. 5, 6 and 7 should be considered as exemplary, rather than as limitations.

Referring still to FIG. 6, after establishing the client SOI as a database 1A07, information is transmitted to for example a second, server-side system 1A01, where a operation 503 on the server side instantiates/opens a global SOI model corresponding to the client SOI model. As will become clear, the global model and the client model are to be updated to comprise substantially identical new scene model information as captured by the client system 1A01 sensors 1E09, although there is no requirement that otherwise the global model and the client model are substantially the same with respect to scene data. Preferably, operation 503 is in communications with client UI 501 such that after the global SOI model is instantiated or substantially instantiated, client UI 501 indicates to the user and allows the user to begin capturing scene data (see 2B07 of FIG. 2B), such as pictures or video of the user's car hood with damage. As the new scene data such as images are captured, the captured data is preferably compressed and transmitted using an appropriate traditional codec, such as a video codec for image data. The compressed new scene data is transmitted to the server-side system 1A01 where a operation 505 decompresses and then at least in part uses the new scene data to reconstruct or refine the global SOI model, where reconstructing is more referencing an entirely new scene and refine is more referencing an existing scene (like a plenoptic scene model of the car that already existed but is now being updated). As the reconstructing operation 505 is creating new portions of the global scene model, the server-side system 1A01 operation 517 provides next subscene increments (of the new portions) from the global SOI model to be communicated to the client-side system 1A01. After receiving new subscene increments, operation 507 on the client-side inserts the next scene data (subscene increments) into the client SOI model. As a careful consideration will show, the client-side system 1A01 is capturing data while the server-side system 1A01 is doing all of the scene reconstruction, where scene reconstruction can be computationally intensive such that the server-side system 1A01 effectively offloads this computationally intensive task from the client system 1A01.

Still referring to FIG. 6, as the client SOI model is being built based upon the received subscene increments provided from the global SOI model (reconstructed based upon client sensor data), the client system 1A01 is then able to provide scene model information to the user through UI 501 all in accordance with the prior descriptions related to provide requested SOT data operation 509 and process client requests 513. Also, as prior discussed, client system 1A01 preferably tracks user indications and usage in an operation 513a for logging with the global SOI database 1A07 through operation 515.

Referring next to FIG. 7, there is shown a flow diagram of some example embodiments built upon FIG. 5 and FIG. 6, but now addressing a variant case where the client is first creating a scene model, or updating an existing scene model, and then capturing local scene data of the real-scene, where both the client-side system 1A01 and the server-side system 1A01 are each capable of reconstructing the real-scene and providing scene increments, as opposed to FIG. 6 where the real-scene was reconstructed into a scene model only on the server-side system 1A01. With respect to FIG. 5, operations 507, 509, 511, 513 (comprising 513a, 513b, 513c and 513d), 515 and 517 remain substantially as described in FIG. 5 and therefore will be given minimal additional discussion with respect to the present FIG. 7. With respect to the descriptions of FIG. 6, operation 501 (comprising 501a, 501b and sensors 1E09, 1E11), as well as operation 503 remain substantially as described in FIG. 6 and therefore will be given minimal additional discussion with respect to the present FIG. 7. The exemplary use case of FIG. 7 is a user working with a mobile device such as an industrial tablet that is a system using scene codec 1A01 for creating (or updating) a scene model of a disaster relief site (where conceivably many users or autonomous vehicles (not depicted) are acting as clients 1A01 to substantially simultaneously capture scene sensory data). Many other use cases are applicable to each of the flow diagrams in FIGS. 5, 6 and 7 than the exemplary uses cases, such as modeling a disaster site with respect to FIG. 7. For example, the present FIG. 7 use case is equally applicable for a user capturing scene models of any shared scene such as workers in an industrial setting or commuters and pedestrians in a city setting.

Still referring to FIG. 7, like FIG. 6 the server-side system 1A07 receives compressed raw data as captured by or based at least in part upon the client-side system 1A07 which it then reconstructs into a global SOI model or refines an existing global SOI model in operation 505. The current use case also includes on the server-side system 1A07 a operation 517 for providing next subscene increments from the global SOI model to the client-side system 1A01 operation 507, where the operation 507 then uses the provided subscene increments to update a client SOI model for providing requested SOI data in operation 509 through UI 501 to a user. Unlike the use case of FIG. 6, client-side system 1A01 also comprises a operation 505 for reconstructing the client SOI model and then also a operation 517 for providing subscene increments to the server-side system 1A01, where the server-side system 1A01 then also comprises an insert operation 507 for reconstructing or refining the global SOI model. Both the client and server-side systems include an operation 511 for confirming any received and processed scene data. It is important to note that preferably under the direction of application software 1A01 running on any of server-side systems 1A01 and client-side systems 1A01, and preferably in shared communication, at any given time, for any given real-scene data captured by or under the command of any one or more client systems 1A01, either or both a server-side or a client-side system 1A01 may be directed by the respective application software 1A01 to reconstruct any of real-scene data and then also to share the reconstructed scene data as a scene increment with any of other systems 1A01, or to not reconstruct any of the real-scene data and then also to receive and process any of the scene increments reconstructed by any of other systems 1A01.

The value of this arrangement of operations becomes even more apparent in the larger use cases that have a multiplicity of client-side systems 1A01 and even a multiplicity of server-side systems 1A01, where those familiar with computer networks and servers will understand that the application software 1A01 communicating across the multiplicity of systems 1A01 is performing scene reconstruction and distribution load balancing. Some of the clients may be users with mobile devices 1A01 while others are autonomous land or air-based systems 1A01. Each of these different types of clients 1A01 is expected to have differing computational and data transmission capacities. Each of these individual clients 1A01 are also expected to have a range of possibly different real-scene sensors 1E09 and needs for plenoptic scene data. The load balancing determinations of software 1A01 at least in part consider any one of, or any combination of, the entire multiplicity of sensor 1E09 data being collected, the priorities for scene reconstruction, availability of computational capacities across all server-side and client-side systems 1A01, data transmission capacities across network 1E01 (see FIG. 1E) between the various systems 1A01 as well as the expected and on-demand requests for scene data by each of the systems. Like the use cases of FIGS. 5 and 6, the use cases of FIG. 7 preferably also capture indications and scene data usage across the multiplicity of client-side systems 1A01, and logs these indications and usage data in any of the appropriate scene databases 1A07 across the multiplicity of systems 1A01, where a machine learning (or deterministic) component of example embodiments is then able to access this logged scene usage for optimizing load balancing, among other benefits and uses already prior described. It is also expected that server-side scene reconstruction metrics such as, but not limited to, fluctuations in received raw data types and amounts as well as scene reconstruction processing times are additionally logged along with client-side usage, where this additional server-side logging is then also used at least in part by the machine learning (or deterministic) component for determining or providing for load balancing needs.

Scene Database

Figure 8:
FIG. 8 is a synthetically generated image of a complex plenoptic scene model, a quotidian kitchen.

FIG. 8 shows a kitchen scene with key attributes associated with quotidian (everyday) scenes: transmissive media (e.g., glass pitcher and window glass), highly reflective surfaces (e.g., metal pots), finely structured objects (e.g., right-hand potted plant and outdoor tree), featureless surfaces (e.g., cabinet doors and dishwasher door), and effectively boundless volumetric extent (e.g., outdoor space seen through window). The scene in FIG. 8 is an example scene that could be stored in a scene database 1A07 for a system using scene codec 1A01 to process in various use cases. One key aspect of such processing is the subdivision of space both volumetrically and directionally (angularly) into addressable containers that serve to contain elements of a scene's plenoptic field.

Figure 9:
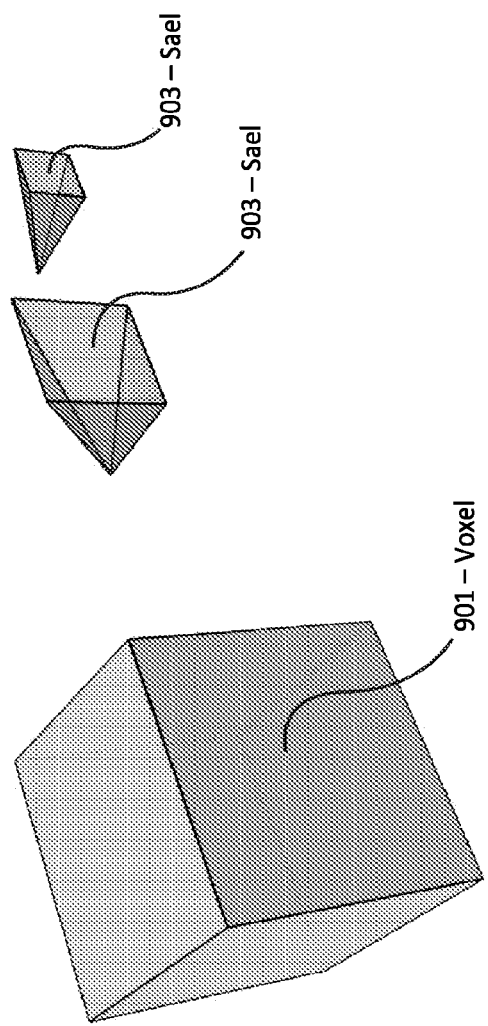
FIG. 9 is a geometric diagram showing a volume element ("voxel") and two views of a solid-angle element ("sael"), according to some embodiments.

FIG. 9 shows example representations of volumetric and directional spatial containers. Voxel 901 is a container delimiting a volumetric region of scene space. Solid-angle element 903, known by the shorthand name "sael", delimits an angular region of space originating at the sael's apex. (Sael 903 is shown from two different viewpoints to help convey its 3D shape.) Although sael 903 is shown as a pyramid of finite extent, a sael may extend infinitely far outward from its origin. Containers used in an embodiment may or may not have the exact shapes shown in FIG. 9. Non-cubical voxels, or saels without a square cross section, for example, are not excluded from use. Further detail on efficient hierarchical arrangements of voxels and saels is gives below with reference to FIGS. 21-65.

Figure 10:
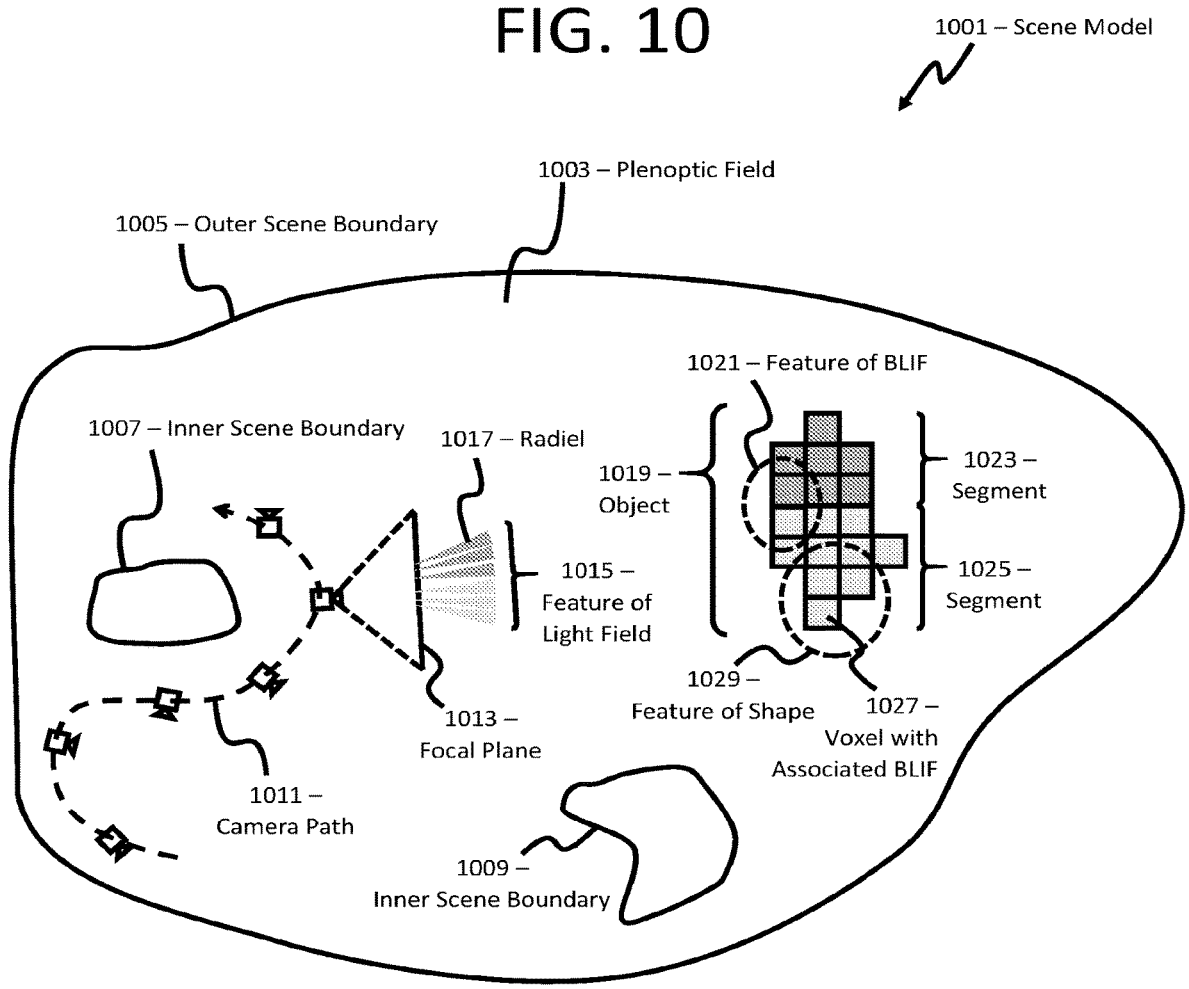
FIG. 10 is a geometric diagram showing an overhead plan view of a scene model of a quotidian scene, according to some embodiments.

FIG. 10 shows an overhead plan view of an example scene model 1001 of a quotidian scene in an example embodiment different from the embodiment described with reference to FIG. 4B above. The embodiment described here is focused more narrowly on aspects related to subscene extraction and insertion, as opposed to the FIG. 4B embodiment's broader focus on overall codec operation. A plenoptic field 1003 is enclosed by an outer scene boundary 1005. Plenoptic field 1003 contains plenoptic primitive entities ("plenoptic primitives", or simply "primitives") representing the matter field and light field of the modeled scene. Plenoptic field 1003 is volumetrically indexed by one or more generally hierarchical arrangements of voxels and is directionally indexed by one or more generally hierarchical arrangements of saels. Matter in the plenoptic field is represented as one or more media elements ("mediels"), such as 1027, each contained in a voxel. A voxel may also be empty, in which case the voxel is said to be "void" or "of type void". Voxels outside the outer scene boundary are of type void. Although these void voxels, by definition, contain no plenoptic primitives, they may point be associated with (point to) entities other than plenoptic primitives. Light in the plenoptic field is represented as one or more radiometric elements ("radiels"), such as 1017, each contained in a sael located at a (e.g., voxel containing a) mediel.

The light field at a mediel (including those that represent only negligible light interaction) includes these four component light fields: incident, responsive, emissive, and fenestral. The incident light field represents light transported from other mediels, including those immediately adjacent to the mediel in question. The responsive light field represents light exitant from the mediel in response to its interaction with incident light. The emissive light field represents light exitant from the mediel due to some physical process other than interaction with incident light (e.g., conversion from another form of energy, as in a light bulb). The fenestral light field represents light injected into the mediel due to unspecified processes external to the plenoptic field. An example of this is a fenestral light field, representing sunlight, that is injected at the outer scene boundary of the plenoptic field when the plenoptic field does not extend sufficiently far to volumetrically represent the Sun itself as an emissive source. It is important to note that a fenestral light field, in some embodiments, may be composed of multiple fenestral light sub-fields, thought of as "fenestral layers", that represent, e.g., the light from the Sun in one layer and the light from the Moon in another layer. A mediel interacts with the injected fenestral light field in the same way it interacts with the incident light field. In the following discussion regarding BLIFs, statements regarding incident light field apply equivalently to the fenestral light field. (The responsive light field is determined by both the incident light field and the fenestral light field.)

In plenoptic field 1003, mediel 1027 has an associated BLIF, as do all mediels. A BLIF represents the relationship between characteristics of interest of incident and responsive radiels in a quasi steady state light field, such characteristics typically including radiometric and/or spectral and/or polarimetric information. In the context of certain example embodiments, a BLIF is useful because it pragmatically represents light's interaction with matter without resorting to computationally intensive modeling of such interactions at the molecular/atomic level. In a highly generalized BLIF representation, the responsive-to-incident ratio in characteristics of interest may be stored in sampled/tabular form at appropriately fine sael granularity. When practical, an embodiment may use one or more compressed BLIF representations. One such representation is a low-dimensional model yielding responsive radiance as an analytic function of incident irradiance, parameterized over the incident and exitant directions, spectral band, and polarization state of the incident and responsive light. Examples of such low-dimensional model include conventional analytic BRDFs, e.g. the Blinn-Phong and Torrance-Sparrow microfacet reflectance models. Such compression of BLIF information is well understood by practitioners of the art and would be used to compress and decompress BLIF data in some embodiments of the present invention. An embodiment may allow the representation of spatially (volumetrically) varying BLIFs, in which one or more BLIF parameters varies over the extent of a volumetric scene region.

Outer scene boundary 1005 is the closed, piecewise continuous two-dimensional manifold separating mediels in the plenoptic field from the void voxels that lie outside the plenoptic field. Void voxels also lie inside inner boundaries 1007 and 1009. Scene model 1001 does not represent light transport outside the outer scene boundary nor inside the inner boundaries. A mediel lying adjacent to a void voxel is known as a "boundary mediel". The light field of a boundary mediel may include, in addition to an incident light field transported from other mediels in the plenoptic field, a fenestral light field representing light injected into the plenoptic field due to unspecified phenomena external to the plenoptic field. The fenestral light field at one or more boundary voxels in a scene may generally be thought of as a four-dimensional light field that is volumetrically located on the piecewise continuous manifold defined by the boundary.

One example of an outer scene boundary is the sky in an outdoor quotidian scene. In the plenoptic field of the scene model, mediels of air exist out to some reasonable distance (e.g., the parallax resolution limit), beyond which void voxels exist. The light of a sunny sky or the moon, for example, is represented in the fenestral light field of air mediels at the outer scene boundary. Likewise, light due to unspecified phenomena inside an inner scene boundary is represented in the fenestral light field of the mediels bordering the inner scene boundary. An example of an inner scene boundary is the boundary around a volumetric region for which full reconstruction has not taken place. The 4D fenestral light field of the adjacent boundary mediels contains all (currently) available light field information about the bounded void region. This can change if subsequent reconstruction operations succeed in discovering a model of the matter field, lying within the previously void region that now explains the previously fenestral light field as incident light transported from newly discovered (resolved) mediels.

In addition to plenoptic field 1003, scene model 1001 includes other entities. Mediel 1027 and other nearby non-air mediels are referenced in various groupings useful in display, manipulation, reconstruction, and other potential operations performed by a system using scene codec 1A01. One grouping is known as a feature, in which plenoptic primitives are grouped together by some pattern in their characteristics of interest, possibly including spatial pose. 1029 is a feature of shape, meaning that the feature's constituent mediels are grouped by virtue of their spatial arrangement. In an embodiment, a system using scene codec 1A01 might consider feature 1027 to be a prominence or bump for some purpose. 1021 is a feature of BLIF, meaning that the feature's constituent mediels are grouped based on the pattern of their associated BLIFs. A system using scene codec 1A01 might consider feature 1021 to be a contrast boundary, color boundary, boundary between materials, and so on.

A plenoptic segment is a subtype of feature defined by similarity (rather than an arbitrary pattern) in some set of characteristics. Segments 1023 and 1025 are matter field segments that are, in this case, defined by uniformity (to within some tolerance) in the BLIF of each segment's mediels. An object, such as 1019, is a feature subtype of the matter field defined by its recognition by one or more humans as an "object" in natural language and cognition. Example objects include a kitchen table, a glass window, and a tree.

Camera path 1011 is a feature subtype representing the 6-DOF path traced by a camera observing plenoptic field 1003. Aspects of potentially useful embodiments of a camera path include kinematic modeling and spherical linear interpolation (slerp). At locations along camera path 1011, focal planes such as 1013 exist at camera viewpoints where the light field is recorded. The collection of radiels incident on a focal plane is typically referred to as an image. Example embodiments do not limit camera representations to have planar arrays of pixels (light-sensing elements). Other arrangements of pixels are representable as well. Focal plane 1013 records light exiting object 1019. Features can be defined on the matter field, light field, or a combination of the two. Item 1015 is an example feature of the light field, in this case comprising radiels at focal plane 1013. The pattern of radiels in this case defines the feature. In conventional image processing terms, a system using scene codec could consider 1015 to be a feature detected as a 2D pattern in image pixels.

Figure 11:
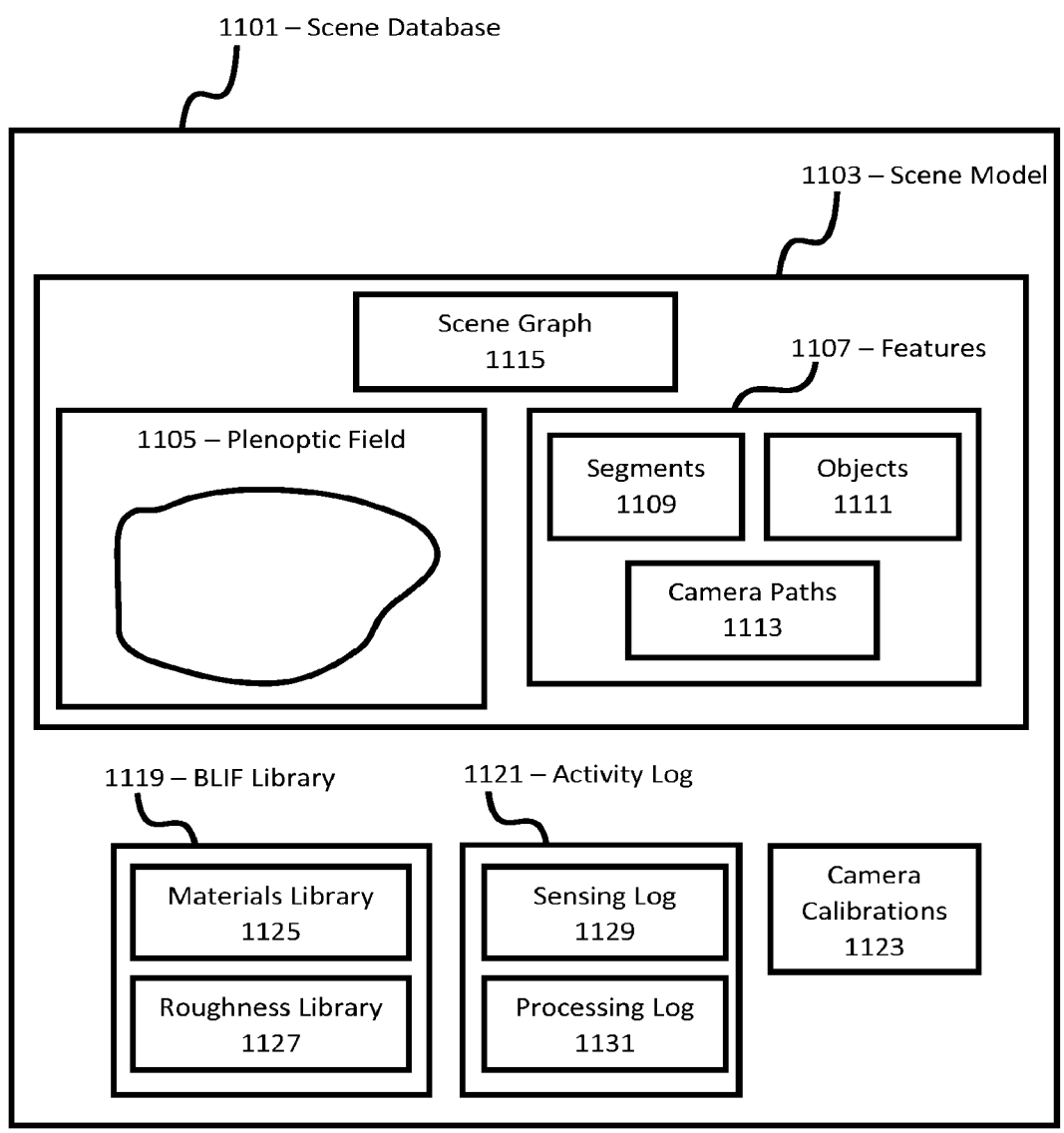
FIG. 11 is a block diagram of a scene database, according to some embodiments.

FIG. 11 shows a block diagram of a scene database in an embodiment different from the embodiment described with reference to FIG. 4C above. The embodiment described here is focused more narrowly on aspects related to subscene extraction and insertion, as opposed to the FIG. 4C embodiment's broader focus on overall codec operation. Scene database 1101 includes one or more scene models, BLIF libraries, activity logs, and camera calibrations, among other entities not shown. Scene model 1103 includes one or more plenoptic fields, such as 1105, and sets of features, such as 1107, potentially including features of type segment (such as 1109), object (such as 1111), and camera path (such as 1113). In addition, one or more scene graphs, such as 1115, point to entities in the plenoptic field. A scene graph may also point to analytic entities not currently manifested in a plenoptic field. A scene graph is arranged into a hierarchy of nodes defining the relationships, spatial and otherwise, between the referenced entities. Multiple plenoptic fields and/or scene graphs typically exist together in a certain single scene model if the system using scene codec expects to register them into a common spatio-temporal frame of reference at some appropriate point in time. If this expectation is absent, then the multiple plenoptic fields and/or scene graphs would typically exist in separate scene models.

BLIF library 1119 holds BLIF models (representations). As discussed above, a scene database may store a BLIF in a variety of forms, from spectro-polarimetric exitant-to-incident ratios, to efficient low-dimensional parametric models. BLIF library 1119 includes a materials sub-library 1125 representing the light interaction characteristics and other characteristics of media that can exist in a matter field. Examples of entries in materials library 1125 include dielectric, metal, wood, stone, fog, air, water, and the near-vacuum of outer space. BLIF library 1119 also includes a roughness sub-library 1127 representing roughness characteristics of media. Examples of entries in roughness library 1127 include various surface microfacet distributions, grit categories of sandpaper, and distributions of impurities in volumetric scattering media. A mediel in a plenoptic field may refer to a BLIF library entry, or it may have a BLIF defined "locally" that is not included in any BLIF library.

Activity log 1121 holds a log 1129 of sensing (including imaging) activity, a log 1131 of processing activity (including activity related to encoding, decoding, and reconstruction), and other relevant activity/events. Camera calibrations 1123 holds compensation parameters and other data related to calibration of cameras used in imaging, display, or other analysis operations on a scene model.

Figure 12:
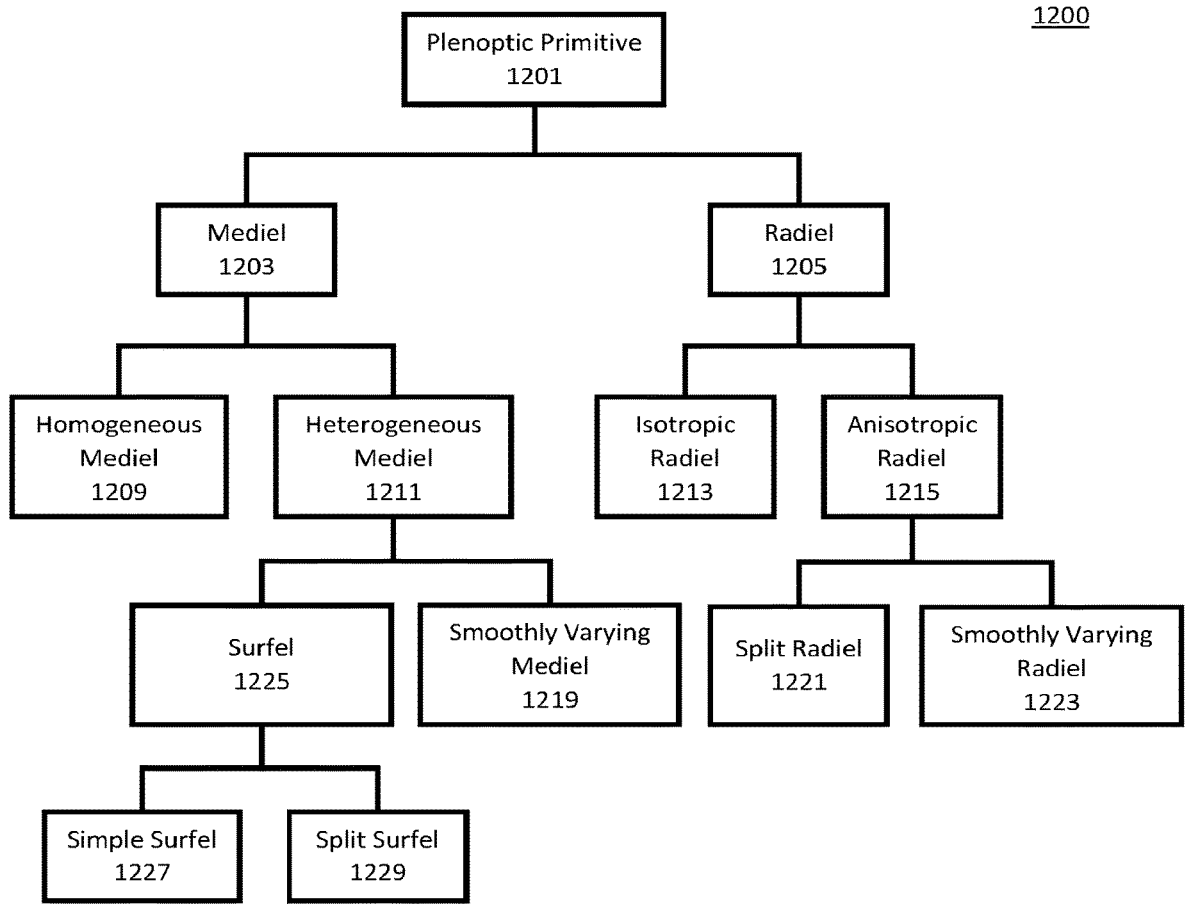
FIG. 12 is a class diagram showing a hierarchy of primitive types used in representing a plenoptic field, according to some embodiments.

FIG. 12 shows a class diagram 1200 of the hierarchy of types of primitive entity found in a plenoptic field. The root plenoptic primitive 1201 has subtypes mediel 1203 and radiel 1205. Mediel 1203 represents media in the matter field resolved to be contained by a particular voxel. Homogeneous mediel 1209 is a mediel whose media is uniform throughout its voxel in one or more characteristics of interest to within some tolerance. Examples of homogeneous mediel 1211 include appropriately uniform solid glass, air, water, and fog. Heterogeneous mediel 1211 is a mediel without such uniformity in the characteristics of interest.

Surfel 1225 is a heterogeneous mediel with a two distinct regions of different media separated by a piecewise continuous two-dimensional manifold. The manifold has an average spatial orientation represented by a normal vector and has a spatial offset represented, in an example embodiment, by the closest point of approach between the manifold and the volumetric center of the voxel containing the surfel. Subtypes of surfel 1225 include simple surfel 1227 and split surfel 1229. Simple surfel 1227 is just as described for its supertype surfel 1225. Examples of simple surfel 1227 include the surface a wall, the surface of a glass sculpture, and the surface of calm water. For split surfel 1229, on one side of the intra-mediel surfel boundary, the mediel is additionally divided into two sub-regions separated by another piecewise continuous two-dimensional manifold. An example of split surfel 1229 is the region of a chessboard surface where a black square and a white square meet.

Smoothly varying mediel 1211 represents media for which one or more characteristics of interest vary smoothly over the volumetric range of the mediel. A spatially varying BLIF would typically be employed to represent the smooth variation in light interaction characteristics throughout the volume of a smoothly varying mediel 1211. Examples of smoothly varying mediel 1219 include surface painted in a smooth color gradient and a region where a thin layer of fog at ground level gives way to clearer air above it.

Radiel 1205 represents light in a scene's light field resolved to be contained by a particular sael. Radiel 1205 has subtypes isotropic radiel 1213 and anisotropic radiel 1215. Isotropic radiel 1213 represents light that is uniform in one or more characteristics of interest, such as radiometric or spectral or polarimetric, over the directional range of the radiel. Anisotropic radiel 1215 represents light without such uniformity in the characteristics of interest. Split radiel 1221 is an anisotropic radiel with two distinct regions of different light content separated by a piecewise continuous one-dimensional manifold (curve). An example of split radiel 1221 is a radiel including the edge of a highly collimated light beam. Smoothly varying radiel 1223 represents light that varies smoothly in one or more characteristics of interest over the directional range of the radiel. An example of smoothly varying radiel 1223 is light from a pixel of a laptop screen that exhibits a radiance falloff as the exitant angle shifts away from perpendicular.

Figure 13:
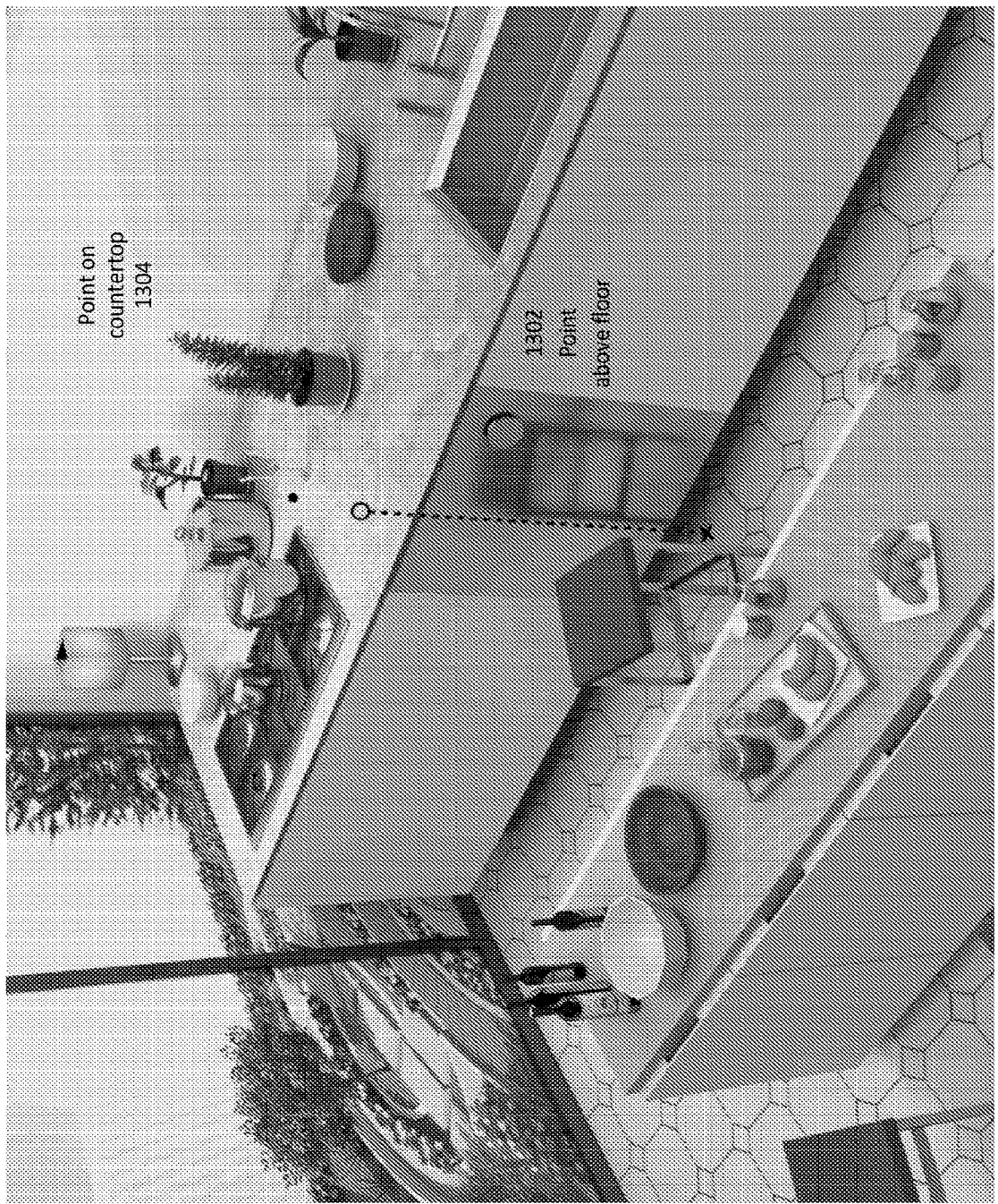
FIG. 13 is a synthetically generated image of a complex plenoptic scene model, a quotidian kitchen with two points highlighted.

The image shown in FIG. 13 is a rendering of a computerized model of a quotidian scene, a real-world kitchen. Two 3D points in the kitchen scene are indicated in FIG. 13 for use in the figures and discussion that follows. Point 1302 is a typical point in the open space of the kitchen (to make its location clear, a vertical dotted line to the floor is shown). Point 1304 is a point on the surface of the marble counter.

The example embodiments described herein are capable of realistically representing scenes such as that shown in FIG. 13. This is the case because the techniques according to example embodiments model not only the matter field of the scene but also the light field plus the interaction between the two. Light entering or leaving a volumetric region of space is represented by one or more radiels incident to or exitant from a specified point in the region that represents the space. The set of radiels is thus called a "point" light field or PLF. The incident and exitant light of a PLF is represented by one or more radiels that intersect specified regions on a "surrounding" cube centered on the representative point.

Figure 14:
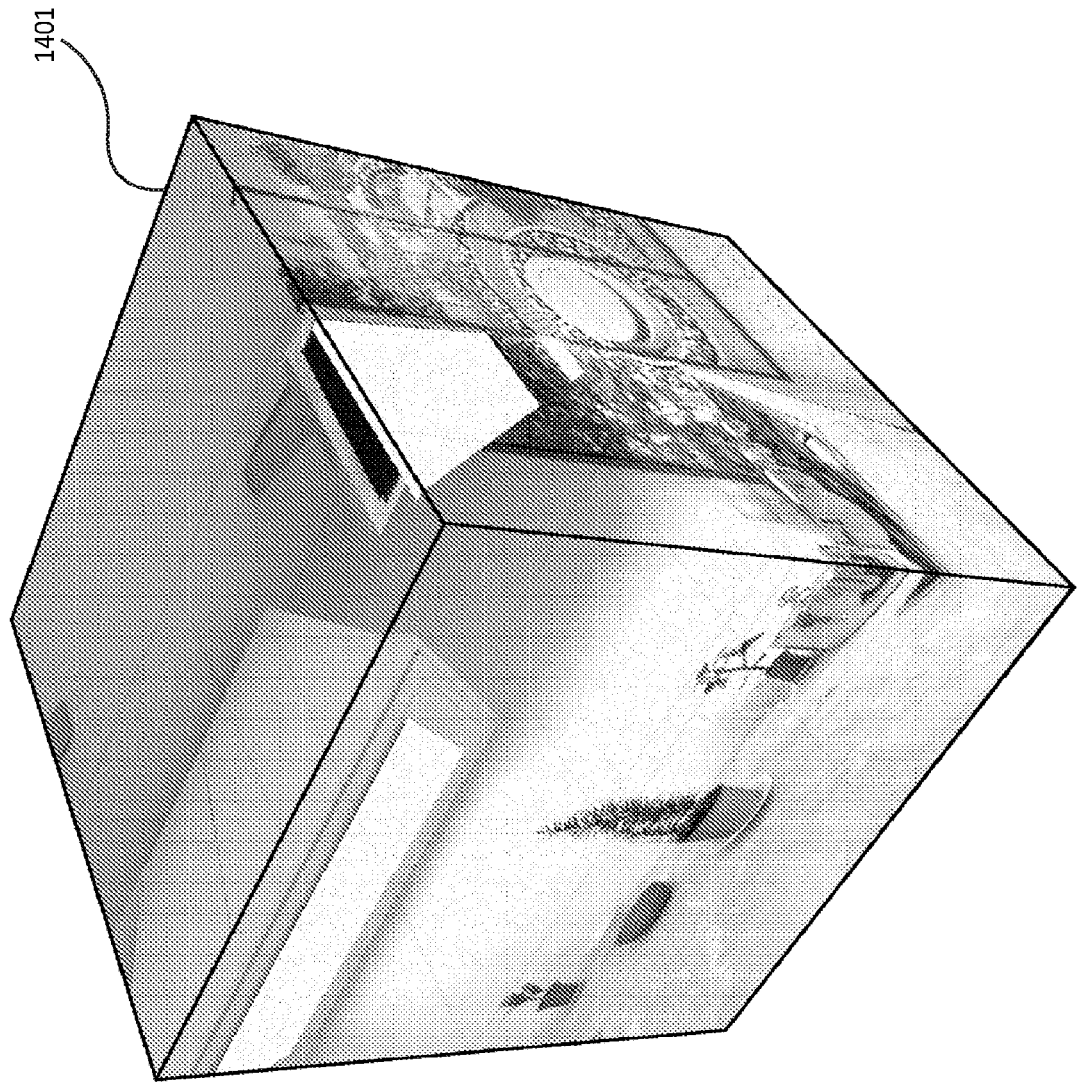
FIG. 14 contains an image from the outside showing a light cube of incident light entering a point in open space in the kitchen shown in FIG. 13, according to some embodiments.
Figure 15:
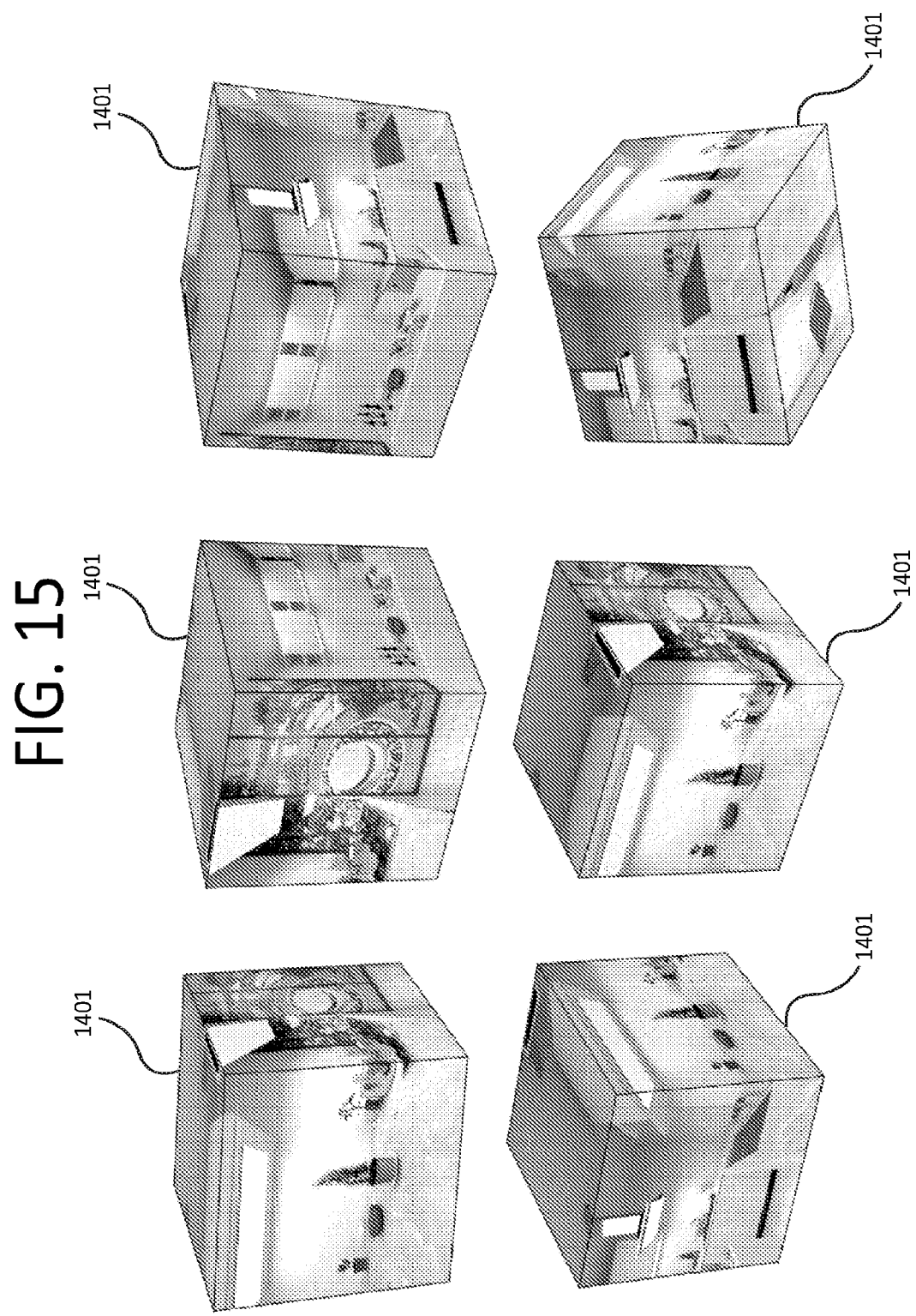
FIG. 15 contains six additional views of the light cube shown in FIG. 14, according to some embodiments.
Figure 16:
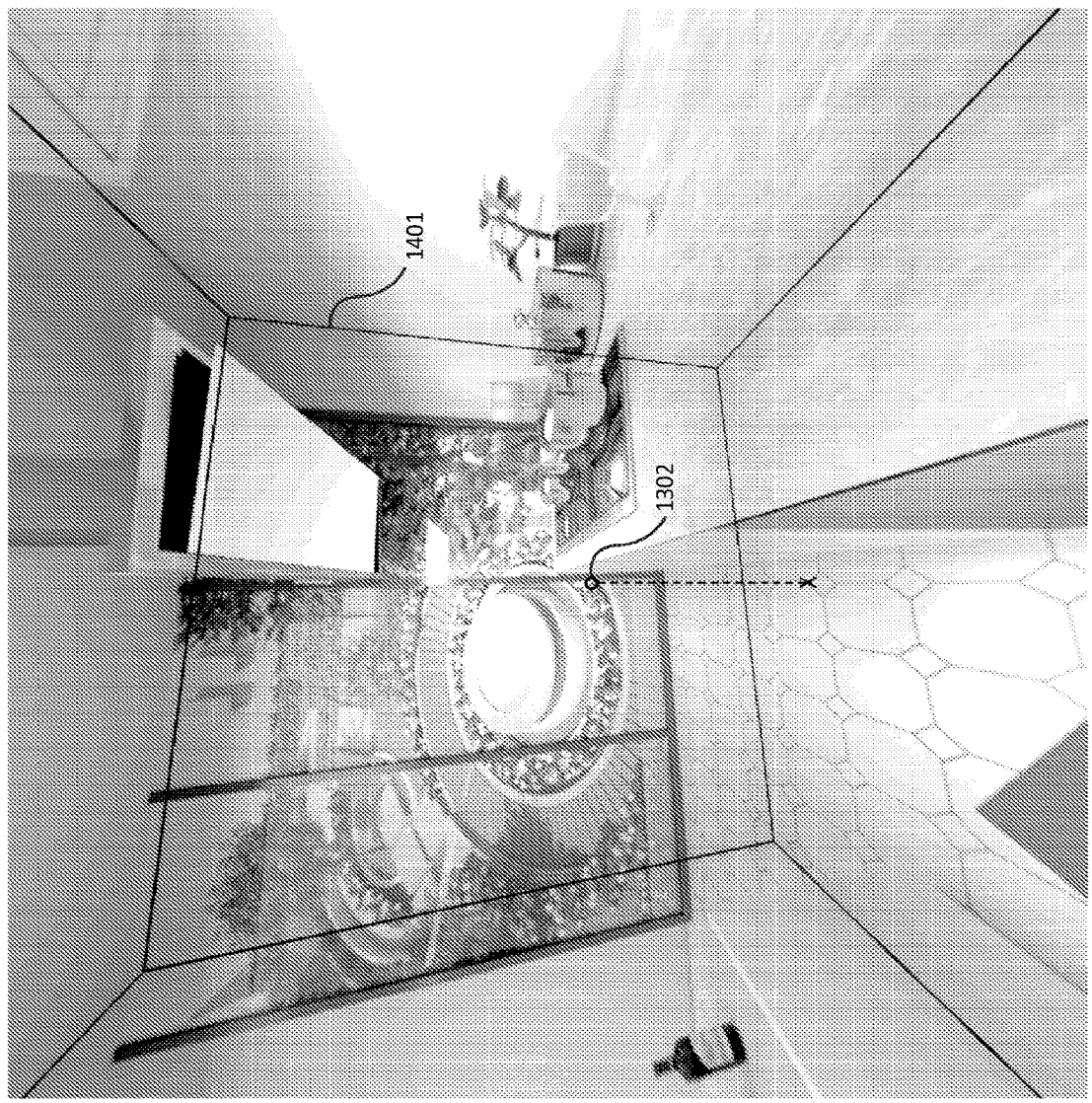
FIG. 16 is an image of the light cube shown in FIG. 14 from an interior viewpoint, according to some embodiments.
Figure 17:
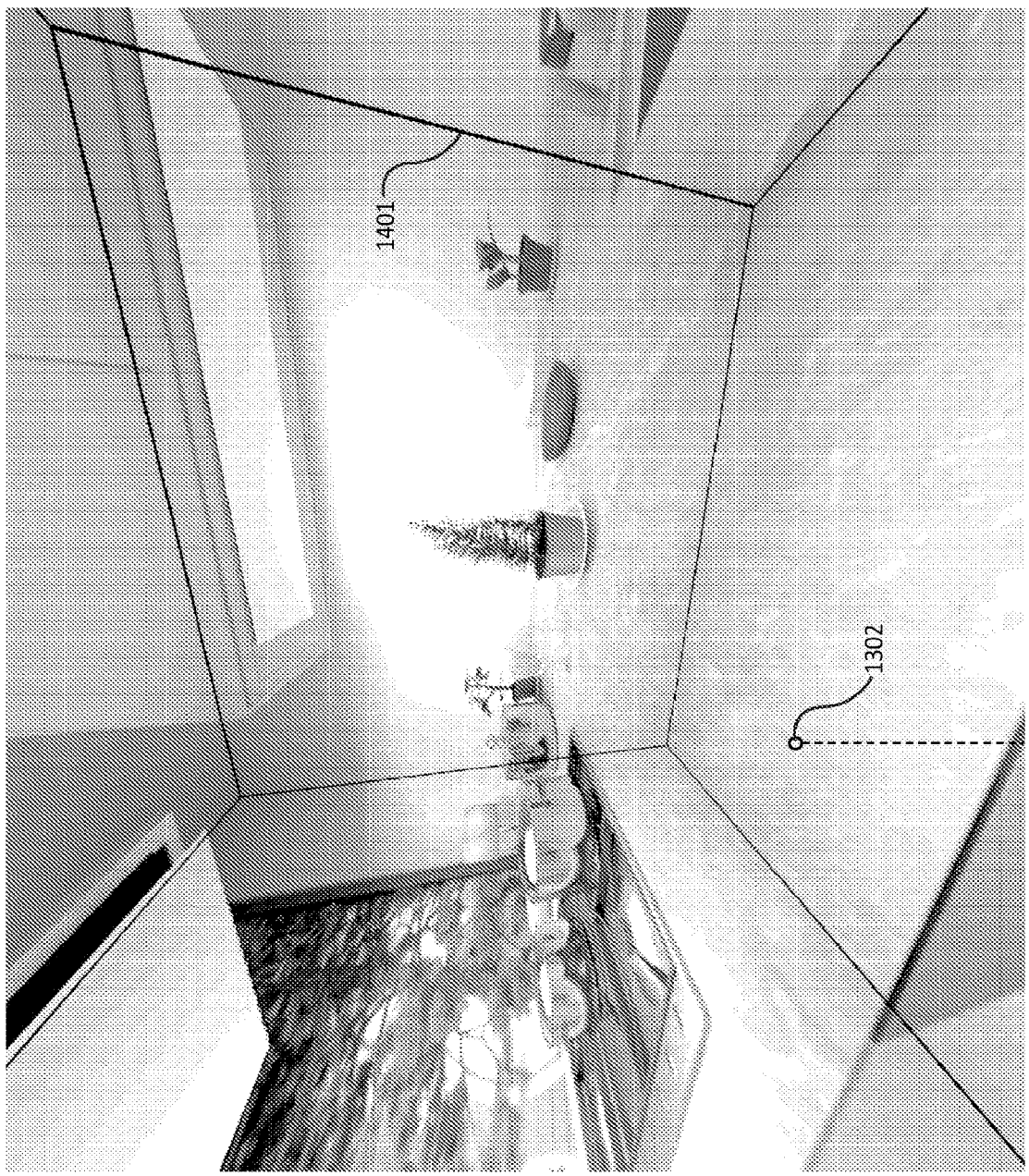
FIG. 17 is an image of the light cube shown in FIG. 14 from an interior viewpoint, according to some embodiments.
Figure 18:
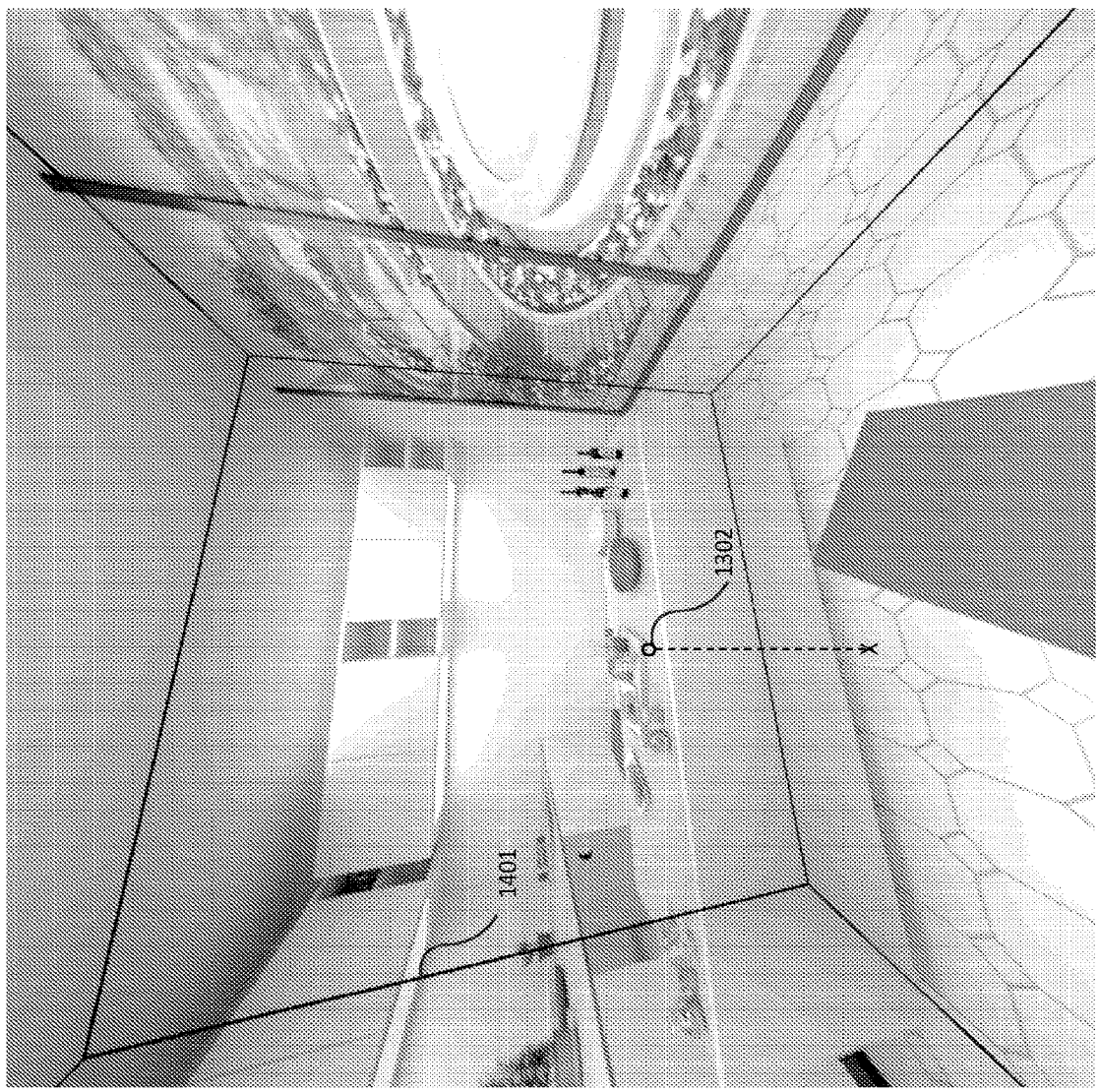
FIG. 18 is an image of the light cube shown in FIG. 14 from an interior viewpoint, according to some embodiments.

This can be visualized by displaying a cube that has the light passing through the cube faces, on their way to or from the center point, displayed on the faces. Such a "light cube" is 1401 in the image of FIG. 14. It is centered on point 1302 in FIG. 13. This light cube shows the incident light entering point 1302. Thus, the light intensity shown at a point or region on the surface of the cube is the light from items and light sources in the kitchen (or beyond) that passes through that point or region that also intersects the center of the cube, point 1302. FIG. 15 shows six additional external views of the light cube 1401. A light cube can also be viewed from inside the cube. The images in FIGS. 16, 17 and 18 show a variety of views from the interior of light cube 1401.

Figure 19:
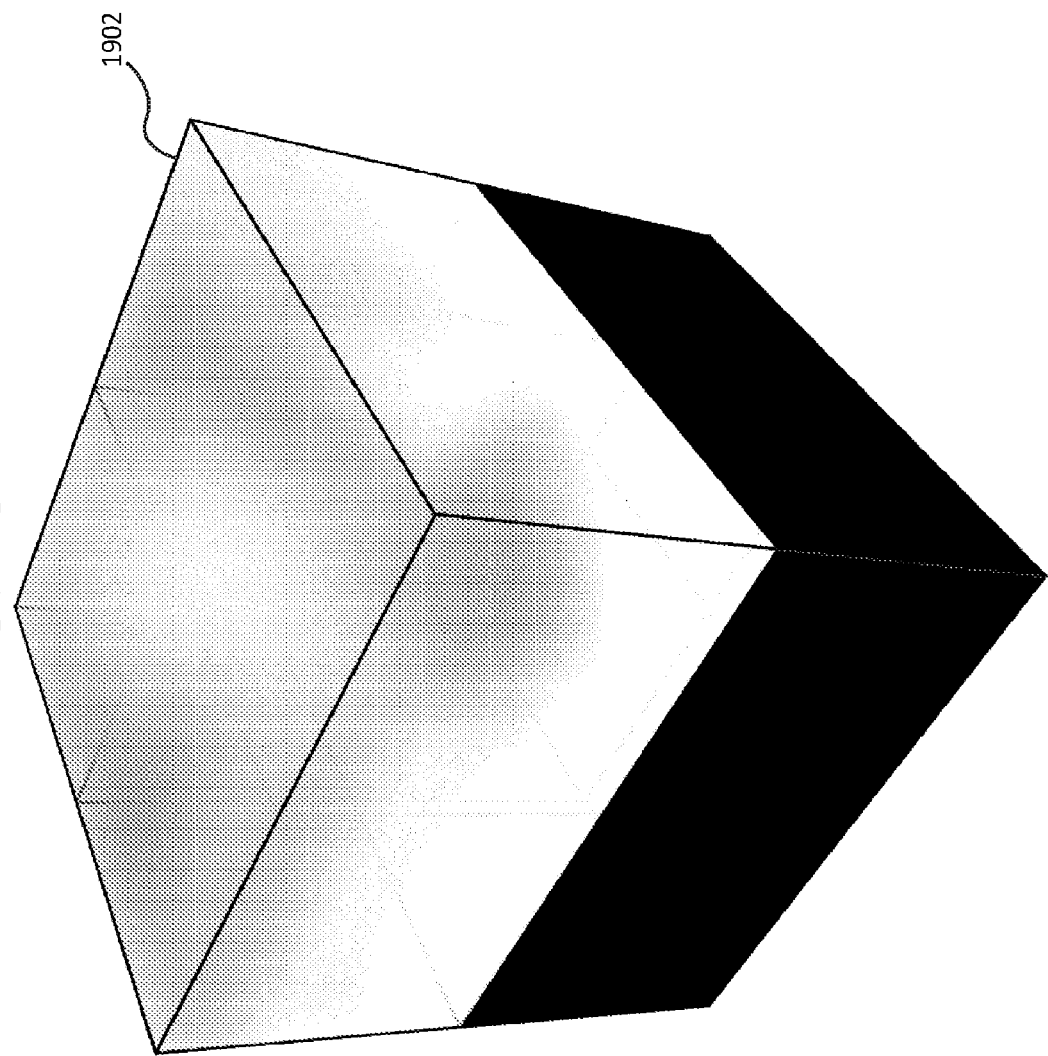
FIG. 19 is an image of the exterior of a light cube for the exitant light from a point on the surface of the kitchen counter indicated in FIG. 13, according to some embodiments.

Light cubes can also be used to visualize the light emerging from a point, an exitant PLF. Such a light cube is 1902 shown in FIG. 19 for point 1304, a point on the marble counter in the kitchen as shown in image 13. The surface of the cube shows the light emerging from the point that intersects the face of the cube or a region on the cube face. This would be like looking at a single point through a straw from all directions located on a sphere around it. Note that the surface of the bottom half of the light cube is black. This is because the center of the PLF is on the surface of an opaque material (marble in this case). No light leaves the point in the direction of the interior of the counter and those directions are thus black in the light cube.

Figure 20:
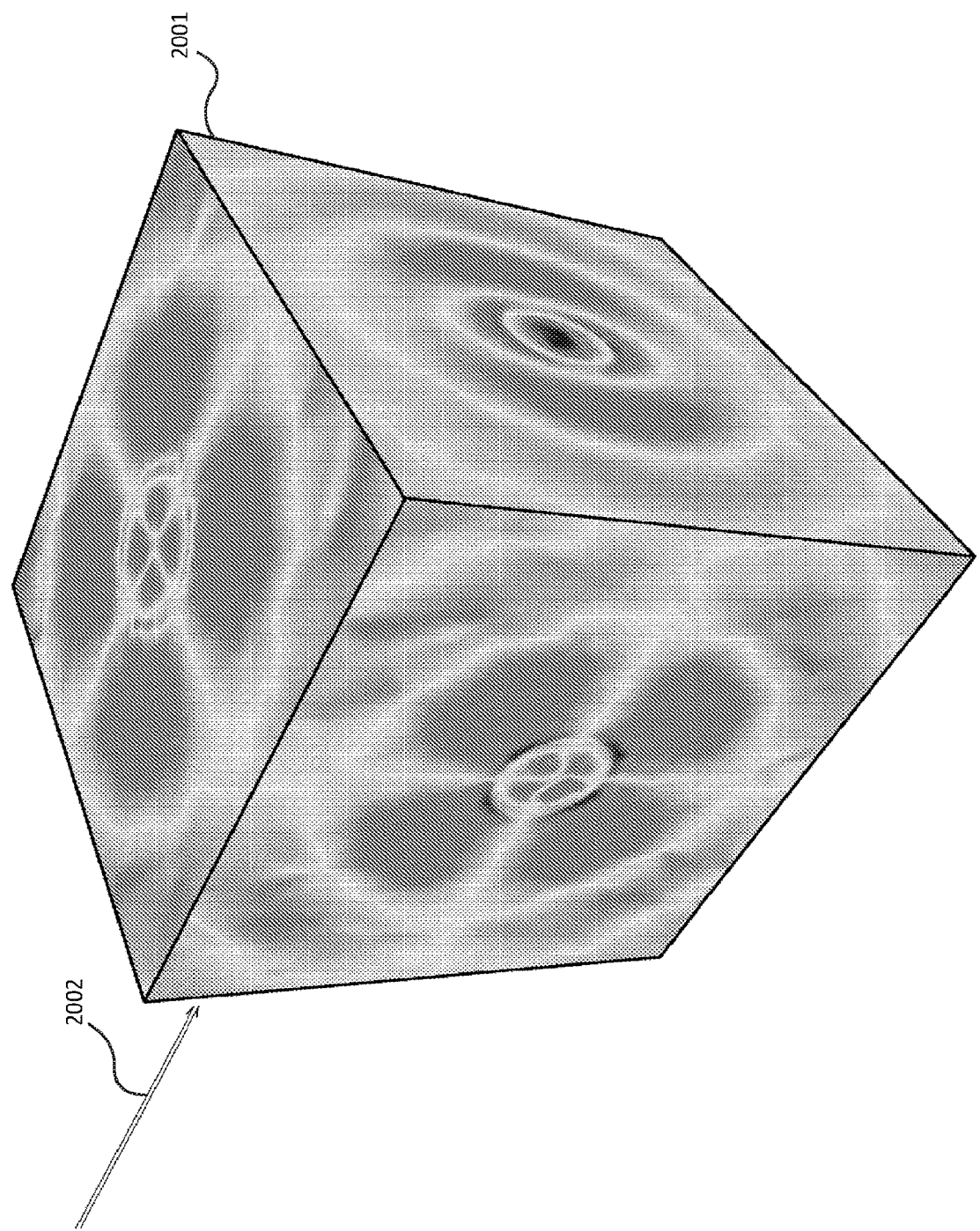
FIG. 20 is an image of a light cube that shows the result of a BLIF applied to a single incident beam of vertically polarized light, according to some embodiments.

A light cube can also be used to visualize other phenomena. The image in FIG. 20 shows light cube 2001. It shows the role of a BLIF function in generating an exitant PLF based on an incident PLF. In this case the incident light is a single beam of vertically-polarized light in incident light element (radiel) 2002. The exitant light resulting from this single light beam is shown on the faces of light cube 2001. Based on the details of the BLIF being used, the complex patterns of exitant light emerge, as shown with light cube 2001.

Figure 21:
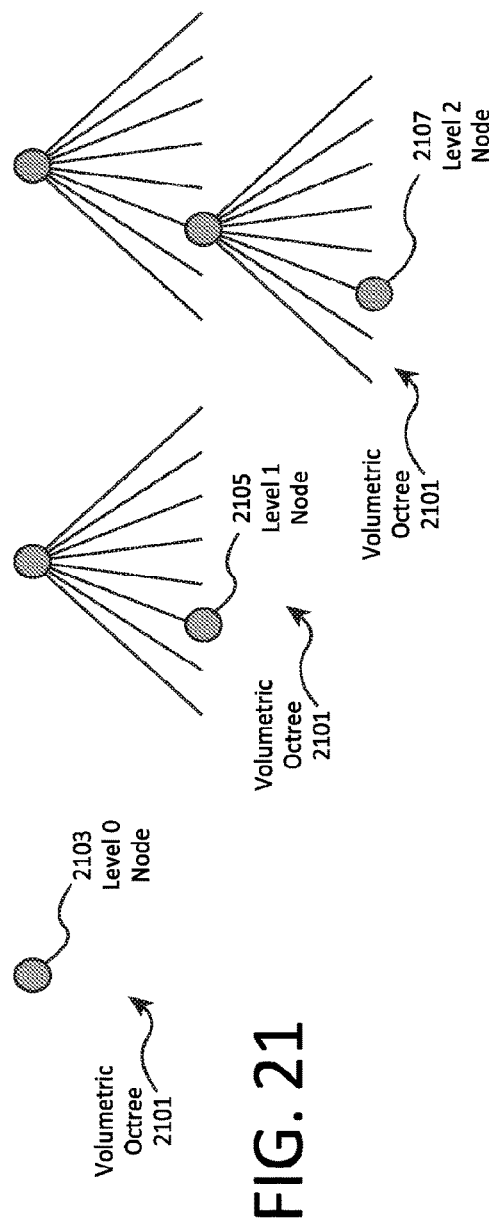
FIG. 21 is diagram showing the tree structure of an octree, according to some embodiments.
Figure 22:
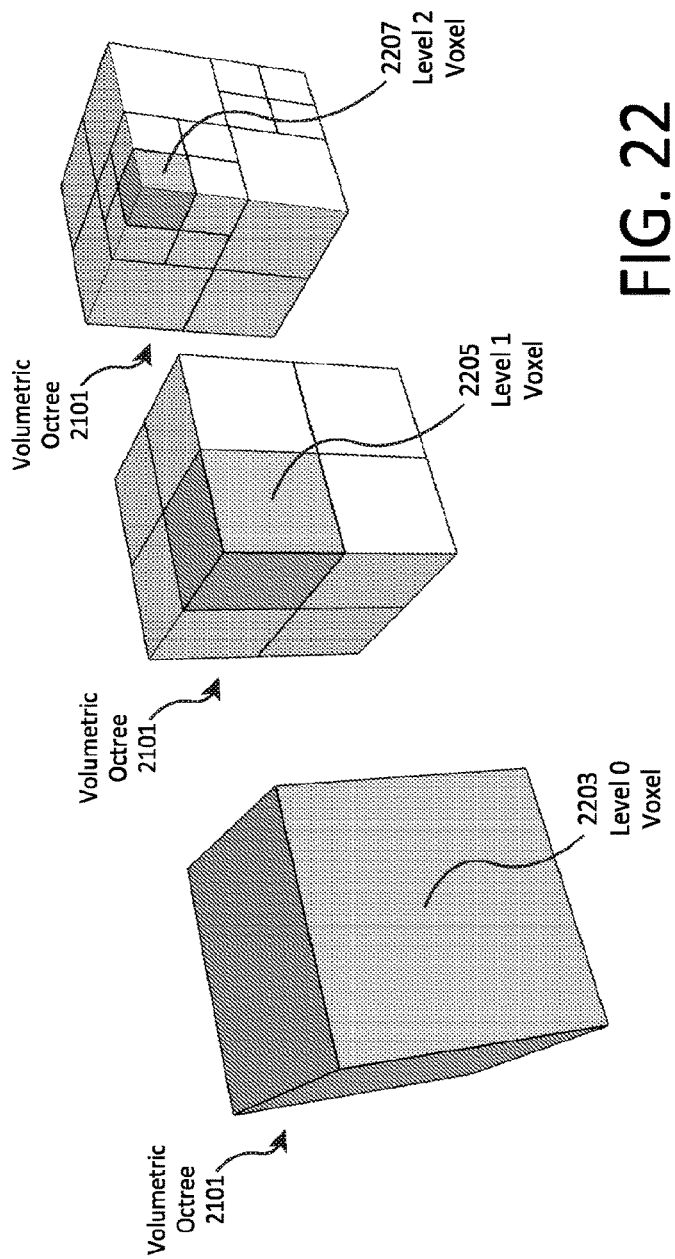
FIG. 22 is a geometric diagram showing the volumetric space represented by the nodes in the octree shown in FIG. 21, according to some embodiments.

Some example embodiments provide techniques for computing the transport of light in a modeled scene and its interaction with matter. These and other computations involving spatial information are performed in a Spatial Processing Unit or SPU. It makes use of plenoptic octrees which are composed of two types of data structures. The first is an octree. An example is volumetric octree 2101 as shown in FIGS. 21 and 22. An eight-way dividing hierarchical tree structure is used to represent cubical regions of space in a finite cubical universe. At the top of the tree structure is a root node 2103 at level 0 which exactly represents the universe 2203. The root node has eight child nodes such as node 2105 at level 1. It represents voxel 2205, one of the eight equally-sized disjoint cubes that exactly fill the universe. This process continues into the next level with the same method of subdividing space. For example, node 2107 at level 2 represents the cubical space 2207. The octree part of a plenoptic octree will be referred to as a "volumetric octree" or VLO.

The second data structure used in a plenoptic octree is a saeltree. A sael is a "solid-angle element" and is used to represent a region of direction space projecting from an "origin" point. This is typically used to as a container for radiels, light exitant from the origin point or incident light falling on to the origin point from the directions represented by the sael. The saeltree typically represents direction space for some region of volumetric space around the origin point (e.g. voxel).

The space represented by a sael is determined by a square area on the face of a cube. This cube is the "surrounding cube" and is centered on the saeltree's origin point. This cube can be of any size and does to enclose or limit the saeltree. It simply specifies the specific geometry of the saels in a saeltree, each of which extends from the origin out to an unlimited distance (but typically only used within the volume represented by the plenoptic octree. Similar to an octree, a saeltree is a hierarchical tree structure in which the nodes represent saels.

Figures 23, 24:
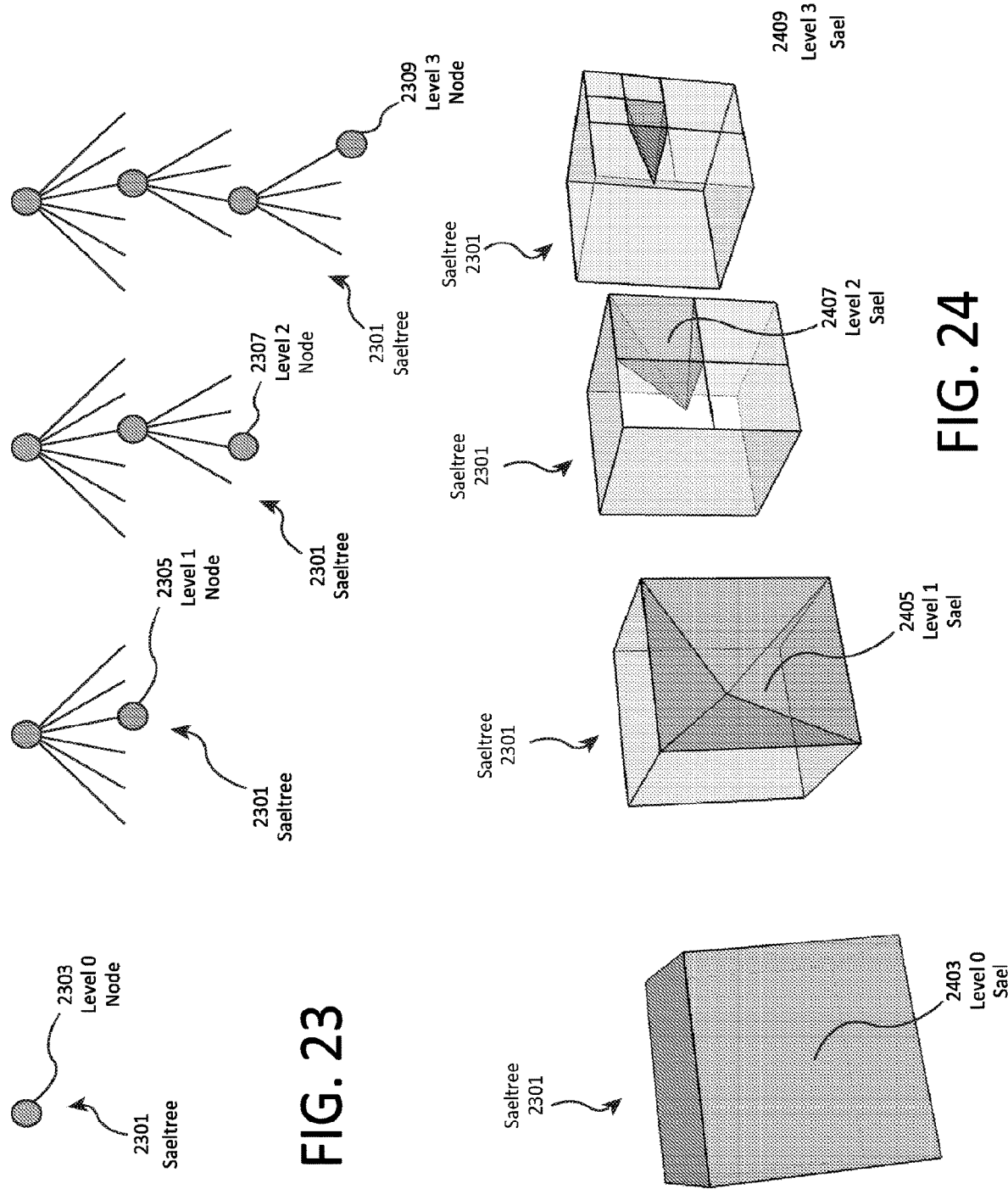
FIG. 23 is a diagram showing the tree structure of a saeltree, according to some embodiments.
FIG. 24 is a geometric diagram showing the regions of direction space represented by the nodes in the saeltree shown in FIG. 23, according to some embodiments.

Saeltree 2301 is illustrated in FIGS. 23 and 24. The root node 2303 is at level 0 and represents all directions emerging from its origin, a point at the center of surrounding cube 2403. While saels and saeltrees enclose an unlimited volumetric space extending out from the origin they are typically only defined and usable within the universe of its plenoptic octree which is normally the universe of its VLO. As can be noted in FIG. 23, the saeltree root node has six children while all nodes in the subtrees below have four children (or no children). Node 2305 is one of the six possible children of the root (only one shown). It is at level 1 and represents all the space projecting out from the origin that intersects face 2405 of the saeltree's surrounding cube. Note that when a saeltree's center is at the center of the universe, its defining faces will be the faces of the universe. When a saeltree is in a different location, its origin will be in another location within the plenoptic octree and its surrounding cube will move will be centered on the origin point. It will no longer be the universe. Since it only determines the direction of saels relative to the origin, it can be any cube of any size that has the origin as its center.

At the next level of subdivision, node 2307 is one of the four level 2 child nodes of node 2305 and represents face square 2407, which is one-quarter of the associated face of the universe. At level 3, node 2309 represents the direction space defined by face square 2409, one of the divisions of square 2407 into four equal squares (one sixteenth of the face 2405). The hierarchical nature of a saeltree is illustrated below in 2D in FIG. 41 for saeltree 4100 with its origin at point 4101. Node 4102 is a non-root node at level n in a saeltree (the root would have six child nodes). It represents the segment of direction space 4103. At the next level down, two of the four level n+1 nodes 4104 represent the two saels 4105 (the other two represent the other two 3D). At level n+2 nodes 4106 represent the four regions 4107 in 2D (16 in 3D). Saeltrees used in plenoptic octrees will be referred to as SLTs.

Note that, as with octrees, the subdivision of saels terminates (no subtree) if the properties in the subtree are sufficiently represented by the properties attached to the node. This is also the case if a sufficient level of resolution has been reached or for other reasons. Saeltrees, like octrees, can be represented in a plethora of ways. Nodes are typically connected with one-way links (parent to child) or two-way links (parent to and from child). In some cases, the subtree of an octree or saeltree can be used multiple times in the same tree structure (technically it becomes a graph structure in this case). Thus, storage can be saved by having multiple parent nodes pointing to the same subtree.

Figure 25:
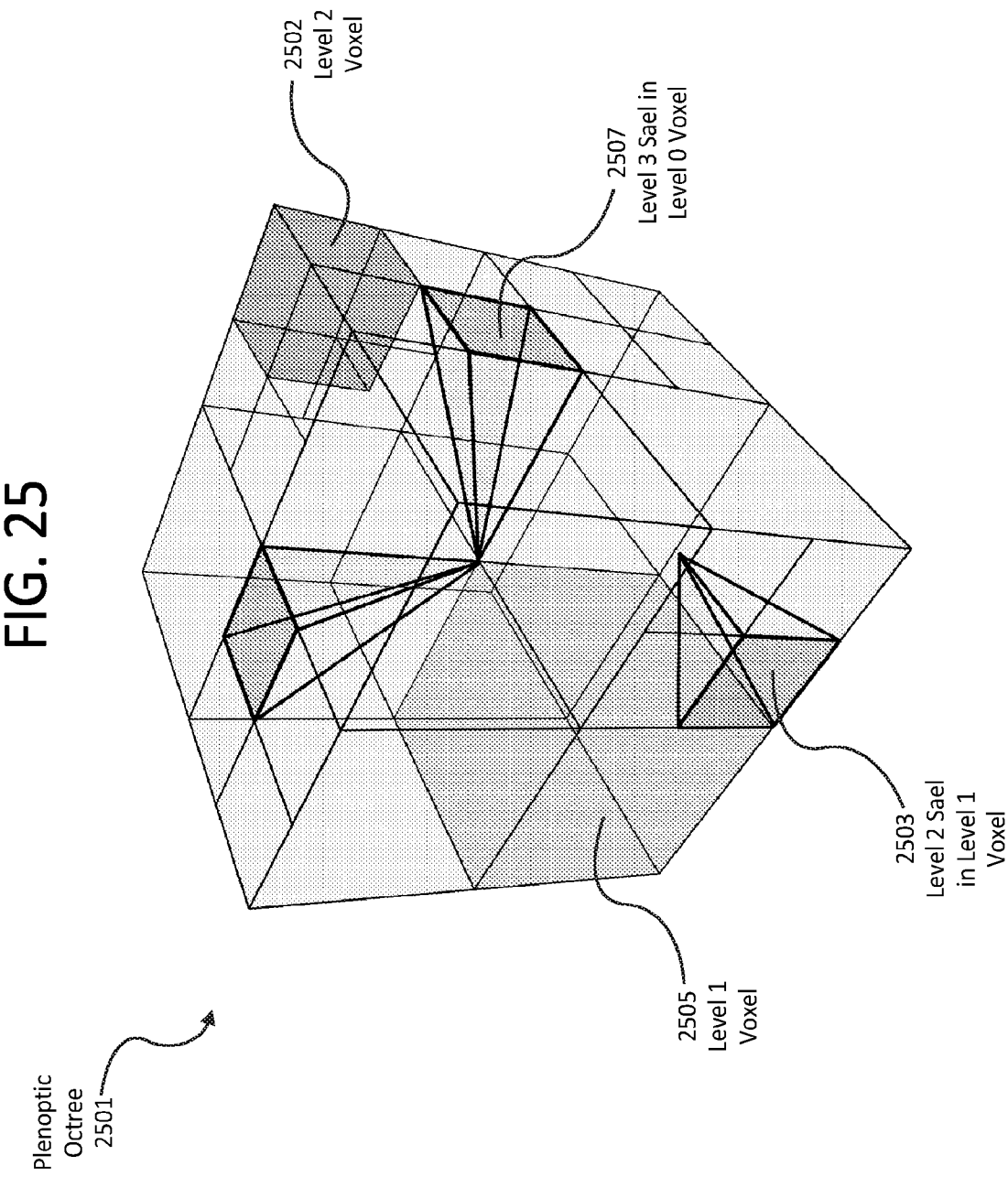
FIG. 25 is a geometric diagram showing saels with origins at the centers of octree nodes, according to some embodiments.

FIG. 25 shows the combination of one VLO and three SLTs in a plenoptic octree 2501. The overall structure is that of the VLO with cubical voxel 2505 being represented by a level 1 VLO node and voxel 2502 being represented by a level 2 VLO node. Sael 2507 is a level 3 sael with its origin at the center of the VLO universe (level 0). Sael 2503 has a different origin, however. It is located at the center of a level 1 VLO node which is used as its surrounding cube. Since it's defining square is one-fourth of a face of the surrounding cube, it is a level 2 sael.

Rather than a single VLO, as described above, a plenoptic octree may be composed of multiple VLOs representing multiple objects or properties which share the same universe and are typically combined using set operations. They are like layers in an image. In this way multiple sets of properties can be defined for the same regions of space and displayed and employed as needed. Saels in multiple saeltrees can be combined in the same fashion if the origins are the same point and the nodes have the same alignment. This can be used, for example, to maintain multiple wavelengths of light that can be combined as needed.

The SLTs and VLOs in a plenoptic octree have the same coordinate system and have the same universe except that SLTs can have their origins located at different points within the plenoptic octree and not necessarily at VLO node centers. Thus, the surrounding cube of an SLT, while it is in the same orientation as the VLO or VLOs in a plenoptic octree, it does not necessarily coincide exactly with the VLO universe or any other node.

Figure 26:
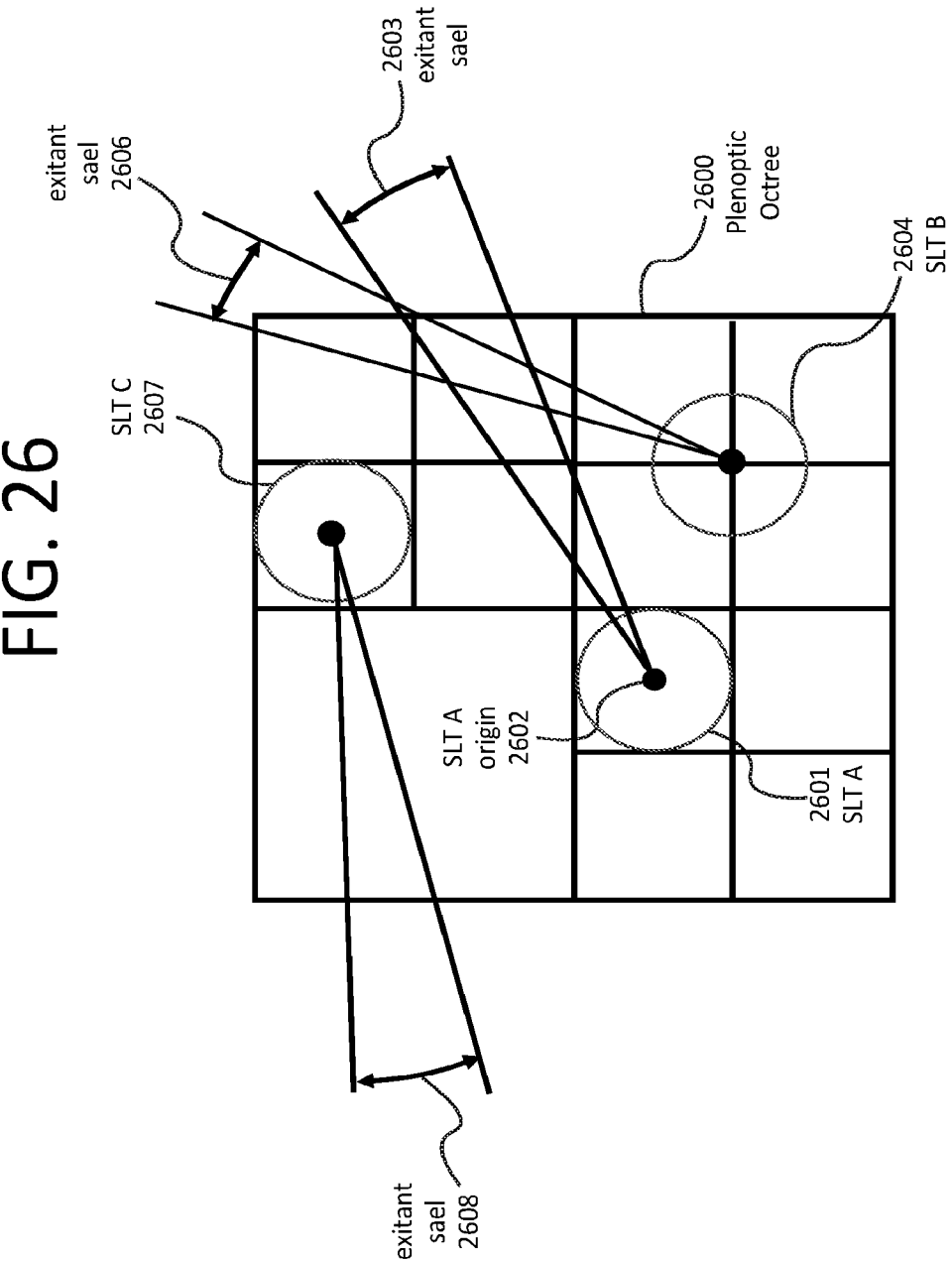
FIG. 26 is a geometric diagram showing the space represented by three saels of three saeltrees in 2D, according to some embodiments.

The use of perspective plenoptic projection in plenoptic octrees (or simply "projection"), as computed by a plenoptic projection engine, is illustrated in FIG. 26 (in 2D). The plenoptic octree 2600 contains three SLTs attached to the VLO. SLT A 2601 has an origin at point 2602. From SLT A 2601, one sael 2603 is shown projecting through the plenoptic octree in a positive x and positive y direction. SLT B 2604 has sael 2606 projecting into the plenoptic octree and SLT C 2607 has sael 2608 projecting out in another direction.

Figure 27:
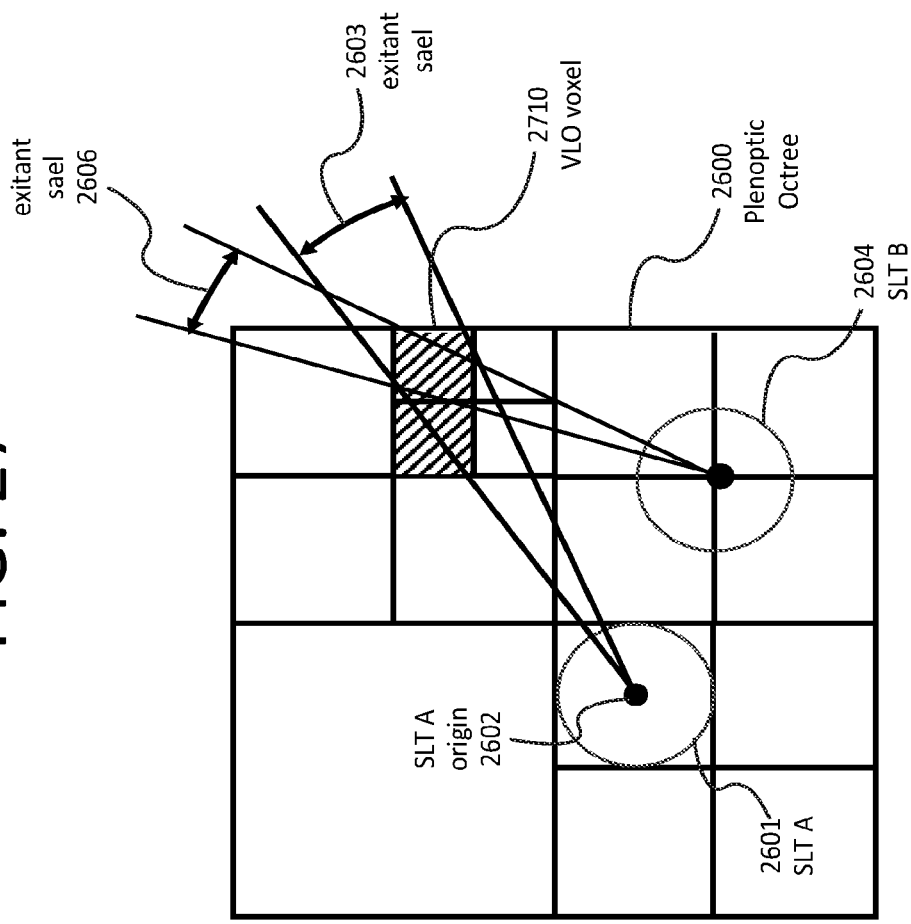
FIG. 27 is a geometric diagram showing two exitant saels of two saeltrees and the intersection of the two saels with two volumetric octree (VLO) voxels, according to some embodiments.

This is continued in FIG. 27 where two VLO voxels are shown, including VLO voxel 2710. Sael 2603 of SLT A 2601 and sael 2606 from SLT B 2604 are exitant saels. This means that they represent light emanating from the center of their respective origins. Only one sael is shown for each SLT. In use there would typically be many saels, of various resolutions, projecting from the origin of each SLT. In this case the two saels pass through the two VLO nodes. SLT C 2607 has does not have a sael that intersects either of the two VLO nodes and is not shown in FIG. 27.

In operation, the intersection of SLT saels and VLO nodes will result in the subdivision of the saels and VLO nodes until some resolution limit (e.g., spatial resolution and angular resolution) is achieved. In a typical situation, subdivision will occur until the projection of the saels approximate the size of the VLO nodes at some level of resolution determined by the characteristics of the data and the immediate needs of the requesting process.

Figure 28:
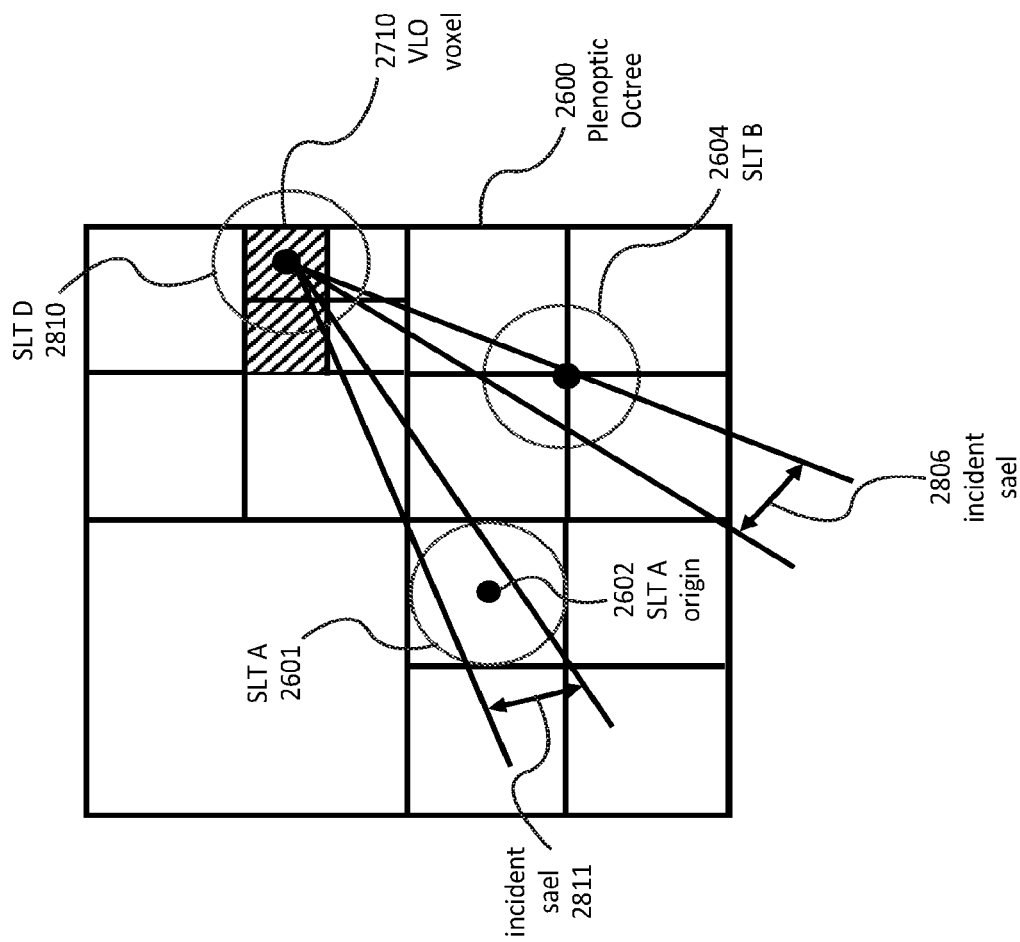
FIG. 28 is a geometric diagram showing two incident saels of a new saeltree attached to one VLO voxel resulting from two exitant saels from two saeltrees that project on to the VLO node, according to some embodiments.

In FIG. 28 some of exitant the light falling on voxel 2710 is captured from point 2602 via sael 2603 and from the origin of SLT 2604 via sael 2606. There are many ways the light can be captured, depending on the application. This light hitting voxel 2710 is represented by an incident SLT D 2810. This can be generated when light falls on a voxel or added to an existing one if it already exists. The result in this case is two incident saels, 2811 and 2806. This now represents the light falling on the voxel, as represented by the light hitting the center of the node.

Figure 29:
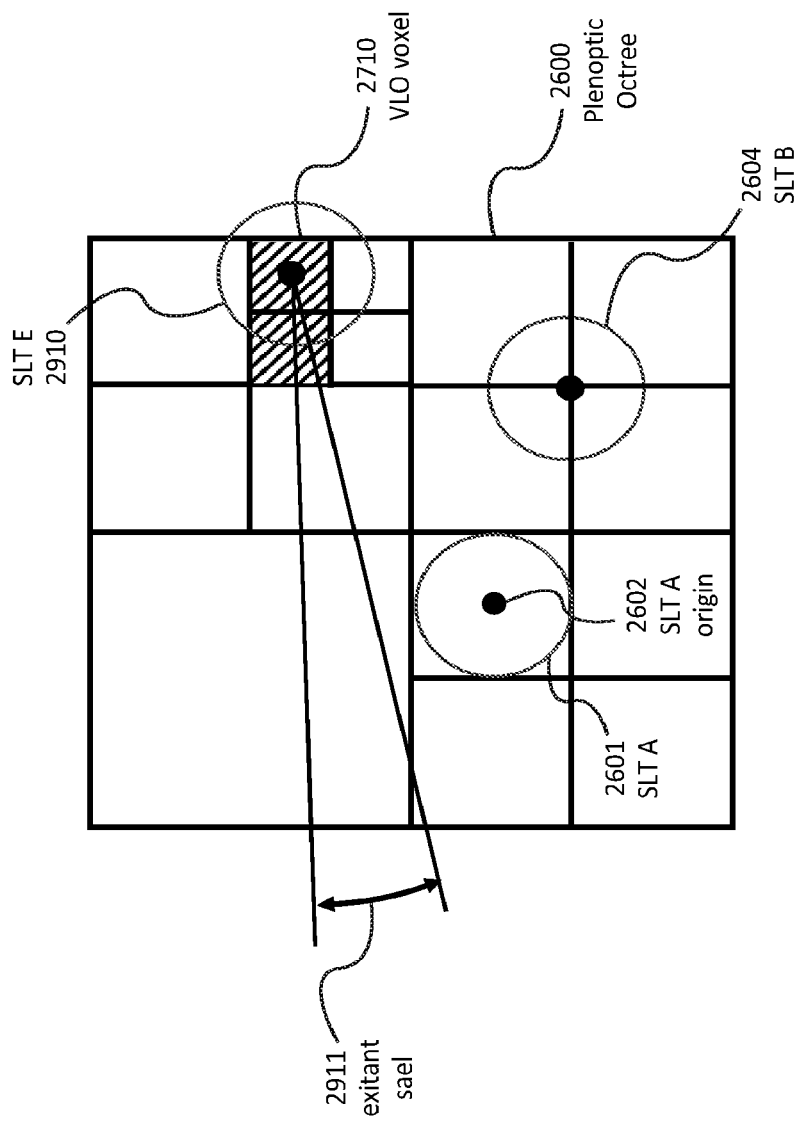
FIG. 29 is a geometric diagram showing an exitant sael from a new saeltree generated for VLO voxel based on the voxel's incident saeltree and the BLIF associated with the voxel, according to some embodiments.

A representative use of SLTs in plenoptic octrees is to use the light entering a voxel, as represented by an incident SLT, to compute the exitant light emerging from the voxel. FIG. 29 illustrates this. The BLIF function know or assumed for voxel 2710 is used to generate a second SLT, an exitant SLT. This is exitant SLT D 2910. Its origin is at the same point as sael D 2810. Thus, the exitant light from multiple locations in the scene has been projected outward with that falling on a voxel captured in an incident SLT and then used to compute the exitant SLT for that voxel.

Figure 30:
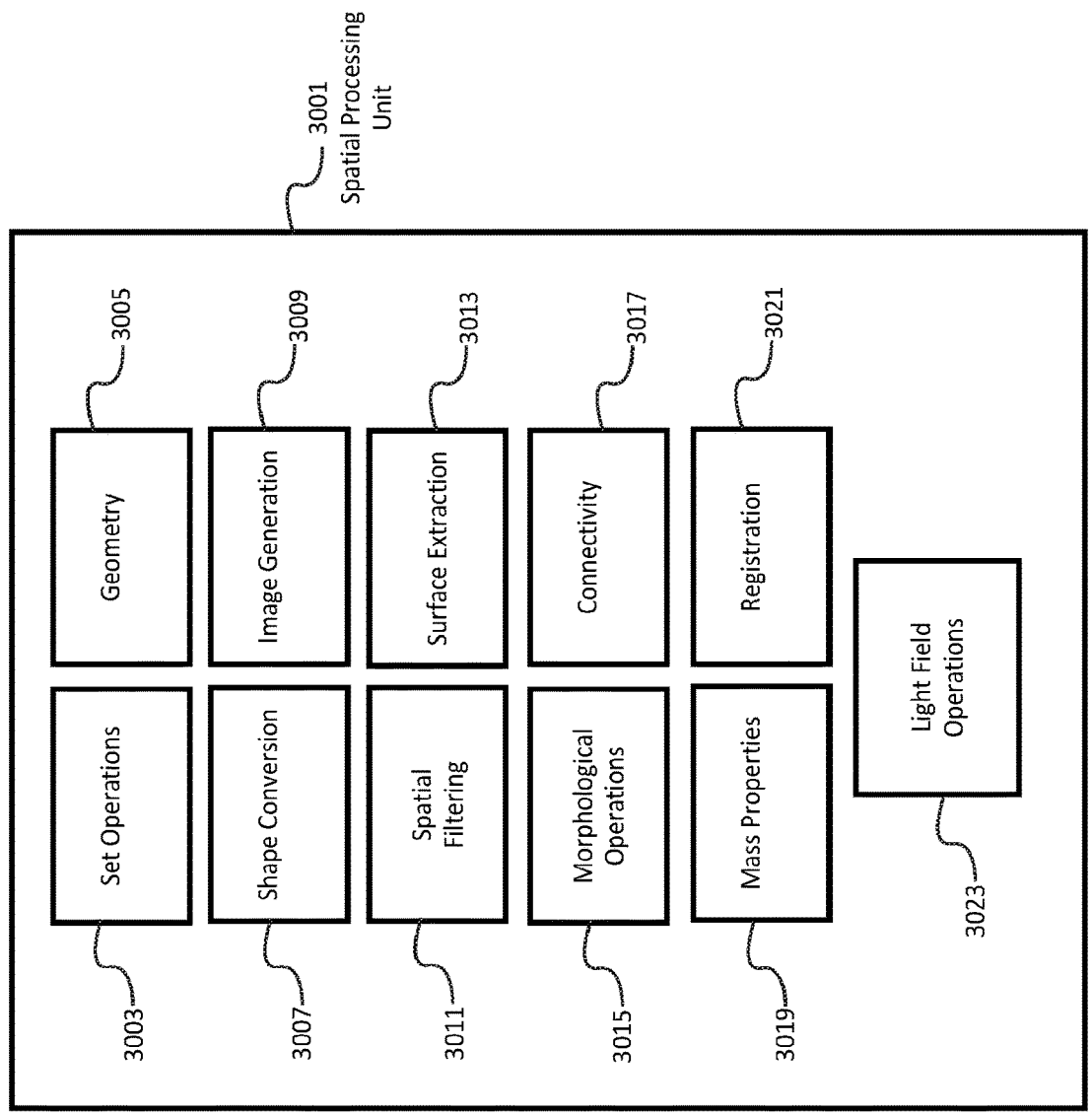
FIG. 30 is a schematic diagram that shows the functions of a Spatial Processing Unit (SPU), according to some embodiments.

The functions of the SPU in generating and operating on plenoptic octrees are shown in FIG. 30 according to some example embodiments. The SPU 3001 may include a set of modules such as set an operations module 3003, a geometry module 3005, a shape conversion module 3007, an image generation module 3009, a spatial filtering module 3011, a surface extraction module 3013, a morphological operations module 3015, a connectivity module 3017, a mass properties module 3019, a registration module 3021 and a light-field operations module 3023. The operation of SPU modules 3003, 3005, 3007, 3009, 3011, 3013, 3015, 3017, 3019, and 3021 on octrees are generally known and those skilled in the art. They understand that such modules may be implemented in many ways, including software and hardware.

Of the SPU functions, several have been extended to apply to plenoptic octrees and SLTs. Modifying set operations module 3003 to operate on SLTs is a straightforward extension of node set operations on octrees. The nodes of multiple SLT must represent the same saels (regions of direction space). The nodes are then traversed in the same sequence, providing the operating algorithm with the associated properties contained in the SLTs. As is well known in the literature, terminal nodes in one SLT are matched to subtrees in other SLTs through the use of "Full-Node Push" (FNP) operations, as with octree s.

Because of the nature of SLTs, the operation of the Geometry 3005 process is limited when applied to SLTs. For example, translation does not apply in that the incident or exitant saels at one point in a plenoptic octree will not, in general, be the same at another origin point. In other words the light field at one point will usually be different from another point and it must be recomputed at that point. The light field operations of sael interpolation and extrapolation performed in the Light Field Operations module 3023 accomplish this. An exception where this is not needed, is when the same illumination applies in an entire region (e.g., illumination from beyond a parallax boundary). In such cases the same SLT can simply be used at any point within the region.

Geometric scaling within function 3005 also does not apply to SLTs. Individual saels represent directions that extend indefinitely and do not have a size that can be scaled. Geometric rotations performed by process 3005 can be applied to SLTs in using a method described below.

The morphological operations in 3015 such as dilation and erosion can be applied to saels in an SLT by extending their limits to, for example, overlap illumination. The can be implemented by using undersized or oversized rectangles on the faces of the surrounding cubes of SLTs. In some situations, the connectivity function 3017 can be extended for the incorporation of SLTs by adding a property to VLO nodes that indicates that saels containing a property such as illumination intersects them. This can then be used with connectivity to identify connected components that have a specific relationship to the projected property (e.g., material illuminated by a specific light source or material not visible from a specific point in space).

Figure 31:
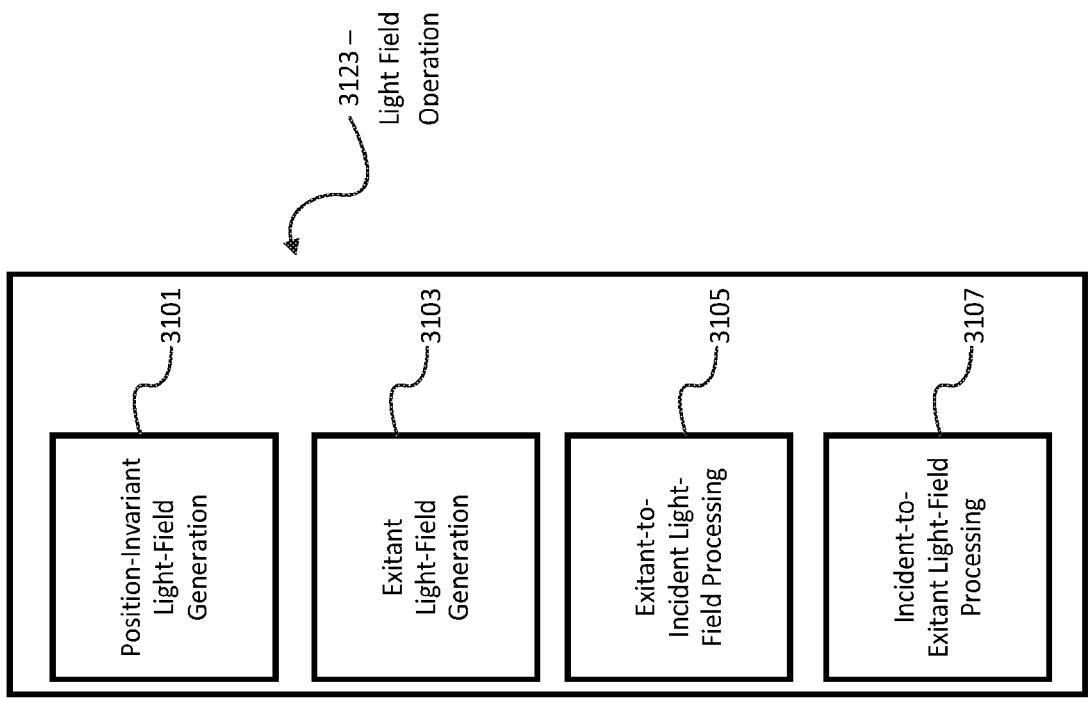
FIG. 31 is a schematic diagram showing the sub-functions of a Spatial Processing Unit's Light-Field Operations function, according to some embodiments.

The operation of the light-field operations processor 3023 is divided into specific operations as shown in FIG. 31. The position-invariant light-field generation module 3101 is used to generate SLTs for light from beyond the parallax boundary and can thus be used anywhere within the region where the parallax boundary is valid. The light may be sampled (e.g., from images) or generated synthetically from modeling the real world (e.g., the sun or moon) or from computerized models of objects and material beyond the parallax boundary.

The exitant light-field generation module 3103 is used to generate point light field information in the form of SLTs located at specific points in the plenoptic octree scene model. This can be from sampled illumination or generated synthetically. For example, in some cases a pixel value in an image may be traced back to a location on a surface. This illumination is then attached to the surface point as one or more exitant saels attached to that location (or contribute to them) in the direction of the camera viewpoint of the image.

The exitant-to-incident light-field processing module 3105 is used to generate an incident SLT for a point in the scene (e.g., a point on an object) called a "query" point. If it does not already exist, an SLT is generated for the point and its saels are populated with illumination information by projecting them out into the scene. When the first matter in that direction is found, its exitant saels are accessed for information on illumination being projected back to the starting point. If no sael exists in the direction in question, neighboring saels are accessed to generate an interpolated or extrapolated set of illumination values, perhaps with the aid of a known or expected BLIF function. This process continues for other saels contained in the incident SLT at the query point. Thus, the incident SLT models the estimate of the light landing on the query point from all or a subset of directions (e.g., light from the interior of an opaque object containing the surface query point may not be needed).

The incident-to-exitant light-field processing module 3107 can then be used to generate an exitant SLT at a point based on an incident SLT at that point, perhaps generated by module 3105. The exitant SLT is typically computed using a BLIF function applied to the incident SLT. The operation of the sub-modules contained in the light-field operations module 3123 employ the sael projection and sael rotation methods presented below.

Figure 32:
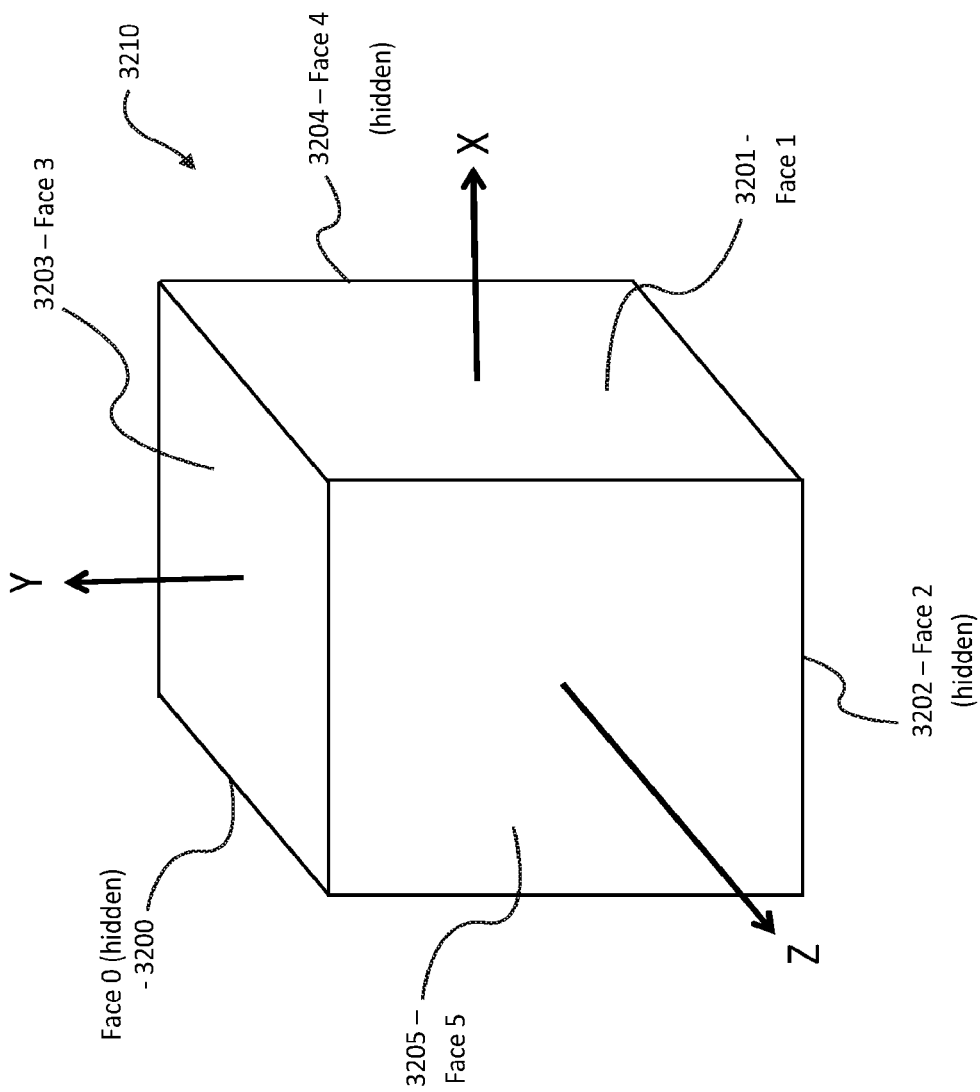
FIG. 32 is a geometric diagram showing the numbering of the six faces of the surrounding cube of a saeltree, according to some embodiments.

FIG. 32 shows the surrounding cube 3210 of a saeltree. The six square faces of an SLT's surrounding cube are numbered 1 to 6. The origin of the coordinate system is located at the center of the SLT universe. Face 0 3200 is the SLT face intersected by the −x axis (hidden in diagram). Face 1 3201 is the face intersected by the +x axis and Face 2 3202 is intersected by the −y axis (hidden). Face 3 3203 is intersected by the +y axis, Face 4 3204 is intersected by the −z axis (hidden) and Face 5 3205 is intersected by +z.

Figure 33:
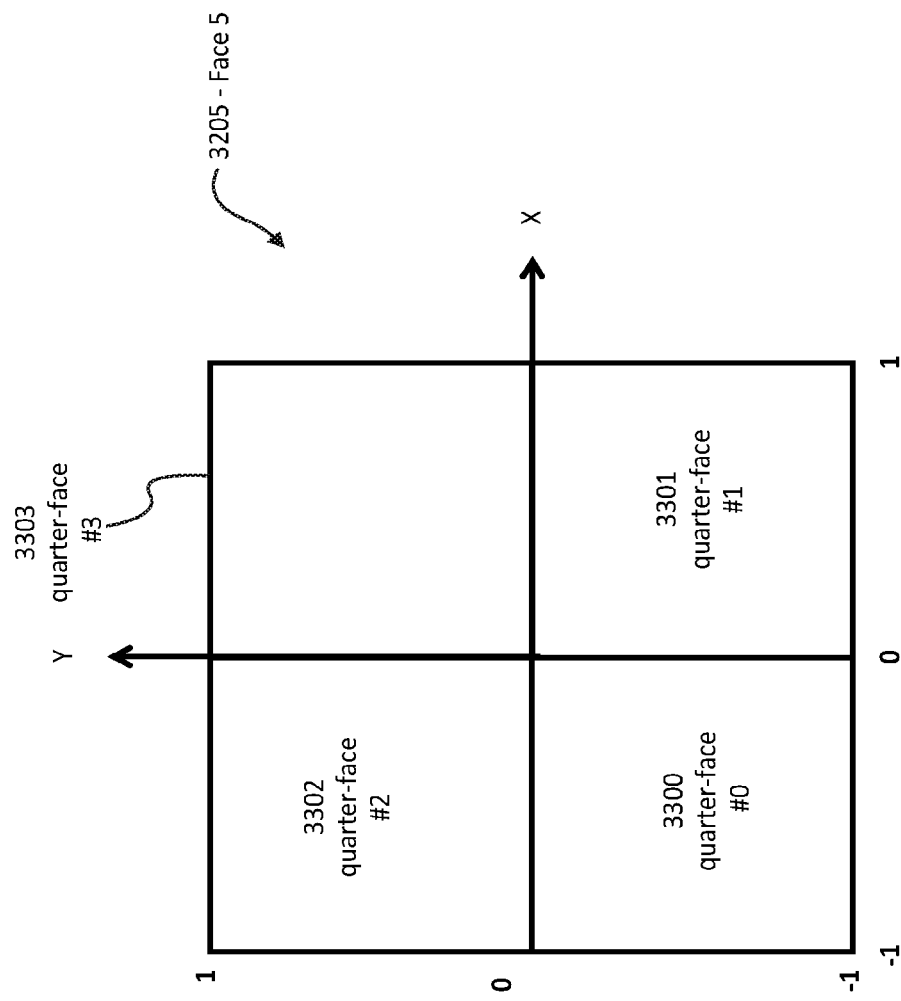
FIG. 33 is a geometric diagram that shows the quarter-faces of a surrounding cube of a saeltree with a highlighted quarter-face of a face of a surrounding cube of a saeltree, according to some embodiments
Figure 34:
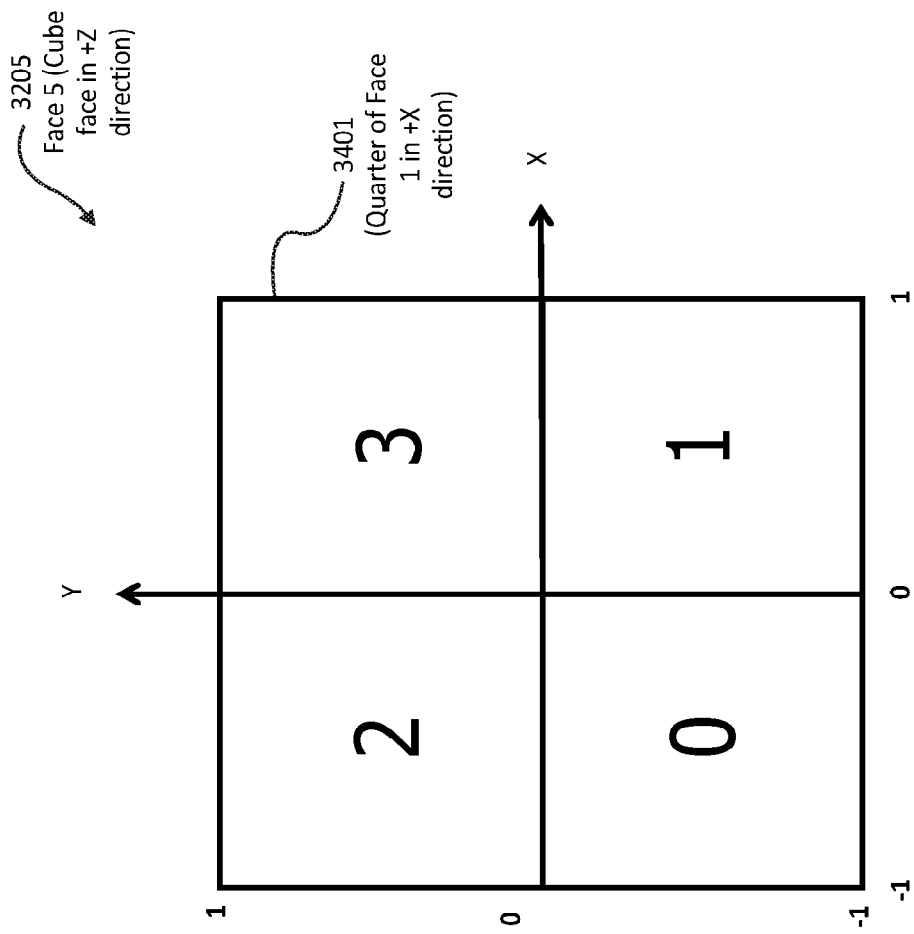
FIG. 34 is a geometric diagram that shows a side view of a quarter-face of a surrounding cube of a saeltree, according to some embodiments.
Figure 35:
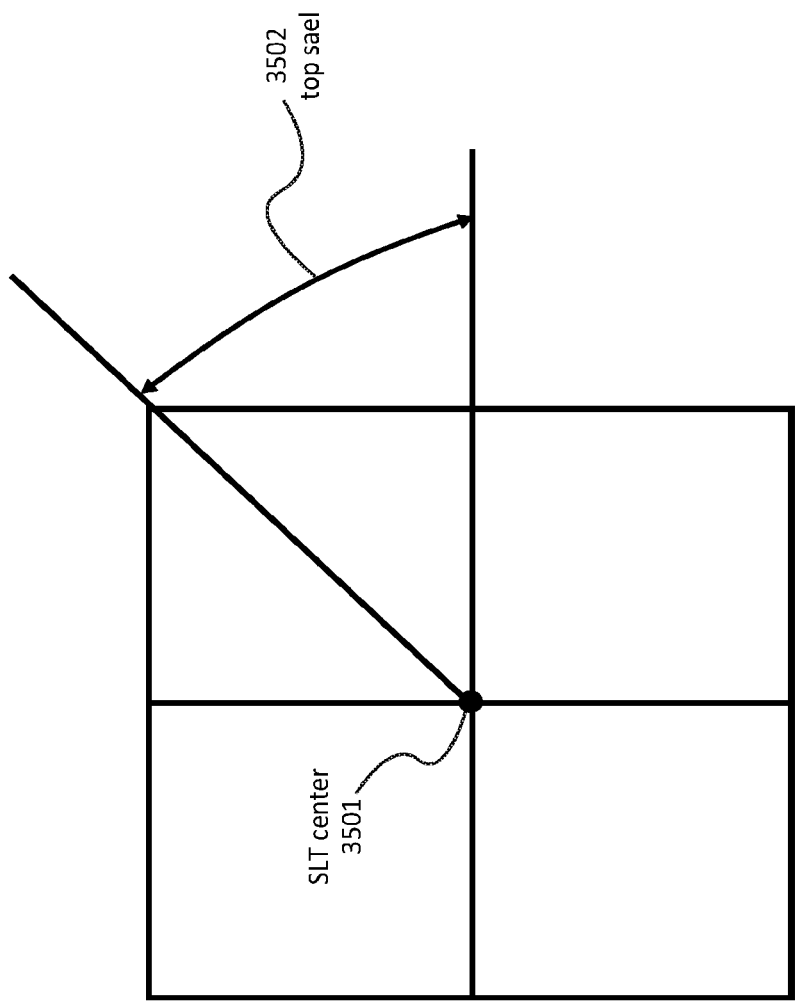
FIG. 35 is a geometric diagram that shows a 2D side view of the segment of direction space represented by a top sael, according to some embodiments.

Level 0 in an SLT includes all of the saels which represent the entire area of a sphere surrounding the origin of the SLT (4 pi steradians). At level 1 of an SLT six saels exactly intersect one of the six faces. At level 2, each sael represents one-quarter of a face. FIG. 33 illustrates the numbering of face 5 3205. Quarter-face 0 3300 in in the −x, −y direction while quarter-face #1 3301 is in the +x, −y direction, quarter-face 2 3302 is in the −x, +y direction and quarter-face 3 3303 is in the +x, +y direction. The following will focus on the quarter-face of Face 3 3303 in the +x, +y, +z direction, as highlighted in FIG. 33. FIG. 34 shows face 5 3205 looking at the origin from the +z axis. From this viewpoint, a quarter-face 3401 is seen as a vertical line, the edge of the quarter-face square.

Saels that intersect a level 2 quarter-face are called top saels. Since there are six faces and four quarter faces per face, there are a total of 24 top saels. In 3D a top sael is the space enclosed by four planes that intersect the SLT origin and each of which intersects an edge of a level 2 quarter face. In 2D this reduces to two rays that intersect the center and the two ends of the quarter face such as 3401. An example of a top sael is 3502 in FIG. 35 with origin 3501.

Figure 36:
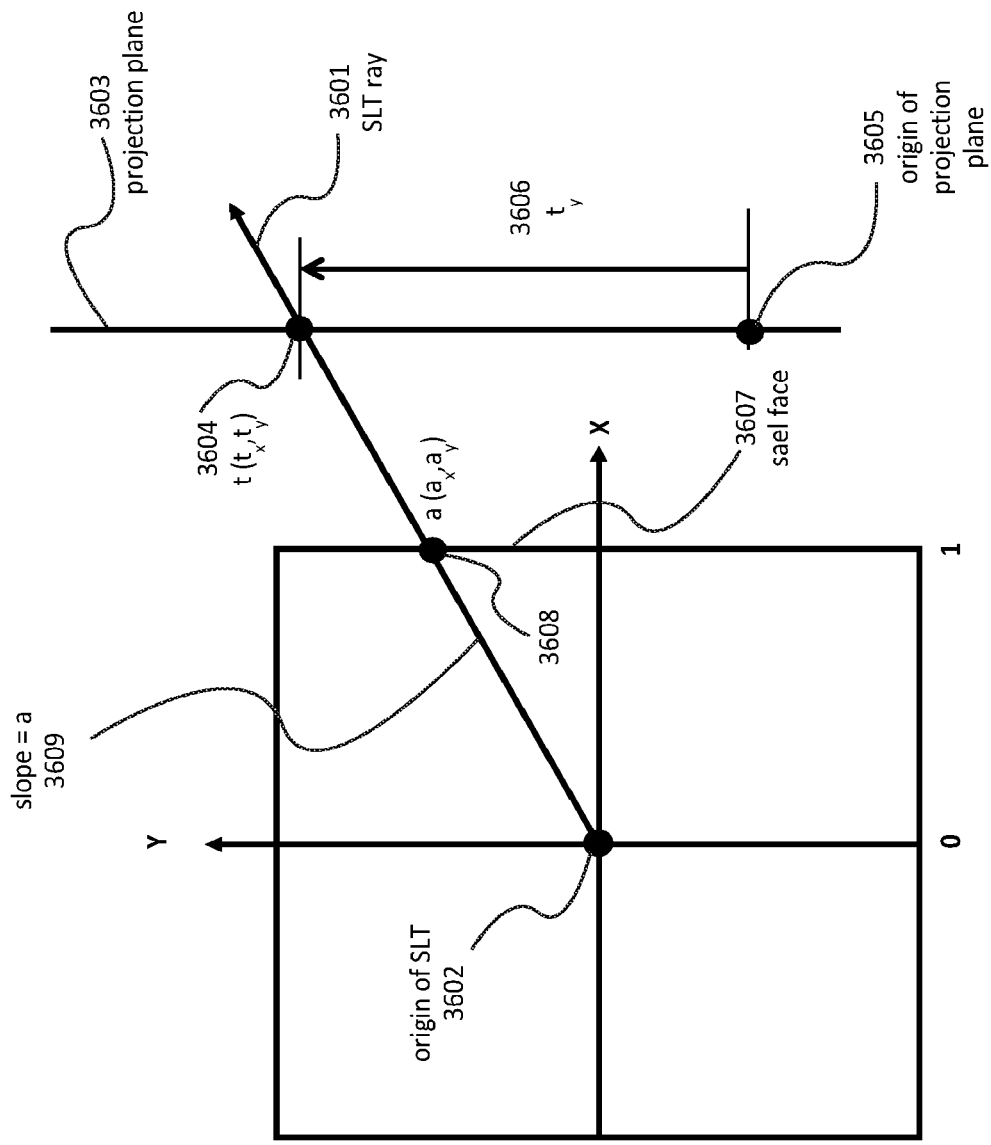
FIG. 36 is a geometric diagram that shows how a projection of a sael of a saeltree on to a projection plane is represented by its intersection at locations on a face of the surrounding cube of a saeltree, according to some embodiments.

Saels are regions of space that can be used, for example, to represent light projection. They are determined by planes that enclose volumetric space. Technically, they are oblique (or non-right) rectangular pyramids of unlimited height. In 2D the planes appear as rays. For example, ray 3601 is shown in FIG. 36. It originates at SLT origin point 3602. The specific ray is defined by the origin and its intersection with a projection plane 3603 which is a plane (line in 2D) parallel to one face of a sael's surrounding cube (perpendicular to the x axis in this case). The projection plane is typically attached to a node in the VLO and will be used to determine if the sael intersects that node and, when appropriate, used to perform illumination calculations. The intersection point 3604, t ($t_x$, $t_y$), is determined by the origin 3605 of the projection plane 3603, usually the center of the VLO that it is attached to, and the distance from the projection plane origin 3605 to the intersection point 3604 which is 3606, $t_y$. The intersection of the ray 3601 with the sael face 3607 is point "a" 3608. Since, in the case shown, the distance from the origin to the face in the x direction is 1, the slope of the ray in the x-y plane is thus the y value of point 3608, ay.

An SLT is anchored to a specific point in the universe, its origin. The anchor point of can be at an explicitly defined point with associated projection information custom computed for that point. Or, as described here, the SLT origin can start at the center of the universe and be moved to its anchor point using VLO PUSH operations while maintaining the geometric relationship to a projection plane (which is also moved around in a similar way). This has the advantage that multiple SLTs could be attached to VLO nodes and share the simplified projection calculations as the octree is traversed to locate SLT centers. The VLO octree that locates the SLT centers also contain the nodes representing matter in one unified dataset, the plenoptic octree.

When implementing plenoptic octree projection, the individual 24 top saels can be processed independently in separate processors. To reduce the VLO memory-access bandwidth, each such processor can have a set of half-space generators. They would be used to locally (for each top-sael processor) construct the pyramid of the sael to be intersected with the VLO. Thus, unnecessary requests to the VLO memory would be eliminated.

The center of a bottom-level VLO node can be used as an SLT origin. Or, if higher precision is needed, an offset can be specified relative to the node center with a projection correction computed for the geometric calculations.

Figure 37:
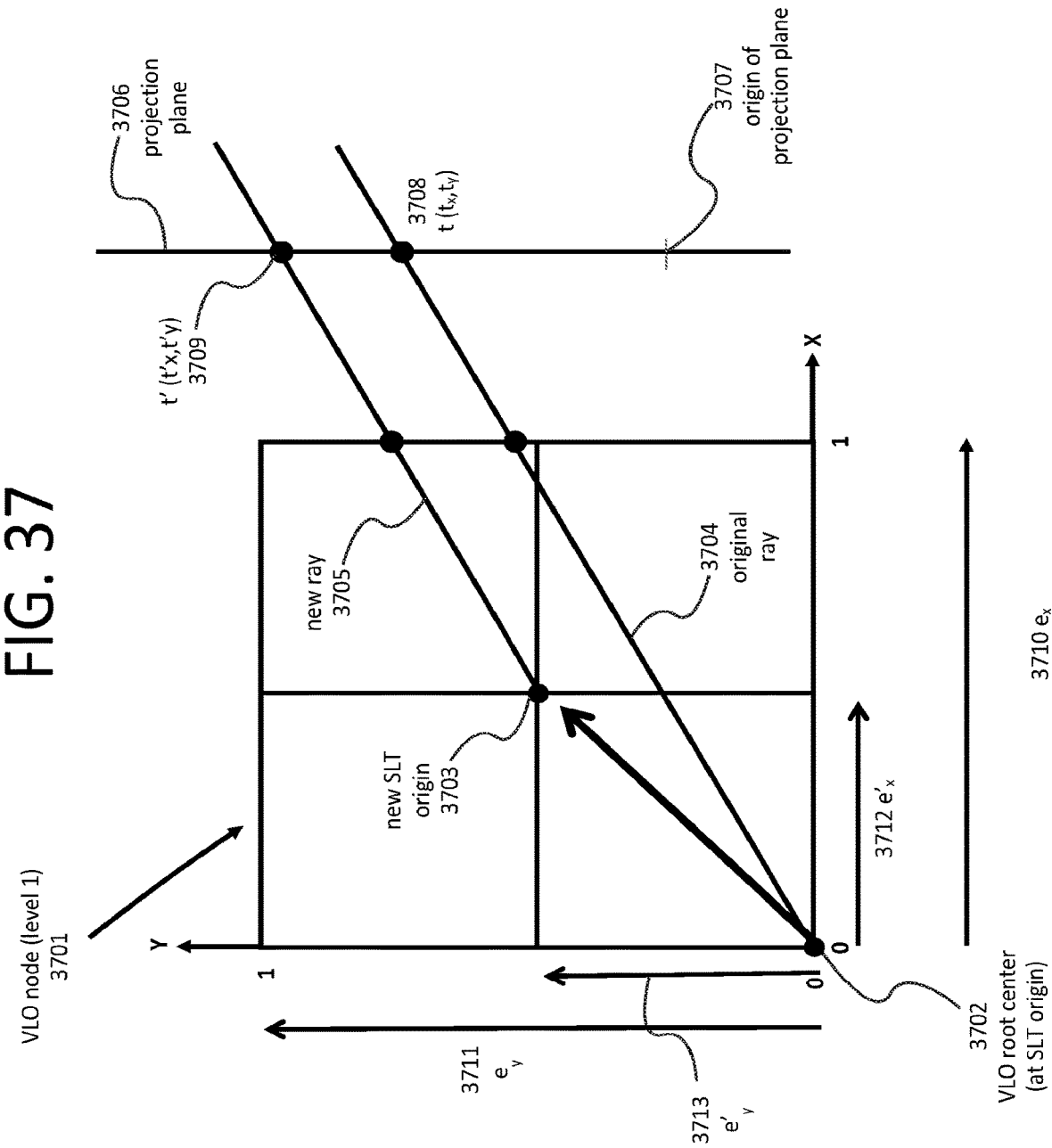
FIG. 37 is a geometric diagram that illustrates in 2D the movement of a saeltree while maintaining a sael projection on a projection plane, according to some embodiments.

In the following, SLTs are positioned in a plenoptic octree by traversing the VLO (with or without an offset correction) to position the STL's origin. The projection information of the STL relative to a projection plane, attached to the center of the universe, is set up for the root node of the VLO and then updated with each PUSH down to the location of the SLT origin. In FIG. 37 the center of an SLT (not shown) is at point 3702, the center of the VLO root node (only VLO node 3701 at level 1 is shown). To move the SLT, center 3702 is moved with a PUSH of the VLO node. In the case shown this is to the VLO child node in the +x and +y direction. It thus moves to the level 1 node center 3703 in the +x and +y directions (for this top sael). The original ray 3704 (representing either edge of the sael) thus becomes 3705 after the PUSH. The slope of this new ray remains the same as the slope of original ray 3704 but the intersection point, with projection plane 3706, moves. The original intersection point 3708, t ($t_x$, $t_y$), relative to the origin of the projection plane 3707, moves to 3709, t' ($t_x'$, $t_y'$). Thus, the value of $t_y$ changes to $t_y'$, while the x coordinate of the projection plane, remains the same as $t_x$).

The step in y is computed by considering the step to the new origin and the slope of the rays. The edge of the level 1 VLO node is 1 as shown by $e_x$ 3710 for 3701. While the magnitude of the edge is identical in all the directions of the axes, they are maintained as separate values because the directions will differ during traversals. The y value is $e_y$ 3711. When a VLO PUSH occurs, the new edge values e'x 3712 and $e'_y$ 3713 are half the original values. As shown in the diagram for this PUSH operation:

$$e'_x = e_x/2 \text{ and}$$

$$e'_y = e_y/2$$

The new intersection point 3709 moves in the y direction due to the movement of the y value of the origin by $e'_y$ 3713, plus the movement of the x value of the SLT origin, 3712 $e'_x$, multiplied by the slope of the edge.

$$t'_y = t_y + e'_y - \text{slope} * e'_x$$

This calculation can be performed in many ways. For example, rather than performing the product each time, the product of the slope and the edge of the VLO universe can be kept in a shift register and, for each VLO PUSH, divided by two using a right shift operation. This shows that the center of an SLT can be moved by PUSH operations on the VLO while maintaining the projection of the sael on the projection plane.

Figure 38:
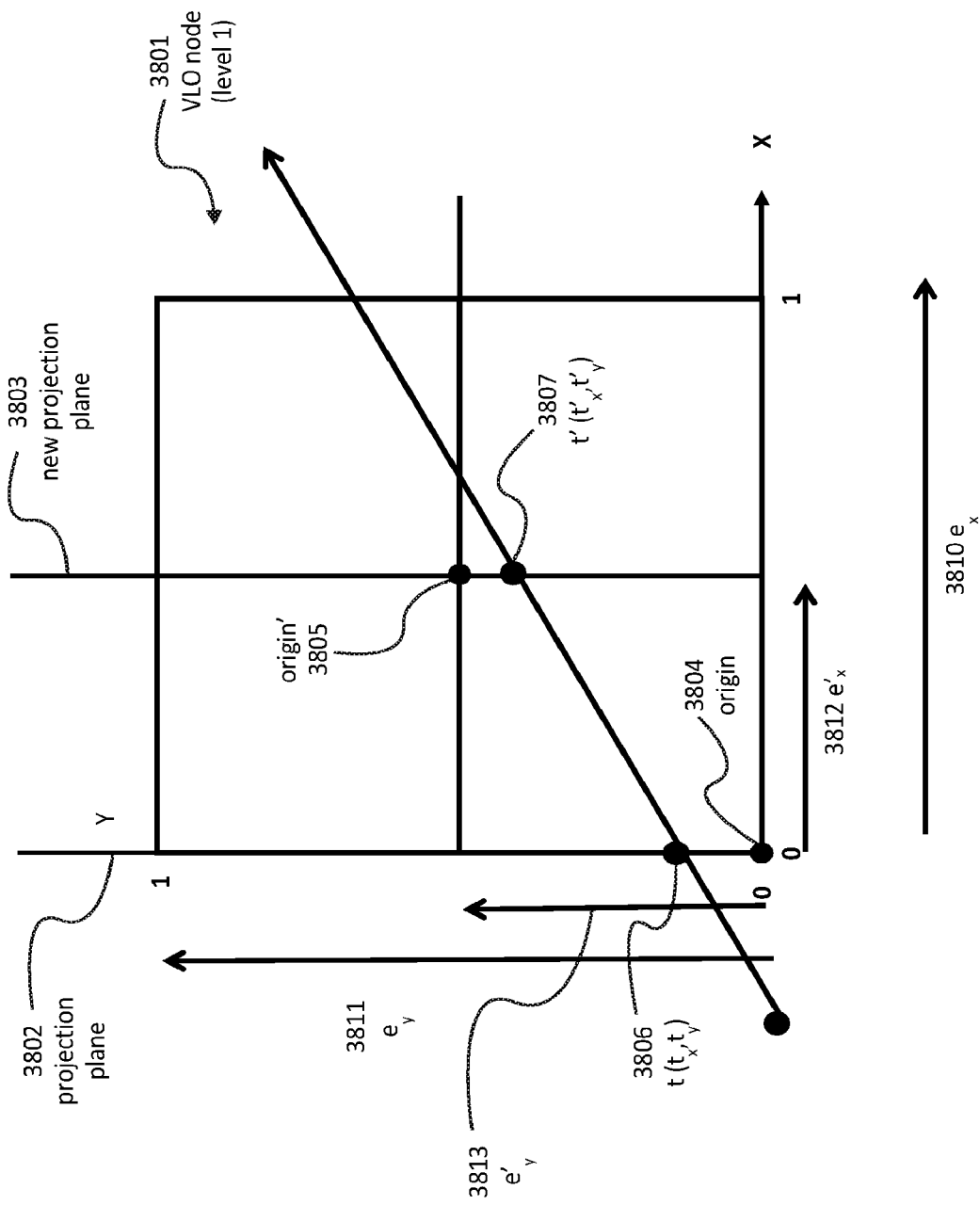
FIG. 38 is a geometric diagram that illustrates the movement of a projection plane while maintaining the projection of a sael of a saeltree, according to some embodiments.

The next operation will move the projection plane while maintaining the geometric relationship with an SLT. The projection plane will typically be attached to the center of a different VLO node which will, in general, be at a different level of the VLO. When the node that the projection plane is attached to is subdivided, the projection plane and its origin will move in the universe. This is shown in FIG. 38. A projection plane 3802 is attached to the center of the VLO root node when a PUSH occurs to level-1 VLO node 3801. The projection plane 3802 moves to a new location becoming projection plane 3803. The projection plane origin moves from the center of the universe 3804 to the center of the child node, point 3805. The original sael edge-ray intersection point 3806, t ($t_x$,$t_y$), moves to a new intersection point 3807, t' ($t'_x$,$t'_y$), on the new projection plane 3803. As above, 3810 e, the x edge of node 3801 is divided by two in the PUSH to 3812 $e'_x$. They edge 3811 $e_y$, is also divided by two becoming 3813 $e'_y$. This is computed as follows:

$$e'_x = e_x/2 \text{ and}$$

$$e'_y = e_y/2$$

The y component of the intersection point, relative to the new origin becomes:

$$t'_y = t_y - e'_y + \text{slope} * e'_x$$

The subtraction of $e'_y$ is because the origin of the projection plane has moved in the + direction from 3804 to 3805. And again, the edge multiplied by the slope could be in a shift register and divided by 2 with a right shift for each PUSH. The slope values will need to be computed separately if the two paths (SLT origin and projection plane) in the same tree structure can PUSH and POP separately, depending on the details of the actual projection method. For example, the SLT-locating octree structure may be traversed to the bottom level before the VLO traversal begins, then reusing some registers.

Figure 39:
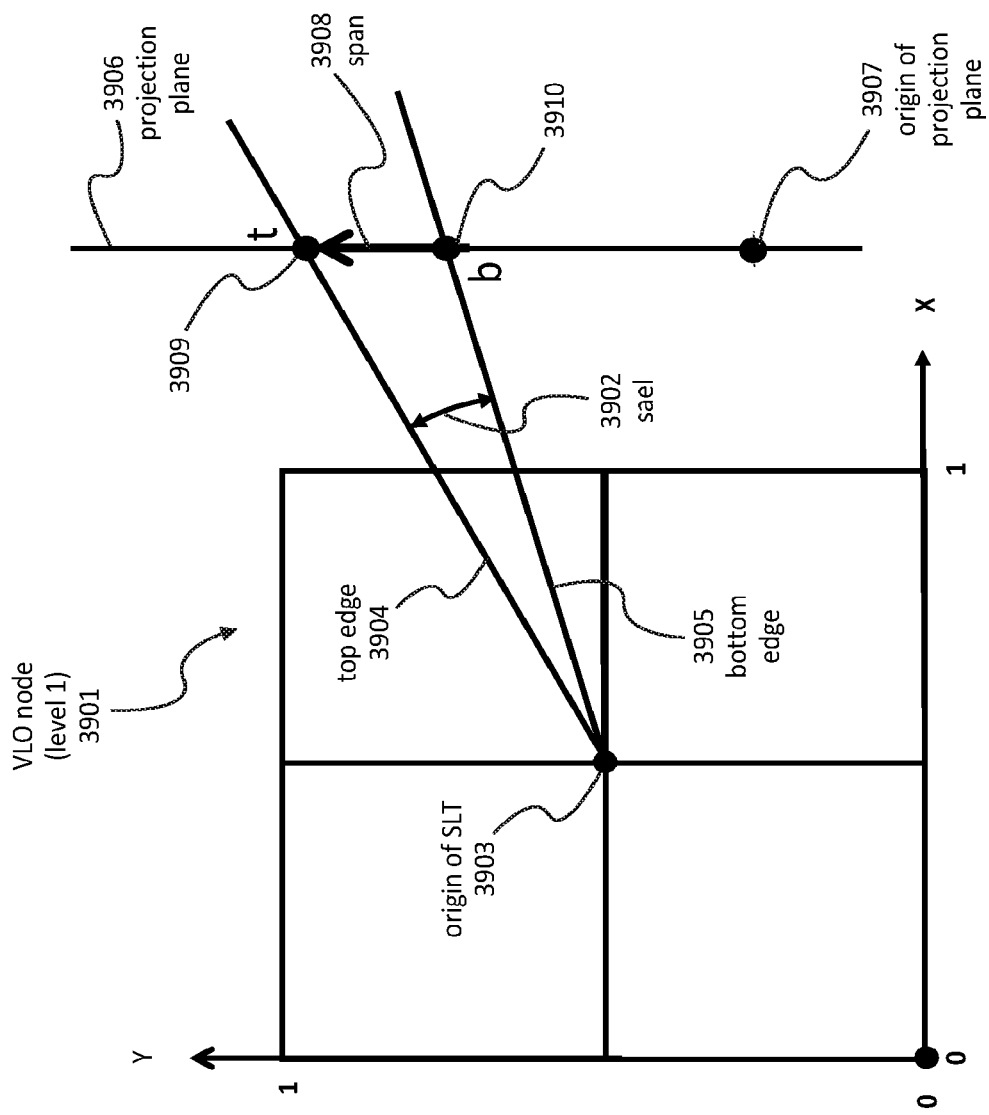
FIG. 39 is a geometric diagram that illustrates the geometry of the span of a sael on a projection plane, according to some embodiments.

A "span" is a line segment in the projection plane between the two rays that define the limits of a sael (in one dimension). This is shown in FIG. 39 for level 1 node 3901 hosting sael 3902. It is defined by three points, the origin of the SLT, 3903, the "top" edge 3904 and the "bottom" edge 3905. The edges are defined by where they intersect the projection plane 3906 which has an origin at point 3907. The intersections are point t 3909 for the top edge and point b 3910 for the bottom edge.

Figure 40:
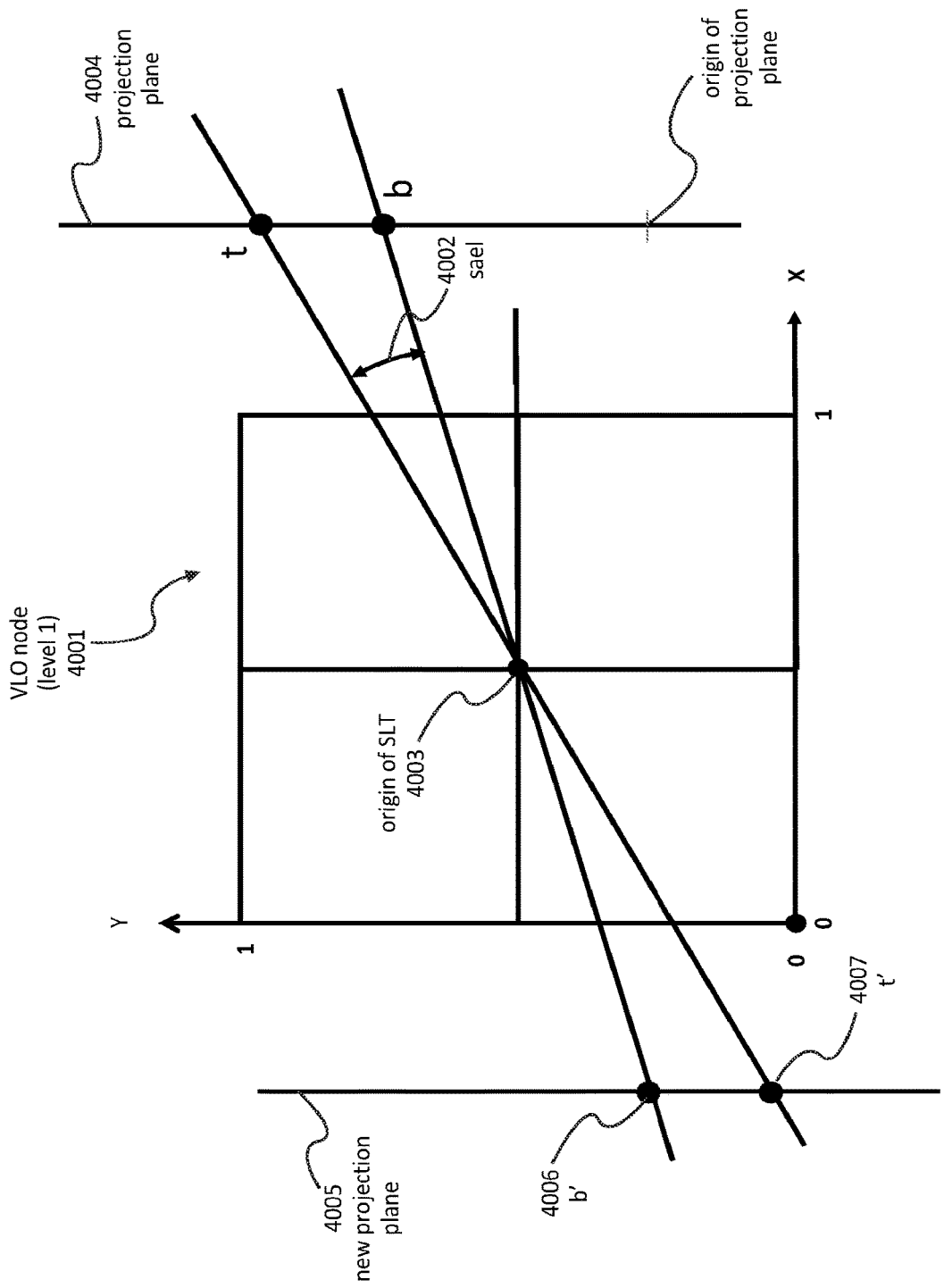
FIG. 40 is a geometric diagram that shows the relationship between the top and bottom intersection points and the situation where the top is below the bottom in the projection plane coordinate system indicating that the projection is not valid (opposite side of the origin from the sael), according to some embodiments.

A sael is only defined from the SLT origin out, between the bottom and top edges. It is not defined on the other side of the origin. During processing, this situation can be detected for a sael as shown in FIG. 40 for a level 1 VLO node 4001 containing sael 4002 with an origin at 4003. The projection plane 4004 moves to the other side of the SLT origin to become 4005, where the sael does not exist. The by offset value becomes b'$_y$ 4006 and the t$_y$ offset value becomes 4007 t'$_y$. After the move, the top offset value is below the bottom offset value indicating that the sael is not defined. It no longer projects on to the projection plane and, while the geometric relationships are calculated and maintained, its use for intersection operations with VLO nodes need to be suspended until it returns to the other side of the origin.

Figure 41:
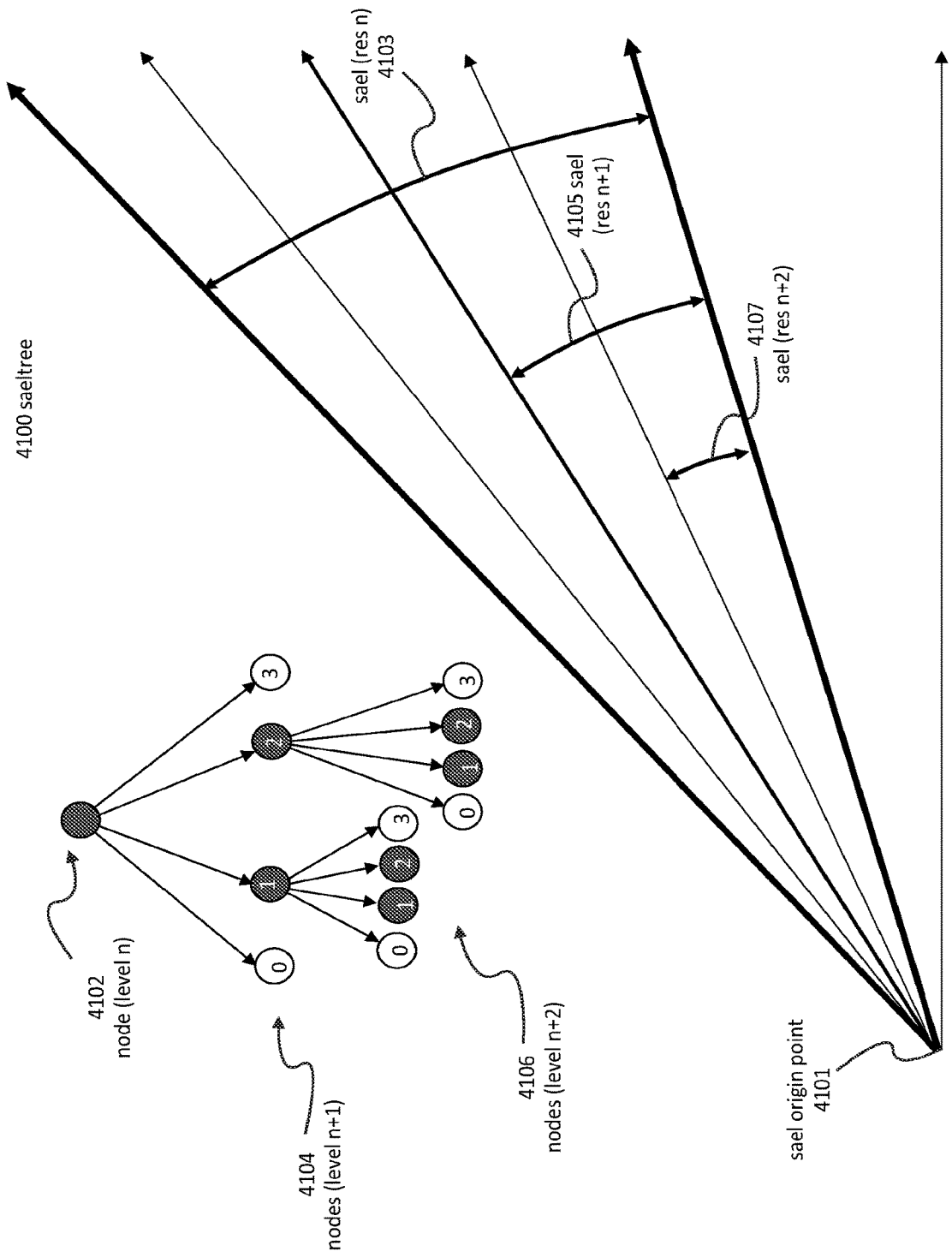
FIG. 41 is a geometric diagram showing the subdivision of a sael of a saeltree into two subtree levels and the spatial regions represented by the nodes in 2D, according to some embodiments.
Figure 42:
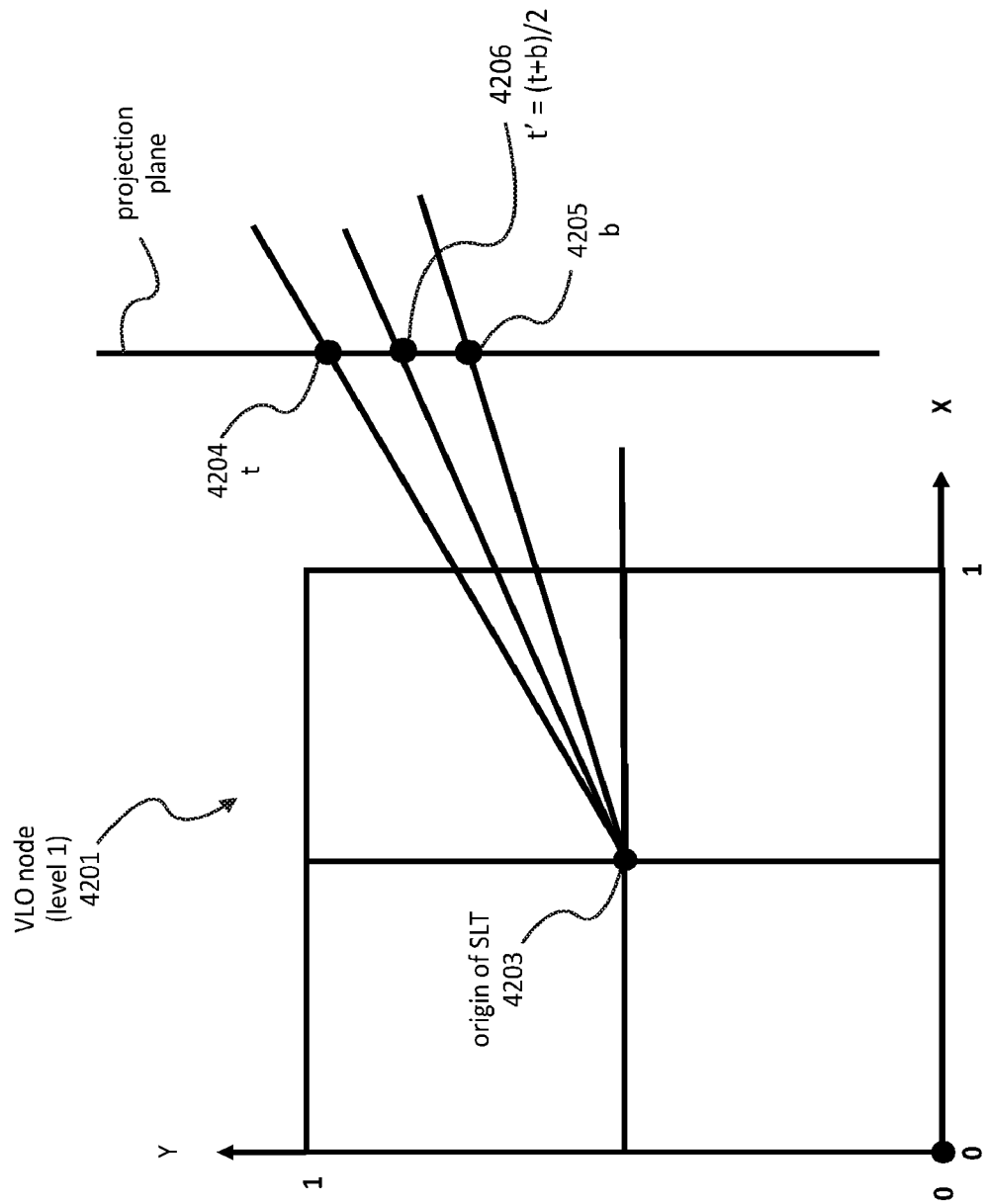
FIG. 42 is a geometric diagram showing the location of the new sael edge intersection with the projection plane that will be the new top edge or bottom edge of a sub-sael, according to some embodiments.

Saels are subdivided into four sub-saels using a sael PUSH operation by computing new top and bottom offsets. The sael subdivision process is illustrated in FIG. 41 as discussed above. FIG. 42 shows a level 1 VLO node 4201 hosting a sael defined by the origin 4203, a top point t, 4204 and a bottom point b, 4205. Depending on the child that the sael is PUSHing to (usually based on geometric calculations performed during the PUSH), the new sub-sael can be the upper sub-sael or the lower sub-sael. The upper sub-sael is defined by origin 4203, the top point 4204, and point 4206, the center between top point 4204 and bottom point 4205. In the case shown, the lower sub-sael is the result of the PUSH, defined by origin 4203, original bottom point b 4205 and new top point t' 4206. The new top point t value, t', is computed as follows:

$$t'_y = (t_y + b_y)/2$$

The new bottom edge is the same as the original and has the same slope. The top edge defined by t' has a new slope, slope t' which can be computed by:

$$slope\_t' = (slope\_t + slope\_b)/2$$

While all the saels at a particular level have the same face area, they do not represent the same solid-angle area because the origin moves in relation to the face area. This can be corrected by moving the edges of the rectangles on a face for each sael at a level. While this simplifies illumination calculations, the geometric calculations become more complex. With the preferred method an SLT "template" is used. This is a static, precomputed "shadow" SLT that is traversed simultaneously with the SLT. For light projection it contains a precise measurement of the solid area for each sael for use in illumination transfer calculations.

A sael represents the incident or exitant illumination into or out from a point in space, the SLTs center (typically the space represented by the point). While plenoptic octrees can be employed in light transport in many ways, the preferred method is to first initialize the geometric variables with the origin of the SLT at the center of the VLO. The geometric relationships are then maintained as the SLT is moved to its location in the universe. Then the VLO is traversed, starting at the root, in a front-to-back (FTB) order from the SLT origin so as to proceed in the direction, from the origin, of the saels. In this way the VLO nodes, some typically containing matter, are encountered in a general order of distance from the sae' origin and processed accordingly. In general, this may need to be performed multiple times to account for sets of saels in different direction groups (top saels).

When the VLO is traversed in an FTB sequence corresponding to a sael projecting from the SLT origin the first interacting (with light) VLO matter node encountered is then examined to determine the next steps needed. It may be determined, for example, that the illumination from the sael is to be transferred to a VLO node by removing some or all of the illumination from the sael and attaching it or some part of it to a sael attached to the VLO node containing matter. This is typically an incident SLT, attached to the VLO node. The transfer can be from a property that might be generated from an image sampling the light field. Or it can be from an exitant sael attached to an illumination source. The incident illumination may be used with a model of the light-interaction characteristics of the surface to determine, for example, the exitant light to be attached to existing or newly-created saels.

Figure 43:
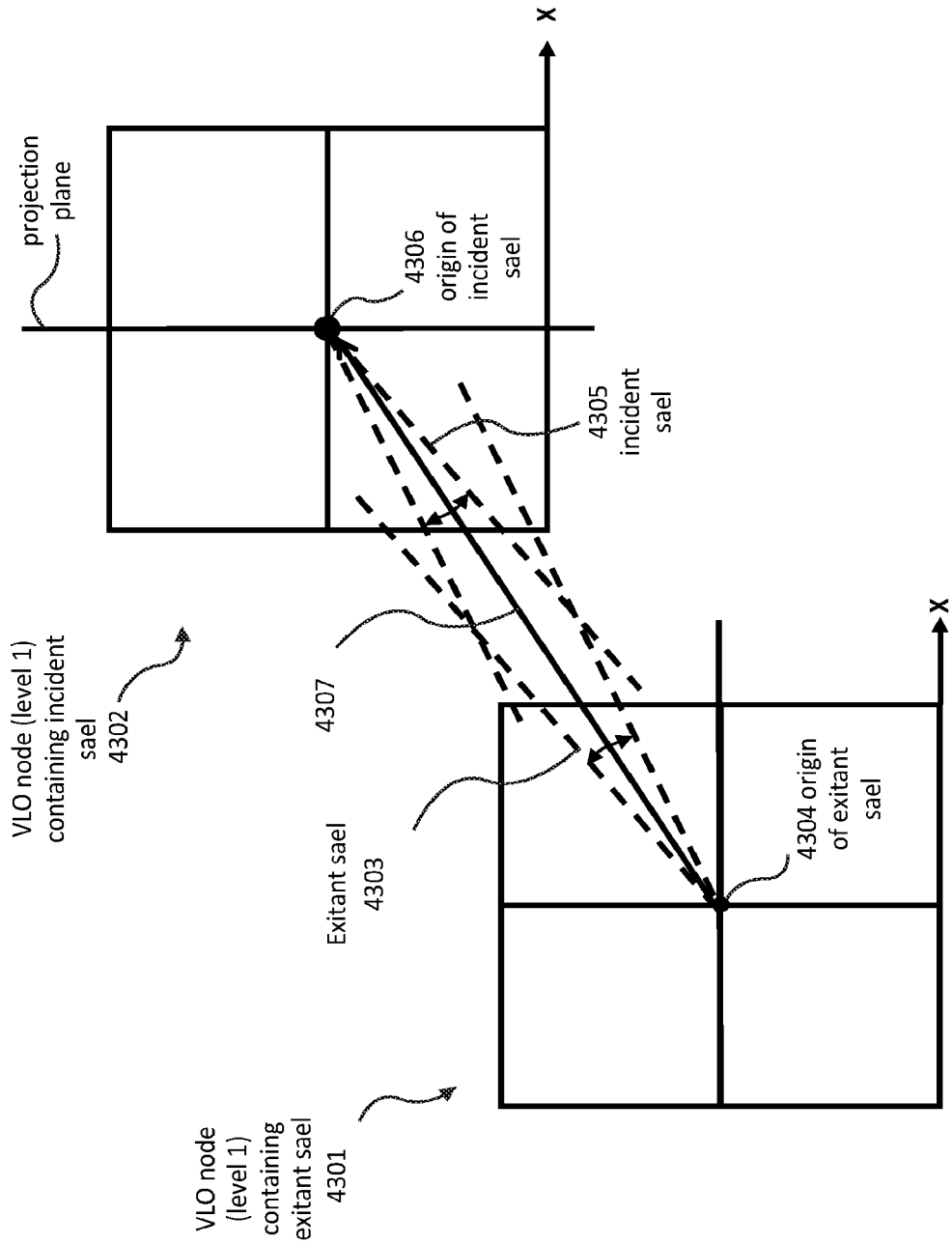
FIG. 43 is a geometric diagram that shows an exitant sael from a saeltree causing the generation of an incident sael in a saeltree attached to a VLO node that the exitant sael intersects, according to some embodiments.

As shown in FIG. 43, a sael-to-sael transfer takes place from an exitant sael attached to VLO node 4301 to an incident sael attached to VLO node 4302. A transfer is initiated when the projection of exitant sael 4303 with its origin at 4304 is at an appropriate size relative to VLO node 4302 and, typically, encloses its center. Otherwise the exitant sael or the VLO node containing the incident SLT (or both) are subdivided and the situation is reexamined for the resulting subtrees.

If the transfer is to take place, the antipodal sael, along origin-to-origin segment 4307, in the incident saeltree 4305 is then accessed or generated at some sael resolution. If the VLO node is too large, it is subdivided, as needed, to increase the relative size of the projection. If the incoming sael is too large, it is typically subdivided to reduce the size of the projection.

Figure 44:
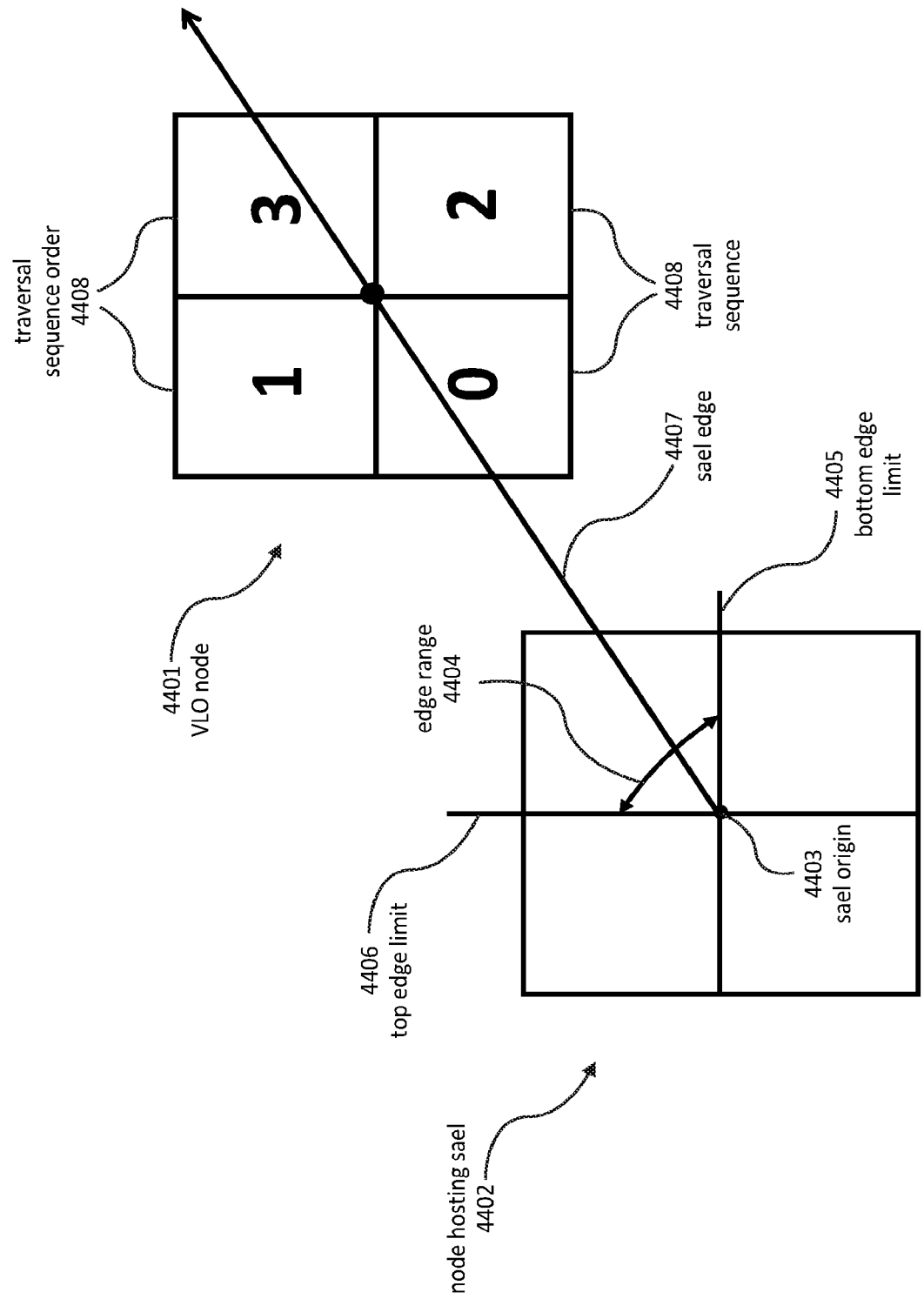
FIG. 44 is a geometric diagram that shows a front-to-back VLO traversal sequence in 2D that is within a shown range of direction space, according to some embodiments.

A specific traversal sequence is used to achieve an FTB ordering of VLO node visits. This is shown in FIG. 44 for traversal of VLO node 4401. The saels with an origin at 4403 and edges (top and bottom) that intersect quarter-circle (eighth sphere in 3D) region 4404 (between the bottom edge limit 4405 and top edge limit 4406). Edge 4407 is a typical edge in this range. A sequence 0 to 3 4408, will generate an FTB sequence in VLO node 4401. Other sequences are used for other ranges. In 3D there are equivalent traversal sequences of eight child nodes. With a VLO, the traversal is applied recursively. Traversal sequence ordering is not unique in that multiple sequences can generate an FTB traversal for a region.

Figure 45:
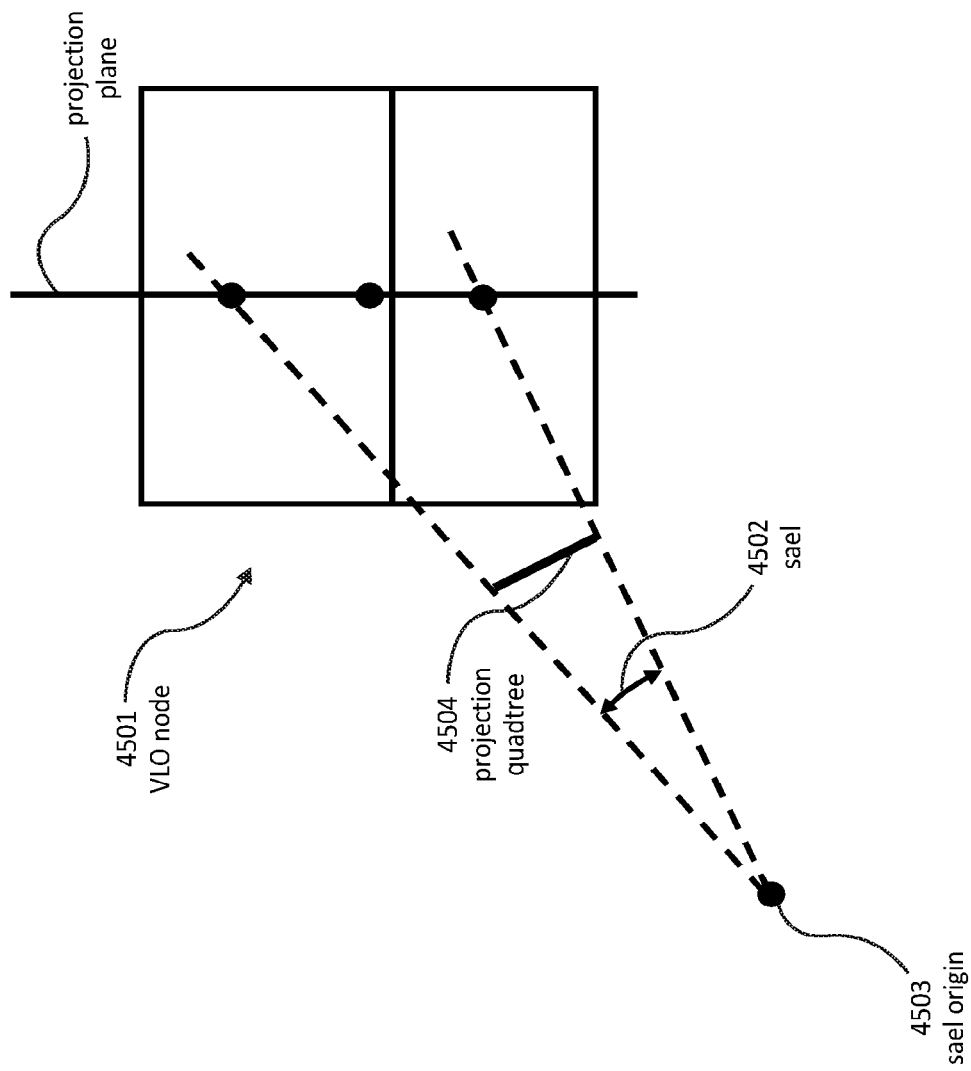
FIG. 45 is a geometric diagram that illustrated, in 2D, the use of a quadtree as a projection mask during a sael projection into a scene, according to some embodiments.

When a sael is subdivided, in some algorithms there is a need to keep track of the saels containing light that have been consumed (e.g., absorbed or reflected) by a matter-containing VLO node that it encounters. As with octree image generation a quadtree will be used to mark the "used" saels. This is illustrated in FIG. 45 where sael 4502 with an origin at 4503 is projecting on VLO node 4501. Quadtree 4504 (only edge shown) is used to keep track of saels in a saeltree that are not active or have been previously used, partially or completely.

Multiple processors could operate simultaneously on different saels. For example, 24 processors could each compute the projection of a different top sael and its descendants. This could place a major bandwidth demand on the memory holding the plenoptic octree, especially the VLO. The SLT center tree can typically be generated synthetically for each processor and the top saels and their descendants could be divided into separate memory segments but the VLO memory will be accessed from multiple sael processing units.

Figure 46:
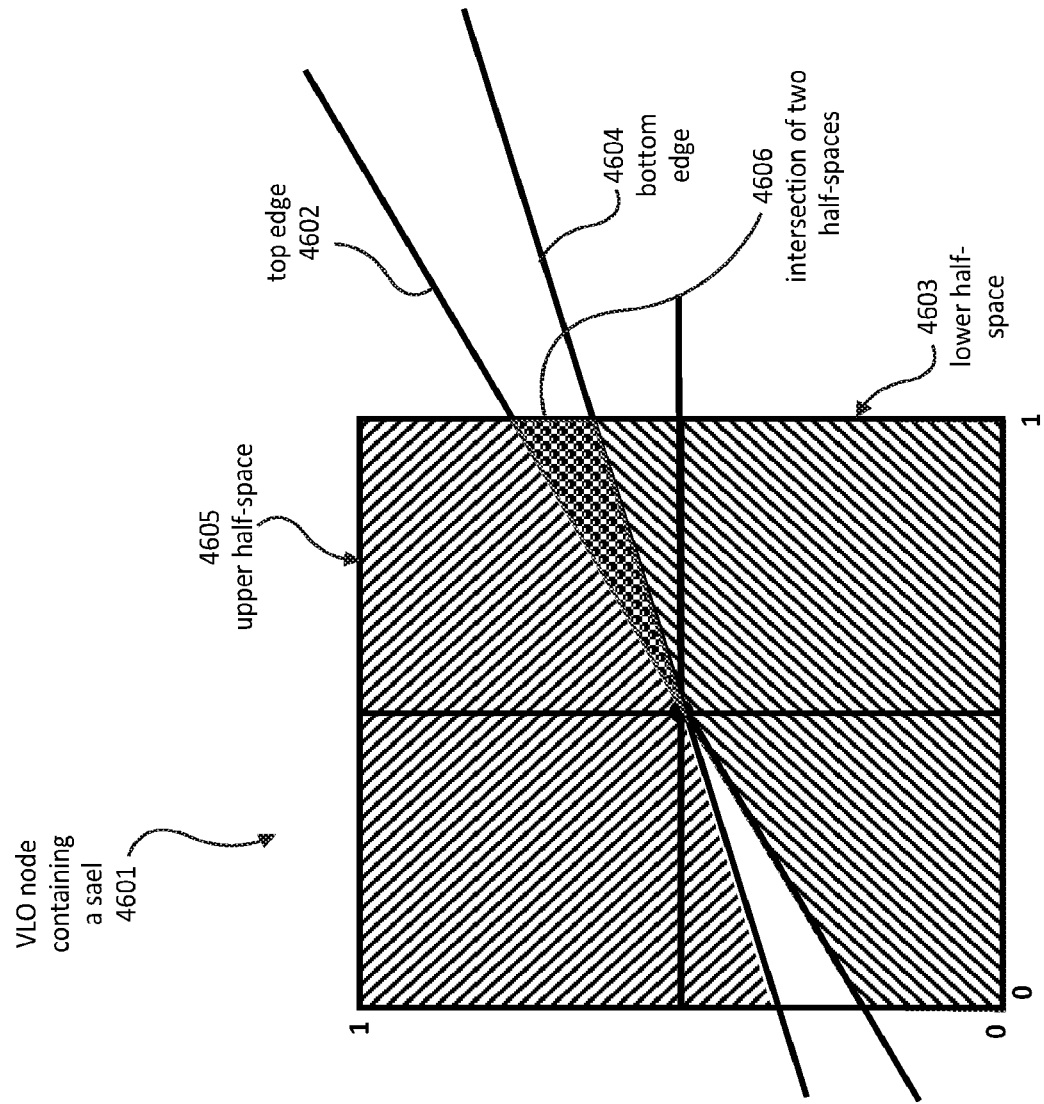
FIG. 46 is a geometric diagram that shows the construction of the volumetric space of a sael by the intersection of multiple half-spaces, according to some embodiments.

As noted above, the memory bandwidth requirement could be reduced using a set of half-space generators for each unit. As shown in FIG. 46 in 2D, half-space octrees would be generated locally (within each processor) for two edges (four planes in 3D) defining the sides of a sael. Edge 4602 is the top sael edge. The area below it is half-space 4603. Edge 4604 is the bottom edge which defines the upper half-space 4605. The space of the sael, in 2D, is the intersection of the two half-spaces 4606. In 3D, the volume of the sael is the intersection of four volume-occupying half-spaces.

Figure 47:
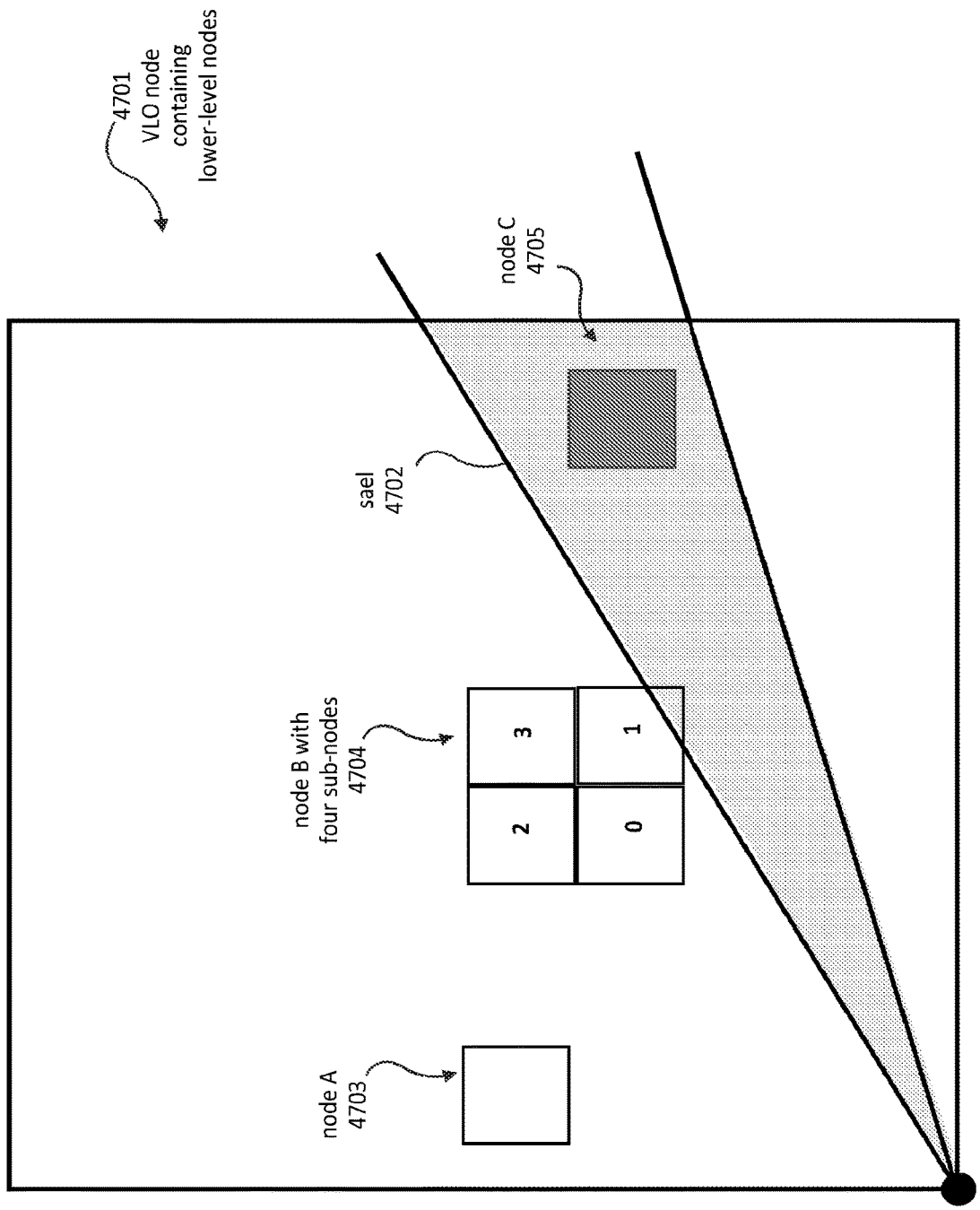
FIG. 47 is a geometric diagram that shows three intersection situations between a sael and three VLO nodes, according to some embodiments.

The local sael-shaped octree would then be used as a mask that would be intersected with the VLO. If a node in the locally-generated octree was empty, the VLO octree in memory would not need to be accessed. In FIG. 47 this is illustrated by an upper-level VLO node 4701 containing multiple lower-level nodes in its subtrees. Node A, 4703, is completely disjoint from the sael 4702 and need not be accessed. Sael 4702 occupies some of the space of node B, 4704. VLO memory would need to be accessed, but any of its child nodes such as 0, 2 and 3 are disjoint from the sael and memory access would thus not be needed. Node C 4705 is completely enclosed by the sael so it, and its descendant nodes, are required for processing. They would need to be accessed from VLO memory as needed. Memory access issues could be reduced by interleaving the VLO memory in eight segments corresponding to the 8 level 1 octree nodes and in other ways.

A "frontier" is here defined as the surface at the distance from a region in a plenoptic octree such that anything at an equal or greater distance will not exhibit parallax at any point within the region. Thus, the light coming from a specific direction does not change regardless of the location within that plenoptic octree region. For light coming from beyond the frontier, a single SLT for the entire plenoptic octree can be used. In operation, for a specified point the incident SLT is accumulated for the point from projecting outward. When all such illumination has been determined (all illumination from within the frontier), for any sael for which no such illumination is found, the sael from the frontier SLT is used to determine its properties. Illumination beyond the plenoptic octree but within the frontier can be represented by SLTs, for example, on the faces of the plenoptic octree (not a single SLT).

Figure 48:
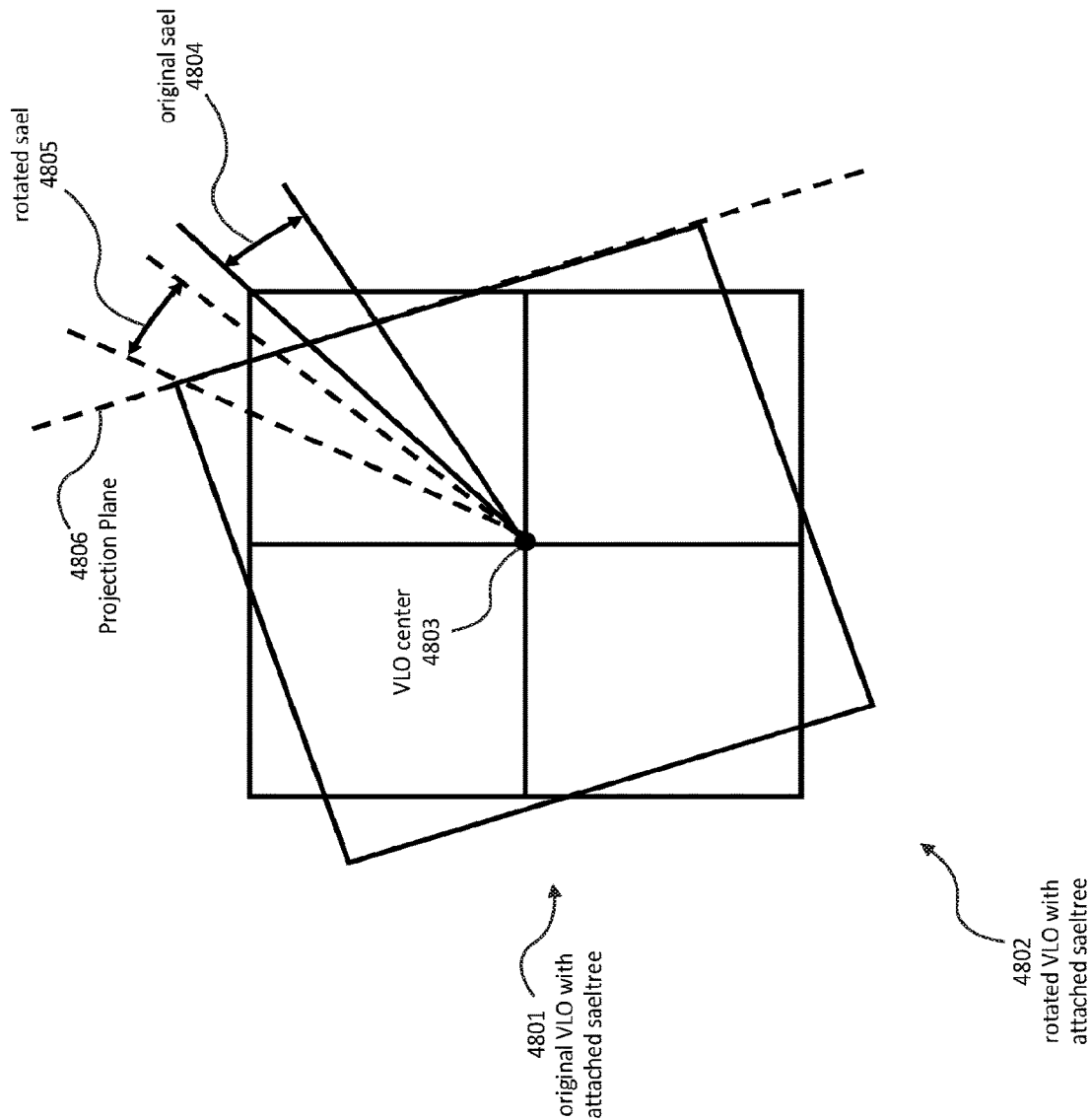
FIG. 48 is a geometric diagram that illustrates the rotation of a sael as part of the rotation of a saeltree, according to some embodiments.

In many operations such as computations using surface properties such as a BLIF, it may be important to rotate an SLT. This is illustrated in FIG. 48 in 2D and can be extended to 3D in a similar manner. 4801 is the original VLO node containing sael 4804. Node 4802 is the rotated VLO node containing the rotated version of 4804, sael 4805, generated from it. The two SLTs share the same origin which is VLO center point 4803. The algorithm generates a new, rotated sael and sub-saels from the original sael and sub-saels. This may be done for all saels in the original or, for example, a plenoptic mask, or simply "mask" as used here, may be used to block the generation of some saels in the new SLT, typically because they are not needed for some reason (e.g., from a surface point, directions into an opaque solid, directions not needed such as the BLIF for a mirror surface where some directions make little or no contributions to exitant light). Masks may also specify property values that are of interest (e.g., ignore saels with radiance values below some specified threshold value). As shown in the diagram, the faces of the new SLT surrounding cube (edges in 2D) become projection planes (lines in 2D) such as 4806. The spans in the new SLT are the projection of the original SLT saels.

Figure 49:
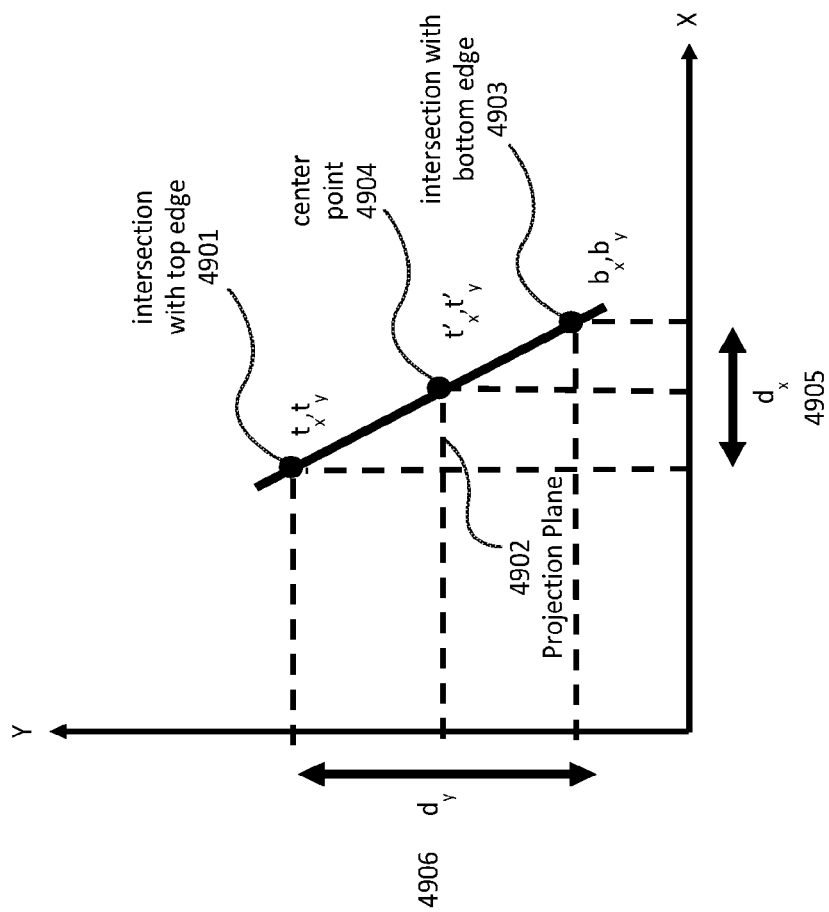
FIG. 49 is a geometric diagram that shows the geometric construction of the center point between sael edges with a projection plane during a saeltree rotation, according to some embodiments.

FIG. 49 shows point t $(t_x, t_y)$ 4901, the intersection point of the top edge of a new sael with rotated projection plane 4902. Likewise, point b (by, by) 4903 is the intersection of the bottom edge. They correspond to the end points of edge/face spans in the saels of the new SLT. They will begin at the ends or corners of the SLTs octree universe. They are then subdivided as needed. As shown, the center point 4904 will now become the new top point t' where:

$$t_x' = (t_x + b_x)/2 \text{ and}$$

$$t_y' = (t_y + b_y)/2$$

The distance in x between the top point and the bottom point is $d_x$ 4905 and divides by 2 with each PUSH. The change in y is $d_y$ 4906 and divides by two with each PUSH. The differences for each subdivision will be a function of the slope of the edge and will also divide by two with each PUSH. The task will be to track the saels in the original SLT that project on to the new saels as they are subdivided. At the bottom level (highest resolution in direction space), for nodes that are needed during processing, the property values in the original saels are used to compute a value for the new sael. This can be done by selecting the value from the sael with the largest projection or some weighted average or computed value.

Figure 50:
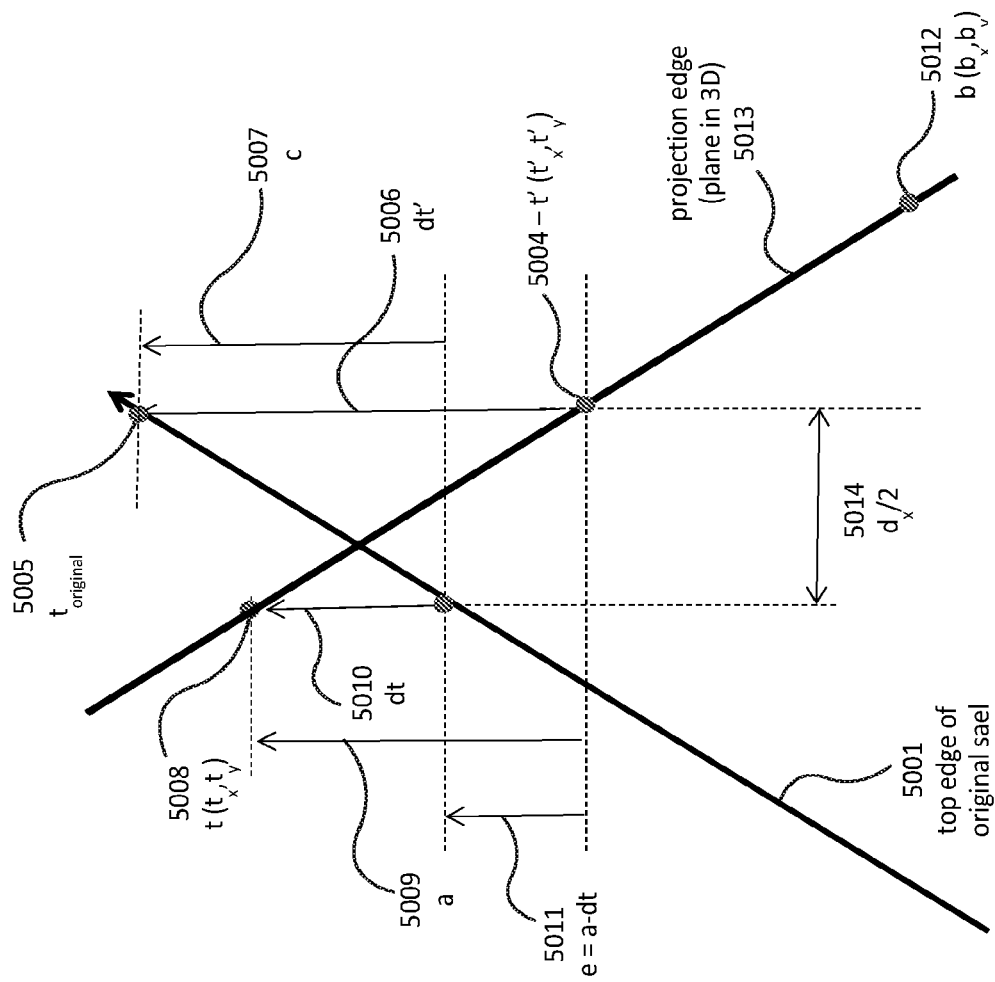
FIG. 50 is a geometric diagram that shows the geometric operations to execute the rotation of an edge when rotating a saeltree, according to some embodiments.

FIG. 50 illustrates how the span information is maintained. The original sael is bounded by top edge 5005 and a bottom edge (not shown). The distance, in y, from point t to $t_{original}$ is computed at the start and then maintained as subdivisions continue. This is $d_t$ 5010 in the diagram. There is also an equivalent distance, in y, from the point b to point $b_{original}$ (not shown). The purpose of the computation is to compute the distance of the new point t, or point b, to the associated original edge. This is a new top point, t' 5004, in the diagram. An equivalent method can be used to handle the generation of the bottom distance for a point b'.

The computation deals with two slopes, the edge of the original sael and the slope of the projection edge (plane in 3D). In either case, the distance change in y for a step in x, $d_x/2$, 5014 in this case, is a value that is determined by the slope and divides by two with each PUSH. These two values can be maintained in shift registers. The values are initialized at the start and then shifted as needed during PUSH and POP operations.

As illustrated in the diagram, the new offset distance dt' 5004, can be computed by first determining the movement along the projection edge for a step of $d_x/2$, 5014, or the value of "a" 5009, in this case. This can then be used to determine the distance from the new top point, t', to the original vertical intersection point with the original top edge. This is the "e" 5011 value in the diagram and is equal to a−dt. The other part is the distance, in y, from the original intersection point on the top edge of the original sael to the new intersection point on the top edge. This distance is the edge slope times $d_x/2$ or "c" 5007 in the diagram. The new distance, dt' 5006, is thus the sum e+c.

When extending this to 3D, the slope information in the new dimension needs to be used to compute additional values for steps in the z direction, a straightforward extension of 2D SLT rotation.

SLTs are hierarchical in that the higher level nodes represent directions for a larger volume of space than their descendants. The SLT center of a parent node is within this volume but will not, in general, coincide with the center of any of its children. If the SLT is generated from, say, an image, a quadtree can be generated for the image. It can then be projected on to an SLT at the node centers at multiple levels of resolution.

In other cases the upper levels are derived from lower levels. SLT reduction is the process used to generate the values for higher-level saels from the information contained in lower-level saels. This could be generating average, minimum and maximum values. In addition, a measure of the coverage can be computed (e.g., percentage of direction space in sub-saels that have values) and possibly accumulated. In some implementations one or more "characteristic vectors" can be used. They are the directions in which some property of the sael is spatially balanced in some sense.

It is often assumed that the SLT is on or near a locally-planar surface. If known, the local surface normal vector can be represented for the SLT, as a whole, and can be used to improve the values in the reduction process.

In some situations, especially where the illumination gradients are large, an improved reduction process would be to project the lower-level saels on to a plane (e.g., parallel to the know plane of the surface through the SLT space) or surface, filter the result on the surface (e.g., interpolating for the center of the larger parent sael) and then project the new values back on to the SLT. Machine Learning (ML) could be employed to analyze the illumination, based on earlier training sets, to improve the reduction process.

The exitant SLT for a point in space that represents a volumetric region containing matter that interacts with light can be assembled from light field samples (e.g., images). If there is sufficient information to determine the illumination in a variety of directions it may be possible to estimate (or "discover") a BLIF for the represented material. This can be facilitated if the incident SLT can be estimated. ML could be used in BLIF discovery. For example, "images" containing sael illumination values for an SLT in a 2D array (two angles) could be stacked (from multiple SLTs) and used to recognize the BLIF.

SLT interpolation is the process of determining the value for an unknown sael based on the values in some set of other saels of an SLT. There are a variety of methods in which this can be done. If a BLIF is known, can be estimated or can be discovered, this can be used to intelligently estimate an unknown sael value from other saels.

Light sources can often be used to represent real or synthetic illumination. An ideal point light source can typically be represented by a single SLT, perhaps with uniform illumination in all directions. An enclosed point light source or directional light source can be represented by using a mask SLT to prevent illumination in blocked directions. Parallel light sources can be represented using a geometric extrusion of "illumination" to generate an octree. The extrusion could, for example, represent an orthogonal projection of a non-uniform illumination (e.g., image).

Figure 51:
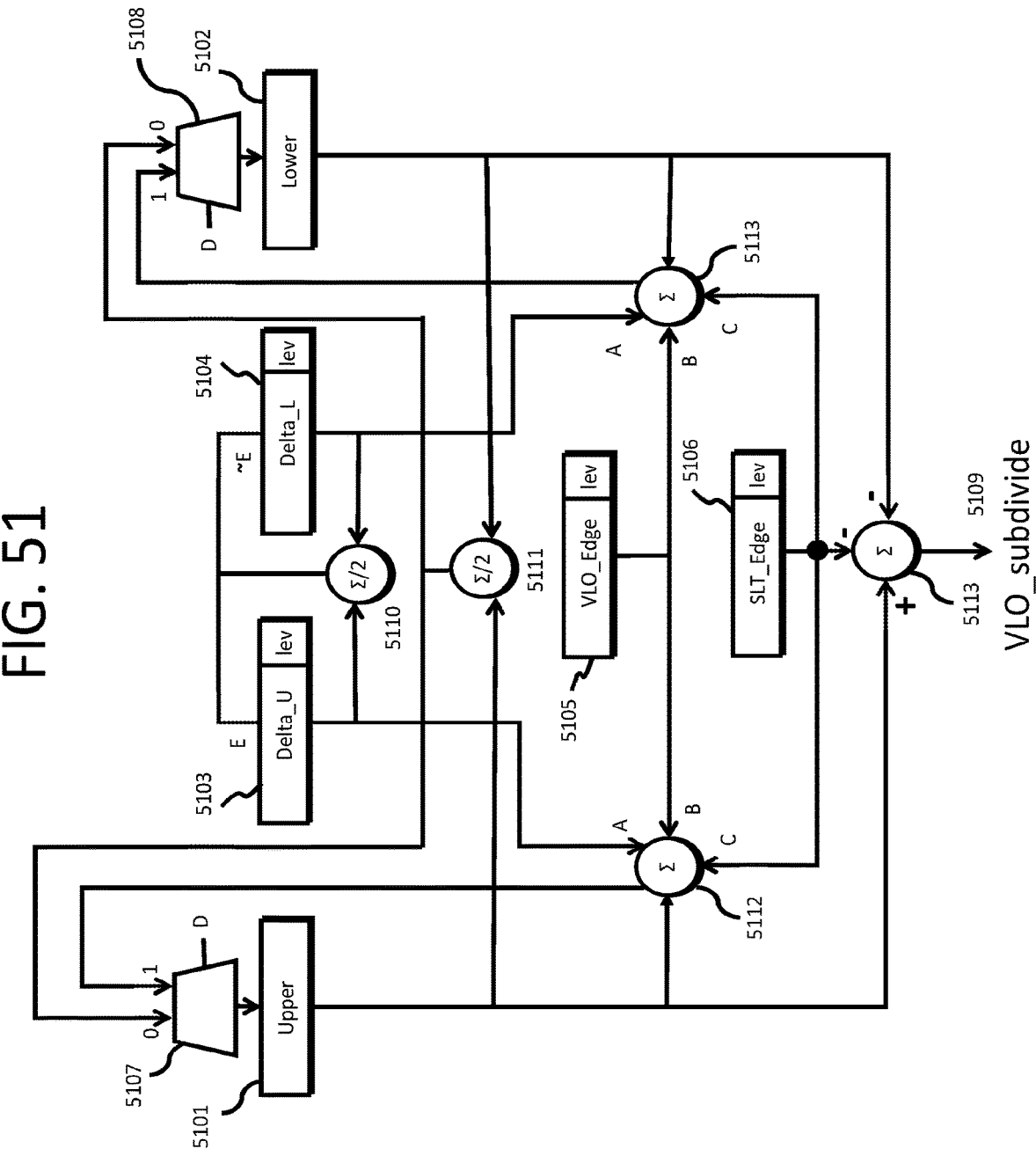
FIG. 51 is a schematic diagram that shows the computation of the geometric relationship between a sael and a projection plane when the sael origin node, the projection plane's VLO node or the sael is PUSHed, according to some embodiments.

A possible plenoptic octree projection processor is shown in FIG. 51. It implements the projection of SLTs on to VLO nodes in a plenoptic octree. Three PUSH operations can occur, PUSH Center (PUSH the center of the SLT to a child node), PUSH VLO (PUSH the VLO node to a child node) and PUSH Sael (PUSH a parent sael to a child). POP operations are not explicitly included here. It is assumed that all of the registers are PUSHed on to a stack at the beginning of each operation and are simply POPed off. Alternately, only the specific PUSH operations (not the values) can be stored in a stack and undone to perform a POP by reversing PUSH computations.

The processor is used for a "top" sael to be projected toward the face at x=1. This unit performs the projection calculations in the x-y plane. A duplicate unit will compute calculations in the y-z plane.

To simplify operation, all SLT Center PUSH operations will be performed first to place the SLT into its location (while maintaining the projection geometry). The two Delta registers will be reinitialized and then VLO PUSH operations will be performed. Then SLT PUSH operations are performed. These operations can be performed simultaneously by, for example, duplicating the Delta registers.

The Upper register 5101 maintains the y location of the upper plane of the projection sael on the projection plane (parallel to face 1 in this case). Lower register 5102 maintains the y location of the lower plane. The Delta shift registers hold the slope values, Delta_U 5103 for the upper plane and Delta_L 5104 for the lower plane. They have "lev" (for level) bits to the right, a sufficient number to maintain precision when POP operations are executed after PUSHes to the lowest possible level. The Delta registers are initialized with slope of the associated plane in the x-y plane. It contains the change in y for a step in x of 1. For each PUSH (SLT Center or VLO) it is shifted to the right by 1. It thus becomes the change in y for a step to the child node in the x direction.

The Edge shift registers maintain the distance of the edge of the VLO node. They are VLO_Edge 5105 for the edge of a node during the VLO traversal. SLT_Edge 5106 is for the VLO node during the traversal to locate the sael in the plenoptic octree. The two will typically be at different levels in the VLO. The Edge registers also have "lev" bits to the right to maintain precision. The other elements are selectors (5107 and 5108) plus five adders (5110, 5111, 5112, 5113, and 5114). The selectors and adders are controlled by signals A to D according to rules below. The result is the VLO subdivide signal 5109.

The operation of the SLT projection unit can be implemented in many ways. For example, if the clock speed in a particular implementation is sufficiently low, instances of the processor may be duplicated in a series configuration to form a cascade of PUSH operations that can perform multiple level movements in a single clock cycle.

Figure 52:
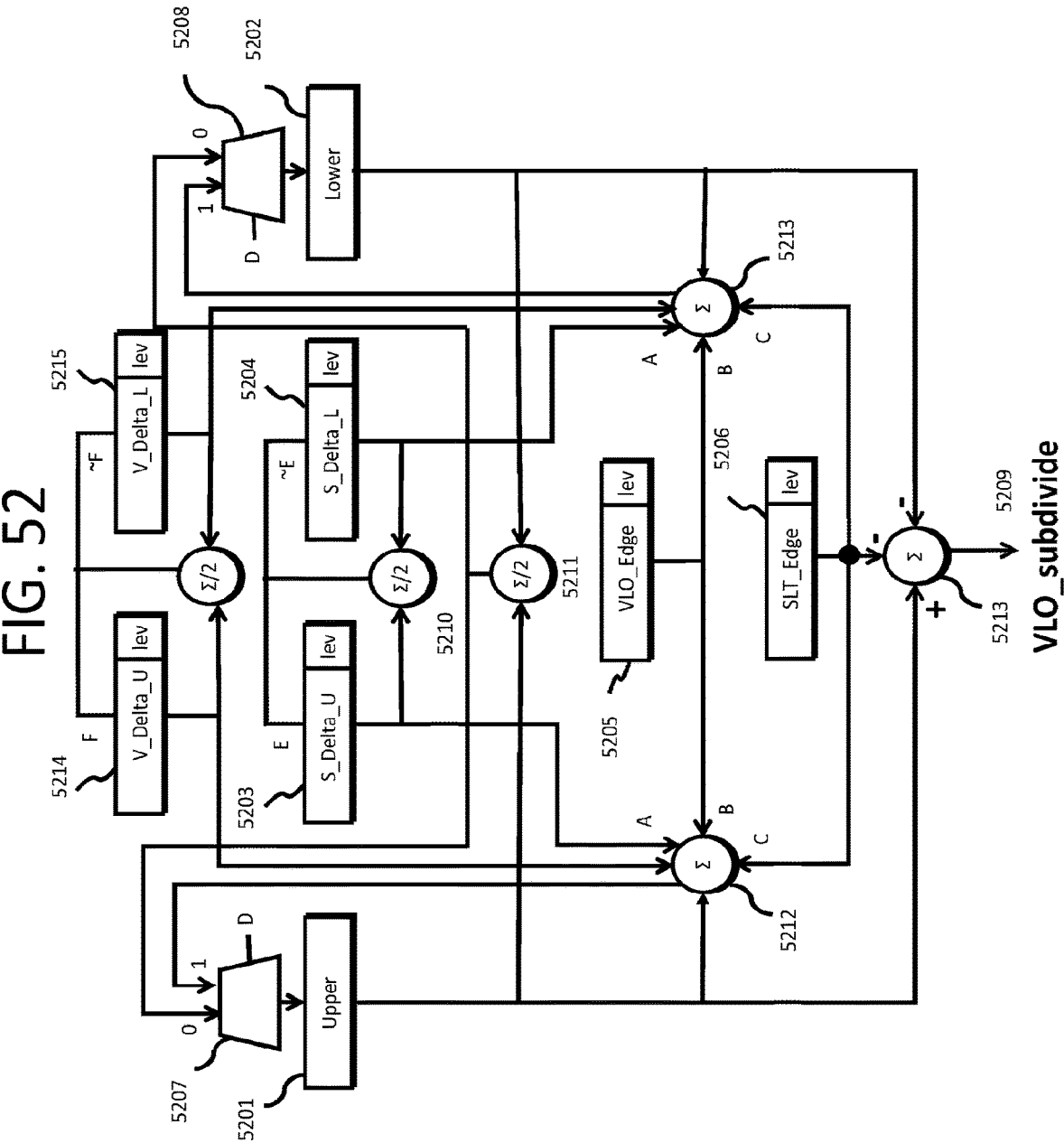
FIG. 52 is a schematic diagram that shows the computation of the geometric relationship between a sael and a projection plane when the sael origin node, the projection plane's VLO node or the sael is PUSHed, where the sael origin and the projection plane's VLO node are PUSHed simultaneously, according to some embodiments.

An alternative design is shown in FIG. 52 so that VLO and SLT PUSH operations can be performed simultaneously. Two new Delta registers are added, V_Delta_U 5214 (for VLO Delta, Upper) and V_Delta_L 5215 for the VLO deltas. The delta registers in FIG. 51 are now used only for SLT push operations. They are now S_Delta_U 5203 and S_Delta_L 5204.

Figure 56:
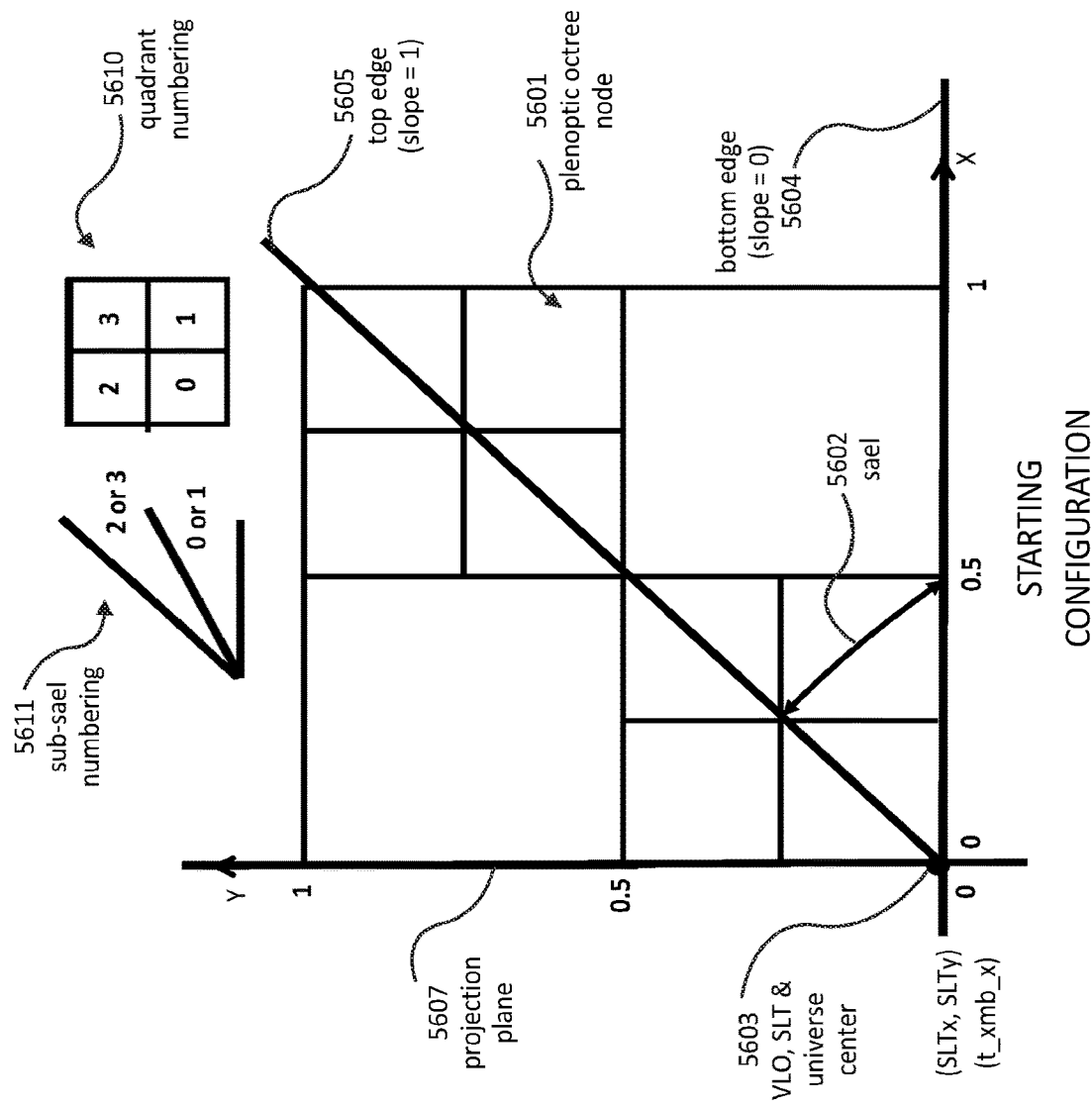
FIG. 56 is a geometric diagram that shows the starting geometric relationships at the beginning of the sequences of PUSH operations tabulated in FIG. 53 and FIG. 54.

The starting situation for the processor in FIG. 51 is shown in FIG. 56. The top sael 5602 is at the origin of the universe 5603 (0,0). The projection plane, parallel to face 1, intersects the same point and its origin is at the same point. Note the quadrant child numbering 5610 and the sub-sael numbering 5611.

The registers are initialized as follows:
Upper=Lower=0 (both the upper edge and lower edge intersect the projection plane at the origin.
Delta_U=1 (upper edge slope=1)
Delta_L=0 (lower edge slope=0)
VLO_edge=SLT_edge=1 (both start at the edge distance of a level 1 node)
The projection unit operates as follows:
SLT Center PUSH
Shift SLT_edge and Delta_U to the right one bit
For SLT child 0 or 2: A is +; else −
For SLT child 0 or 1: C is −; else +

B is 0
D is 1
E is no-load (the Delta_U and Delta_L registers do not change)
VLO Node PUSH
  Shift VLO_Edge and Delta_U to the right one bit
  For VLO child 0 or 2: A is −; else +
  For VLO child 0 or 1: B is +; else −
  C is 0
  D is 1
  E is no-load
SLT Sael PUSH
  New sael is upper: D is 1; else 0
  E is load It may be desirable to locate the center of an SLT at a point other than the center of a plenoptic node. This could, for example, be used to locate the representative point to specific point of some underlying structure rather than the center of the local cubical volume in space represented by the node. Or it could be a specific location for a point light source.

This can be done by incorporating the SLT location into the initialization of the projection processor. This is simplified because the upper slope starts at 1 and the lower at 0. Thus, the initial top projection plane intersection will be at y will be the y value of the sael center minus the x value. The bottom value will be the y value of the sael center.

The projection calculations then proceed as before. It would be possible to add in shifted values of the offsets with the final PUSH to the node center of the SLT but this would generally not be desirable, at least not when SLT center PUSHes and VLO PUSHes occur simultaneously. The span values are used to select the next SVO child to visit so the correct span is needed during the VLO traversal.

The register values for a number of PUSHes of the three types are contained in the Excel spreadsheet in FIG. 53 and FIG. 54. The two offset values in row 5 are set to 0 to simplify the calculations. The Excel formulas used are presented in FIG. 55 (with rows and columns reversed for readability). Offset values are located in row 5 (F5 for x, H5 for y).

The spreadsheet values are in a floating-point format for clarity with the geometric diagrams. In an actual processor the registers could be scaled integers using only integer operations. The spreadsheet columns are as follows:
  A. Iteration (The sequential number of PUSH operations.)
  B. SLT PUSH (The SLT Center child node being PUSHed to.)
  C. VLO PUSH (The VLO child node being pushed to.)
  D. Sael PUSH (The sael child being pushed to.)
  E. SLT To Lev (The new level of the SLT location after PUSH.)
  F. VLO To Lev (The new level of the VLO node after PUSH.)
  G. Sael To Lev (The new level of the Sael after a PUSH.)
  H. SLT Edge (The size of a node in the octree used to locate the center of the SLT.
  I. SLT Step x (The current step, in x, of a PUSH to the child when locating the SLT center point. Depends on child number.)
  J. SLT Step y (The current setp, in y, of a PUSH to the child when locating the SLT center point. Depends on child number. The magnitude is the same as SLT Step x except sign depends on the child number being pushed to.)
  K. SLTx (The x location of the current center of the node being used to locate the SLT.)
  L. SLTy (The y location of the current center of the node being used to locate the SLT.)
  M. VLO Edge (The length of the current node, during PUSH, in the VLO.)
  N. VLO Step x (The current step size, in x, for a move to a VLO child node. Sign depends on child number.)
  O. VLO Step y (The current step size, in y, for a move to a VLO child node. Magnitude identical to VLO Step x in this implementation but sign depends on child number.)
  P. VLO x (The location, in x, of the center of the VLO node.)
  Q. VLO y (The location, in y, of the center of the VLO node.)
  R. TOP Slope (The slope of the top (upper) edge of the sael. NOTE: This is the actual slope, not the value for the current x step size.)
  S. BOT Slope (The slope of the bottom (lower) edge of the sael. Note: This is the actual slope, not the value for the current x step size.)
  T. t_y (The top (upper) y value for the endpoint of the span on the projection plane.)
  U. b_y (The bottom (lower) y value for the endpoint of the span on the projection plane.)
  V. comp_t_y (The value of t_y computed independently for comparison to t_y.)
  W. comp b_y (The value of b_y computed independently for comparison to b_y.)
  X. Notes (Comments on the iteration.)

The initialization values in the first column ("(start)" in the first column). The values are as listed above (and shown in FIG. 56*n*). It is then followed by 14 iterations of PUSH operations involving the SLT center, the VLO and the SLT saels. The first seven iterations are shown geometrically in FIGS. 56 to 63.

The first two iterations will be SLT PUSHes followed by two VLO PUSHes and then two sael PUSHes. This is then followed by two VLO PUSHes (iterations 7 and 8), one SLT PUSH (iteration 9) and, finally, a VLO PUSH.

Figure 57:
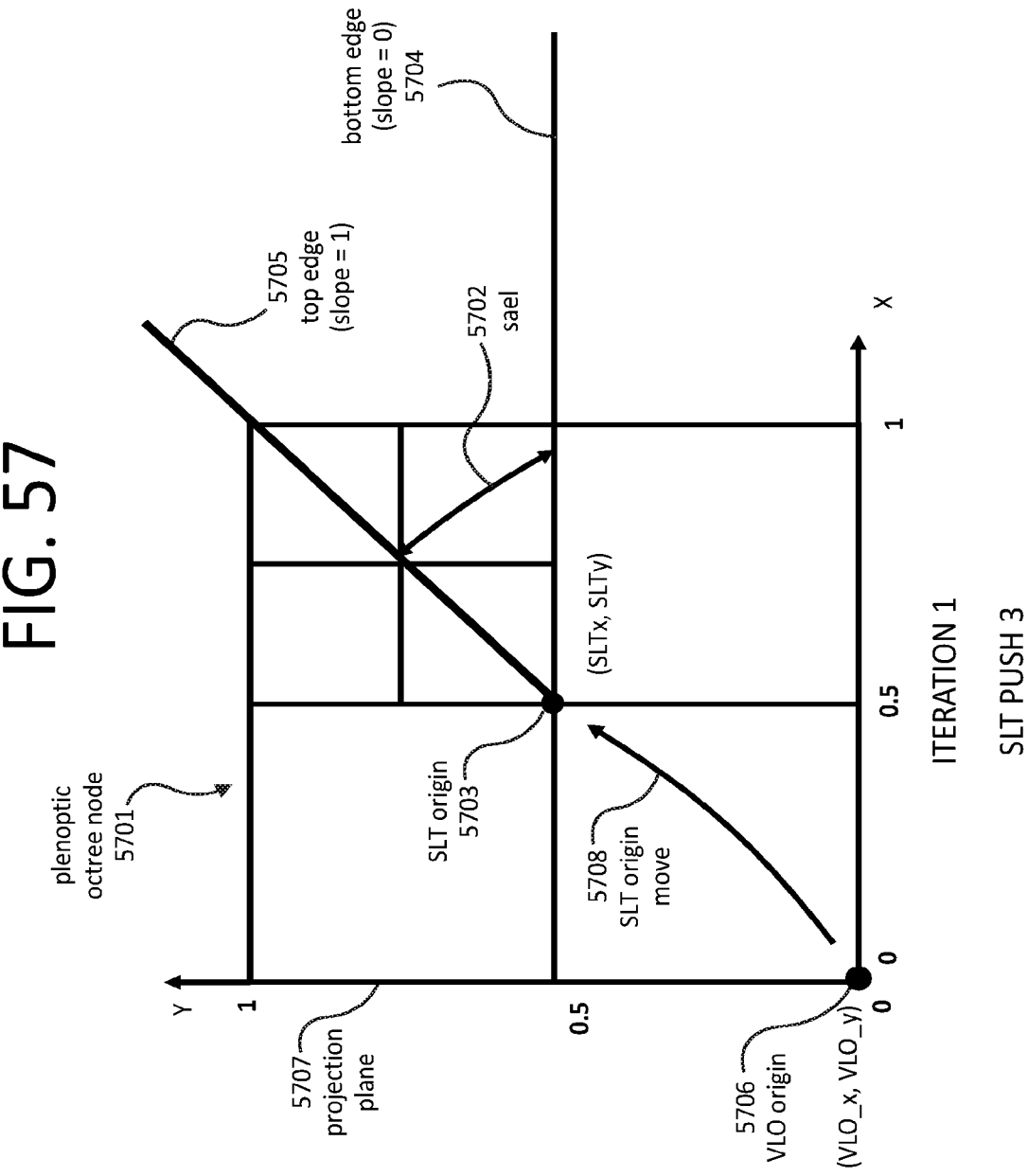
FIG. 57 is a geometric diagram that shows the geometric relationship between a sael and its projection on a projection plane after iteration #1 shown in the spreadsheet of FIG. 53 and FIG. 54 (sael origin SLT node PUSH to child 3), according to some embodiments.

The result of iteration 41 is shown in FIG. 57, an SLT PUSH from the VLO root to child 3. In Level 1 VLO node 5701 the sael 5702 is moved from the VLO's origin 5706 to the center of child 3 at level 2, point 5703. The new sael origin's location at (0.5, 0.5). The projection plane 5707 remains in the same place and the slopes remain unchanged (0 for bottom edge 5704 and 1 for top edge 5705).

Figure 58:
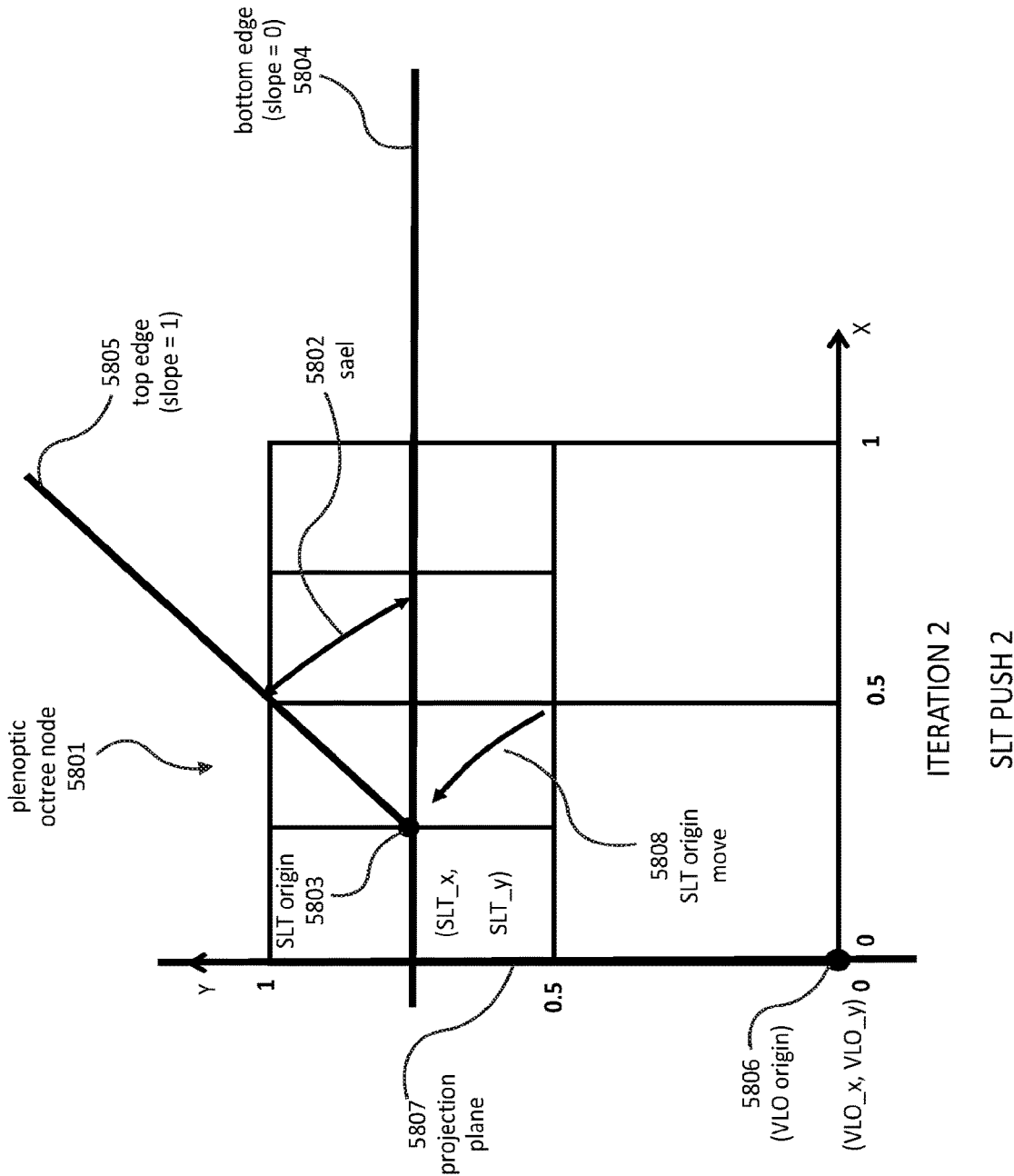
FIG. 58 is a geometric diagram that shows the geometric relationship between a sael and its projection on a projection plane after iteration #2 shown in the spreadsheet of FIG. 53 and FIG. 54 (sael origin SLT node PUSH to child 2), according to some embodiments.

Iteration #2 is shown in FIG. 58, an SLT PUSH to child 2. This is similar to the last operation except that it is to child 2 at level 2 so, in addition to a different direction, the step is half the previous distance. In node 5801, the sael 5802 is moved to point 5803 at (0.25, 0.75). The slope of the bottom edge 5804 remains 0 and the slope of top edge 5805 remains at 1. Projection plane 5807 remains in the same location. The top edge intersection with the projection plane is below the bottom intersection (not shown in diagram). The sael is thus not actually intersecting the projection plane at this time and the projection is inactive.

Figure 59:
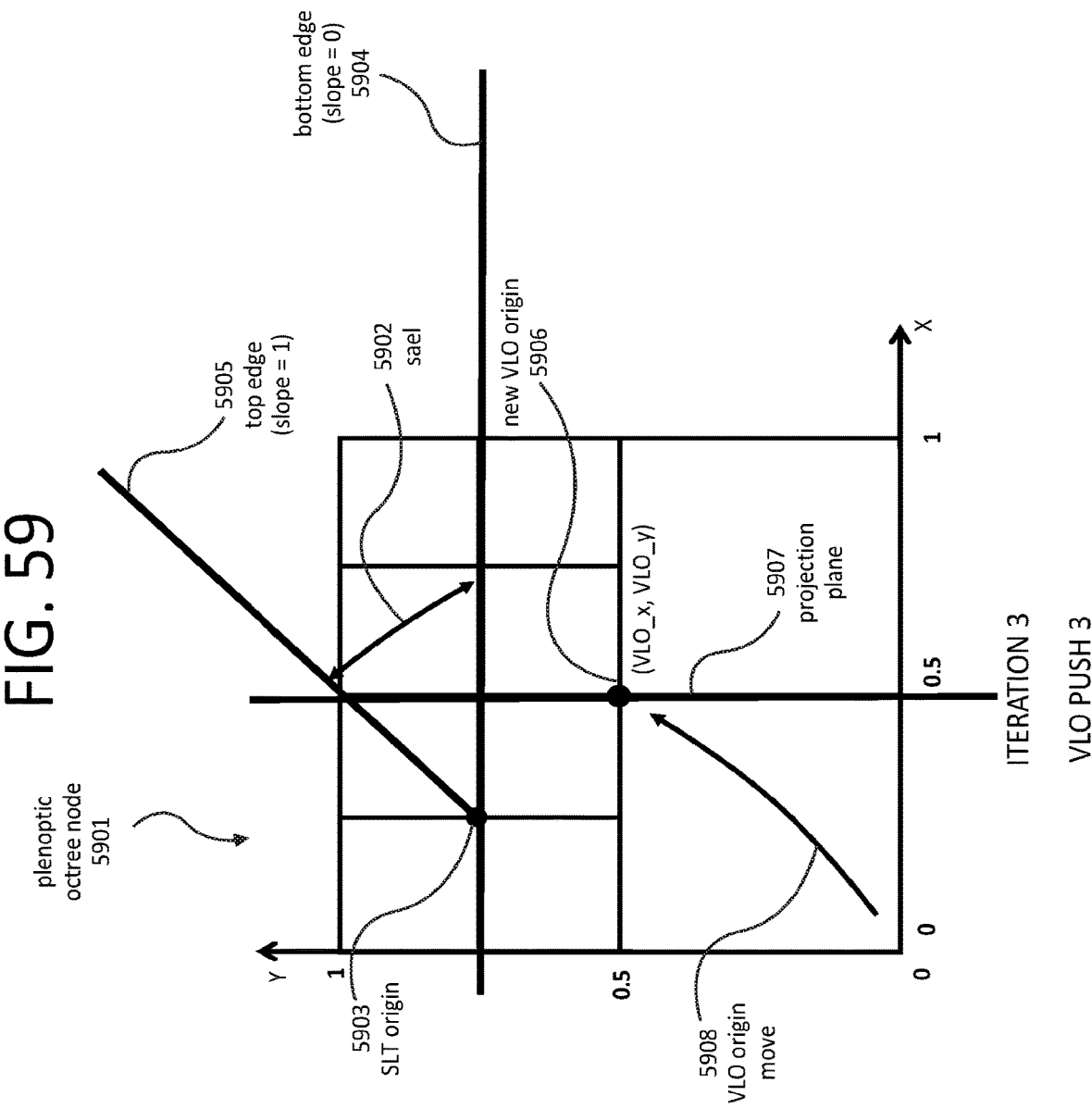
FIG. 59 is a geometric diagram that shows the geometric relationship between a sael and its projection on a projection plane after iteration #3 shown in the spreadsheet of FIG. 53 and FIG. 54 (projection plane VLO node PUSH to child 3), according to some embodiments.

Iteration #3 is a VLO PUSH from the root VLO node to child 3 (level 1). It is shown in FIG. 59. In VLO node 5901, sael 5902 does not move. But the projection plane 5907 moves from the center of the VLO root node to the center of child 3 at level 1, point 5906. Note that the origin of the projection plane now moves to this point, the center of child 3. The intersections of the edges of 5902 with the projection plane are recomputed because of the movement of the projection plane and the change of its origin.

Figure 60:
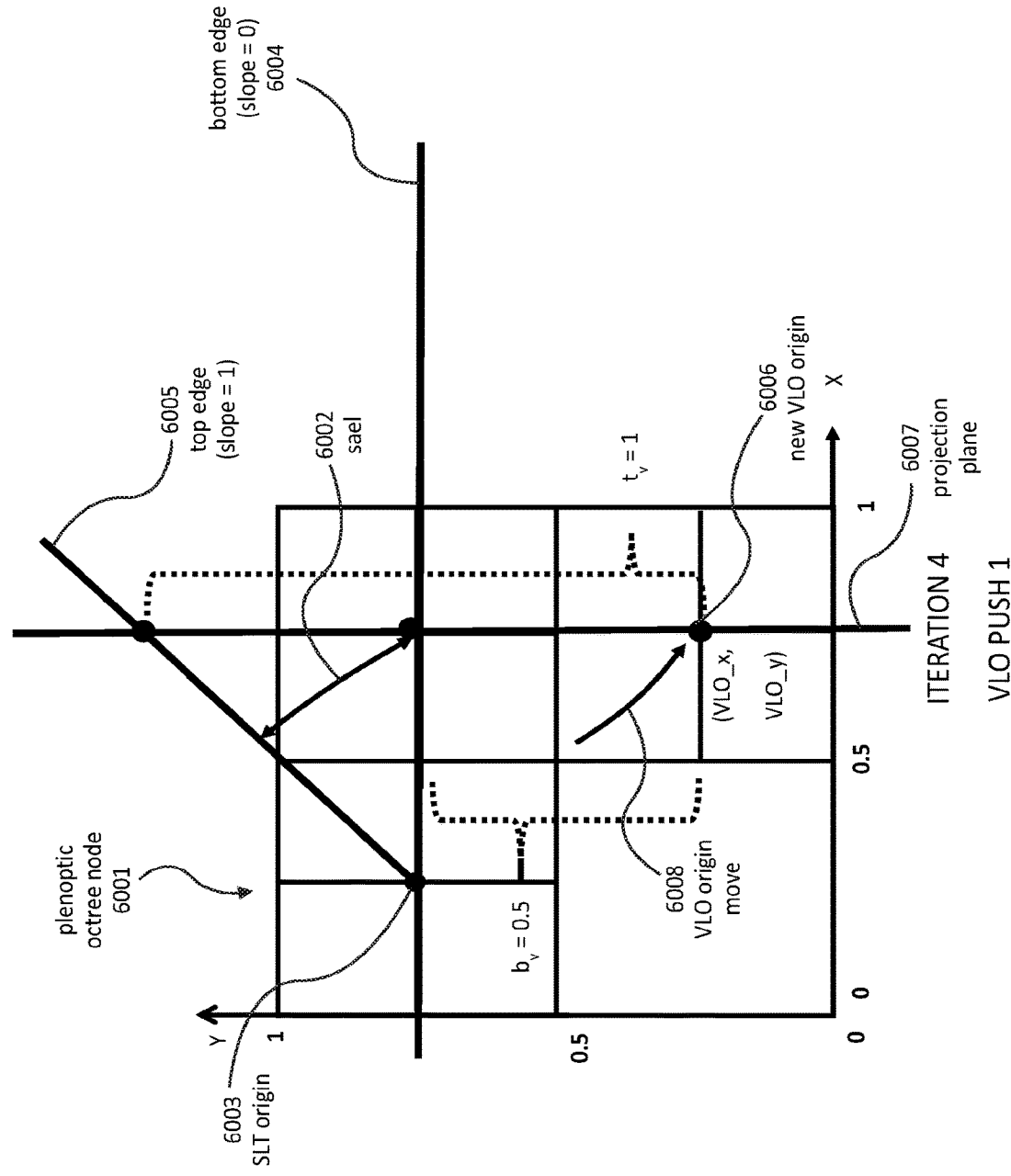
FIG. 60 is a geometric diagram that shows the geometric relationship between a sael and its projection on a projection plane after iteration #4 shown in the spreadsheet of FIG. 53 and FIG. 54 (projection plane VLO node PUSH to child 1), according to some embodiments.

Iteration #4 is shown in FIG. 60. It is a VLO PUSH to child 1. Sael 6002 does not move but the projection plane 6007 moves and therefore the intersection of the bottom edge 6004 and the top edge 6005 must be recomputed. The projection plane moves in +x with a new origin at 6006. The slopes of the edges are not changed.

Figure 61:
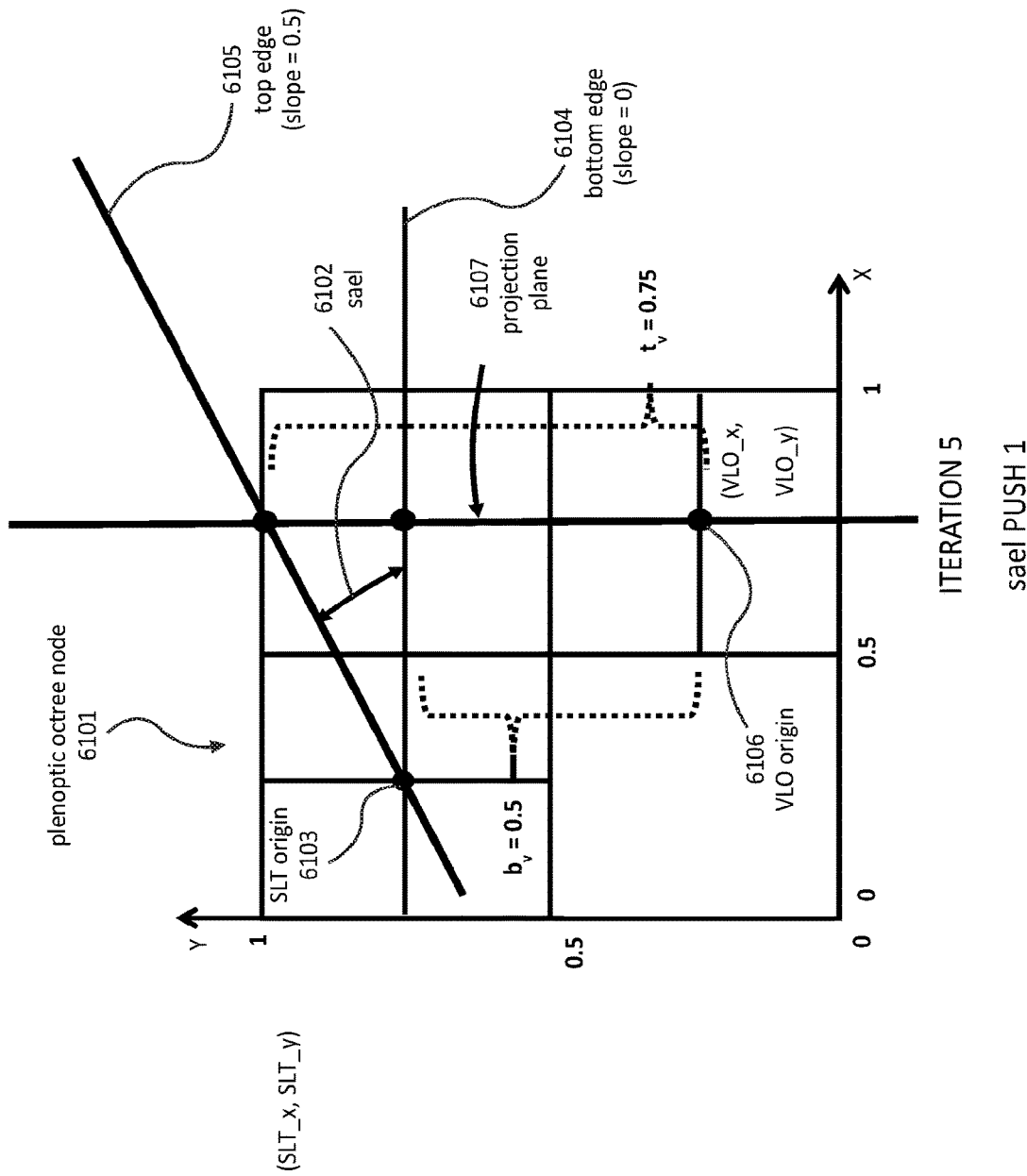
FIG. 61 is a geometric diagram that shows the geometric relationship between a sael and its projection on a projection plane after iteration #5 shown in the spreadsheet of FIG. 53 and FIG. 54 (sael PUSH to child 1), according to some embodiments.

FIG. 61 illustrates Iteration #5, a sael PUSH to child 1. The origin of sael 6102 does not change but it is divided into two sub-saels of which the lower one is to be retained. Bottom edge 6104 remains the same but the new top edge 6105 moves so its intersection with the projection plane is half way between the previous top and bottom intersections or a distance of 0.75 from the projection plane origin. The bottom distance remains at 0.5. The bottom slope remains at 0 while the top slope is reduced to the average slope, 0.5.

Figure 62:
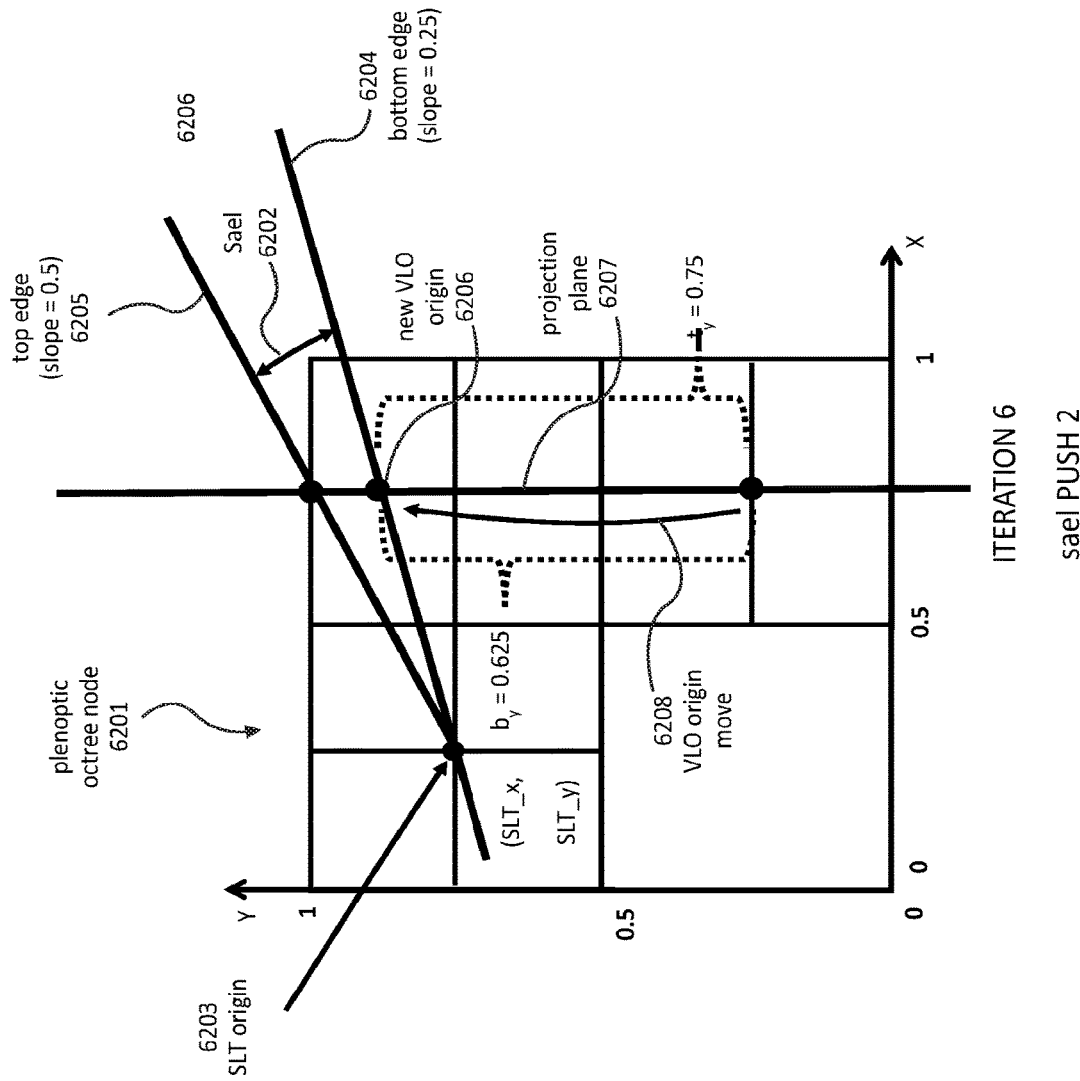
FIG. 62 is a geometric diagram that shows the geometric relationship between a sael and its projection on a projection plane after iteration #6 shown in the spreadsheet of FIG. 53 and FIG. 54 (sael PUSH to child 2), according to some embodiments.

Iteration #6 is shown in FIG. 62. It is a sael PUSH to child 2. Again, sael 6202 is divided into two sub-saels with the upper one being retained. Thus, the top edge remains the same with the same slope. The bottom edge moves up, away from the origin of the projection plane and its slope is reset to the average of 0 and 0.5 or 0.25.

Figure 63:
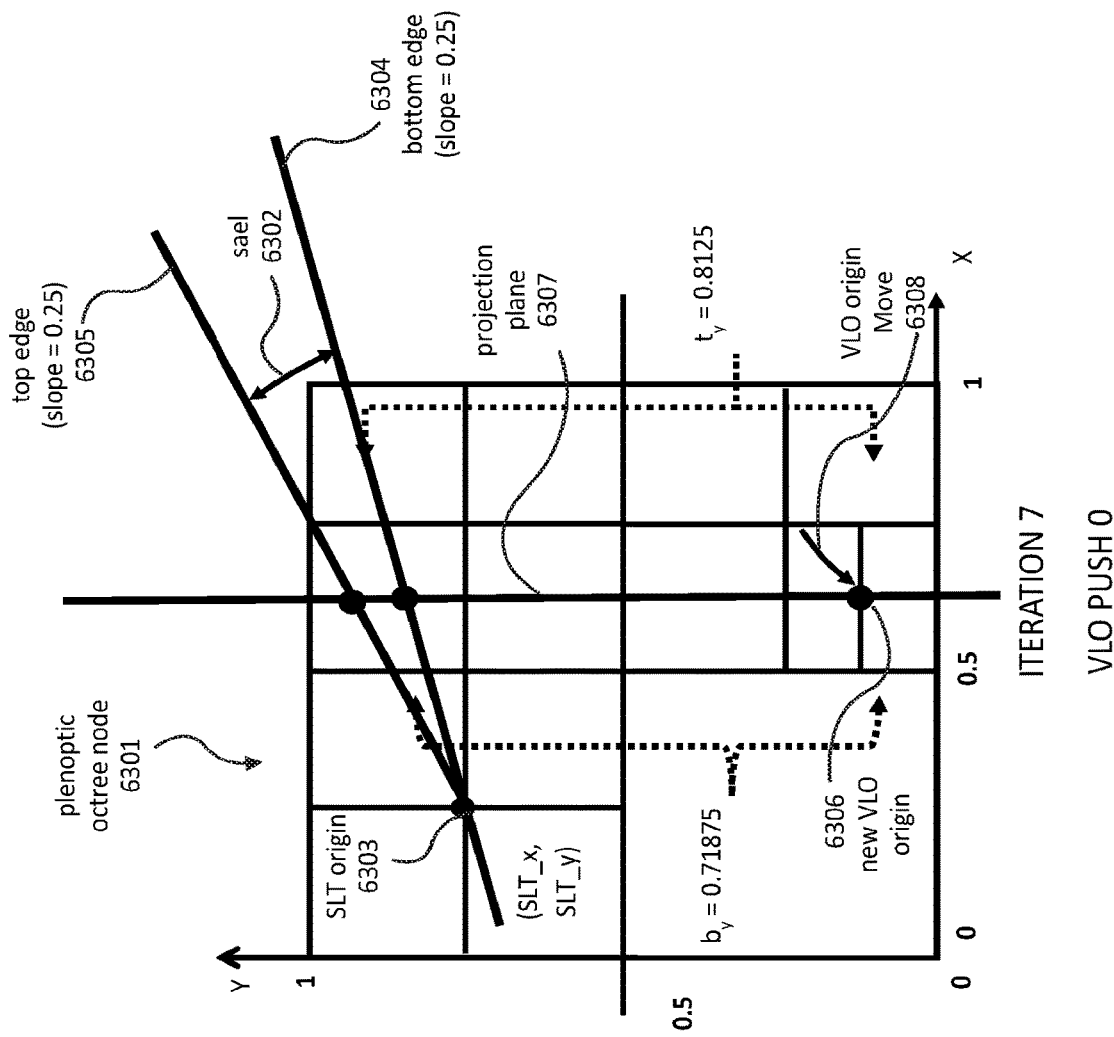
FIG. 63 is a geometric diagram that shows the geometric relationship between a sael and its projection on a projection plane after iteration #7 shown in the spreadsheet of FIG. 53 and FIG. 54 (projection plane VLO node PUSH to child 0), according to some embodiments.

Iteration #7 is shown in FIG. 63. The operation is a VLO push to child 0. The projection plane moves in the −x direction and its origin moves in the −x and −y directions. Sael 6302 remains in the same location and the edges are unchanged except the intersection points with the projection plane are changed to accommodate the move.

The Excel spreadsheet simulation was rerun with SLT center offsets set to non-zero values (in row 5, 0.125 for the x offset value in cell F5 and 0.0625 for yin H5). The results are shown in the spreadsheet in FIG. 64 and FIG. 65.

Volumetric techniques are used to represent matter, including objects, within a scene, VLOs. They are also used to represent light in the scene (the light field) using SLTs. As described above, the information needed for high-quality visualizations and other uses can be acquired from real-world scenes using Scene Reconstruction Engines (SREs). This can be combined with synthetically generated objects (generated by SPU shape conversion module 3007) to form composite scenes. The technique in some example embodiments uses hierarchical, multi-resolution and spatially-sorted volumetric data structures for both matter and light and for their interactions in the SPU 3001. This allows for the fast identification of the parts of a scene that are needed for remote use based on location, resolution, visibility and other characteristics as determined by, for example, each user's location and viewing direction or statistically estimated for groups of users. In other cases, an application may request subsets of the databased based on other considerations. By communicating only the necessary parts, channel bandwidth requirements are minimized. The use of volumetric models also facilitates advanced functionality in virtual worlds such as collision detection (e.g., using the set operations module 3003) and physics-based simulations (e.g., mass properties that are readily computed by the mass properties module 3019).

Depending on the application, it may be desirable to combine the matter and light-field models generated separately by an SRE, or by multiple SREs, into a composite scene model for remote visualization and interaction by, for example, one or more users (e.g., musicians or dancers placed into a remote arena). Since lighting and material properties are modeled, the illumination from one scene can be applied to replace the illumination in another scene, insuring that the viewer experiences a uniformly-lit scene. The light-field operations module 3023 can be used to compute the lighting while image generation module 3009 generates images.

A scene graph or other mechanism is used to represent the spatial relationships between the individual scene elements. One or more SREs may generate real-world models that are saved in the plenoptic scene database 1A07. In addition, other real-world or synthetic spatial models represented in other formats (not plenoptic octrees) are stored in the database. This can be just about any representation that can be readily converted into the plenoptic octree representation by the shape-conversion module 3007. This includes polygonal models, parametric models, solid models (e.g., CSG (Constructive Solid Geometry) or boundary representation) and so on. A function of SPU 3001 is to perform the conversion one time, or multiple times if the model changes or requirements change (e.g., a viewer moves closer to an object and a higher resolution conversion is needed).

In addition to light field and material properties, an SRE can also discover a wide variety of additional characteristics in a scene. This could be used, for example, to recognize the visual attributes in the scene that could be used to enable a previously acquired or synthesized model for incorporation into a scene. For example, if a remote viewer visually moved too close to an object, requiring a higher resolution than was acquired by the SRE from the real world (e.g., a tree). An alternative model (e.g., parametric tree bark) could be smoothly "switched in" to generate higher-resolution visual information for the user.

The SPU modules in 3001 can be used to transform and manipulate the models to accomplish the application requirements, often when the scene graph is modified by the application program such as in response to user requests. This and other SPU spatial operations can be used to implement advanced functions. This includes interference and collision detection, as computed by set operations module 3003, plus features requiring mass properties such as mass, weight and center of mass as calculated by SPU mass properties module 3019. The models in the plenoptic scene database are thus modified to reflect the real-time scene changes as determined by the users and application program.

Both types of information, matter (VLOs) and light (SLTs), can be accessed and transmitted for selected regions of space (direction space in the case of SLTs) and to a specified level of resolution (angular resolution for SLTs). In addition, property values are typically stored in the lower-resolution nodes in the tree structure (upper nodes in tree) that are representative of the properties in the node's sub-trees. This could, for example, be the average or min/max values of the color in the subtrees of octree nodes or some representative measure of illumination in the subtrees of saeltree nodes.

Depending on the needs of the remote processes (e.g., user or users), only necessary subsets of the scene model need to be transmitted. For viewing, this typically means sending high-resolution information for the parts of the scene currently being viewed (or expected to be viewed) by module 3009 with higher resolution than other regions. Higher resolution information is transmitted for nearby objects than those visually distant. Tracked or predicted movements would be used to anticipate the parts of the scene that will be needed. They would be transferred with increased priority. Advanced image generation methods of octree models in 3009 can determine occluded regions when a scene is rendered. This indicates regions of the scene that are not needed or may be represented to a lower level of fidelity (to account for possible future viewing). This selective transmission capability an inherent part of the codec. Only parts of the scene at various resolutions are accessed from storage and transmitted. Control information is transferred as necessary to maintain synchronization with remote users.

When large numbers of remote viewers are operating simultaneously, their viewing parameters can be summarized to set transmission priorities. An alternative would be to model expected viewer preferences on a probabilistic basis, perhaps based on experience. Since a version of the model of the entire scene is always available to every viewer at some, perhaps limited, level of resolution, views that are not expected will still result in a view of the scene but at a lower level of image quality.

The information needed for image generation is maintained in the local database which is, in general, a subset of the source scene model database. The composition of the scene is controlled by a local scene graph which may be a subset of the global scene graph at the source. Thus, especially for large "virtual worlds," the local scene graph may maintain only objects and light field information and other items that are visible or potentially visible to the user or that may be important to the application (e.g., the user's experience).

The information communicated between the scene server and the client consists of control information and parts of models in the form of plenoptic octrees and, perhaps, other models (e.g. shapes in other formats, BLIF functions). The plenoptic octrees contain matter in the form of VLOs and light fields in the form of SLTs. Each are hierarchical, multi-resolution, spatially-sorted volumetric tree structures. This allows them to be accessed by specified regions of modelling space and to a variable resolution which can be specified by spatial region (direction space for saeltrees). The location of each user in scene space, the viewing direction and the needed resolution (typically based on the distance from the viewpoint in the viewing direction) plus anticipated future changes can thus be used to determine the subsets of the scene that need to be transmitted and a priority for each based on various considerations (e.g., how far and fast the viewpoint can move, the bandwidth characteristics of the communications channel, the relative importance of image quality for various sections of the scene).

Depending on the computational capabilities that can be dedicated at the remote site, functions associated with the server side of the communications channel can be implemented on the remote site. This allows, for example, for just matter models (VLOs) to be transmitted to the remote site with light field information (SLTs) reconstructed there, rather than having it also transmitted over the channel. The potential communications efficiency will depend, of course, on the details of the situation. The transmission of a simple model of solid material to the remote site followed by the local computation of light fields and display may be more efficient than the transmission of complete light field information. This might be especially true for static objects in a scene. On the other hand, objects that change shape or have complex movements may benefit by transmitting only light field SLTs, as requested.

In a plenoptic octree, SLTs are 5D hierarchical representations at some location in space within a scene (or, in some cases, beyond the scene). The five dimensions are the three location components (x, y and z) of the center where all saels meet, plus two angles defining a sael. A saeltree can be located at the center of a VLO voxel or somewhere specified within a voxel. A VLO node thus contains matter, as defined by properties, and can, optionally, also contain a saeltree. A voxel in space containing substantially non-opaque (transmissive) media and lying adjacent to a scene boundary (void voxels) can be referred to as a "fenestral" voxel in some embodiments.

It may be the case that the set of saels may be similar at multiple points within a scene (e.g., nearby points on a surface with the same reflection characteristics). In such cases, sets of saels with different centers may be represented independent of the center location. If identical for multiple center points, they may be referenced from multiple center locations. If the differences are sufficiently small, multiple sets can by represented by individual sets of deviations from one or a set of model saels. Or they may be generated by applying coefficients to a set of precomputed basis functions (e.g., sael datasets generated from representative datasets with Principal Component Analysis). In addition, other transformations can be used to modify a single sael model into specific sets, such as by rotation about the center. Some types of SLTs, such as point light sources may be duplicated by simply giving additional locations to a model (no interpolation or extrapolation needed).

A scene codec operates in a data flow mode with data sources and data sinks. In general, this takes the form of request/response pairs. Requests may be directed to the local codec where the response is generated (e.g., current status) or transmitted to a remote codec for an action to be taken there with a response returned providing the results of the requested action.

Figure 66:
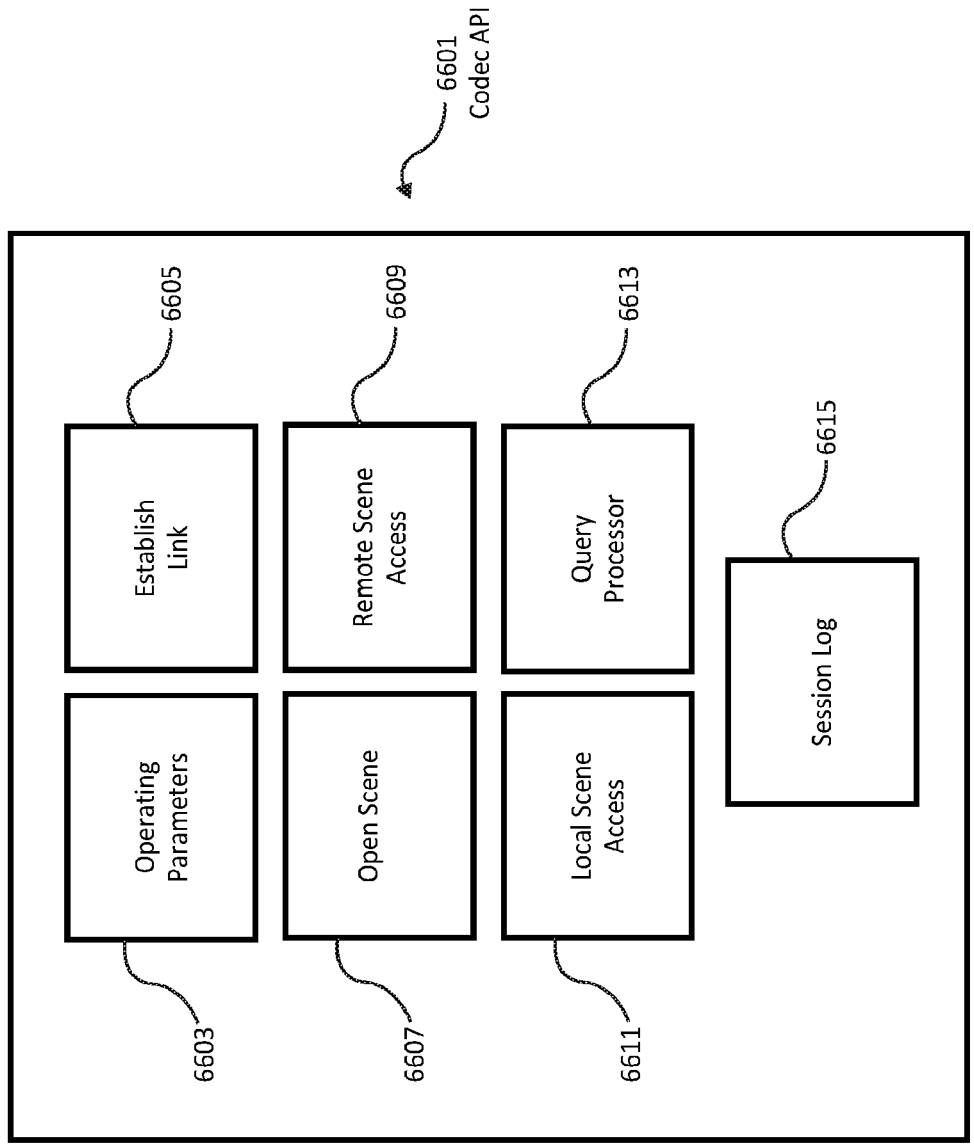
FIG. 66 is a schematic diagram showing the Application Programming Interface functions of a scene codec, according to some embodiments.

The requests and responses are communicated through the scene codec's Application Programming Interface (API). The core functions of the basic codec API 6601 are summarized in FIG. 66. The codec is initialized through the operating-parameters module 6603. This function can be used to specify or read the operating mode, controlling parameters and status of the codec. After a link to another scene codec has been established, this function may also be used to control and query the remote codec, if given specific permissions.

The codec API establish link module 6605, when triggered, attempts to establish a communication link to the remote scene codec specified. This typically initiates a "handshaking" sequence to establish the communications operating parameters (protocols, credentials, expected network bandwidth, etc.). If successful, both codecs report to the calling routine that they are ready for a communications operation.

The next step is to establish a scene session. This is set up through API open scene module 6607. This involves establishing links to scene databases on both the remote side to access or update the remote scene database and often on the local side also. For example, to build up a local sub-scene database from the remote scene database or to update the local scene database simultaneously with the remote one.

Once a connection to a scene or scenes has been established, two codes API modules can be used to access and change scene databases. Remote scene access module 6609 is used to request information about and changes to the remote scene that do not involve the movement of subscenes across the communications channel Operations to be performed on the local scene database are executed using the local scene access module 6611. Scene database queries that involve the movement of sub-scenes are performed with the query processor module 6613. All actions taken by the codecs are recorded by session log module 6615.

The primary function of query processor module 6613 is the transmission of sub-scenes from a remote scene database or to request a sub-scene to be incorporated into it (or removed from it). This could involve, for example, questions about the status of plenoptic octree nodes, requests for computing of mass properties, and so on. This typically involves a subscene extraction and the transmission of a compressed, serialized, and perhaps encrypted subtree of a plenoptic octree and related information. The subscene to be extracted is typically defined as a set of geometric shapes, octrees and other geometric entities specified in some form of a scene graph that can result in a region of space, volumetric space or direction space or both. In addition, the resolution needed in various regions of volumetric or direction space is specified (e.g., decreasing from a viewpoint in a rendering situation). The types of information will also be specified to not transmit extraneous information. In some situations subscene extraction can be used to perform some form of spatial query. For example, a request to perform a subscene extraction of a region but only to level 0 would return a single node which, if found to be null, would indicate no matter in that region. This could also be extended to search for specific features in a plenoptic scene.

Figure 67:
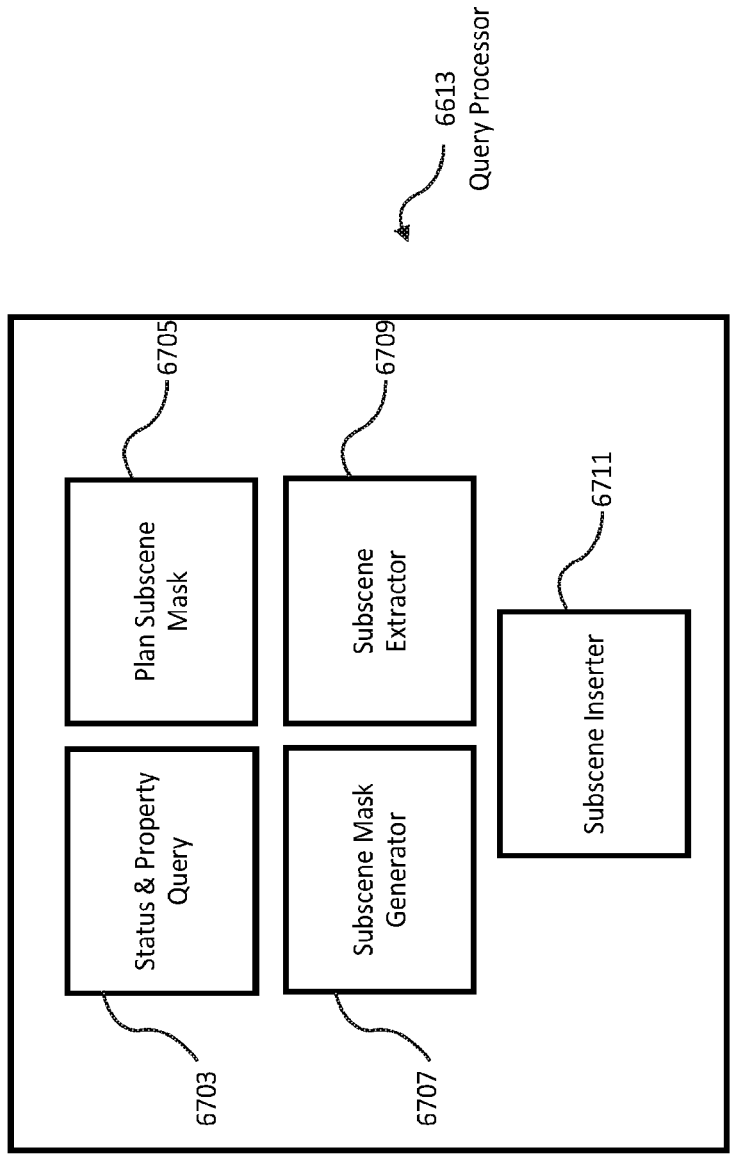
FIG. 67 is a schematic diagram showing the functions of a Query Processor function, according to some embodiments.

The subfunctions of query processor module 6613 are shown in FIG. 67. This consists of the status & property query module 6703. It is used to obtain information about a plenoptic scene such as the ability to perform writes into it or what properties exist in it or if new properties can be defined and so on. The subscene mask control module accepts subscene extraction requests in some form and constructs a mask plan to accomplish the request. This is typically a set of evolving masks that will incrementally send subscenes to the requesting system as planned by plan subscene mask module 6705.

The subscene mask generator 6707 constructs a plenoptic octree mask that will be used to select the nodes from the scene database for transmission back to the requesting system. It is continuously building the next mask for extraction. The subscene extractor module 6709 performs the traversal of the scene plenoptic octree to select the nodes as determined by the mask. They are then serialized and further processed and then entered into the stream of packets transmitted to the requesting system. The subscene inserter module 6711 is used by the requesting system to use the transmitted stream of plenoptic node requests to modify a local subtree of the scene model.

A codec may perform subscene extraction or subscene insertion or both. If only one is implemented, modules and functions only needed for the other may be eliminated. Thus, an encoder-only unit will need the subscene extractor 6709 but not the subscene inserter 6711. A decoder-only unit will need the subscene inserter module 6711 but not the subscene extractor module 6709.

As discussed above, extracting a subscene from a plenoptic scene model enables the efficient transmission of only the parts of a scene database to a client, as needed for immediate or near-term visualization or for other uses. In some embodiments, plenoptic octrees are used for the scene database. The characteristics of such data structures facilitates the efficient extraction of subscenes.

A variety of types of information can be contained in a plenoptic octree, either as separate VLOs or as properties contained in or attached to the octree or saeltree nodes in a plenoptic octree, in an auxiliary data structure, in a separate database or in some other way. The initial subscene extraction request specifies the type of information that will be needed by the client. This can be done in a variety of ways specific to the application being serviced.

The following is an example use where the client is requesting subscene extractions for remote viewing by a display device such as a VR or AR headset. A large plenoptic octree is maintained on the server side. Only a subset is needed on the client side to generate images. A plenoptic octree mask will be used here as an example. Many other methods can be used to accomplish this. A mask is a form of plenoptic octree that is used to select nodes in a plenoptic octree using set operations. For example, a subsection of a large octree can be selected using a smaller octree mask and the intersection operation. The two octrees share the exact same universe and orientation. The two trees are traversed from the root nodes simultaneously. Any nodes in the large octree that do not also exist as occupied nodes are simply skipped over in memory and ignored. They simply do not show up in the traversal. They effectively disappear. In this way the subset of the nodes can be selected by the traversal and serialized for transmission. The subset is then recreated on the receiving side and applied to a local plenoptic octree. This concept is easily extended to saeltrees.

In the following, the mask concept is extended with the use of incremental masks. Thus, a starting mask can be increased or decreased or otherwise modified to select additional nodes for transmission to the receiving side. A mask can be modified for this purpose in a variety of ways. The morphological operations of dilation and erosion can be applied using the SPU Morphological Operations module 3015. Geometric shapes can be added or used to remove parts of the mask buy converting them using the SPU Shape Conversion module 3007 and the SPU Set Operations module 3003. Typically, the new mask would be subtracted from the old mask to generate an incremental mask. This would be used to traverse the large scene model to locate the new nodes to be serialized and transmitted to be added or otherwise handled at the receiving end. Depending on the situation, the opposite subtraction can be performed, new mask subtracted from the old mask, to determine a set of nodes to be removed. This could be serialized and transmitted directly to do the removal on the receiving side (not involving subscene extraction). Similar methods could be used on the receiving side to remove nodes that are no longer needed for some reason (e.g., the viewer moved, and high-resolution information is no longer needed in some region), informing the server side of changes to the current mask.

The purpose of the plenoptic projection engine (PPE) is to efficiently project light from one location to another in a plenoptic scene model, resulting in a light transfer. This can be from, for example, a light source represented by an exitant point light field (PLF) to an incident PLF attached to a mediel. Or it can be an incident PLF resulting in exitant light being added to an exitant PLF.

The plenoptic projection takes advantage of hierarchical, multi-resolution tree structures that are spatially sorted to efficiently perform the projection process. Three such tree structures are used: (1) a VLO or volumetric octree that holds the mediels (while this is considered a single octree, it may be multiple octrees UNIONed together), a SOO or Saeltree Origin Octree, this is an octree that contains the origin points of the saeltrees in the plenoptic octree, and (3) SLTs, some number of saeltrees in a plenoptic octree (the origin locations are in the SOO).

The plenoptic projection engine projects the saels in the SLTs on to the nodes in the VLO in a front-to-back sequence starting at the origin of each SLT. When a sael intersects a mediel node, the size of the projection is compared to the size of the media voxel. The analysis is based on a number of factors such as the spatial or angular resolutions currently needed, the relative sizes of the mediel and the sael projection on it, the existence of higher-resolution information at lower levels in the tree structures, and other factors. If needed, either the mediel or the sael or both may be subdivided into the regions represented by their children. The same analysis then continues at a higher resolution.

When the subdivision process is completed, a light transfer may take place. A sael in the saeltree may, for example, result in the creation or modification of a sael or multiple saels in a saeltree attached to the mediel. In a typical application incident radiel information may be accumulated in an incident PLF attached to a mediel. When the incident SLT is sufficiently populated, a BLIF for the mediel may be applied, resulting in an exitant PLF for the mediel.

The projection process operates by maintaining the projection of a sael on to a projection plane attached to each VLO node visited in a traversal. The projection planes are perpendicular to an axis, depending on the top sael to which the sael being projected belongs.

The process begins by starting the VLO and SOO tree structures at the center of the universe. Thus, the location in the SOO begins at the center of the universe. It will be traversed down to the location of the first SLT to be projected, as determined by any masks applied and any specified traversal sequence. The projection plane begins as a plane through the origin of the universe, perpendicular to the appropriate axes, depending on the first sael. In operation, all three may be defined and tracked to account for all top-sael directions.

The primary function of the plenoptic projection engine is to continuously maintain the projection of the oblique pyramid projection that is a sael projection on to the projection plane attached to the mediels, as the VLO is traversed. This is done by initializing the geometry at the beginning and then continuing to maintain it as the three tree structures are traversed to, typically, project all the saels in all of the SLT into the scene. This may create additional SLTs that may be further traversed when created during this process or later.

Thus, the typical flow of the method is to initialize the tree structures, then traverse the TOO to place the first SLT at its origin using a series of TOO PUSH operations, maintaining the projection geometry for each step. Next, the VLO is traversed to enclose the origin of the first SLT. Next, the VLO is traversed in a front-to-back sequence to visit nodes in a general order of increasing distance from the SLT's origin, in the direction of the top sael. At each PUSH of the VLO, the projection on to the projection plane connected to the node is checked to see if the sael continues to intersect the VLO node. If not, all subtrees are ignored in the traversal.

If mediel VLO nodes are encountered, an analysis determines the next action to be taken, as outlined above typically involving visiting the subtrees of the VLO and/or the SLT. When completed, the trees are POPed back up to where the next sael can be projected in the same way. When the final sael of the first or later SLT has been processed, the tree structures are POPed to a point where the processing of the next SLT can begin. This process continues until all the saels in all SLTs have been either processed or rendered unnecessary to be processed because of the processing of an ancestor sael.

Figure 68A:
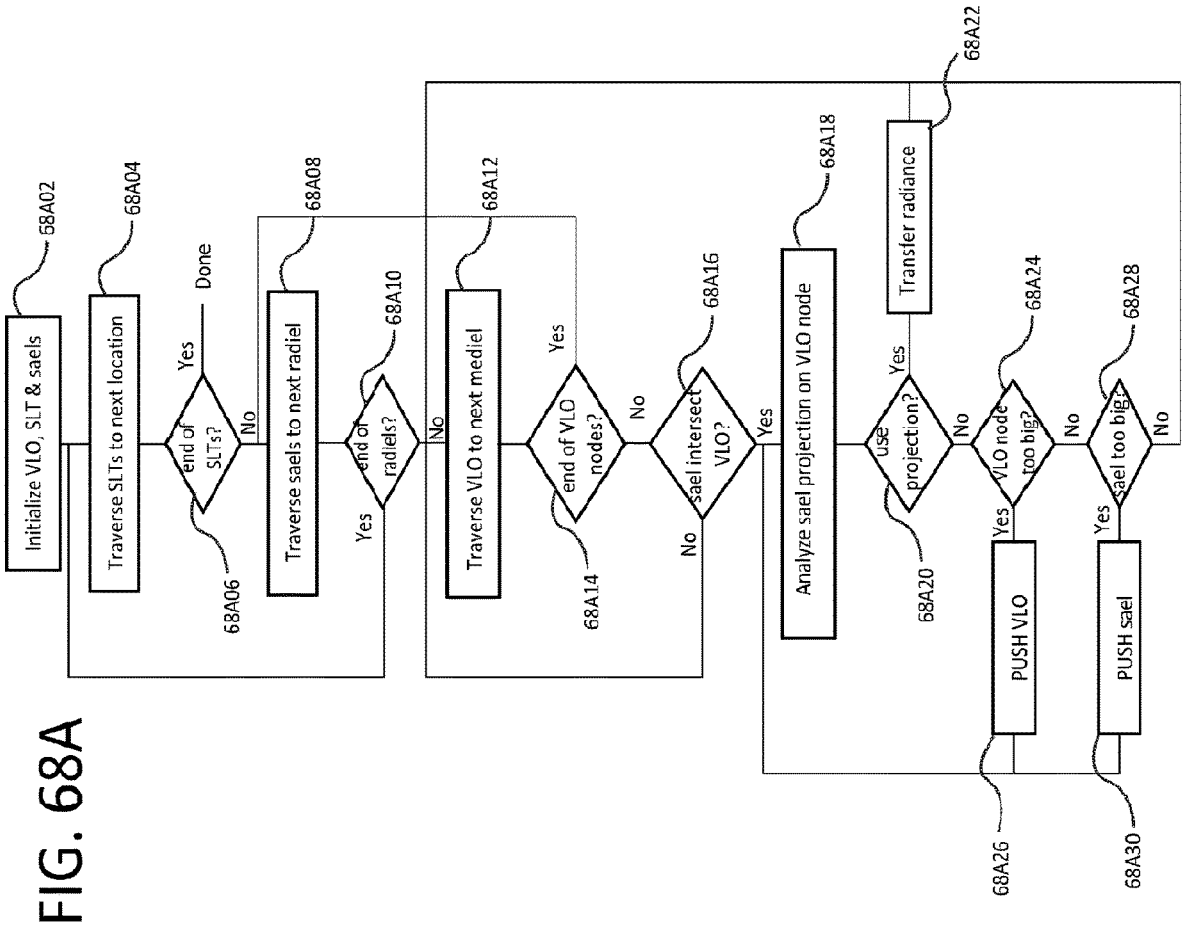
FIG. 68A is a flowchart of a procedure used to implement a plenoptic projection engine, according to some embodiments.

The overall procedure is shown in plenoptic projection engine flowchart in FIG. 68A. This is a sample procedure of many possible procedures. The process begins with the initialization of the projection mechanism in operation 68A02. As presented above, the VLO traversal starts at its root. The projection plane of interest is thus attached to the center of the universe (three may actually be tracked). The SSO is also initialized to its root. The initial SLT point thus starts at the origin of the universe and will be PUSHed to the origins of the SLTs. The initial sael to be visited is top sael 0.

In operation 68A04 the SOO tree structure is traversed to the origin of the next SLT in the plenoptic octree universe using PUSH operations. In the first use, this will be from the origin of the universe. At other times it will be from where the last operation left off. The projection of the current top sael on to the projection plane attached to the current VLO projection plane (attached to the center of the universe the first time) is maintained for each operation to arrive at the next SLT origin. If there are no additional SLTs in the SOO (typically detected by an attempt to POP from the root node), decision operation 68A06 terminates the operation and returns control to the requesting routine.

Otherwise, operation 68A08 traverses the saels of the current SLT to the first non-null node (a non-void voxel), a sael representing a radiel. Again, the projection geometry between the saels and the projection plane is maintained. If no saels with a radiel remain, control is passed back to operation 68A04 by decision operation 68A10 to find and traverse the next SLT.

If a sael needs to be projected, operation 68A12 traverses the VLO tree to a node that encloses the current SLT's origin. Basically, if finds the first VLO node with a projection plane where the sael projection intersects with the VLO node intersection with its projection plane. If no such VLO nodes are found, control is returned to operation 68A08 by decision operation 68A14 to proceed to the next sael to be processed. If the projection of the sael does not intersect the node, control is passed back to operation 68A12 by decision operation 68A16 to proceed to the next VLO node to be investigated.

Otherwise, control is passed to operation 68A18 where the projection of the current sael on the current projection plane is analyzed. If the current rules for such are fulfilled, control is transferred by decision operation 68A20 to operation 68A22 where the radiance transfer or resampling takes place. This generally means that a sufficient level of resolution has been reached, perhaps based on the variance in the sael's radiance, and that the size of the projection is comparable, in some sense, to the size of the VLO node. In some cases, the transfer of radiance some or all the radiance to the appropriate saels in an SLT attached to that node (created if needed). In other cases, the radiance may be employed in some other way in the node.

If the analysis determines that a higher level of resolution is needed for the saels or the VLO nodes, operation 68A24 determines if the VLO node needs to be subdivided. If so, control is passed to operation 68A26 to perform the PUSH. Information about the situation will typically be PUSHed on to an operations stack so as to later visit all the sibling nodes. If not, control is passed to decision 68A28 where the need for a subdivision of the current sael is handled. If so, control is passed to operation 68A30 where the sael PUSH is executed. Otherwise, the sael projection on to the current VLO node requires no additional processing and control is passed back to operation 68A12 to traverse to the next VLO node for examination and a possible transfer of radiance.

Figure 68B:
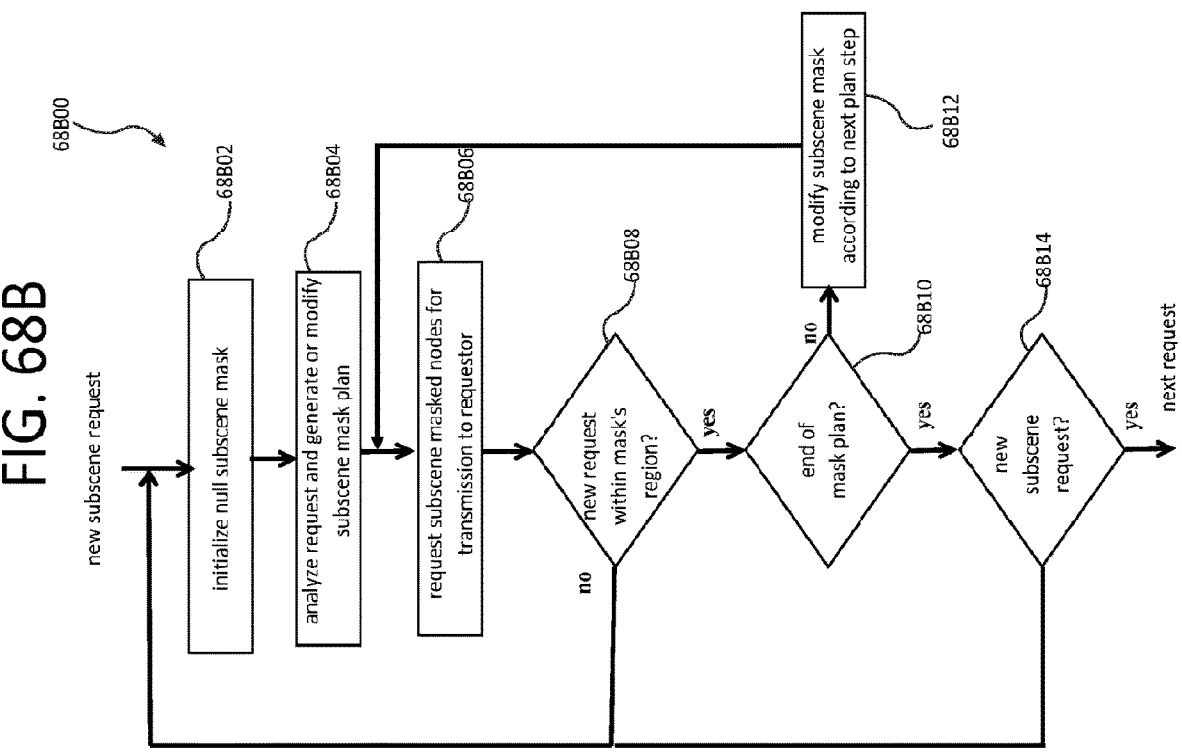
FIG. 68B is a flowchart of the procedure used to extract a subscene from a plenoptic octree for remote transmission, according to some embodiments.

The general flow of subscene extraction from a plenoptic octree is shown in flowchart in FIG. 68B. The process starts when a subscene request is received. The initial step 68B02 is to initialize a null subscene mask. This is typically a single-node plenoptic octree and related parameters. The request is then analyzed in step 68B04. For an image generation situation this could include the 3D location of the viewer in the scene and the viewing direction. Additional information would be the field-of-view, the screen resolution, and other viewing and related parameters.

For viewing, this would then be used to define an initial viewing frustum for the first image. This could be represented as a geometric shape and converted to an octree using SPU Shape Conversion module 3007. In other situations, a saeltree could be generated with each pixel resulting in a sael. The distance from the viewpoint is incorporated as part of the mask data structure or computed in some other way (e.g., distance computed on-the-fly during subscene extraction). This will be used during subscene extraction to determine the resolution of the scene model (volumetric or direction space) to be selected for transmission.

From this analysis by module 68B04, a plan is constructed for a series of subscene masks. The general strategy is to start with a mask that will generate an initial subscene model at the receiving end that will result in a usable image for the viewer very quickly. This could have, for example, a reduced resolution request for a smaller initial dataset for transmission. The next steps would typically add progressively higher-resolution details. And information in the request from the viewing client could be used to anticipate future changes in viewing needs. This could include, for example, the direction and speed of directional and rotational movements of the viewer. This would be used to expand the mask to account for the expected needs in the future. These expansions would be incorporated into the planned steps for future mask changes.

This plan would next be passed to operation 68B06 where the subscene mask, as defined by the current step in the plan, is intersected with the full plenoptic scene model. The nodes resulting from a specific traversal of the plenoptic octree are then collected into a serial format for transmission to the requesting program. Node compression, encryption and other processing operations can be performed before being passed on for transmission.

The next flow operation is a decision performed by 68B08 which accepts the next request. If it is for a new subscene, one that cannot be accommodated by modifying the current subscene mask and plan, the current mask plan is abandoned and a new subscene mask is initialized in operation 68B02. On the other hand, if the request is for a subscene that is already anticipated by the current plan, as determined by decision operation 68B10, the next step of the plan is executed in operation 68B12. The subscene mask is modified and control is passed back to operation 68B06 to implement the next subscene extraction. If the end of the subscene mask is encountered by decision 68B10, the next request is used to start a new subscene mask in operation 68B02 if a new subscene extraction request exists as determined by decision operation 68B14. If no new requests are pending, the subscene extraction operation 68B00 is placed into a wait state until new requests arrive.

FIG. 69 shows a flow diagram of a process 6900, in an embodiment, to extract a subscene (model) from a scene database for the generation of images from multiple viewpoints in the scene. The first step, operation 6901, is to establish a connection to the database containing the full scene model from which the subscene it to be extracted. At operation 6903, the new subscene to be output is initialized to have a plenoptic field empty of primitives. In other words, no matter field nor light field exists in the subscene at this point. At operation 6905, a set of "query saels" is determined based on the image generation parameters, including the 6-DOF pose, intrinsic parameters, and image dimensions of the virtual camera at each viewpoint. A query sael is a sael, defined at some level in an SLT of the full scene, that will be used to spatially query (probe) the scene for plenoptic primitives lying in the query sael's solid-angle volume. The set of query saels is typically the union of a set of saels per viewpoint. The set of saels per viewpoint typically covers the FOV (camera's view frustum) such that each image pixel is included in at least one query sael. The query saels may be adaptively sized to match the sizes of primitives lying at various distances in the scene. The set of query saels may also deliberately be made to cover slightly more or even much more 5D plenoptic space than the tight union of FOVs. One example reason for such non-minimal plenoptic coverage is that process 6900 could anticipate the 6-DOF path of a virtual camera used by the client for image generation.

At operation 6907, primitives in the plenoptic field are accumulated into the new subscene by projecting each query sael into the full scene using process 7000, leading generally to a recursive chain of projections as the light field is resolved to the target accuracy specified by the image generation parameters. The target accuracy may include expressions of radiometric, spectral, and polarimetric target accuracies. A description of process 7000 is given below with reference to FIG. 70.

At operation 6909, process 6900 determines a subset of the accumulated primitives to retain in the subscene. Detail on this determination is given below in the description of operation 6915. In one simple but practical example case, a primitive is retained if it falls at least partially inside one of the camera FOVs specified in the image generation parameters of the subscene request. At operation 6911, the subscene's outer scene boundary is defined to enclose at least those accumulated primitives partially or fully contained in at least one of the FOVs. Radiels of interest are projected onto the defined outer scene boundary at operation 6913. This projection can generally take place from scene regions both inside and outside the boundary. The boundary light field is generally realized as fenestral light field at boundary mediels adjacent to the boundary.

At operation 6915, process 6900 further simplifies the subscene as appropriate for the current use case and QoS threshold. When minimizing the subscene data size is important, one prominent example of subscene simplification is the complete or partial removal of mediels' radiels resulting from BLIF interactions or from transport (projection) from other mediels. That is to say, by removing radiels that are not part of a fenestral or emissive light field, the subscene takes a more "canonical" form, which typically has smaller data size than a non-canonical form, especially when compressed BLIF representations are used. In the context of the current description, a canonical representation ("canonical form") of a scene model's plenoptic field is one that, to some practical degree dependent on the use case, contains a minimal amount of stored light field information in non-fenestral and non-emissive parts of the light field. This is achieved by storing sufficiently accurate representations of the matter field (including mediel BLIFs) and fenestral and emissive light field radiels. Then when needed, other parts of the total quasi steady state light field can be computed, for example, by processes like those described with reference to FIGS. 70 and 71 below.

Some degree of simplification (compression) is achievable by adapting a BLIF representation to the needs of the subscene extraction client. In the current example case where the client intends to generate images of the subscene, a glossy BLIF of a car surface, for example, might lead to the extremely intricate reflection of a tree from one viewpoint, while from another viewpoint, only a homogeneous patch of sky is reflected. If only the second viewpoint is included in the image generation parameters at operation 6905, then a more compact BLIF representation, with lower accuracy in its specular lobe(s), may suffice in the subscene model.

One should note that, in many use cases, subscene data sparsity may be a more important goal than minimizing the volumetric extent of the extracted subscene. Depending the viewpoints specified at operation 6905, the subscene's matter field may largely consist of partial object and surface "shells" facing toward the union of viewpoints. In addition to BLIF compression, other scene model entities that are not plenoptic primitives may be compressed, adaptively resampled, re-parameterized, and so forth in order to minimize the data size of the subscene model. It is generally expected that an extracted subscene's light field and BLIF data will have sparsity similar to that of its matter field.

Other potential goals exist in opposition to the goal of minimal subscene data size. For example, minimizing the image generation time may be desirable in a use case of high server-to-client network throughput but limited computing capacity by the client. In a 3D game or virtual tour, the client might want a less canonical subscene that instead has more light field information "baked into" it for purposes of maintaining a high display frame rate at limited computational cost. In another example relating to FIGS. 70 and 71 described below, primitives that only indirectly contribute to a query sael might be included in the output subscene. A strong light source that indirectly reflects into a requested FOV might be included as actual mediels having an emissive light field for purposes of faithfully reproducing its effect in images from unanticipated viewpoints. Following simplification, the extracted subscene is output into the desired scene database at operation 6917, ending process 6900. Note that the order of operations shown in process 6900 could be different in other embodiments.

Figure 70:
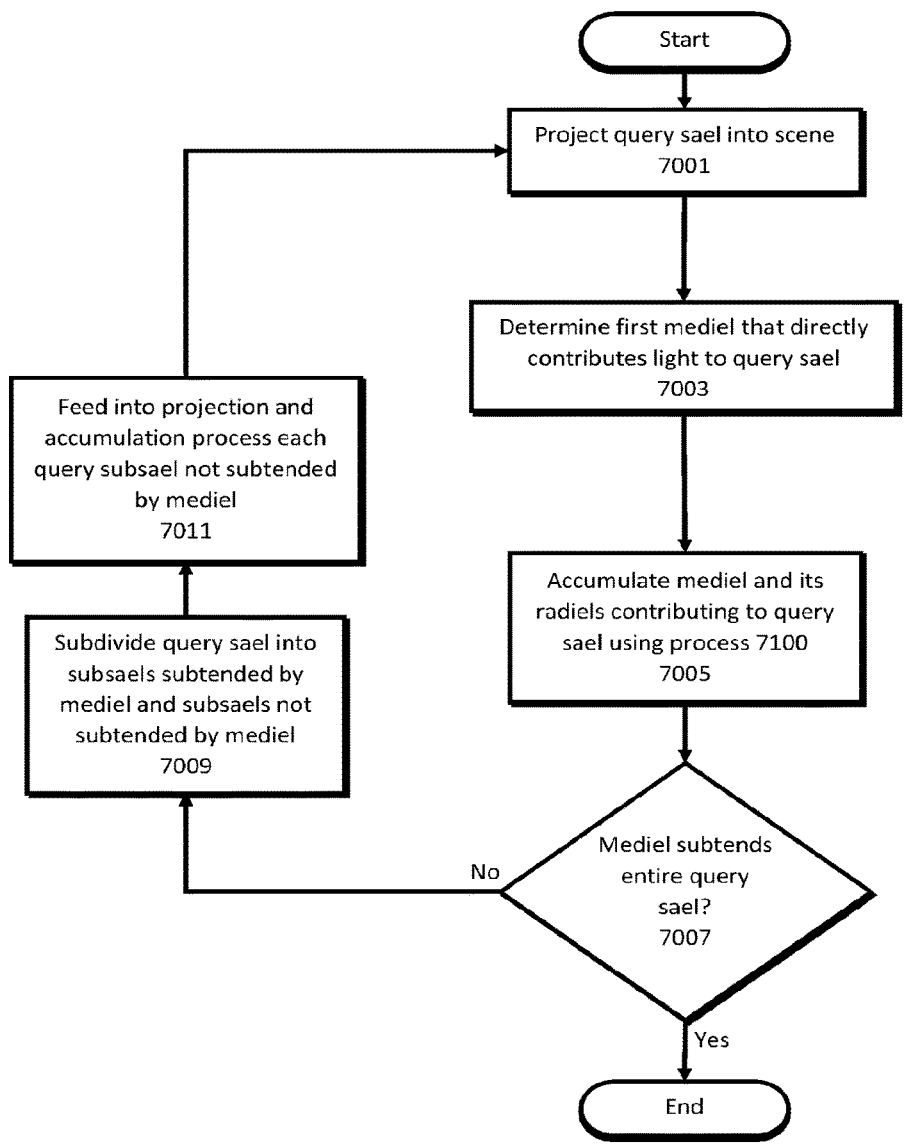
FIG. 70 is a flow diagram of a process to accumulate plenoptic primitives that contribute light to a query sael, according to some embodiments.

FIG. 70 shows a flow diagram of a process 7000, in an embodiment, to accumulate (one or more) plenoptic primitives that contribute light, directly or indirectly, to a specified query sael projected into a scene's plenoptic field. In this context, "accumulate" means to store, in the subscene, the accumulated primitive by value, reference, handle, or other suitable means. The query sael is projected into the plenoptic field at operation 7001 using the mechanics described above with reference to FIGS. 21-65. At operation 7003, process 7000 determines the first mediel that directly contributes light to the query sael, where the meaning of "first" is determined by a precedence ordering of scene primitives that depends on the use case. A typical example ordering gives higher precedence to mediels located nearer to the query sael's origin (those encountered earlier when the projection is thought of as proceeding outward from the sael's origin). Other precedence orderings are possible, for example, one in which mediels with certain application-specific attributes (e.g., those likely to contribute light in a spectral band of interest) take precedence over other mediels. In the case that multiple mediels have equal precedence (a tie), some tie-breaking criteria would be employed if the embodiment lacks sufficient parallel computing capacity to process the tied mediels in parallel.

At operation 7005, process 7000 uses process 7100 to accumulate the current mediel and its radiels that contribute to the query sael. At operation 7007, process 7000 checks whether the current mediel angularly subtends the entire query sael. If so, process 7000 ends. If not, process 7000 subdivides the query sael at operation 7009 into subsaels subtended by the mediel and subsaels not subtended by the mediel. The subdivision into subsaels at one or more SLT levels stops upon reaching some stopping criterion. Typical stopping criteria include the achievement of a target light field accuracy and the exhaustion of a time, computation, or data size budget. At operation 7011, query subsaels not subtended by the mediel are fed back into operation 7001, effectively invoking a next iteration (tail recursion) of process 7000.

Figure 71:
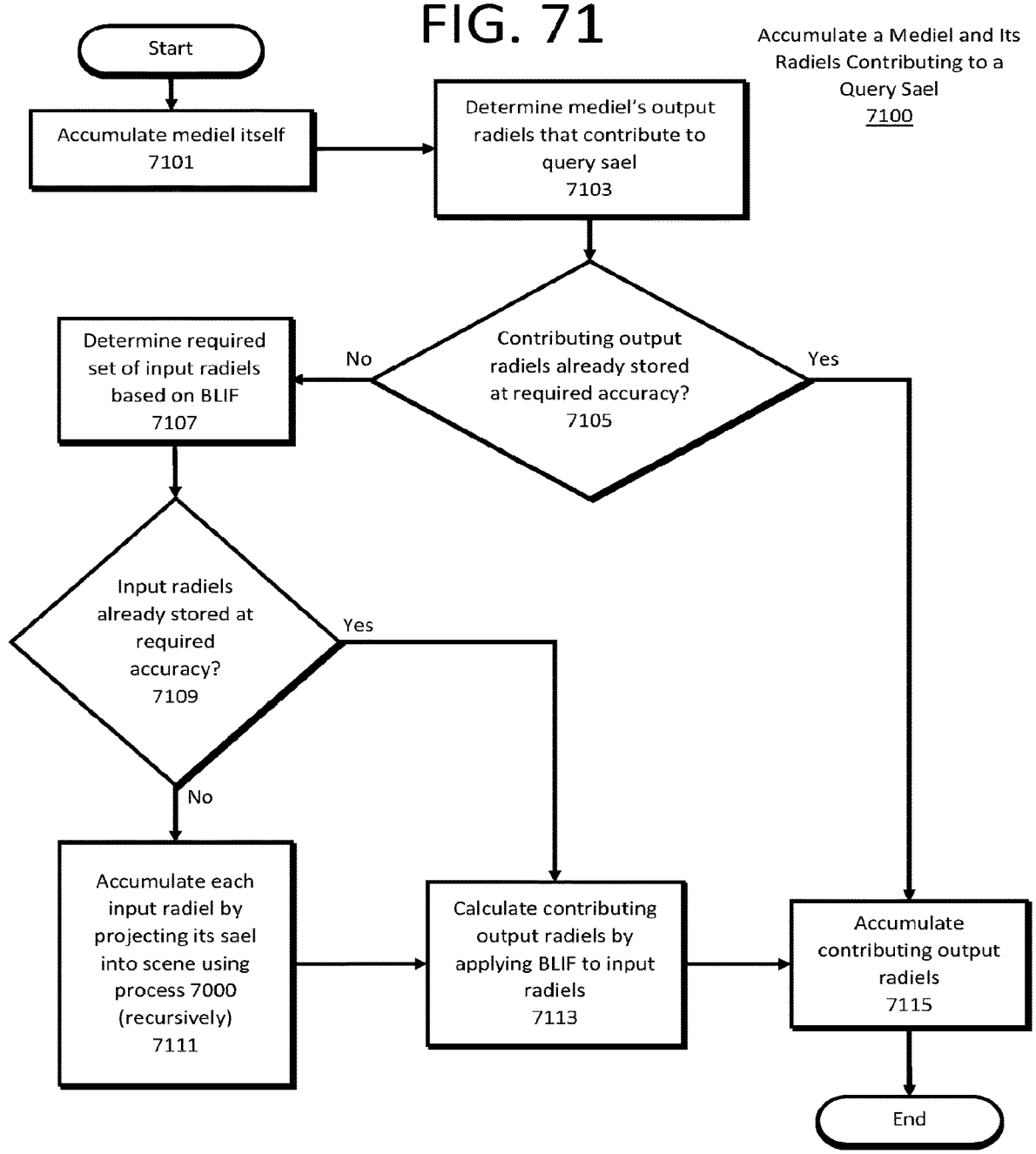
FIG. 71 is a flow diagram of a process to accumulate a media element ("mediel") and its contributing light field elements ("radiels") that contribute light to a query sael, according to some embodiments.

FIG. 71 shows a flow diagram of a process 7100, in an embodiment, to accumulate a single mediel and its radiels that contribute light to a query sael, where "accumulate" has the meaning given above with reference to process 7000. At operation 7101, the mediel itself is accumulated. At operation 7103, process 7100 determines which of the mediel's output radiels contribute to the query sael. This is typically decided by whether the radiel's containing sael plenoptically overlaps the query sael, meaning that the query sael and radiel's sael each contain the other's origin. At operation 7105, process 7100 checks whether the contributing output radiels are already stored, in the mediel's light field, at the accuracy specified by the calling process that invoked 7100 (e.g., process 7000, which in turn gets its target accuracy requirements from process 6900 in this example). If operation 7105 yields a positive answer, then process 7100 proceeds to accumulate those radiels at operation 7115. If operation 7105 yields a negative answer, then process 7100 proceeds to determine the required set of input radiels at operation 7107. This determination is heavily influenced by the mediel's BLIF. A BLIF with a narrow specular lobe, for example, indicates that higher accuracy/resolution of incident radiels is needed in the direction of the incident specular lobe. Wider lobes indicate a more isotropic distribution of required incident radiel accuracy.

In the context of the current description, "output" radiels are those directed downstream toward the query sael, while "input" radiels are those directed upstream. In the case of a mediel, input and output radiels are on opposite sides of its BLIF mapping. In the example case that a query sael arrives at an opaque surfel bordering air, the output radiels will be exitant from the surfel, while the input radiels will be incident on the surfel. In the example case that query sael originates within a transmissive mediel (e.g., generating an image from inside a chunk of glass), the output radiels will be incident on the mediel, while the input radiels will be exitant from the mediel.

At operation 7109, process 7100 checks whether the required input radiels are already stored in the mediel's light field (at the required accuracy). If so, each contributing output radiel is calculated by applying the mediel's BLIF to the input radiels at operation 7113. If not, process 7100 invokes process 7000 (often recursively) to project, into the scene, a query sael for each required input radiel at operation 7009. Once control returns from the potentially deeply recursive call to 7000, the flow proceeds to operation 7113 as in the positive branch of 7109. Having calculated the contributing output radiels by applying the mediel's BLIF at operation 7113, process 7100 then accumulates the output radiels at operation 7115 as in the positive branch of 7105. Process 7100 ends after the accumulation at 7115. It should be noted that operation 7113, in some example embodiments, could invoke a scene solver (reconstruction) process to estimate or refine the mediel's BLIF if needed. This is not described in further detail here.

A great many instances (invocations) of processes 7000 and 7100 can proceed in parallel in appropriate embodiments, for example, those including an FPGA computing fabric with a great number of discrete logic cores. Regardless of the degree of parallelism, the recursion will tend to be become shallower as successive query saels are projected in process 7000. This tendency exists because each query sael projection generally leads, at operations 7113 and 7115, to the calculation and storage (potentially implemented as caching) of incident and responsive radiels. In invocations of process 7100 due to later query saels, the positive branches of 7105 and 7109 will thus be followed more often, yielding shallower recursion. In the context of process 6900, this deep-to-shallow sequence of chains (stacks) of recursive sael projection can be thought of as the fairly rapid computation of the quasi steady state light field in plenoptic field of the subscene. Also, this filling in of subscene light field information can usefully proceed in both the upstream and downstream directions in some embodiments. For example, light from known (or discovered) strong light sources could be transported downstream to scene regions like to experience heavy sael query activity. This would happen in advance of upstream-directed query saels arriving at the region(s) in question, yielding shallower recursion depth once they do arrive. It should also be noted that the various operations in processes 7000 and 7100 can be executed in a deferred manner, for example, placed in a list for later processing when hardware acceleration resources become available.

Regarding the canonical form of plenoptic field representation described above with reference to FIG. 69, when a scene model lacks sufficiently accurate matter field and BLIF information needed to achieve a desired degree of canonicality, a system using scene codec 1A01 generally can invoke a scene solver 1A05, for example with the specified goal of resolving the matter field to high accuracy, in order to supply the needed matter field information. In some example embodiments, a system using scene codec 1A01, especially when acting as a server, could continuously run a solver 1A05 such that when new light field data is supplied (e.g., new images from a client system with a camera), the light field information is promptly propagated into the matter field representation into the appropriate plenoptic field in the server's scene database.

Regarding the subscene insertion operation in an embodiment, subscene inserter module 6711 handles subscene insertions at the plenoptic octree level of scene representation (by modifying a local subtree of the plenoptic octree into which the incoming subscene is being inserted). At the scene model 1001 and scene database 1101 levels of representation, subscene insertion (including incremental subscene insertion) may also involve operations including plenoptic field merging, scene graph merging, alteration of feature-to-primitive mappings (including the segment and object subtypes of feature), and BLIF library merging. In some example use cases, the merging of plenoptic fields may trigger a recomputation, using processes 7000 and 7100, of the quasi steady state light field at regions of interest in the merged plenoptic field.

Another novel aspect of certain embodiments herein is the "analytic portal". This is a mechanism that provides for a visual presentation of the details of the representations and processes that give rise to a rendering of a plenoptic scene model. Such a portal can also be used to add, remove, change or edit elements and parameters of the plenoptic scene and rendering. A portal can be of any shape. For example, a rectangular 2D window could by drawn to show the details of everything "behind" the portal. It can also be a region in 3D that limits the volumetric space being examined. This can be combined with a 2D window to enhance visibility and understanding. Such portals may be interactively modified as needed (e.g., expanded, rotated). In addition, the viewer can move relative to the portal. One could, for example, "fly" through a portal and then move around and view the analytic scene from within the portal domain. Analytic portals can also be smart in that they could be generated automatically to highlight the occurrence of some situation or event that triggers their use. Multiple portals could be created in this manner and perhaps linked visually or in some other way to provide an enhanced understanding.

Figure 72:
FIG. 72 is an image of the kitchen with a small rectangular region highlighting an analytic portal, according to some embodiments.
Figure 73:
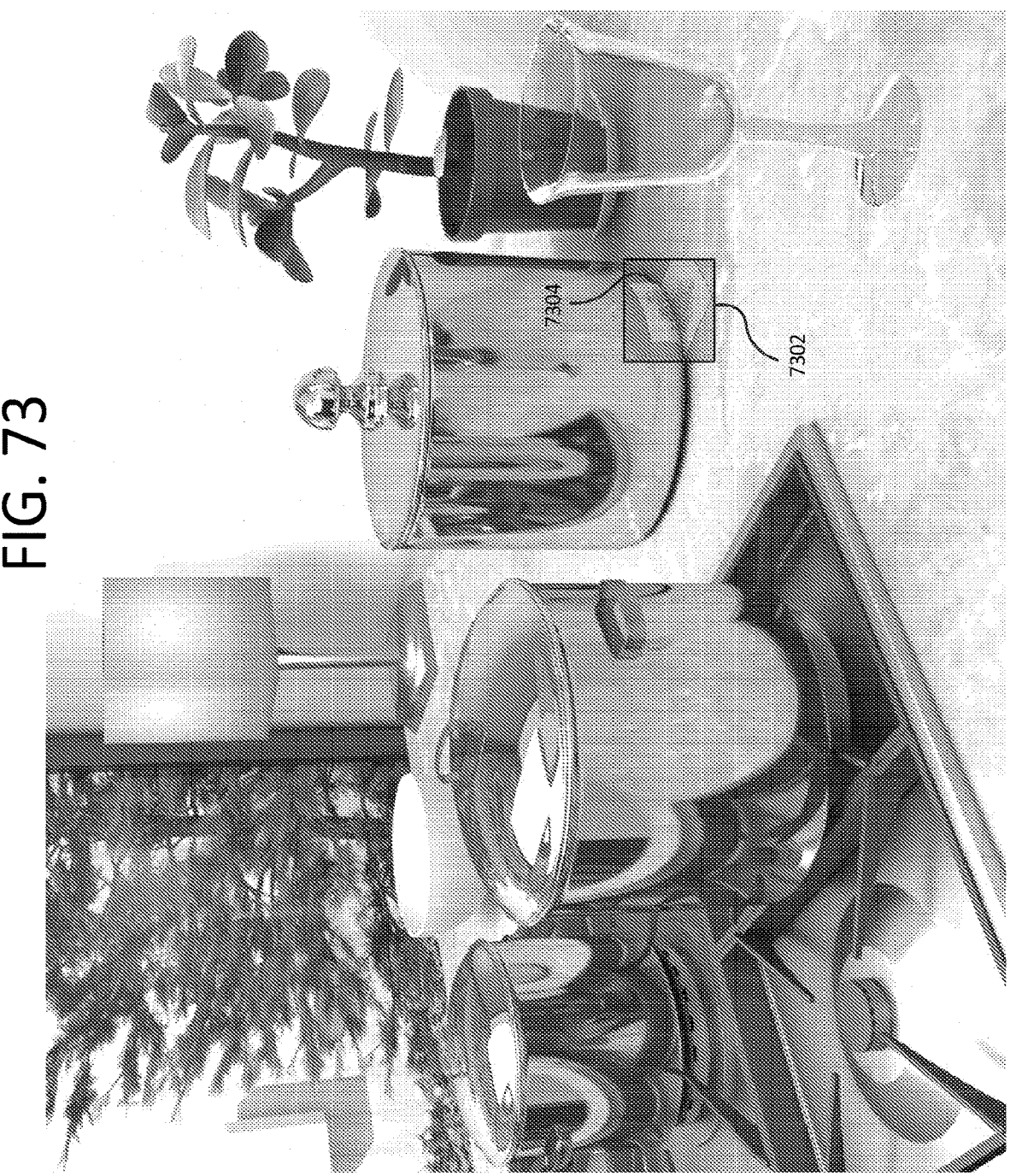
FIG. 73 is an image of part of the kitchen of FIG. 72 scaled up with the rectangular window of FIG. 72 highlighting an analytic portal, according to some embodiments.

An analytic portal is illustrated in the image of FIG. 72, the kitchen of FIG. 8. It shows the kitchen image with a small rectangular region 7202. FIG. 73 shows an enlarged image of the kitchen. The rectangular can more clearly be seen to enclose part of the bottom of the metal pot sitting on the counter near the stove. Within this is a view of analytic port 7304. This is a 3D rectangular region within which individual primitive elements are shown greatly enlarged. The representations of the matter and light fields, and their interactions that result in images, are complex and difficult to analyze and understand directly from the image itself. By specifying the types of scene elements and the viewing characteristics (e.g., scale factor) and how elements are to be rendered (e.g., wireframe versus shaded), the information displayed can be tailored to the immediate needs of the viewer.

Figure 74:
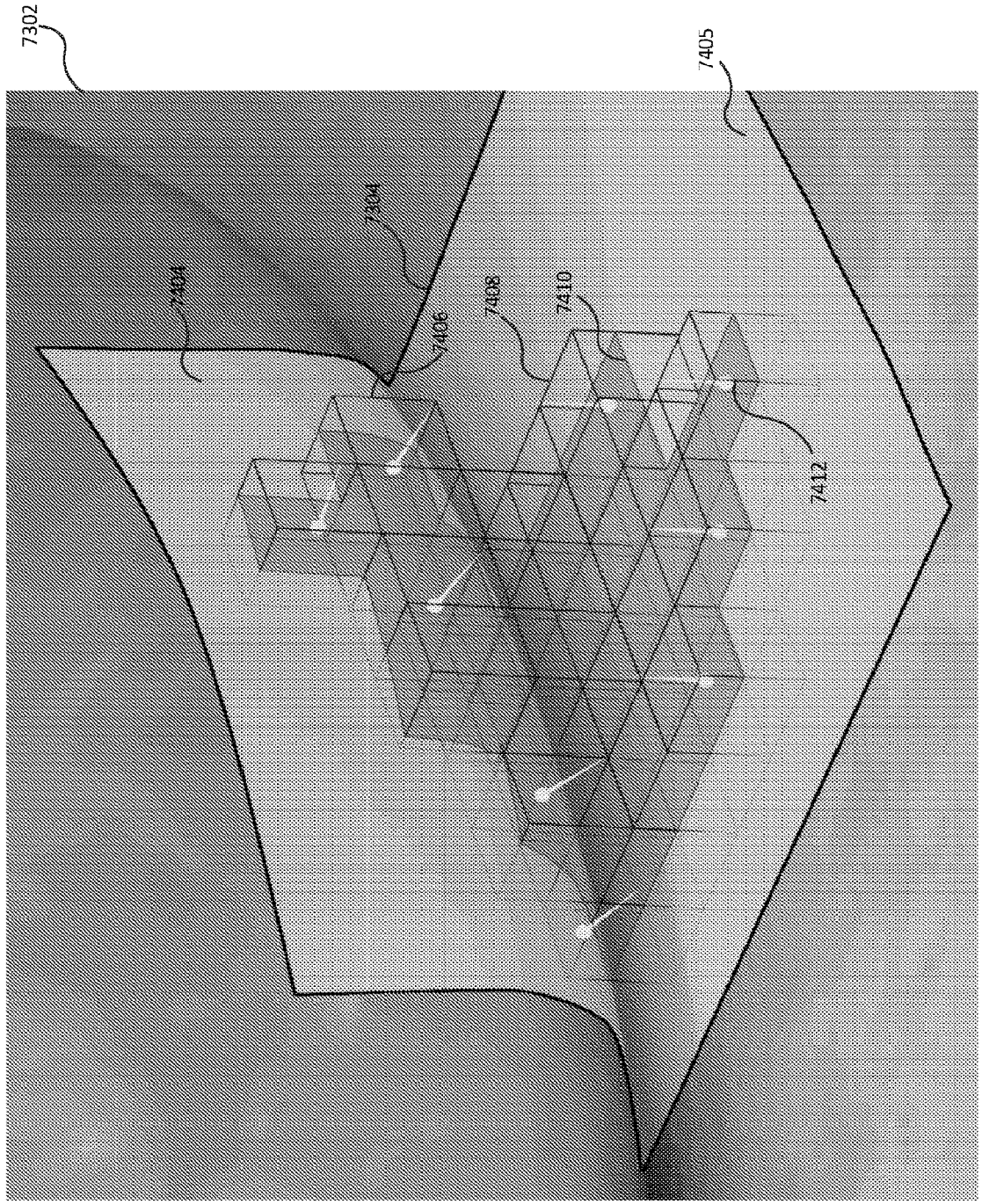
FIG. 74 is an image of the rectangular region shown in FIG. 73 scaled up to show the analytic elements being displayed in the analytic portal of FIG. 73, according to some embodiments.

Analytic portal 7304 within region 7302 is shown in FIG. 74. The analytic portal is indicated by the black edges showing the intersection of the 3D rectangular region with the surface of the pot, 7404, and the surface of the counter, 7405. The scaled-up individual voxels can be seen, such as voxel 7406 representing the pot and voxel 7408 representing the marble counter. In this case, they are shown as wireframe cubes. The surfels contained in the voxels are shown such as surfel 7410 representing part of the counter. Also shown are representative points on some of the surfels, as small white spheres, with extensions in the direction of the local normal vector at that point on the surface. Point 7412 is an example.

The use of an analytic portal could facilitate an understanding of the representations and mechanisms that result in visual features or anomalies in a realistic scene rendering. But they could also support a plethora of applications beyond viewing the matter and light field elements that interact to give rise to an image This would include an enhanced understanding of dynamic scenes and the physics involved and the results of modifications of the controlling parameters. This would extend into research and pedagogical uses and beyond.

FIGS. 75, 76, and 77 show empirical data produced by an example embodiment in order to demonstrate the utility of some embodiments in representing and reconstructing the matter field and light field of a highly non-Lambertian surfaces. In the cases of FIGS. 75 and 76, the embodiment reconstructed a black surface and a white surface, both of which contain shallow artificial dents. The reconstructed 3D surface profiles compare favorably to reference reconstructions performed by a state-of-the-art optical 3D digitizer. In the case of FIG. 77, the embodiment reconstructed several motor vehicle body panels containing natural hail dents. The reconstruction results generally agree with the dent locations and sizes as assessed by trained human inspectors using professional inspection equipment. These empirical results demonstrate usefully accurate operation on surface regions that are highly non-Lambertian and that lack tightly localized appearance features as would be required in reconstructing such a region using conventional photogrammetry.

Other characteristics of scenes that are representable and reconstructible using the present approach include surface concavity, high self-occlusion, multiple media types lying in close proximity, metallic media, transmissive media (including glass), cast shadows, bright reflections of light sources, moving objects, and an entire environment containing a heterogeneous collection of media.

With reference to FIG. 75, 4 shallow dents were artificially introduced into region 7501 of an aluminum test panel. The region was subsequently painted black. Small dot annotation 7502 shows the center location of one of the dents. To produce a trusted reference reconstruction for evaluation of the present approach, anti-glare spray powder was applied to the unpainted panel, which was then scanned by a metrology-grade optical 3D digitizer, the GOM ATOS Triple Scan III.

After completion of the reference scan, the anti-glare powder was removed, and 3 thin coats of black spray paint were applied. This was done in order to demonstrate reconstruction, by the embodiment, of a surface with low diffuse reflectivity (e.g. <1%). The black-painted panel was mounted on a tripod and imaged from 12 inward-facing viewpoints of a (e.g. PX 3200-R) polarimetric camera at a mean distance of roughly 0.5 meters from the center of the panel. In addition to the inward-facing viewpoints, 86 additional outward-facing images of the surrounding environment were recorded. This was done in order to sample and reconstruct the light field incident at the dent region. 7511 is a subset of the inward-facing (top 2) images and outward-facing (bottom 2) images. Using the present approach, the hemispherical incident light field was reconstructed at surface locations, e.g. 7502, within the dent region. Quantified characteristics of the reconstructed light field (incident and exitant) included the radiometric power, polarization state, and spectral information of each radiel in the hemisphere of incident light. In the example embodiment, a BLIF at the panel surface was used in order to discover the 3D shape profile of the dent region.

In an example embodiment, the present approach was realized in a combined C++ and MATLAB® software implementation environment. A spatially low-frequency version of the reconstructed surface was computed with the intent of largely filtering out the higher-frequency dent geometry. The low-frequency surface then served as an estimate of the "nominal" surface, which is the surface that would exist in the absence of dents. The nominal surface was subtracted from the detailed reconstruction, yielding a 2D indentation map showing the indentation depth of each surface location relative to the nominal surface.

With reference to FIG. 75, 3D surface plot 7521 is a comparison of the dent region reconstruction produced by the example embodiment of the present approach, and the reconstruction produced by the state-of-the-art optical 3D digitizer. A simple vertical alignment was performed by subtracting each reconstruction's mean indentation value from its indentation map. The RMS deviation between the two indentation maps is approximately 21 microns. 2D plot 7531 is a cross section of indentation values through one of the 4 reconstructed dents. The RMS deviation between the indentation cross sections is approximately 8 microns. The present approach, in this example embodiment, is thus found to yield 3D surface profile accuracy roughly equivalent to a contemporary metrology-grade optical 3D digitizer.

With reference to FIG. 76, following reconstruction work on the black dent region, 3 thin coats of white paint were applied to dent region 7601. This was done in order to demonstrate reconstruction by the present approach on a surface with much higher diffuse reflectivity (e.g. >20%) as compared to the black-painted case. When polarimetric characteristics are used in a scene reconstruction approach, the white surface case is especially salient because white surface tend to polarize reflected light much less strongly than surfaces of darker appearance. The imaging and reconstruction process for the white region reconstruction scenario was similar in all key respects to the process used on the black region. The comparison visualized in 3D surface plot 7611 has RMS deviation of approximately 45 microns. Greater accuracy is achievable in embodiments by reducing systematic in error in the scene model parameters, light field elements, camera compensations, and optical interaction parameters of media in the scene.

The accuracy of the black dent and white dent reconstruction may be expressed in relative terms as (better than) one part in a thousand because the volumetric scene region containing the 4 dents extends roughly 50 millimeters in the X, Y, and Z directions. Dividing the absolute RMS deviation by the linear extent of the reconstructed region yields a ratio indicating the relative RMS deviation. The table below contains empirical data for the black dent and white dent reconstruction cases.

| | | Reconstruction Quantity | | |
|---|---|---|---|---|
| Imaged Surface | Mean diffuse reflectivity | Mean degree of linear polarization | Absolute RMS deviation in indentation vs. reference reconstruction (μm) | Relative RMS deviation in indentation vs. reference reconstruction (parts per thousand) |
| Black region containing 4 dents | 0.5% | 0.50 | 21 | 0.4 |
| White region containing 4 dents | 22% | 0.03 | 45 | 0.9 |

With reference to FIG. 77, motor vehicle panels 7701 and additional panels, numbering 17 in total quantity, were prepared and placed in a bright light field 7711 and imaged using a polarimetric camera. The light field in 7711 was not engineered to have any precise structure or distribution of illumination. Its main purpose was to provide sufficient luminous energy such that very long camera exposure times could be avoided when imaging panels with a dark surface finish. The imaged set of panels spans a range of paint colors, including black and white at the extremes of diffuse reflection and polarizing behavior. The imaging included inward-facing and outward-facing camera viewpoints as described above in reference to the test panel imaging scenarios.

Following imaging operations in the example embodiment, each panel was inspected and annotated 7721 by a human inspector professionally trained in vehicle hail damage assessment. Differently colored stickers were applied to the panels to indicate dents of various sizes as judged by the inspectors using industry-standard inspection lamps and other equipment. Each panel surface region was reconstructed using the present approach, and, with the aid of larger coded optical targets (square stickers), was resolved in a spatial frame of reference in common 7731 with the human inspectors' physical annotations. The reconstructed indentation maps were compared 7741 against the inspectors' annotations, results of which are summarized in the table below.

| Panel Color | Reconstruction Quantity | | | |
|---|---|---|---|---|
| | Total reconstructed dents > 20 μm indentation depth | Reconstructed dents intersecting an inspectors' annotation rectangle | Inspectors' annotation rectangles not intersecting a reconstructed dent | Total dents found by inspectors |
| Black | 11 | 11 | 1 | 13 |
| Blue | 12 | 11 | 1 | 12 |
| White | 15 | 15 | 4 | 19 |

Figure 78:
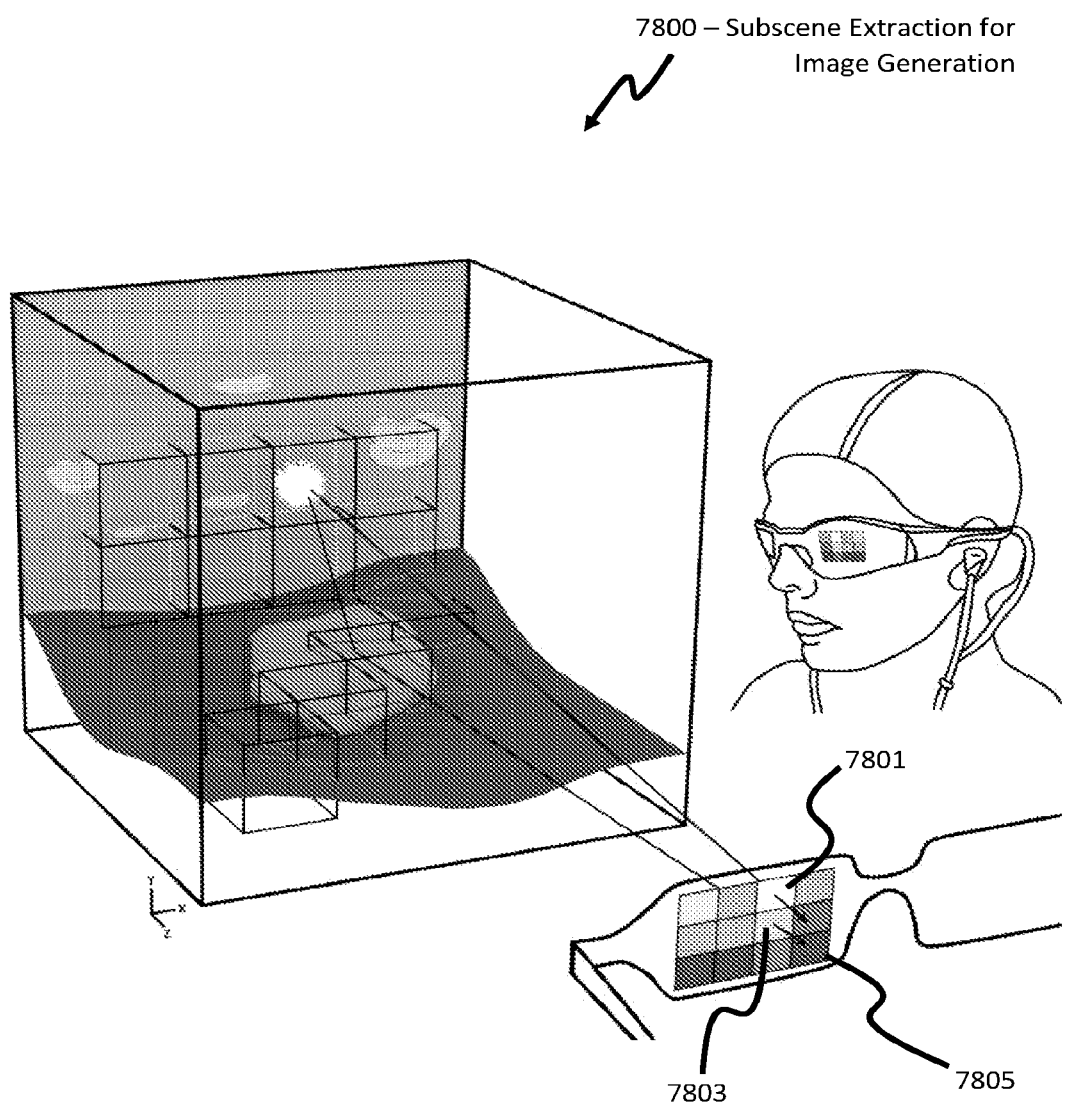
FIG. 78 is a pictorial diagram showing subscene extraction for purposes of image generation.

FIG. 78 shows an example case 7800 of subscene extraction for purposes of image generation. The extraction goal is to transmit a subscene that enables the head-mounted display 7805 screen to reproduce an image of the depicted scene model, shown with relatively coarse voxels that hold surfels and also boundary voxels holding a fenestral light field representing light from the Sun and nearby sky. The pixel 7801 in the topmost row of the display 7805 receives sunlight directly from the fenestral light field of the represented Sun. The pixel 7803 in the middle row of the display 7805 receives sunlight reflected off the ground surfel indicted in the figure. In processes 6900, 7000, and 7100 during the subscene extraction, one or more query saels covering the two pixels 7801 and 7803 would encounter both light transport paths shown in the figure. If the middle pixel 7803 happened to trigger its query earlier than the top pixel 7801, then the boundary mediel representing the sunlight in its fenestral light field might be reached via an indirect chain of 2 plenoptic projections. If the top pixel 7801 instead happened to trigger its query earlier than the middle pixel 7803, then that same boundary voxel might be reached directly via a single projection from the pixel 7801 to the boundary voxel. If the scene contained sufficiently accurate BLIF information for the ground surfel (related to "canonical" form of the scene model), the same pixel content would result regardless of the order of query sael processing.

In the examples described herein, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions. Although databases may be depicted herein as tables, other formats (including relational databases, object-based models, and/or distributed databases) may be used to store and manipulate data.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the technology, and does not imply that the illustrated process is preferred.

Processors, memory, network interfaces, I/O interfaces, and displays noted above are, or includes, hardware devices (for example, electronic circuits or combinations of circuits) that are configured to perform various different functions for a computing device.

In some embodiments, each or any of the processors is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 604 uses an instruction set architecture such as x86 or Advanced RISC Machine (ARM).

In some embodiments, each or any of the memory devices is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors). Memory devices are examples of non-volatile computer-readable storage media.

In some embodiments, each or any of network interface devices includes one or more circuits (such as a baseband processor and/or a wired or wireless transceiver), and implements layer one, layer two, and/or higher layers for one or more wired communications technologies (such as Ethernet (IEEE 802.3) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of display interfaces in 10 interfaces is or includes one or more circuits that receive data from the processors 104, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device, which displays the image data. Alternatively or additionally, in some embodiments, each or any of the display interfaces is or includes, for example, a video card, video adapter, or graphics processing unit (CPU).

In some embodiments, each or any of user input adapters in I/O interfaces is or includes one or more circuits that receive and process user input data from one or more user input devices that are included in, attached to, or otherwise in communication with the computing device, and that output data based on the received input data to the processors. Alternatively or additionally, in some embodiments each or any of the user input adapters is or includes, for example, a PS/2 interface, a USB interface, a touchscreen controller, or the like; and/or the user input adapters facilitates input from user input devices such as, for example, a keyboard, mouse, trackpad, touchscreen, etc.

Various forms of computer readable media/transmissions may be involved in carrying data (e.g., sequences of instructions) to a processor. For example, data may be (i) delivered from a memory to a processor; (ii) carried over any type of transmission medium (e.g., wire, wireless, optical, etc.); (iii) formatted and/or transmitted according to numerous formats, standards or protocols, such as Ethernet (or IEEE 802.3), ATP, Bluetooth, and TCP/IP, TDMA, CDMA, 3G, etc.; and/or (iv) encrypted to ensure privacy or prevent fraud in any of a variety of ways well known in the art.

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor execute instructions that may be tangibly stored on a computer readable storage medium.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

When it is described in this document that an action "may," "can," or "could" be performed, that a feature or component "may," "can," or "could" be included in or is applicable to a given context, that a given item "may," "can," or "could" possess a given attribute, or whenever any similar phrase involving the term "may," "can," or "could" is used, it should be understood that the given action, feature, component, attribute, etc. is present in at least one embodiment, though is not necessarily present in all embodiments.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A scene decoder system comprising:
   a communication path configured to:
     transmit one or more requests for data related to a scene, wherein the one or more requests comprise:
       a request for data representing a first light field in the scene, and data related to one or more characteristics of the system; and
     receive a response to the request, wherein the response comprises:
       data representing the first light field in the scene, and
       additional data representing at least one additional light field in the scene, wherein the additional data is related to the one or more characteristics of the system;
   a processor configured to:
     monitor the characteristics of the system,
     determine contents of the one or more requests,
     process light field information, wherein the light field information comprises the data representing the first light field in the scene and the additional data related to the at least one additional light field,
     determine whether to output any portion of the additional data related to the at least one additional light field; and
     output at least a portion of the processed light field information, wherein the outputted processed light field information comprises:
       the processed light field information related to the data representing the first light field in the scene, and
       if the processor has determined to output at least a portion of the additional data related to the at least one additional light field, the portion of the processed light field information related to the additional data related to the at least one additional light field determined to be output by the processor.

2. The scene decoder system of claim 1 wherein the data related to one or more characteristics of the system comprises a request for data related to a subscene and the response includes a representation of a subscene.

3. The scene decoder system of claim 1 wherein the response further comprises data representing a matter field in the scene.

4. The scene decoder system of claim 1 wherein the system further comprises storage medium comprising a plenoptic scene model database organized in one or more of a spatially-sorted, hierarchical, and multi-resolution manner.

5. The scene decoder system of claim 1 wherein the processor is further configured to calculate a probability of making a future request for data representing a second light field in the scene.

6. The scene decoder system of claim 5 wherein the processor is further configured to initiate a second request for data related to the scene based at least in part on the probability.

7. The scene decoder system of claim 1 wherein data related to one or more characteristics of the system comprises an accumulation of scene experience logging, a direction of travel associated with the request, data provided as part of the request, data provided in a separate request, or one or more pieces of auxiliary scene information.

8. The scene decoder system of claim 1 wherein the additional data represents one or more of a higher resolution representation of a portion of the data representing the first light field in the scene, data representing at least part of the scene from a different viewpoint, or data representing at least part of the scene from a same viewpoint with a different direction of viewing.

9. The scene decoder system of claim 1 wherein the request specifies one or more characteristics of the response, and wherein the response includes data representing the first light field in the scene responsive to the specified characteristics.

10. The scene encoder system of claim 9 wherein the one or more characteristics includes a lighting condition associated with the scene and wherein the response comprises data reflecting the lighting condition.

11. A method for decoding scene data comprising:
   transmitting one or more requests for scene data related to a scene, wherein the one or more requests comprise:
      a request for data representing a first light field in the scene, and
      data related to one or more characteristics of a system; and
   receiving a response to the request, wherein the response comprises:
      data representing the first light field in the scene, and
      additional data representing at least one additional light field in the scene, wherein the additional data is related to the one or more characteristics of the system;
   monitoring the characteristics of the system,
   determining contents of the one or more requests,
   processing light field information, wherein the light field information comprises the data representing the first light field in the scene and the additional data related to the at least one additional light field,
   determining whether to output any portion of the additional data related to the at least one additional light field; and
   outputting at least a portion of the processed light field information, wherein the outputted processed light field information comprises:
      the processed light field information related to the data representing the first light field in the scene, and
      if a processor has determined to output at least a portion of the additional data related to the at least one additional light field, the portion of the processed light field information related to the additional data related to the at least one additional light field determined to be output by the processor.

12. The method of claim 11 wherein the data related to one or more characteristics of the system comprises a request for data related to a subscene and the response includes a representation of a subscene.

13. The method of claim 11 wherein the response further comprises data representing a matter field in the scene.

14. The method of claim 11 wherein the method further comprises storing the response in a storage medium comprising a plenoptic scene model database organized in one or more of a spatially-sorted, hierarchical, and multi-resolution manner.

15. The method of claim 11 wherein the method further includes calculating a probability of making a future request for data representing a second light field in the scene.

16. The method of claim 15 wherein the method further comprises initiating a second request for data related to the scene based at least in part on the probability.

17. The method of claim 11 wherein the data related to one or more characteristics of the system comprises an accumulation of scene experience logging, a direction of travel associated with the request, data provided as part of the request, data provided in a separate request, or one or more pieces of auxiliary scene information.

18. The method of claim 11 wherein the additional data represents one or more of a higher resolution representation of a portion of the data representing the first light field in the scene, data representing at least part of the scene from a different viewpoint, or data representing at least part of the scene from a same viewpoint with a different direction of viewing.

19. The method of claim 11 wherein the request specifies one or more characteristics of the response, and wherein the response includes data representing the first light field in the scene responsive to the specified characteristics.

20. A non-transitory computer readable storage medium having instructions stored thereon, wherein the instructions, when executed by at least one processor of a computer system, causes the computer system to perform operations comprising:
   transmitting one or more requests for scene data related to a scene, wherein the one or more requests comprise:
      a request for data representing a first light field in the scene, and
      data related to one or more characteristics of the system; and
   receiving a response to the request, wherein the response comprises:
      data representing the first light field in the scene, and
      additional data representing at least one additional light field in the scene, wherein the additional data is related to the one or more characteristics of the system;
   monitoring the characteristics of the system,
   determining contents of the one or more requests,
   processing light field information, wherein the light field information comprises the data representing the first light field in the scene and the additional data related to the at least one additional light field,
   determining whether to output any portion of the additional data related to the at least one additional light field; and
   outputting at least a portion of the processed light field information, wherein the outputted processed light field information comprises:

the processed light field information related to the data representing the first light field in the scene, and if the processor has determined to output at least a portion of the additional data related to the at least one additional light field, the portion of the processed light field information related to the additional data related to the at least one additional light field determined to be output by the processor.

\* \* \* \* \*